US009111256B2

(12) United States Patent
Holman et al.

(10) Patent No.: US 9,111,256 B2
(45) Date of Patent: Aug. 18, 2015

(54) SELECTION INFORMATION SYSTEM AND METHOD FOR INGESTIBLE PRODUCT PREPARATION SYSTEM AND METHOD

(75) Inventors: Paul Holman, Seattle, WA (US); Royce A. Levien, Lexington, MA (US); Mark A. Malamud, Seattle, WA (US); Neal Stephenson, Seattle, WA (US); Christopher Charles Young, Seattle, WA (US)

(73) Assignee: ELWHA LLC, Bellevue, WA (US)

( * ) Notice: Subject to any disclaimer, the term of this patent is extended or adjusted under 35 U.S.C. 154(b) by 216 days.

(21) Appl. No.: 13/317,979

(22) Filed: Oct. 31, 2011

(65) Prior Publication Data

US 2013/0054383 A1 Feb. 28, 2013

Related U.S. Application Data

(63) Continuation-in-part of application No. 13/199,361, filed on Aug. 26, 2011, and a continuation-in-part of application No. 13/199,481, filed on Aug. 30, 2011, and a continuation-in-part of application No.

(Continued)

(51) Int. Cl.
*G06Q 30/00* (2012.01)
*G06Q 50/00* (2012.01)
(Continued)

(52) U.S. Cl.
CPC ............. *G06Q 10/10* (2013.01); *H04L 67/22* (2013.01); *H04L 67/306* (2013.01)

(58) Field of Classification Search
CPC ... G06Q 30/02; G06Q 50/12; G06Q 30/0633; G06Q 10/101; G07F 7/1008
USPC .......... 705/1.1, 26.8, 27.1, 15, 330, 500, 339, 705/5, 21, 26.9, 2, 300; 99/321, 322; 700/233, 236; 222/243; 434/127; 235/375, 383; 455/553.1, 3.06; 379/93.12, 90.01
See application file for complete search history.

(56) References Cited

U.S. PATENT DOCUMENTS 1,570,405 A 1/1926 Salerno
3,702,583 A * 11/1972 Rullman .......................... 99/335
(Continued)

FOREIGN PATENT DOCUMENTS

| NL | 2003661 C | 4/2011 |
|----|-----------|--------|
| WO | WO 03/056493 A1 | 7/2003 |
| WO | WO 2006/095212 A1 | 9/2006 |

OTHER PUBLICATIONS

Fiore, a. M., & Yu, H. (2001). Effects of imagery copy and product samples on responses toward the product. Journal of Interactive Marketing, 15(2), 36-46. Retrieved from http://search.proquest.com/docview/229656911?accountid=14753.*

(Continued)

*Primary Examiner* — Olusegun Goyea

(57) ABSTRACT

A computationally implemented system and method that is designed to, but is not limited to: electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus.

60 Claims, 66 Drawing Sheets

Related U.S. Application Data

13/199,545, filed on Aug. 31, 2011, and a continuation-in-part of application No. 13/199,544, filed on Aug. 31, 2011, and a continuation-in-part of application No. 13/200,113, filed on Sep. 16, 2011, and a continuation-in-part of application No. 13/200,106, filed on Sep. 16, 2011, and a continuation-in-part of application No. 13/200,830, filed on Sep. 30, 2011, and a continuation-in-part of application No. 13/200,829, filed on Sep. 30, 2011, and a continuation-in-part of application No. 13/200,907, filed on Oct. 3, 2011, and a continuation-in-part of application No. 13/200,906, filed on Oct. 3, 2011, and a continuation-in-part of application No. 13/317,545, filed on Oct. 19, 2011, and a continuation-in-part of application No. 13/317,546, filed on Oct. 19, 2011.

(51) Int. Cl.

| | | |
|---|---|---|
| G06Q 10/00 | | (2012.01) |
| G06Q 20/00 | | (2012.01) |
| G06F 17/00 | | (2006.01) |
| G06F 7/00 | | (2006.01) |
| G06K 15/00 | | (2006.01) |
| G06K 5/00 | | (2006.01) |
| G06K 7/01 | | (2006.01) |
| G06Q 10/10 | | (2012.01) |
| H04L 29/08 | | (2006.01) |

(56) References Cited

U.S. PATENT DOCUMENTS

| | | | |
|---|---|---|---|
| 3,859,904 A | | 1/1975 | Carriazo |
| 4,076,846 A | | 2/1978 | Nakatsuka et al. |
| 4,135,077 A | | 1/1979 | Wills |
| 4,293,296 A | | 10/1981 | Caiello et al. |
| 4,634,597 A | | 1/1987 | Spiel et al. |
| 4,666,204 A | | 5/1987 | Reinholtz |
| 4,681,000 A | | 7/1987 | Wolters |
| 4,723,614 A * | | 2/1988 | Lahti .............. 177/120 |
| 4,797,818 A * | | 1/1989 | Cotter .............. 705/15 |
| 4,974,747 A * | | 12/1990 | Ahlstrom .............. 221/87 |
| 5,176,922 A | | 1/1993 | Balsano et al. |
| 5,197,376 A * | | 3/1993 | Bird et al. .............. 99/330 |
| 5,261,150 A | | 11/1993 | Grube et al. |
| 5,408,443 A * | | 4/1995 | Weinberger .............. 368/10 |
| 5,417,989 A | | 5/1995 | Atwood et al. |
| 5,511,594 A | | 4/1996 | Brennan et al. |
| 5,522,310 A * | | 6/1996 | Black et al. .............. 99/357 |
| 5,540,943 A | | 7/1996 | Naramura |
| 5,583,129 A | | 12/1996 | Spona et al. |
| 5,598,947 A * | | 2/1997 | Smith .............. 221/150 HC |
| 5,697,043 A | | 12/1997 | Baskaran et al. |
| 5,731,020 A | | 3/1998 | Russo |
| 5,762,971 A | | 6/1998 | Schirmer |
| 5,820,906 A | | 10/1998 | Akesson et al. |
| 6,048,191 A | | 4/2000 | Beltrami |
| 6,105,818 A * | | 8/2000 | Speranza .............. 221/1 |
| 6,112,182 A * | | 8/2000 | Akers et al. .............. 705/2 |
| 6,194,017 B1 | | 2/2001 | Woodward et al. |
| 6,200,125 B1 | | 3/2001 | Akutagawa |
| 6,202,923 B1 * | | 3/2001 | Boyer et al. .............. 235/375 |
| 6,236,974 B1 * | | 5/2001 | Kolawa et al. .............. 705/7.32 |
| 6,245,556 B1 | | 6/2001 | Sako et al. |
| 6,268,004 B1 | | 7/2001 | Hayashi |
| 6,280,784 B1 * | | 8/2001 | Yang et al. .............. 426/231 |
| 6,280,785 B1 * | | 8/2001 | Yang et al. .............. 426/231 |
| 6,280,786 B1 | | 8/2001 | Williams et al. |
| 6,376,000 B1 | | 4/2002 | Waters |
| 6,415,555 B1 | | 7/2002 | Montague |
| 6,618,062 B1 | | 9/2003 | Brown et al. |
| 6,622,064 B2 | | 9/2003 | Bartholomew et al. |
| 6,637,432 B2 | | 10/2003 | Wakefield et al. |
| 6,644,359 B1 | | 11/2003 | Wertheim |
| 6,646,659 B1 | | 11/2003 | Brown et al. |
| 6,660,317 B1 | | 12/2003 | Akutagawa |
| 6,711,460 B1 | | 3/2004 | Reese |
| 6,802,433 B2 | | 10/2004 | Leykin et al. |
| 6,843,166 B1 * | | 1/2005 | Li .............. 99/327 |
| 6,859,215 B1 | | 2/2005 | Brown et al. |
| 6,865,261 B1 * | | 3/2005 | Rao et al. .............. 379/93.12 |
| 6,998,087 B1 | | 2/2006 | Hanson et al. |
| 7,006,893 B2 | | 2/2006 | Hart et al. |
| 7,027,996 B2 | | 4/2006 | Levinson |
| 7,054,909 B1 | | 5/2006 | Ohkubo et al. |
| 7,080,597 B2 | | 7/2006 | Ando |
| 7,098,794 B2 | | 8/2006 | Lindsay et al. |
| 7,110,964 B2 * | | 9/2006 | Tengler et al. .............. 705/21 |
| 7,183,518 B2 * | | 2/2007 | Near et al. .............. 219/214 |
| 7,187,960 B2 | | 3/2007 | Abreu |
| 7,188,082 B2 * | | 3/2007 | Keane et al. .............. 705/26.81 |
| 7,200,644 B1 | | 4/2007 | Flanagan |
| 7,231,917 B2 | | 6/2007 | Frederiksen |
| 7,243,789 B2 | | 7/2007 | Discko, Jr. |
| 7,281,468 B2 | | 10/2007 | Frem |
| 7,295,889 B2 | | 11/2007 | Lähteenmäki |
| 7,299,982 B2 | | 11/2007 | Kreiner et al. |
| 7,319,780 B2 | | 1/2008 | Fedorovskaya et al. |
| 7,343,174 B2 * | | 3/2008 | Suryanarayana et al. . 455/553.1 |
| 7,364,068 B1 | | 4/2008 | Strubbe et al. |
| 7,392,193 B2 | | 6/2008 | Mault |
| 7,395,134 B2 | | 7/2008 | Bartholomew et al. |
| 7,415,375 B2 | | 8/2008 | Shakman et al. |
| 7,451,015 B2 | | 11/2008 | Mazur et al. |
| 7,457,685 B2 | | 11/2008 | D'Silva |
| 7,555,360 B1 | | 6/2009 | Green et al. |
| 7,571,586 B1 * | | 8/2009 | Morales .............. 53/167 |
| 7,625,198 B2 | | 12/2009 | Lipson et al. |
| 7,630,790 B2 | | 12/2009 | Handfield et al. |
| 7,680,690 B1 * | | 3/2010 | Catalano .............. 705/15 |
| 7,698,566 B1 | | 4/2010 | Stone |
| 7,747,345 B2 | | 6/2010 | Ohmura et al. |
| 7,762,181 B2 * | | 7/2010 | Boland et al. .............. 99/322 |
| 7,783,379 B2 | | 8/2010 | Beane et al. |
| 7,818,089 B2 | | 10/2010 | Hanna et al. |
| 7,842,323 B1 | | 11/2010 | White |
| 7,884,953 B1 | | 2/2011 | Willcocks et al. |
| 7,961,916 B2 | | 6/2011 | Wang et al. |
| 7,974,873 B2 * | | 7/2011 | Simmons et al. .............. 705/7.29 |
| 8,007,847 B2 | | 8/2011 | Biderman et al. |
| 8,027,748 B2 | | 9/2011 | Handfield et al. |
| 8,085,135 B2 | | 12/2011 | Cohen Alloro et al. |
| 8,173,186 B2 | | 5/2012 | Kuwabara et al. |
| 8,190,447 B2 | | 5/2012 | Hungerford et al. |
| 8,204,757 B2 * | | 6/2012 | Carlson et al. .............. 705/1.1 |
| 8,249,946 B2 | | 8/2012 | Froseth et al. |
| 8,306,655 B2 | | 11/2012 | Newman |
| 8,370,176 B2 | | 2/2013 | Vespasiani |
| 8,412,369 B2 | | 4/2013 | Ames, II et al. |
| 8,504,440 B2 | | 8/2013 | Kolawa et al. |
| 8,521,326 B1 | | 8/2013 | Holtje |
| 8,583,511 B2 | | 11/2013 | Hendrickson |
| 8,594,935 B2 | | 11/2013 | Cioffi et al. |
| 2001/0005830 A1 | | 6/2001 | Kuroyanagi |
| 2001/0028308 A1 * | | 10/2001 | De La Huerga .............. 340/573.1 |
| 2001/0036495 A1 | | 11/2001 | Ganan-Calvo |
| 2002/0029149 A1 | | 3/2002 | Nishina |
| 2002/0049652 A1 | | 4/2002 | Moore et al. |
| 2002/0081356 A1 | | 6/2002 | Bebiak et al. |
| 2002/0138201 A1 | | 9/2002 | Greensides |
| 2002/0156682 A1 | | 10/2002 | DiPietro |
| 2002/0192572 A1 | | 12/2002 | Lau |
| 2003/0017248 A1 | | 1/2003 | Gray |
| 2003/0050854 A1 * | | 3/2003 | Showghi et al. .............. 705/26 |
| 2003/0051606 A1 * | | 3/2003 | Cusenza et al. .............. 99/357 |
| 2003/0071806 A1 * | | 4/2003 | Annand .............. 345/418 |
| 2003/0079612 A1 | | 5/2003 | Con |
| 2003/0099157 A1 * | | 5/2003 | Quine .............. 368/10 |
| 2003/0105555 A1 * | | 6/2003 | Lunak et al. .............. 700/237 |
| 2003/0121929 A1 * | | 7/2003 | Liff et al. .............. 221/7 |
| 2003/0125836 A1 | | 7/2003 | Chirnomas |
| 2003/0125963 A1 * | | 7/2003 | Haken .............. 705/1 |

(56) References Cited

U.S. PATENT DOCUMENTS

| | | |
|---|---|---|
| 2003/0125986 A1* | 7/2003 | Collosi ............... 705/2 |
| 2003/0197005 A1 | 10/2003 | Huegerich et al. |
| 2003/0208113 A1 | 11/2003 | Mault et al. |
| 2003/0208409 A1 | 11/2003 | Mault |
| 2003/0219527 A1 | 11/2003 | Sasaki et al. |
| 2003/0236706 A1* | 12/2003 | Weiss ............... 705/15 |
| 2004/0045579 A1 | 3/2004 | Miki et al. |
| 2004/0054554 A1* | 3/2004 | Barts et al. ............ 705/1 |
| 2004/0073448 A1* | 4/2004 | Barts et al. ............ 705/1 |
| 2004/0073449 A1* | 4/2004 | Yang ............... 705/1 |
| 2004/0091843 A1 | 5/2004 | Albro et al. |
| 2004/0093265 A1 | 5/2004 | Ramchandani et al. |
| 2004/0093268 A1 | 5/2004 | Ramchandani et al. |
| 2004/0131659 A1 | 7/2004 | Gibson et al. |
| 2004/0143503 A1* | 7/2004 | Suthar ............... 705/15 |
| 2004/0151820 A1 | 8/2004 | Harris |
| 2004/0158350 A1 | 8/2004 | Ostergaard et al. |
| 2004/0158499 A1 | 8/2004 | Dev et al. |
| 2004/0193495 A1 | 9/2004 | Kim |
| 2004/0214597 A1* | 10/2004 | Suryanarayana et al. . 455/552.1 |
| 2004/0238555 A1* | 12/2004 | Parks ............... 221/80 |
| 2004/0246819 A1* | 12/2004 | Quine ............... 368/10 |
| 2004/0250842 A1 | 12/2004 | Adams et al. |
| 2005/0023710 A1 | 2/2005 | Brodkin et al. |
| 2005/0038719 A1 | 2/2005 | Young et al. |
| 2005/0048461 A1 | 3/2005 | Lahteenmaki |
| 2005/0059849 A1 | 3/2005 | Liu |
| 2005/0079257 A1 | 4/2005 | Neto |
| 2005/0080650 A1 | 4/2005 | Noel |
| 2005/0098169 A1 | 5/2005 | Frederiksen |
| 2005/0114149 A1 | 5/2005 | Rodriguez et al. |
| 2005/0131738 A1 | 6/2005 | Morris |
| 2005/0157148 A1 | 7/2005 | Baker et al. |
| 2005/0160052 A1 | 7/2005 | Schneider et al. |
| 2005/0171663 A1 | 8/2005 | Mittelsteadt et al. |
| 2005/0193901 A1 | 9/2005 | Buehler |
| 2005/0209915 A1 | 9/2005 | Saluccio |
| 2005/0226975 A1 | 10/2005 | Drouillard |
| 2005/0230472 A1* | 10/2005 | Chang ............... 235/383 |
| 2005/0233011 A1 | 10/2005 | Beavers |
| 2005/0241497 A1 | 11/2005 | Cantu |
| 2005/0251289 A1 | 11/2005 | Bonney et al. |
| 2005/0267811 A1* | 12/2005 | Almblad ............... 705/15 |
| 2005/0280544 A1 | 12/2005 | Mishelevich |
| 2006/0015289 A1 | 1/2006 | Shakman et al. |
| 2006/0053184 A1 | 3/2006 | Grana |
| 2006/0064037 A1 | 3/2006 | Shalon et al. |
| 2006/0081653 A1* | 4/2006 | Boland et al. ............ 222/243 |
| 2006/0108415 A1* | 5/2006 | Thomas et al. ............ 235/381 |
| 2006/0111976 A1* | 5/2006 | Pompushko ............ 705/14 |
| 2006/0161453 A1 | 7/2006 | Kost et al. |
| 2006/0178943 A1 | 8/2006 | Rollinson et al. |
| 2006/0191885 A1* | 8/2006 | Near et al. ............ 219/214 |
| 2006/0224419 A1 | 10/2006 | Servizio et al. |
| 2006/0237523 A1 | 10/2006 | Carlson et al. |
| 2006/0259188 A1 | 11/2006 | Berg |
| 2006/0263501 A1* | 11/2006 | Oghafua et al. ............ 426/523 |
| 2006/0277066 A1 | 12/2006 | Hungerford et al. |
| 2006/0278093 A1 | 12/2006 | Biderman et al. |
| 2006/0286218 A1 | 12/2006 | Salzman |
| 2007/0037567 A1 | 2/2007 | Ungless et al. |
| 2007/0038727 A1 | 2/2007 | Bailey et al. |
| 2007/0048407 A1 | 3/2007 | Collins et al. |
| 2007/0055550 A1* | 3/2007 | Courtney et al. ............ 705/3 |
| 2007/0055694 A1 | 3/2007 | Ruge et al. |
| 2007/0061170 A1 | 3/2007 | Lorsch |
| 2007/0061209 A1 | 3/2007 | Jackson |
| 2007/0062156 A1 | 3/2007 | Kim |
| 2007/0083494 A1 | 4/2007 | Carlson et al. |
| 2007/0092614 A1 | 4/2007 | Waldock |
| 2007/0150371 A1 | 6/2007 | Gangji |
| 2007/0150375 A1* | 6/2007 | Yang ............... 705/26 |
| 2007/0151984 A1 | 7/2007 | Baker et al. |
| 2007/0168205 A1* | 7/2007 | Carlson et al. ............ 705/1 |
| 2007/0185615 A1 | 8/2007 | Bossi et al. |
| 2007/0185785 A1* | 8/2007 | Carlson et al. ............ 705/27 |
| 2007/0191689 A1 | 8/2007 | Elitok |
| 2007/0192715 A1 | 8/2007 | Kataria et al. |
| 2007/0208454 A1 | 9/2007 | Forrester et al. |
| 2007/0231435 A1 | 10/2007 | Ream et al. |
| 2007/0260487 A1 | 11/2007 | Bartfeld et al. |
| 2007/0275690 A1 | 11/2007 | Hunter et al. |
| 2008/0059226 A1 | 3/2008 | Melker et al. |
| 2008/0077440 A1 | 3/2008 | Doron |
| 2008/0084450 A1 | 4/2008 | Silverbrook |
| 2008/0124433 A1 | 5/2008 | Yelden et al. |
| 2008/0125897 A1 | 5/2008 | DiGianfilippo et al. |
| 2008/0126220 A1 | 5/2008 | Baril et al. |
| 2008/0126985 A1 | 5/2008 | Baril et al. |
| 2008/0141315 A1 | 6/2008 | Ogilvie |
| 2008/0173711 A1 | 7/2008 | Handfield et al. |
| 2008/0195247 A1 | 8/2008 | Mallett et al. |
| 2008/0224823 A1 | 9/2008 | Lawson et al. |
| 2008/0249865 A1 | 10/2008 | Angell et al. |
| 2008/0260918 A1 | 10/2008 | Lai et al. |
| 2008/0272138 A1 | 11/2008 | Ross et al. |
| 2008/0288287 A1 | 11/2008 | Stanners |
| 2008/0314918 A1 | 12/2008 | Nuriely |
| 2009/0012433 A1 | 1/2009 | Fernstrom et al. |
| 2009/0029016 A1 | 1/2009 | Pfister et al. |
| 2009/0043176 A1 | 2/2009 | Nakajima et al. |
| 2009/0087819 A1* | 4/2009 | Adachi et al. ............ 434/127 |
| 2009/0099944 A1 | 4/2009 | Robinson et al. |
| 2009/0105875 A1 | 4/2009 | Wiles |
| 2009/0106313 A1 | 4/2009 | Boldyga |
| 2009/0130449 A1 | 5/2009 | El-Siblani |
| 2009/0132379 A1 | 5/2009 | Baril et al. |
| 2009/0164897 A1 | 6/2009 | Amer-Yahia et al. |
| 2009/0167553 A1 | 7/2009 | Hong et al. |
| 2009/0192898 A1 | 7/2009 | Baril |
| 2009/0198547 A1 | 8/2009 | Sudak |
| 2009/0199105 A1* | 8/2009 | Kamada et al. ............ 715/738 |
| 2009/0218363 A1 | 9/2009 | Terzini |
| 2009/0236333 A1* | 9/2009 | Ben-Shmuel et al. ....... 219/702 |
| 2009/0236334 A1* | 9/2009 | Ben-Shmuel et al. ....... 219/703 |
| 2009/0236335 A1* | 9/2009 | Ben-Shmuel et al. ....... 219/710 |
| 2009/0242620 A1 | 10/2009 | Sahuguet |
| 2009/0261175 A1* | 10/2009 | Kauppinen et al. ............ 236/44 |
| 2009/0267895 A1 | 10/2009 | Bunch |
| 2009/0294521 A1 | 12/2009 | De La Huerga |
| 2009/0295569 A1 | 12/2009 | Corwin et al. |
| 2009/0297668 A1 | 12/2009 | Cantu |
| 2009/0299645 A1 | 12/2009 | Colby et al. |
| 2009/0317519 A1 | 12/2009 | Lavie et al. |
| 2009/0326516 A1 | 12/2009 | Bangera et al. |
| 2010/0017296 A1* | 1/2010 | Spignesi et al. ............ 705/14.66 |
| 2010/0038416 A1 | 2/2010 | Canora |
| 2010/0038594 A1 | 2/2010 | Bohlig et al. |
| 2010/0042427 A1* | 2/2010 | Graham et al. ............ 705/1 |
| 2010/0045705 A1 | 2/2010 | Vertegaal et al. |
| 2010/0047410 A1 | 2/2010 | Lichtenstein |
| 2010/0052900 A1 | 3/2010 | Covannon et al. |
| 2010/0055257 A1 | 3/2010 | Hervig |
| 2010/0063889 A1* | 3/2010 | Proctor et al. ............ 705/21 |
| 2010/0087155 A1 | 4/2010 | Dubost |
| 2010/0100237 A1 | 4/2010 | Ratnakar |
| 2010/0106523 A1 | 4/2010 | Kalamas |
| 2010/0106607 A1 | 4/2010 | Riddiford et al. |
| 2010/0121156 A1 | 5/2010 | Yoo |
| 2010/0121722 A1* | 5/2010 | Vawter ............... 705/15 |
| 2010/0136666 A1 | 6/2010 | Kobayashi et al. |
| 2010/0139992 A1 | 6/2010 | Delia et al. |
| 2010/0145506 A1 | 6/2010 | Waugh et al. |
| 2010/0161345 A1 | 6/2010 | Cain et al. |
| 2010/0161600 A1 | 6/2010 | Higgins et al. |
| 2010/0167648 A1 | 7/2010 | Doutriaux |
| 2010/0189842 A1 | 7/2010 | Toren |
| 2010/0204676 A1 | 8/2010 | Cardullo |
| 2010/0206765 A1 | 8/2010 | Fonte |
| 2010/0235201 A1 | 9/2010 | McEvoy |
| 2010/0250384 A1* | 9/2010 | Bhargava ............ 705/26 |
| 2010/0256993 A1 | 10/2010 | Vespasiani |
| 2010/0259719 A1 | 10/2010 | Sabeta |
| 2010/0268378 A1* | 10/2010 | Sharpley ............... 700/233 |

(56) References Cited

U.S. PATENT DOCUMENTS

| | | |
|---|---|---|
| 2010/0268380 A1 | 10/2010 | Waugh et al. |
| 2010/0275625 A1* | 11/2010 | Lowenstein .................... 62/127 |
| 2010/0286632 A1 | 11/2010 | Dos Santos |
| 2010/0291515 A1 | 11/2010 | Pinnisi et al. |
| 2010/0303972 A1 | 12/2010 | Srivastava |
| 2010/0305974 A1* | 12/2010 | Patch et al. ...................... 705/3 |
| 2010/0310737 A1 | 12/2010 | Someya et al. |
| 2010/0312143 A1 | 12/2010 | Kim |
| 2010/0312385 A1 | 12/2010 | Deuber |
| 2010/0320189 A1 | 12/2010 | Buchheit |
| 2010/0332140 A1 | 12/2010 | Joyce et al. |
| 2010/0332250 A1 | 12/2010 | Simpson et al. |
| 2011/0000923 A1* | 1/2011 | Morales ........................ 220/673 |
| 2011/0004624 A1 | 1/2011 | Bansal et al. |
| 2011/0027432 A1 | 2/2011 | Loeser |
| 2011/0031236 A1* | 2/2011 | Ben-Shmuel et al. ......... 219/620 |
| 2011/0040660 A1 | 2/2011 | Allison et al. |
| 2011/0055044 A1 | 3/2011 | Wiedl |
| 2011/0076349 A1 | 3/2011 | Yoshihara et al. |
| 2011/0087076 A1 | 4/2011 | Brynelsen et al. |
| 2011/0124996 A1 | 5/2011 | Reinke et al. |
| 2011/0160902 A1 | 6/2011 | Postins |
| 2011/0166881 A1 | 7/2011 | Brazzo et al. |
| 2011/0173062 A1 | 7/2011 | Chen et al. |
| 2011/0208617 A1 | 8/2011 | Weiland |
| 2011/0231212 A1* | 9/2011 | Hurley et al. ...................... 705/5 |
| 2011/0231266 A1 | 9/2011 | Baril |
| 2011/0282712 A1 | 11/2011 | Amos et al. |
| 2011/0289572 A1 | 11/2011 | Skeel et al. |
| 2011/0300270 A1* | 12/2011 | Koppens ...................... 426/115 |
| 2011/0313867 A9 | 12/2011 | Silver |
| 2011/0318717 A1 | 12/2011 | Adamowicz |
| 2011/0320037 A1 | 12/2011 | Frugone |
| 2012/0004770 A1 | 1/2012 | Ooyen et al. |
| 2012/0016745 A1 | 1/2012 | Hendrickson |
| 2012/0041778 A1 | 2/2012 | Kraft |
| 2012/0088212 A1 | 4/2012 | Knaan |
| 2012/0089249 A1* | 4/2012 | Rosenblum ................... 700/225 |
| 2012/0101914 A1* | 4/2012 | Kumar et al. ................. 705/26.8 |
| 2012/0131619 A1 | 5/2012 | Ogilvie |
| 2012/0136731 A1 | 5/2012 | Kidron et al. |
| 2012/0137325 A1 | 5/2012 | Ogilvie |
| 2012/0152125 A1 | 6/2012 | Yoakim et al. |
| 2012/0156337 A1 | 6/2012 | Studor et al. |
| 2012/0168985 A1* | 7/2012 | Klaber .......................... 264/308 |
| 2012/0173271 A1 | 7/2012 | Omidi |
| 2012/0179665 A1 | 7/2012 | Baarman et al. |
| 2012/0196011 A1 | 8/2012 | Felix |
| 2012/0214140 A1 | 8/2012 | Brynelsen et al. |
| 2012/0233002 A1 | 9/2012 | Abujbara |
| 2012/0246004 A1 | 9/2012 | Book et al. |
| 2012/0251688 A1 | 10/2012 | Zimmerman et al. |
| 2012/0251689 A1 | 10/2012 | Batchelder |
| 2012/0258216 A1 | 10/2012 | Wessels |
| 2012/0284126 A1 | 11/2012 | Giraud et al. |
| 2012/0290412 A1 | 11/2012 | Marovets |
| 2012/0323707 A1 | 12/2012 | Urban |
| 2013/0006415 A1* | 1/2013 | Paydar et al. ................. 700/235 |
| 2013/0011529 A1 | 1/2013 | Belzowski et al. |
| 2013/0018356 A1 | 1/2013 | Prince et al. |
| 2013/0034633 A1 | 2/2013 | Von Hasseln |
| 2013/0089642 A1 | 4/2013 | Lipson et al. |
| 2013/0151268 A1* | 6/2013 | Fletcher ............................ 705/2 |
| 2013/0158705 A1* | 6/2013 | Levy et al. .................... 700/241 |
| 2013/0171304 A1 | 7/2013 | Huntley |
| 2013/0189405 A1 | 7/2013 | Filliol et al. |
| 2013/0196035 A1 | 8/2013 | Passet et al. |
| 2013/0238118 A1 | 9/2013 | Haas |
| 2013/0273217 A1 | 10/2013 | Minvielle |
| 2013/0304529 A1 | 11/2013 | Phalake et al. |
| 2014/0013962 A1 | 1/2014 | Lipton et al. |
| 2014/0050811 A1 | 2/2014 | Lipton et al. |

OTHER PUBLICATIONS

U.S. Appl. No. 13/435,591, Holman et al.
U.S. Appl. No. 13/435,590, Holman et al.
U.S. Appl. No. 13/432,525, Holman et al.
U.S. Appl. No. 13/432,507, Holman et al.
U.S. Appl. No. 13/385,690, Holman et al.
U.S. Appl. No. 13/385,687, Holman et al.
U.S. Appl. No. 13/385,129, Holman et al.
U.S. Appl. No. 13/385,128, Holman et al.
U.S. Appl. No. 13/373,847, Holman et al.
U.S. Appl. No. 13/373,846, Holman et al.
U.S. Appl. No. 13/373,675, Holman et al.
U.S. Appl. No. 13/373,674, Holman et al.
U.S. Appl. No. 13/317,978, Holman et al.
U.S. Appl. No. 13/317,546, Holman et al.
U.S. Appl. No. 13/317,545, Holman et al.
U.S. Appl. No. 13/200,907, Holman et al.
U.S. Appl. No. 13/200,906, Holman et al.
U.S. Appl. No. 13/200,830, Holman et al.
U.S. Appl. No. 13/200,829, Holman et al.
U.S. Appl. No. 13/200,113, Holman et al.
U.S. Appl. No. 13/200,106, Holman et al.
U.S. Appl. No. 13/199,545, Holman et al.
U.S. Appl. No. 13/199,544, Holman et al.
U.S. Appl. No. 13/199,481 Holman et al.
U.S. Appl. No. 13/199,361, Holman et al.
"3D food printing"; PharmacyEscrow.com; printed on Apr. 4, 2012; 2 pages.
Blain, Loz; "Cornucopia: Digital Gastronomy—could 3D printing be the next revolution in cooking?"; Gizmag; Jan. 14, 2010; 4 pages.
Broomfield, Mark; "The Future of Food Printing"; Fab@Home; Aug. 20, 2009; 1 page.
Coelho, Marcelo; "Cornucopia"; printed on Apr. 4, 2012; 1 page; located at fluid.media.mut.edu.
Cohen et al.; "Hydrocolloid Printing: A Novel Platform for Customized Food Production"; Twentieth Annual International Solid Freeform Fabrication Symposium, Austin, Texas; bearing a date of 2009; cover page and pp. 807-818.
Fawkes, Piers; "3D Food Printing", PSFK; Jan. 17, 2008; 8 pages.
Flatley, Joseph L.; "Ikea's kitchen of the future: 3D food printing, mood lighting, virtual Gordon Ramsay"; Engadget; printed on Apr. 4, 2012; 4 pages; AOL Inc.
McKendrick, Joe; "3D food 'printing': coming to a kitchen near you"; Smartplanet; Dec. 27, 2010; 6 pages; located at www.smartplanet.com/business/blog/business-brains.
Periard et al.; "Printing Food"; Cornell University; printed on Apr. 6, 2012; 11 pages; located at www.creativemachines.cornell.edu/papers/SFF07_Periard2.pdf.
"Printed Meats!"; Fabbaloo; Aug. 23, 2010; 5 pages; Fabbaloo.
"Prototypes and Concept Designs for a Digital Gastronomy"; Cornucopia; printed on Apr. 4, 2012; 5 pages.
Sandhana, Lakshmi; "The printed future of Christmas dinner"; BBC News Technology; Dec. 24, 2010; 4 pages; MMXI.
Seth, Radhika; "Printing My Food by the Molecule"; Yanko Design; Mar. 2, 2010; 7 pages.
Seth, Radhika; "Surreal Food is Real and Printed"; Yanko Design; Aug. 26, 2009; 6 pages.
"The CandyFab 6000"; Evil Mad Scientist Laboratories; bearing a date of 2011; 7 pages; Evil Mad Scientist Laboratories.
"Welcome to The CandyFabProject"; CandyFab.org; Jan. 22, 2011; 3 pages; The CandyFab Project.
"Scientests create 'inhalable' food?"; bearing a date of Aug. 29, 2012; snapshot. taken Apr. 12, 2009, available at http://web.archive.org/web/2009041213937/ http://chowhound.chow.com/topics/611174.
"Transdermal Nutrient Delivery System"; U.S. Army Soldier and Biological Chemical Command; snapshot taken Jul. 21, 2004; available at http://web.archive.org/web.20040721134210 http://archives.tproc.org/www.sbccom.army.mil/products/food/tdnds.pdf.

(56) References Cited

OTHER PUBLICATIONS

American Society of Hospital Pharmacists; "ASHP Technical Assistance Bulleting on Compounding Nonsterile Products in Pharmacies"; Am. J. Hosp. Pharm.; bearing a date of 1994, approved Apr. 27, 1994; pp. 73-79; vol. 51, No. 1441-8; American Society of Hospital Pharmacists, Inc.

"Airline Tickets and Airline Reservations from American Airlines"; AA.com; 1 page; retrieved from the internet wayback machine on Oct. 27, 2011; located at http://web.archieve.org/web.20101027131457/http://www.aa.com.

Williams, N.T.; "Medication administration through enteral feeding tubes"; Am J Health Syst Pharm.; bearing a date of Dec. 15, 2008; 2 pages. (abstract only); vol. 65, No. 24; located at http://www.ncbi.nlm.nih.gov/pubmed/19052281.

Indiana State Excise Police; "Alcohol Laws"; snapshot taken Oct. 22, 2010; pp. 1-2; located at http://web.archive.org/web/20101122202431/http://www.in.gov/atc/isep/2384.htm.

Valuevapor.com; "Starter Kits"; printed on Sep. 22, 2014; pp. 1-2; located at http://web.archive.org/web/20100610083606/http://www.valuevapor.com/VV/store/index.php?main_page=index&cPath=10.

"Easy Delft Blue Eggs"; The Sweet Adventures of Sugarbelle Blog; Mar. 25, 2012; pp. 1-7; located at: www.sweetsugarbelle.com/2012/03/simple-delft-blue-easter-egg-cookies.

\* cited by examiner

Selection of Product

Today's Date: 8-15-2011   12:24 pm

- Pudding, Vanilla
- Pudding, Chocolate
- Pudding, Lemon
- Smoothie, Raspberry
- Smoothie, Mango
- Smoothie, Strawberry
- Smoothie, Banana
- Jello, Raspberry
- Jello, Strawberry
- Jello, Lemon

- Snack Bar, Chocolate
- Snack Bar, Peanut Butter
- Snack Bar, Caramel
- Snack Bar, Cranberry
- Tea, Green
- Tea, Black
- Tea, Oolong
- Soup, Tomato
- Soup, Beef Onioin
- Soup, Chicken Noodle

10 ingestible product preparation system

- e12 controlling preparation elec circ arrange
- e1201 control prep connected elec circ arrange
- e1202 control prep network elec circ arrange
- e1203 control prep thermal elec circ arrange
- e1204 control prep heating elec circ arrange
- e1205 control prep cooling elec circ arrange
- e1206 control prep portion elec circ arrange
- e1207 control prep mixing elec circ arrange
- e1208 control prep radiation elec circ arrange
- e1209 control prep sound elec circ arrange
- e1210 control prep infrared elec circ arrange
- e1211 control prep microwave elec circ arrange
- e1212 control prep container elec circ arrange
- e1213 control prep syringe elec circ arrange
- e1214 control prep mix before thermal elec circ arrange
- e1215 control prep re mix after thermal elec circ arrange
- e1216 control prep heating cooling elec circ arrange
- e1217 control prep time control elec circ arrange
- e1218 control prep ingredient exclusion elec circ arrange
- e1219 control prep ingredient inclusion elec circ arrange

Fig. 65 o12 →

Start → ??

electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus o1219 electronically directing control of the at least partial preparation of the one or more selected ingestible products via electronically including ingredients in the preparation of the ingestible product o1220 electronically directing control of the at least partial preparation of the one or more selected ingestible products, the at least partial preparation of the one or more selected ingestible products within the vicinity of the electronically outputting of the electronically generated one or more selection menus as within an interior of a dispensing machine housing o1221 electronically directing control of the at least partial preparation of the one or more selected ingestible products, the at least partial preparation of the one or more selected ingestible products within the vicinity of the electronically outputting of the electronically generated one or more selection menus as within an interior of a architectural building containing a dispensing machine End

*Fig. 66*

Start — o1222 electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus o1222 electronically directing control of the at least partial preparation of the one or more selected ingestible products, the at least partial preparation of the one or more selected ingestible products within the vicinity of the electronically outputting of the electronically generated one or more selection menus as within a food court of a shopping mall o1223 electronically directing control of the at least partial preparation of the one or more selected ingestible products, the at least partial preparation of the one or more selected ingestible products within the vicinity of the electronically outputting of the electronically generated one or more selection menus as within an interior of a restaurant o1224 electronically directing control of the at least partial preparation of the one or more selected ingestible products, the at least partial preparation of the one or more selected ingestible products within the vicinity of the electronically outputting of the electronically generated one or more selection menus as within an interior of an airplane End

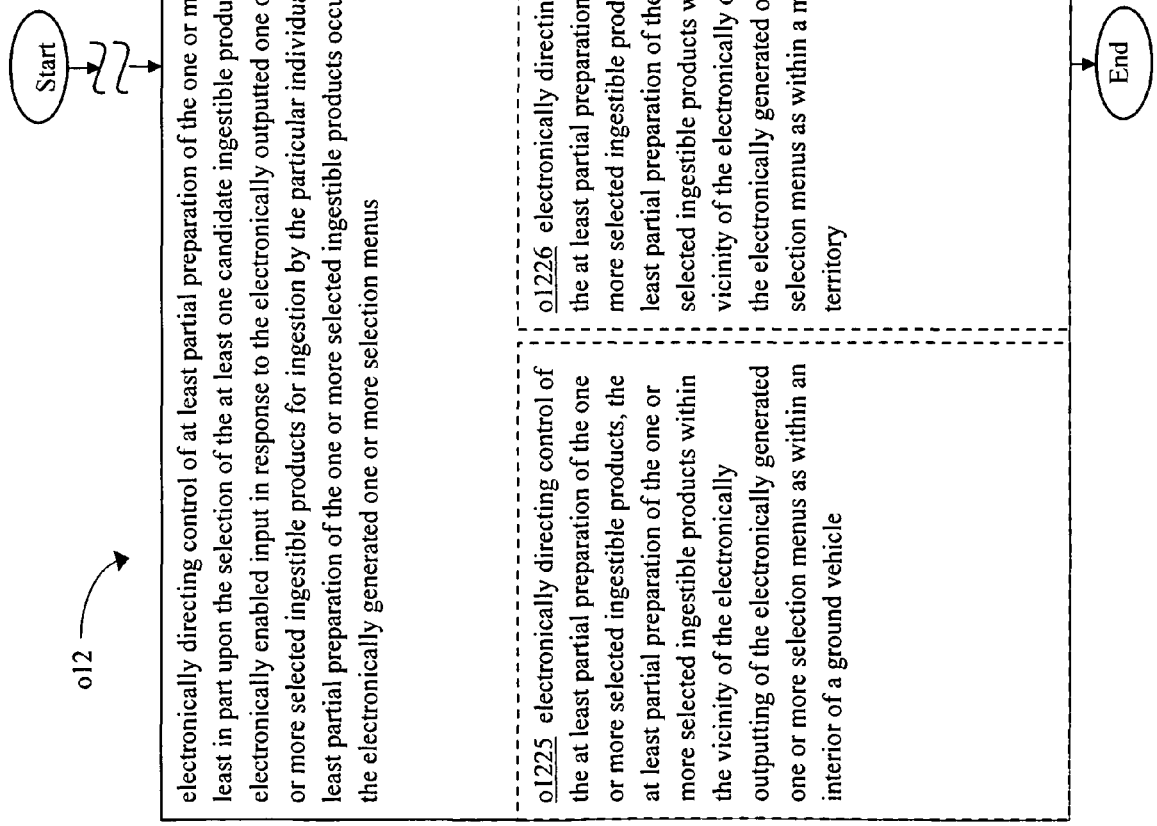

SELECTION INFORMATION SYSTEM AND METHOD FOR INGESTIBLE PRODUCT PREPARATION SYSTEM AND METHOD

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 13/199,361, entitled CONTROLLED SUBSTANCE AUTHORIZATION SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 26 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,481, entitled CONTROLLED SUBSTANCE AUTHORIZATION SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 30 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,545, entitled REPORTING SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 31 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,544, entitled REPORTING SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 31 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,113, entitled SUBSTANCE CONTROL SYSTEM AND METHOD FOR DISPENSING SYSTEMS, naming Paul Holman, Royce A. Levien, Mark A. Malamud, Neal Stephenson, and Christopher Charles Young as inventors, filed 16 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,106, entitled SUBSTANCE CONTROL SYSTEM AND METHOD FOR DISPENSING SYSTEMS, naming Paul Holman, Royce A. Levien, Mark A. Malamud, Neal Stephenson, and Christopher Charles Young as inventors, filed 16 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,830, entitled CLEANING SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 30 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,829, entitled CLEANING SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 30 Sep. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,907, entitled TREATMENT SYSTEM AND METHOD FOR INGESTIBLE PRODUCT DISPENSING SYSTEM AND METHOD, naming Paul Holman, Royce A. Levien, Mark A. Malamud, Neal Stephenson, and Christopher Charles Young as inventors, filed 3 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,906, entitled TREATMENT SYSTEM AND METHOD FOR INGESTIBLE PRODUCT DISPENSING SYSTEM AND METHOD, naming Paul Holman, Royce A. Levien, Mark A. Malamud, Neal Stephenson, and Christopher Charles Young as inventors, filed 3 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,545, entitled SUBSTANCE ALLOCATION SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 19 Oct. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/317,546, entitled SUBSTANCE ALLOCATION SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 19 Oct. 2011, which is currently co-pending or is an application of which a currently co-pending application is entitled to the benefit of the filing date.

For purposes of the USPTO extra-statutory requirements, the present application is related to U.S. patent application Ser. No. 13/317,978, entitled SELECTION INFORMATION SYSTEM AND METHOD FOR INGESTIBLE PRODUCT PREPARATION SYSTEM AND METHOD, naming Paul Holman, Royce A. Levien, Mark A. Malamud, Neal Stephenson, and Christopher Charles Young as inventors, filed 31 Oct. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A method includes, but is not limited to electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus; and electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus.

In one or more various aspects, related machines, compositions of matter, or manufactures of systems may include, but are not limited to, virtually any combination of hardware, software, and/or firmware configured to effect the herein-referenced method aspects depending upon the design choices of the system designer (limited to patentable subject matter under 35 USC 101).

A system includes, but is not limited to: means for electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus; and means for electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus. In addition to the foregoing, other system aspects are described in the claims, drawings, and text forming a part of the present disclosure.

A system includes, but is not limited to a receiving information electrical circuitry arrangement for electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus; and a controlling preparation electrical circuitry arrangement for electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus. In addition to the foregoing, other system aspects are described in the claims, drawings, and text forming a part of the present disclosure.

An article of manufacture including a non-transitory signal-bearing storage medium bearing one or more instructions for electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus; and one or more instructions for electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4 is a schematic view of a display screen of the first exemplary implementation of the ingestible product preparation system 10 in FIG. 1 displaying first content.

FIG. 10 is a schematic diagram view depicting an information display associated with one or more ingestible product selection menus for the ingestible product preparation system 10 in FIG. 1.

FIG. 24 is a block diagram depicting one or more exemplary electrical circuitry arrangements of the ingestible product preparation system 10 of FIG. 1.

FIG. 65 is a high-level flowchart including exemplary implementations of operation O12 of FIG. 32.

FIG. 66 is a high-level flowchart including exemplary implementations of operation O12 of FIG. 32.

FIG. 67 is a high-level flowchart including exemplary implementations of operation O12 of FIG. 32.

DETAILED DESCRIPTION

Figure 1A:
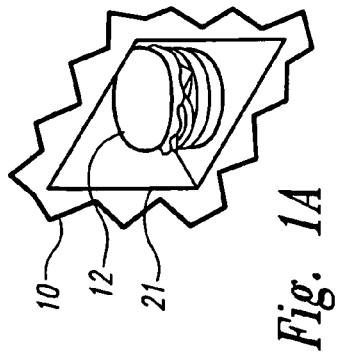
FIG. 1A is a fragmentary view depicting a second application of the first exemplary implementation of the ingestible product preparation system 10 of FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Generally, automated and semi-automated machines to make, manufacture, fabricate, or otherwise prepare and/or dispense ingestible products to be ingested by living beings such as humans, animals, plants, etc are known to a degree with interest existing for future development as well. Automated and semi-automated preparation of the ingestible products can incorporate all known forms of preparation of food and other ingestible products including but not limited to all known forms of energy addition to one or more ingredients of the ingestible products (such as through various forms of thermal heating or adding microwave, infrared, or ultrasonic energy), extracting energy from one or more ingredients of the ingestible products (such as through thermodynamic-cycle based cooling or peltier cooling), deposition methods (including deposition by layering or at the pixel level), and combinational methods (such as blending, mixing, ingredient injection, kneading, stirring, ultrasonic agitation, other agitational methods, etc.), etc.

Although ingestible products made, fabricated, or otherwise prepared and/or dispensed by semi-automated and automated machines are presently limited in scope to a degree, it is envisioned that with future development, this will change. Ingestible products can take many forms including, but not limited to, solids, semi-solids, liquids, gases, dispersions (such as true solutions, colloid dispersions, emulsions, foams, and gels) and vast combinations thereof. Ingestion by the living beings can occur through many pathways including, but not limited to, oral ingestion, transdermal ingestion, peg-tube ingestion, nasal ingestion, anal ingestion, injectable ingestion, tear-duct ingestion, and respiratory ingestion.

Figure 1B:
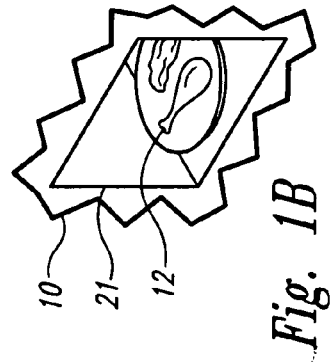
FIG. 1B is a fragmentary view depicting a third application of the first exemplary implementation of the ingestible product preparation system 10 of FIG. 1.
Figure 1C:
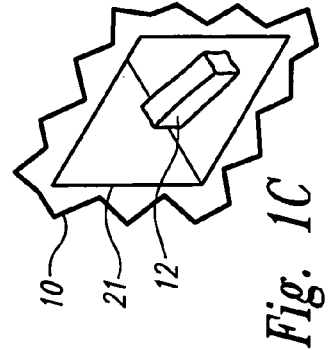
FIG. 1C is a fragmentary view depicting a fourth application of the first exemplary implementation of a ingestible product preparation system 10 including a substance allocation system therefor.
Figure 1:
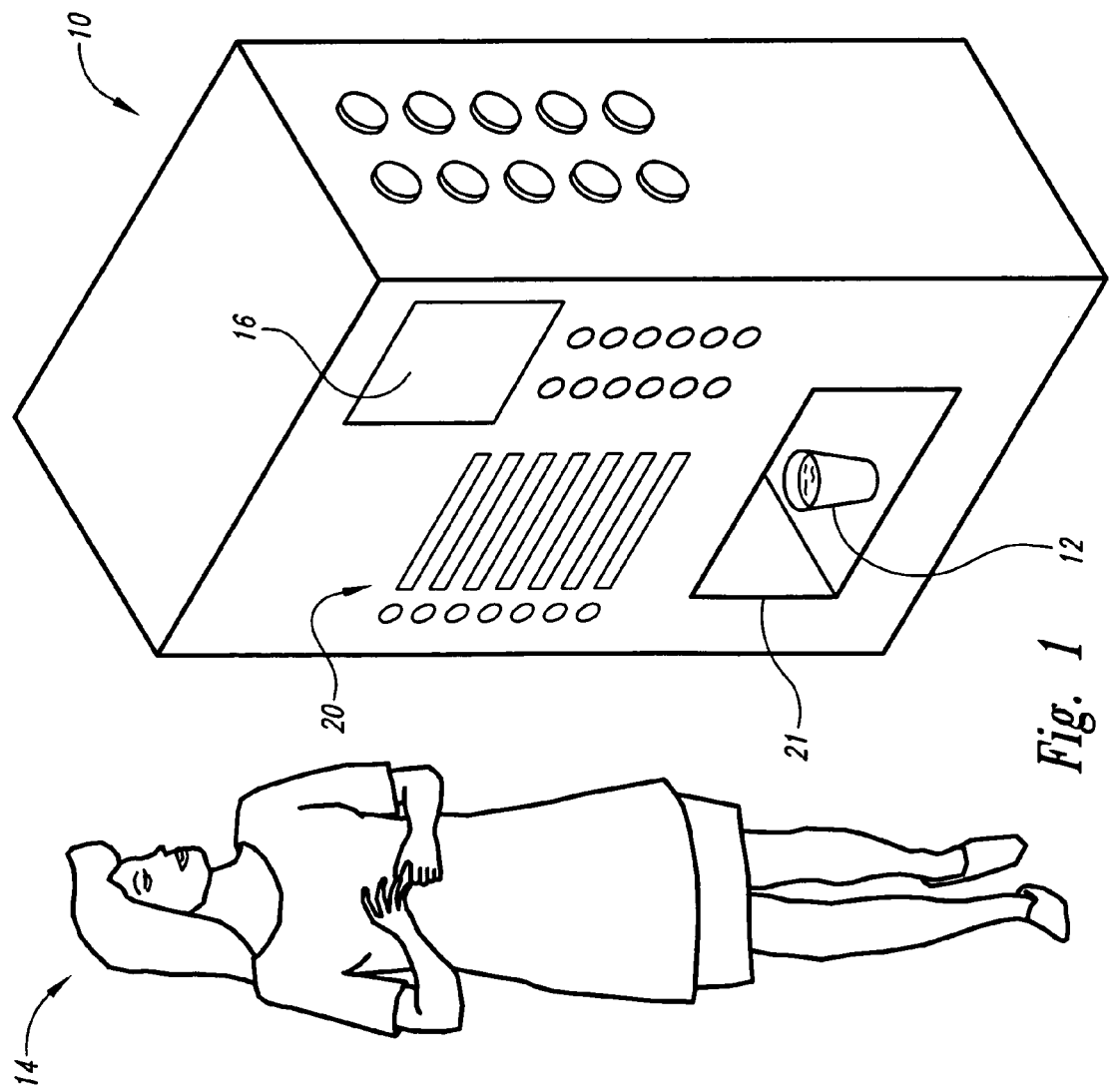
FIG. 1 is a schematic diagram depicting a first application of a first exemplary implementation of a ingestible product preparation system 10 including a selection information system.
Figure 2:
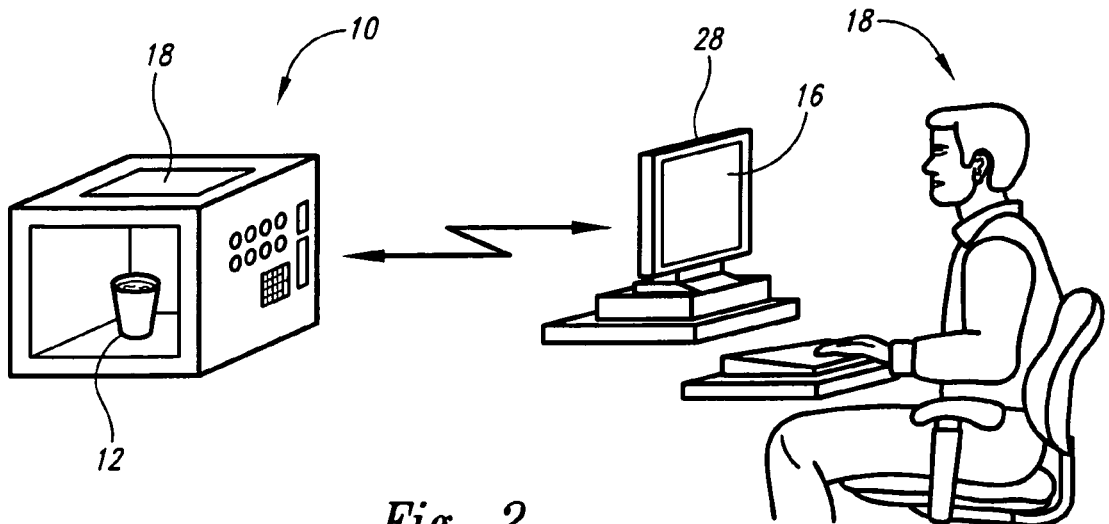
FIG. 2 is a schematic diagram depicting a first application of a second exemplary implementation of the ingestible product preparation system 10 of FIG. 1 including the selection information system.
Figure 3:
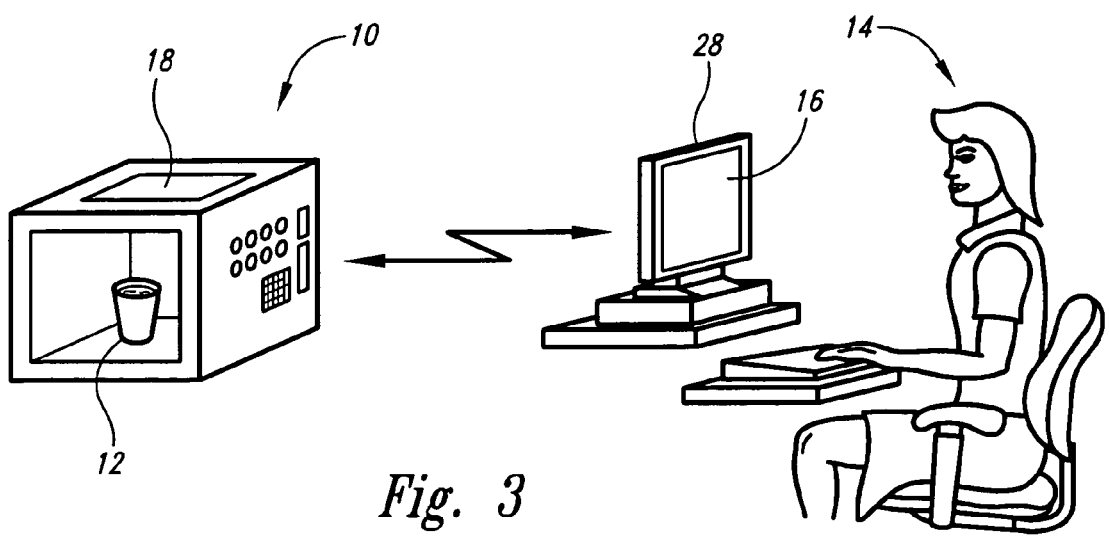
FIG. 3 is a schematic diagram depicting a second application of the second exemplary implementation of the ingestible product preparation system 10 of FIG. 1 including the selection information system.

As depicted in FIGS. 1-3, exemplary implementations of an ingestible product preparation system 10 are shown to prepare and dispense ingestible products such as a liquid drink 12 (shown in dispensing area 21) to be consumed by a particular individual living being, such as a human being 14 (such as a user, etc.) shown. Exemplary implementations determine selection menus to be generated and outputted, for instance, on display 16 and selections or other information can be inputted through user interfaces, for instance, user input 20 or other types of user input. For instance, input may be collected through active user input (e.g. keyboard, textual, audio, graphical user interface, etc.) or passive user input (e.g. image recognition of user behavior, refuse analysis of past dispensing such as quantity of wrappers, leftovers, audio analysis of collected unsolicited user comments, etc.). Selection menus can be generated that are unique to a particular individual living being, such as the human being 14, based upon such information as but not limited to identification of the individual and other information such as past selections, allergies, preferences, specials, holidays, location of preparation, location of dispensing, time of day, dislikes, recent ingestion, health goals, present illness, past illness, sports requirements, injuries, fads, hobbies, associated social organizations, etc. Other sorts of ingestible products can include but are not limited to sandwiches (FIG. 1A), full meals (FIG. 1B), food bars (FIG. 1C), meal replacements, snacks, plant and/or animal based products, nutraceuticals, pharmaceuticals, smoothies, etc.

The ingestible product preparation system 10 is further depicted in FIGS. 2 and 3 as communicating with the human being 14 an exemplary remotely located user or an exemplary advisor 18 (e.g. physician, nurse, nutritionist, health expert, sports coach, etc.) via a communication link (e.g. wireless or wired network or direct electronic communication, etc.) and display screen 28. The display screen 28 can include selection indicators configured to provide information described above by the users and advisors. The display screen 28 can also output generated selection menus based upon identification of the particular individual living being and other information including that described above. Selection menus can be furnished to suggest candidate ingestible products that once selected as selected ingestible products can be prepared and dispensed (in some implementations prepared such as from ingredient containers 22) and to provide other sorts of information discussed herein. The display screen 28 can display textual and graphic information such as including but not limited to menu screens allowing users to select various dispensing (including in some implementations preparation) options and information requests. Other implementations can include other devices and methods for information input and output including those further discussed below.

Figure 5:
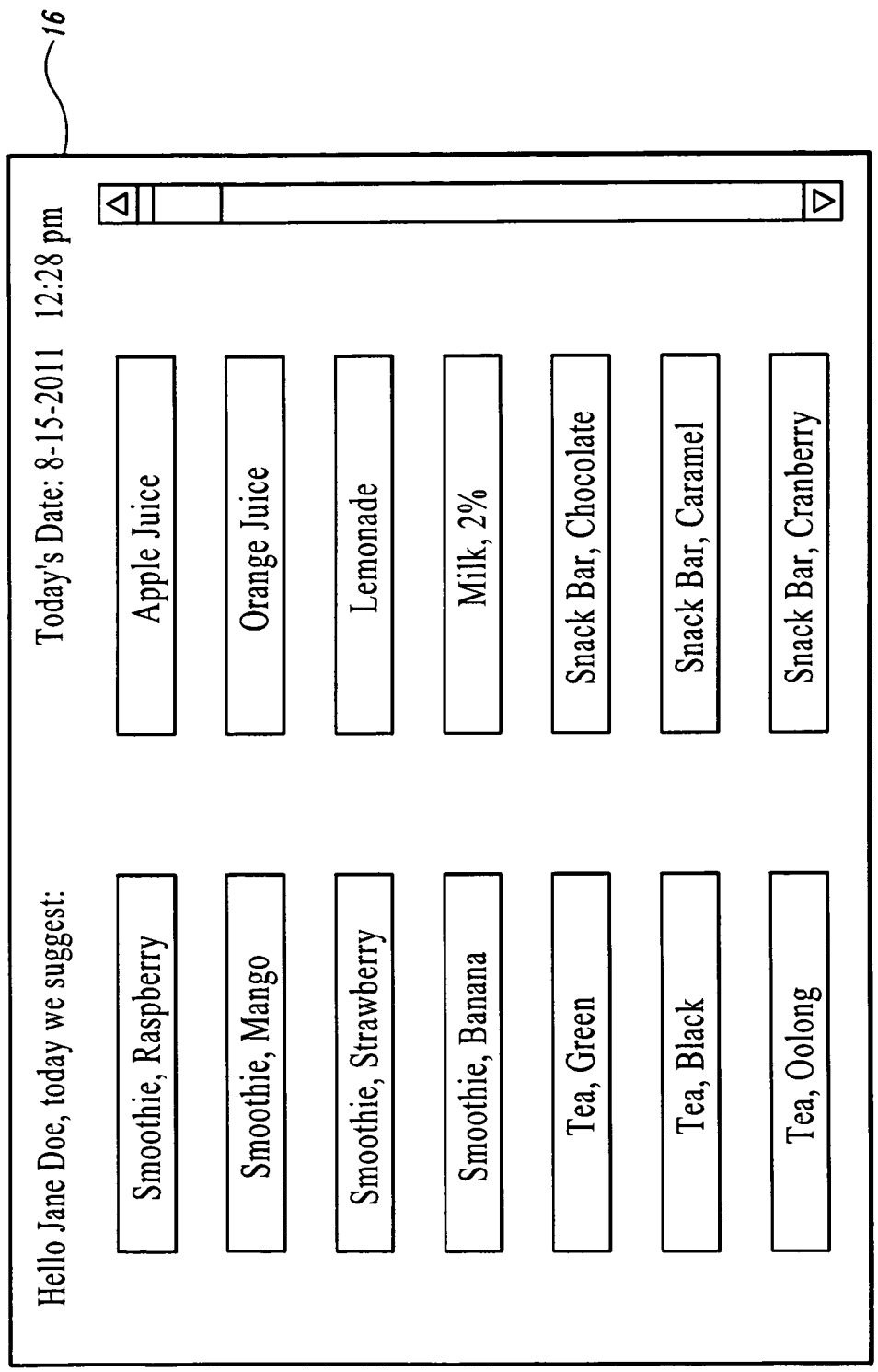
FIG. 5 is a schematic view of a display screen of the first exemplary implementation of the ingestible product preparation system 10 in FIG. 1 displaying second content.
Figure 6:
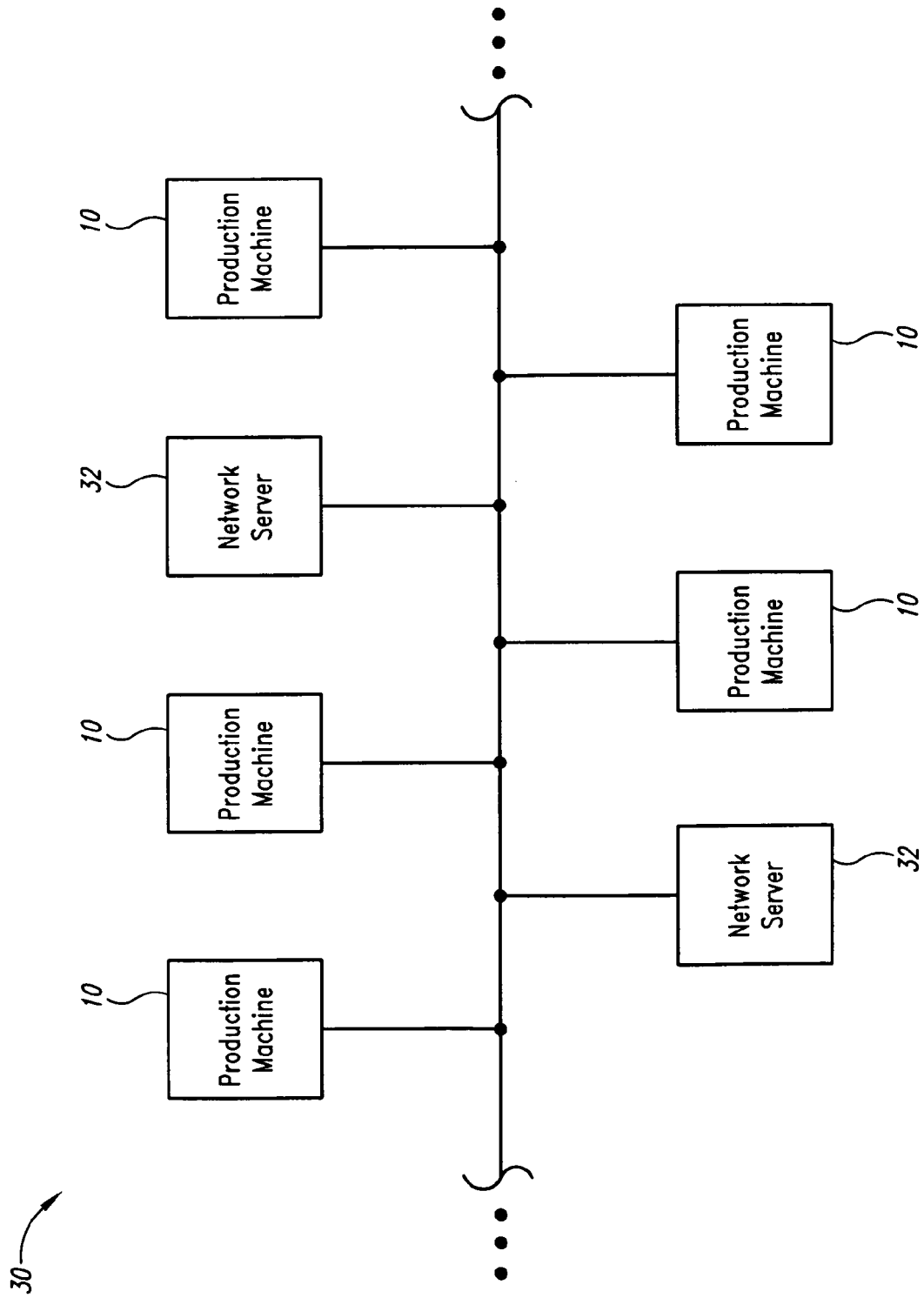
FIG. 6 is a schematic of an exemplary network implementation of the ingestible product preparation system 10 in FIG. 1.

Exemplary generated selection menus depicted in FIGS. 4 and 5 are in listed textual form, but other implementations can include but are not limited to graphical, audio, video, ingestible samples, maps of suggestions, hierarchical ordered arrangements and other sorts of arrangements, etc. As depicted in FIG. 6, information used to generate selection menus can be found on other machines networked, for example network 30, with, the ingestible product preparation system (aka production machine) 10 such as being stored on network server 32.

Figure 7:
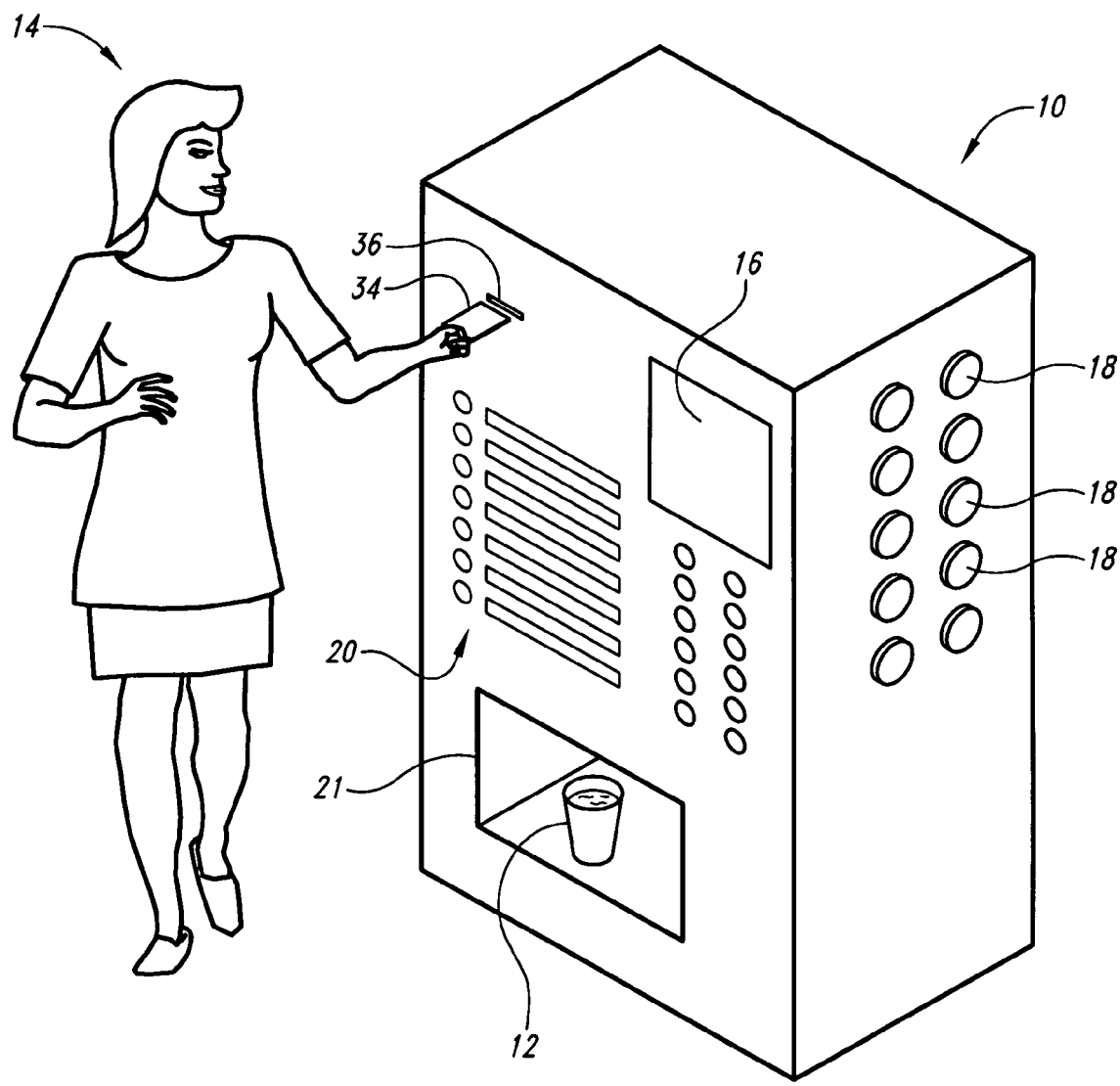
FIG. 7 is a schematic of an exemplary user identification implementation of the ingestible product preparation system 10 in FIG. 1.

Identification information and other information regarding the particular individual living being can be inputted directly to the ingestible product preparation system 10 or can be inputted through other devices to be stored apart from the ingestible product preparation system since in some implementations, the selection menus can be generated locally at the ingestible product preparation system whereas is other implementations the selection menus can be generated elsewhere to either be displayed elsewhere or to be sent to the digestible product preparation system to be displayed thereon. FIG. 7 depicts an exemplary implementation where at least some information such as identification information is inputted directly through a memory card 34 into receiving slot 36 to the ingestible product preparation system 10 to be used to generate selection menus either locally or remotely to then be displayed on the ingestible product preparation system. In other implementations, the memory card 34 can be inputted into a receiving slot found on another machine other than the ingestible product preparation system 10.

Figure 8:
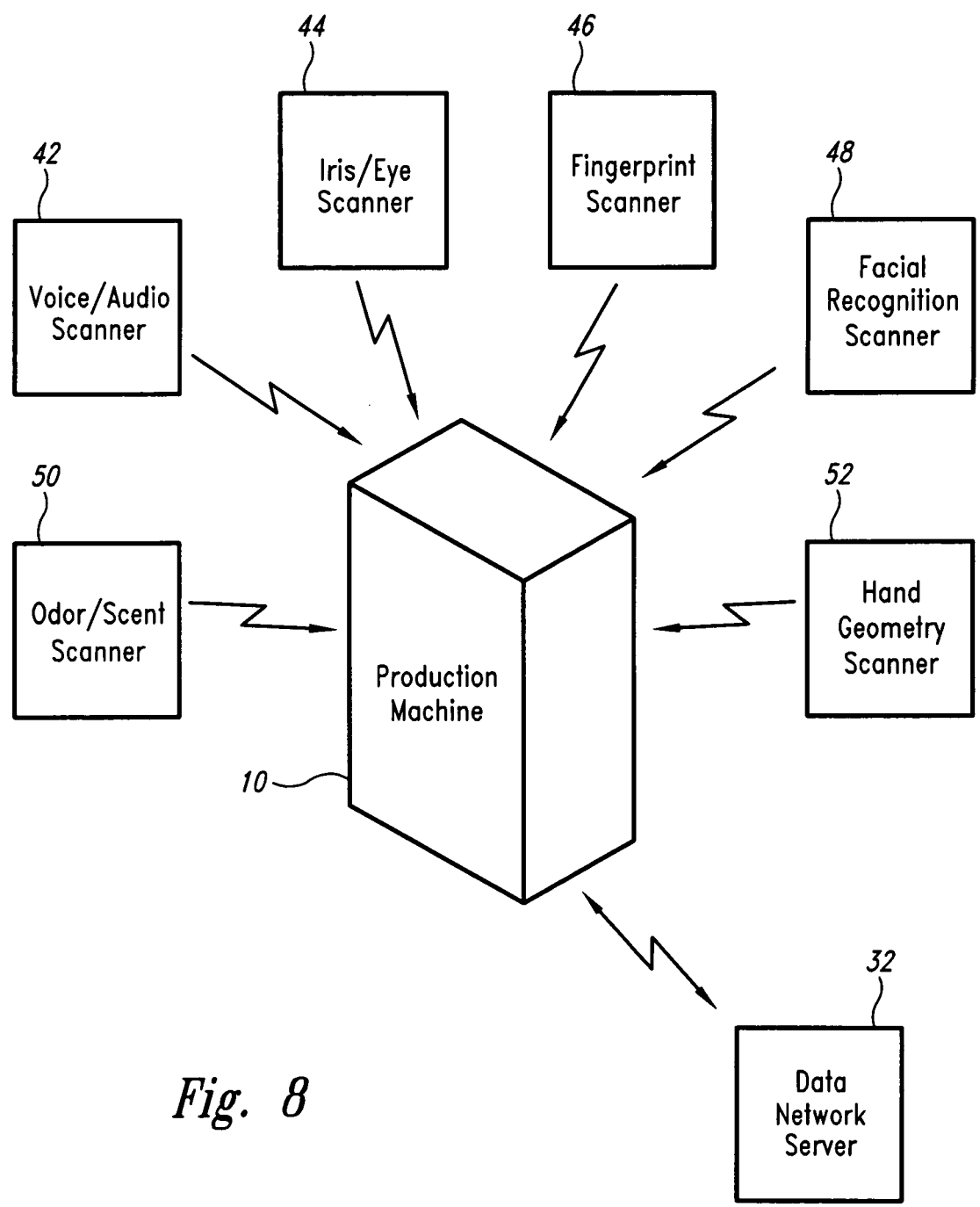
FIG. 8 is a schematic diagram depicting user identification implementations for the ingestible product preparation system 10 in FIG. 1.
Figure 9:
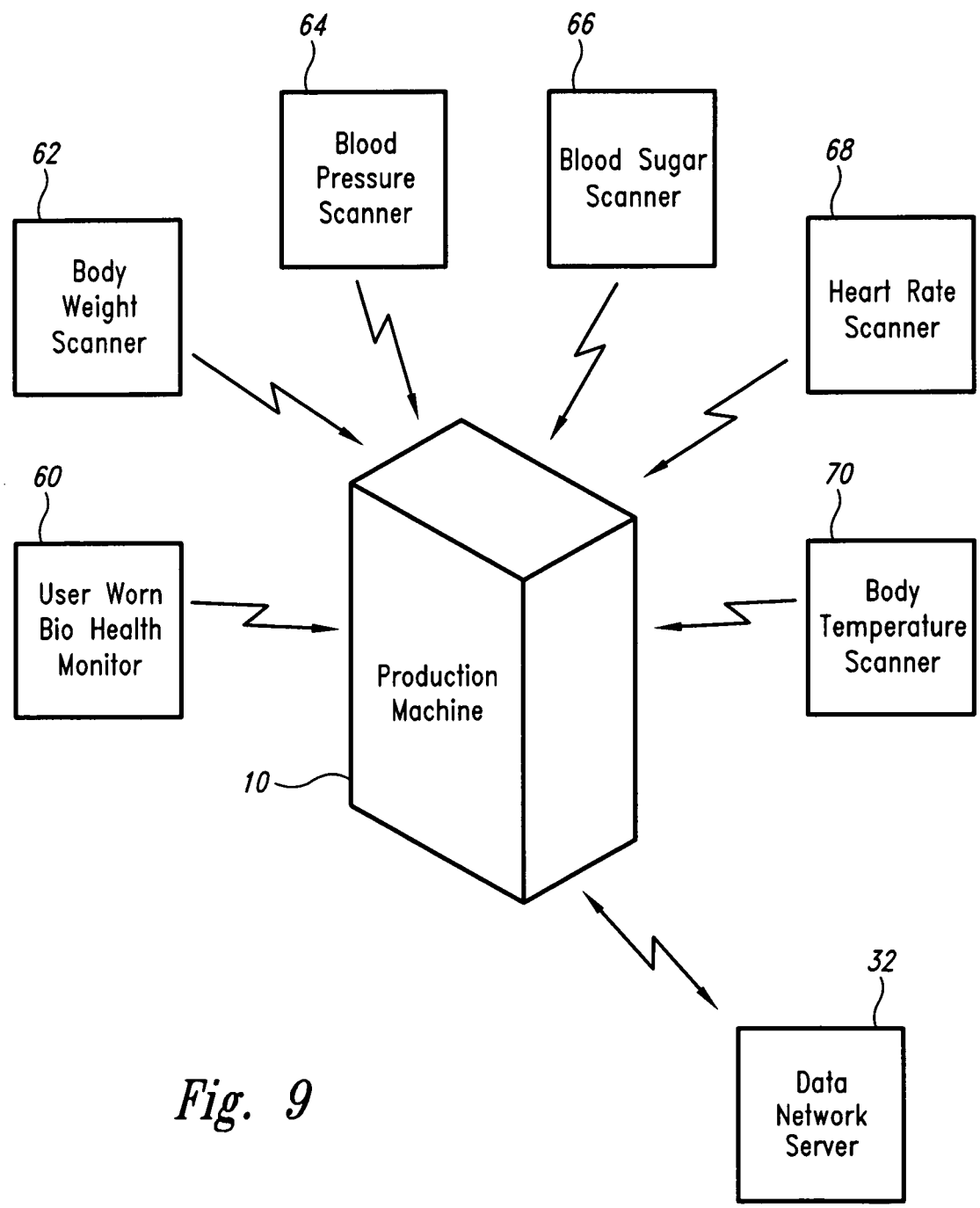
FIG. 9 is a schematic diagram depicting user identification implementations for the ingestible product preparation system 10 in FIG. 1.
Figure 10:
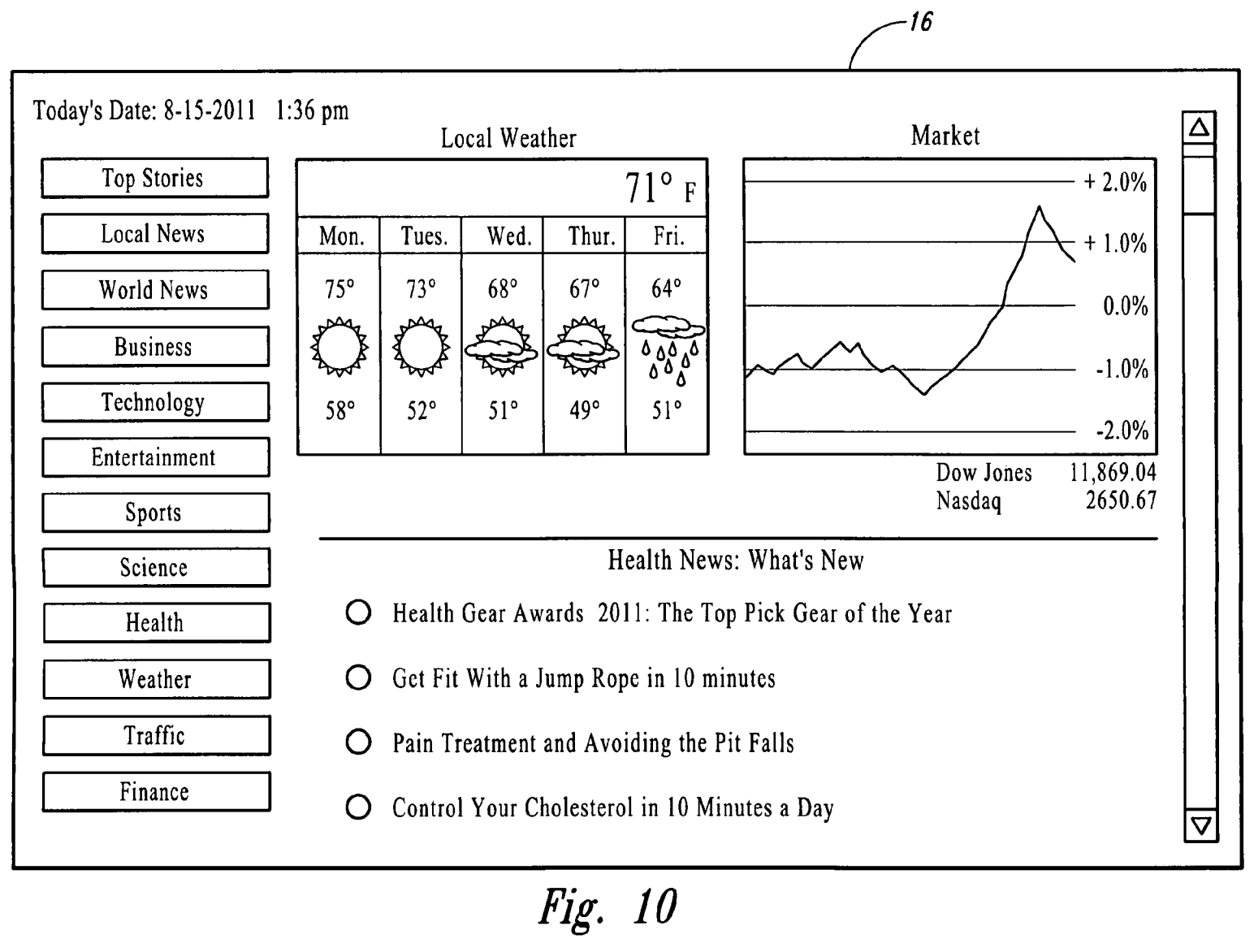

FIGS. 8 and 9 show other examples of various ways that information, such as identification information, can be inputted directly to the ingestible product preparation system 10. Alternatively, these depicted ways that information can be inputted and other ways can be inputted to other devices that are electronically linked to the ingestible product preparation system 10 so that selection menus can be generated directly by the ingestible product preparation system 10 or elsewhere, such as the network server 32, to be outputted at the ingestible product preparation system or elsewhere. The input ways depicted in FIG. 8 include voice/audio scanner 42, iris/eye scanner 44, fingerprint scanner 46, facial recognition scanner 48, odor/scent scanner 50, and hand geometry scanner 52. The input ways depicted in FIG. 9 include user worn bio health monitor 60 (for instance, tracking blood pressure, blood sugar, urea, temperature, activity, heart rate, EKG, ECG, hormone levels, nerve activity, other blood levels, etc), body weight scanner 62, blood pressure scanner 64, blood sugar scanner 66, heart rate scanner 68, and body temperature scanner 70. Other information can be displayed on other screens to complement the selection menus as depicted in FIG. 10.

Figure 11:
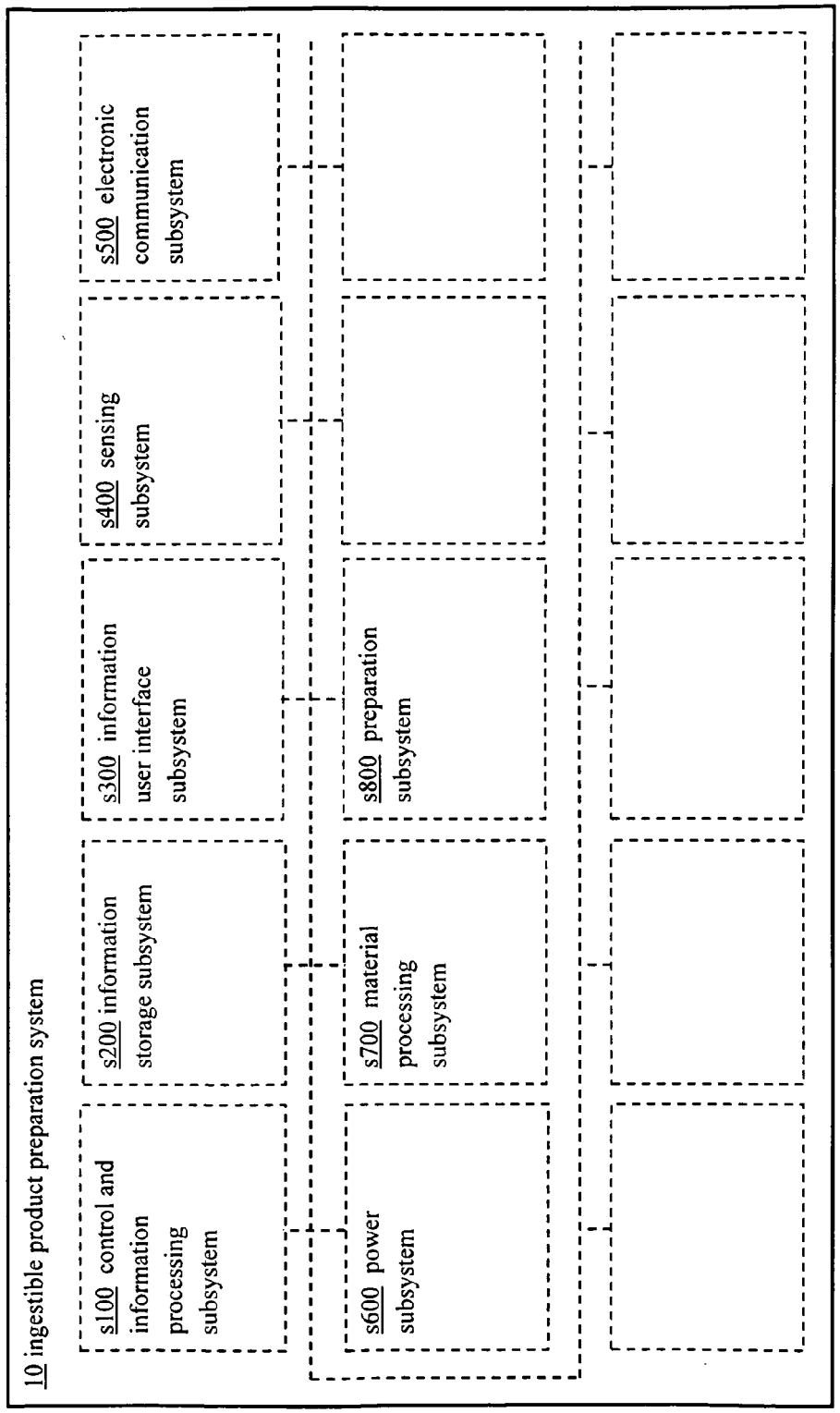
FIG. 11 is a block diagram depicting an exemplary implementation of the ingestible product preparation system 10 of FIG. 1 including exemplary subsystems.

An exemplary version of the ingestible product preparation system 10 is shown in FIG. 11 to optionally include various subsystems such as control and information processing subsystem s100, information storage subsystem s200, information user interface subsystem s300, sensing subsystem s400, electronic communication subsystem s500, power subsystem s600, material processing subsystem s700, and preparation subsystem s800.

Figure 12:
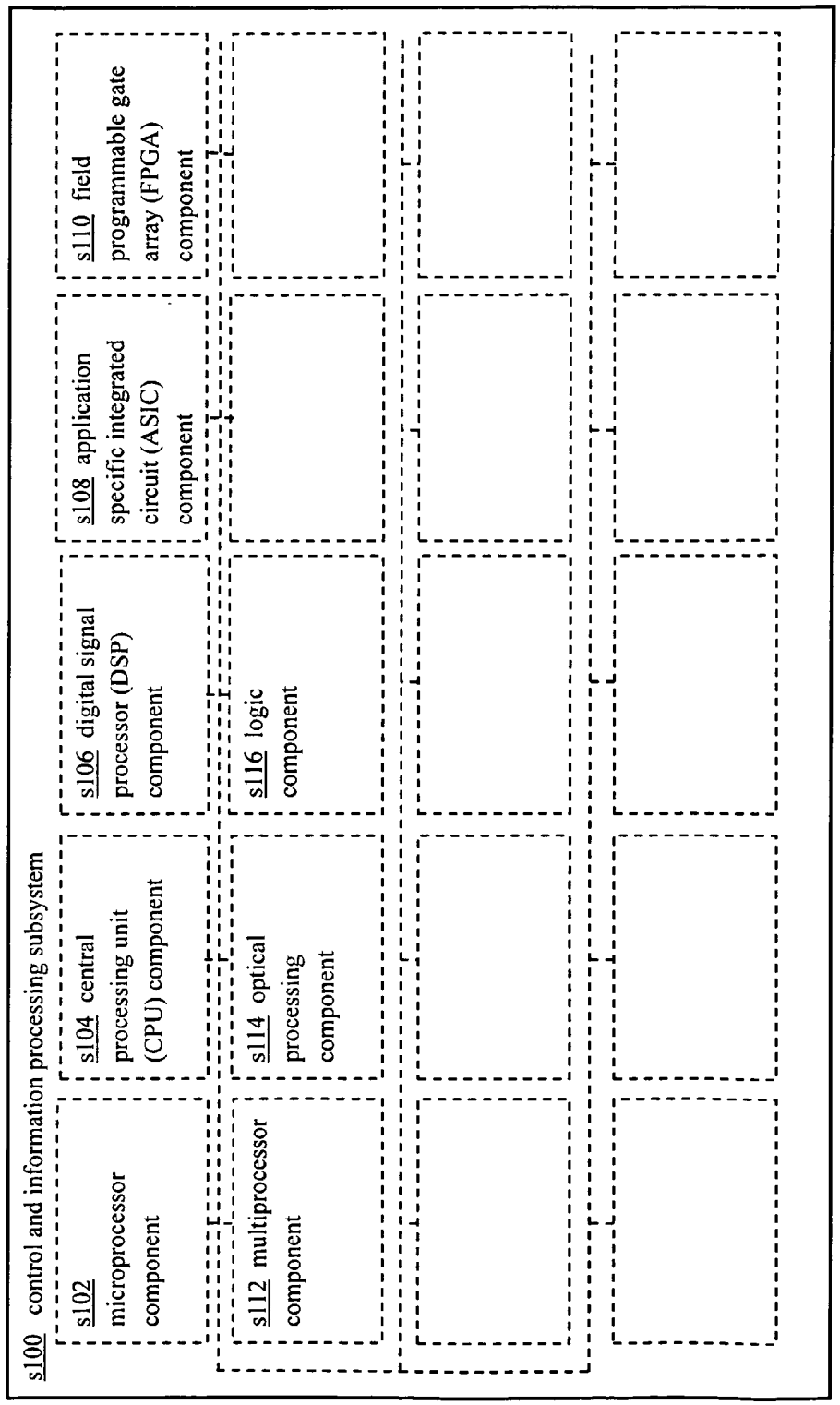
FIG. 12 is a block diagram depicting a control and information processing subsystem s100 of an exemplary implementation of the ingestible product preparation system 10 of FIG. 1.

An exemplary implementation of the control and information processing subsystem s100 is shown in FIG. 12 to optionally include various components such as microprocessor component s102, central processing unit (CPU) component s104, digital signal processor (DSP) component s106, application specific integrated circuit (ASIC) component s108, field programmable gate array (FPGA) component s110, multiprocessor component s112, optical processing component s114, and logic component s116.

Figure 13:
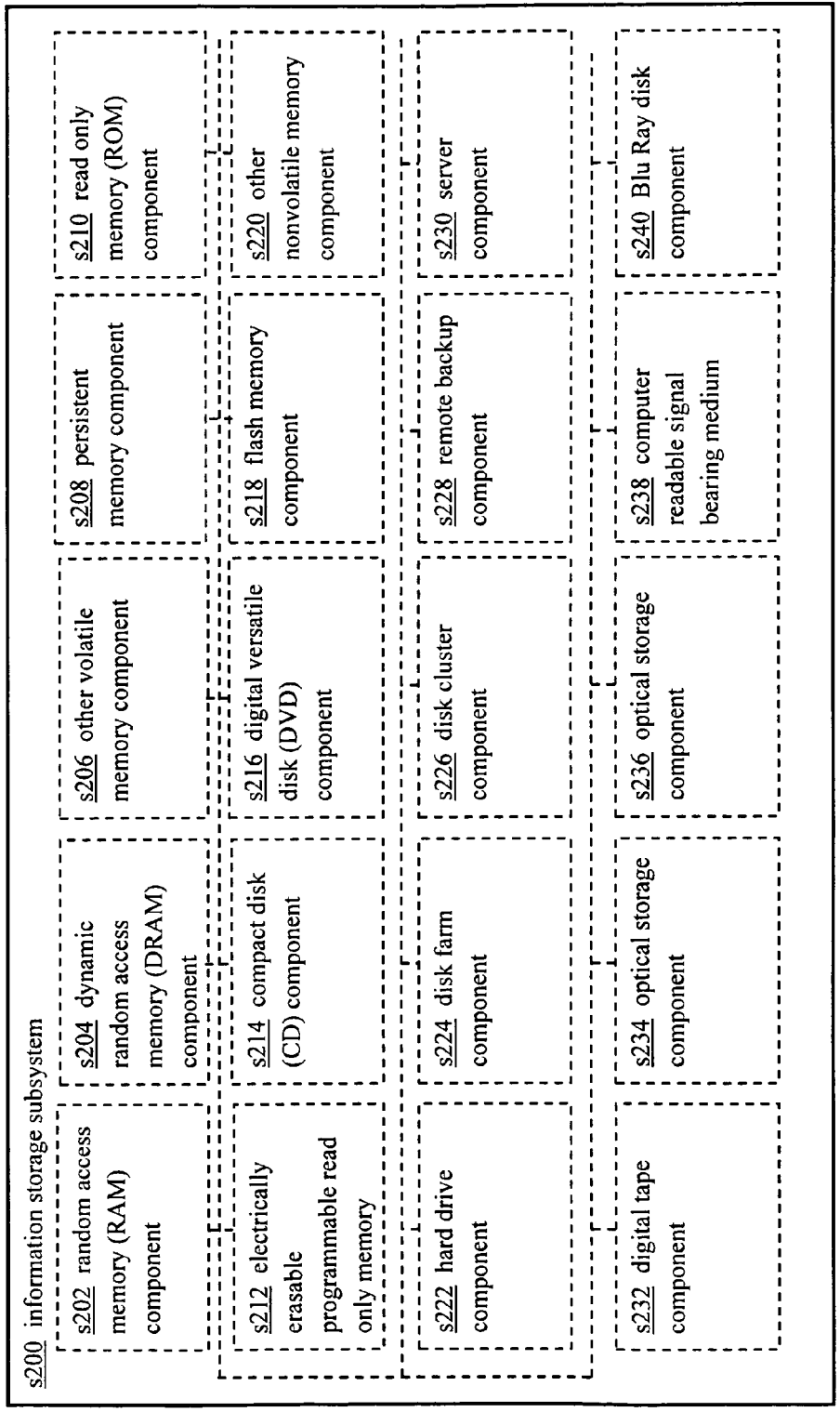
FIG. 13 is a block diagram depicting an information storage subsystem s200 of an exemplary implementation of the ingestible product preparation system 10 of FIG. 1.

An exemplary implementation of the information storage subsystem s200 is shown in FIG. 13 to optionally include various components such as random access memory (RAM) component s202, dynamic random access memory (DRAM) component s204, other volatile memory component s206, persistent memory component s208, read only memory (ROM) component s210, electrically erasable programmable read only memory (EEPROM) component s212, compact disk (CD) component s214, digital versatile disk (DVD) component s216, flash memory component s218, other nonvolatile memory component s220, hard drive component s222, disk farm component s224, disk cluster component s226, remote backup component s228, server component s230, digital tape component s232, optical storage component s234, optical storage component s236, computer readable signal bearing medium s238, and Blu Ray disk component s240.

Figure 14:
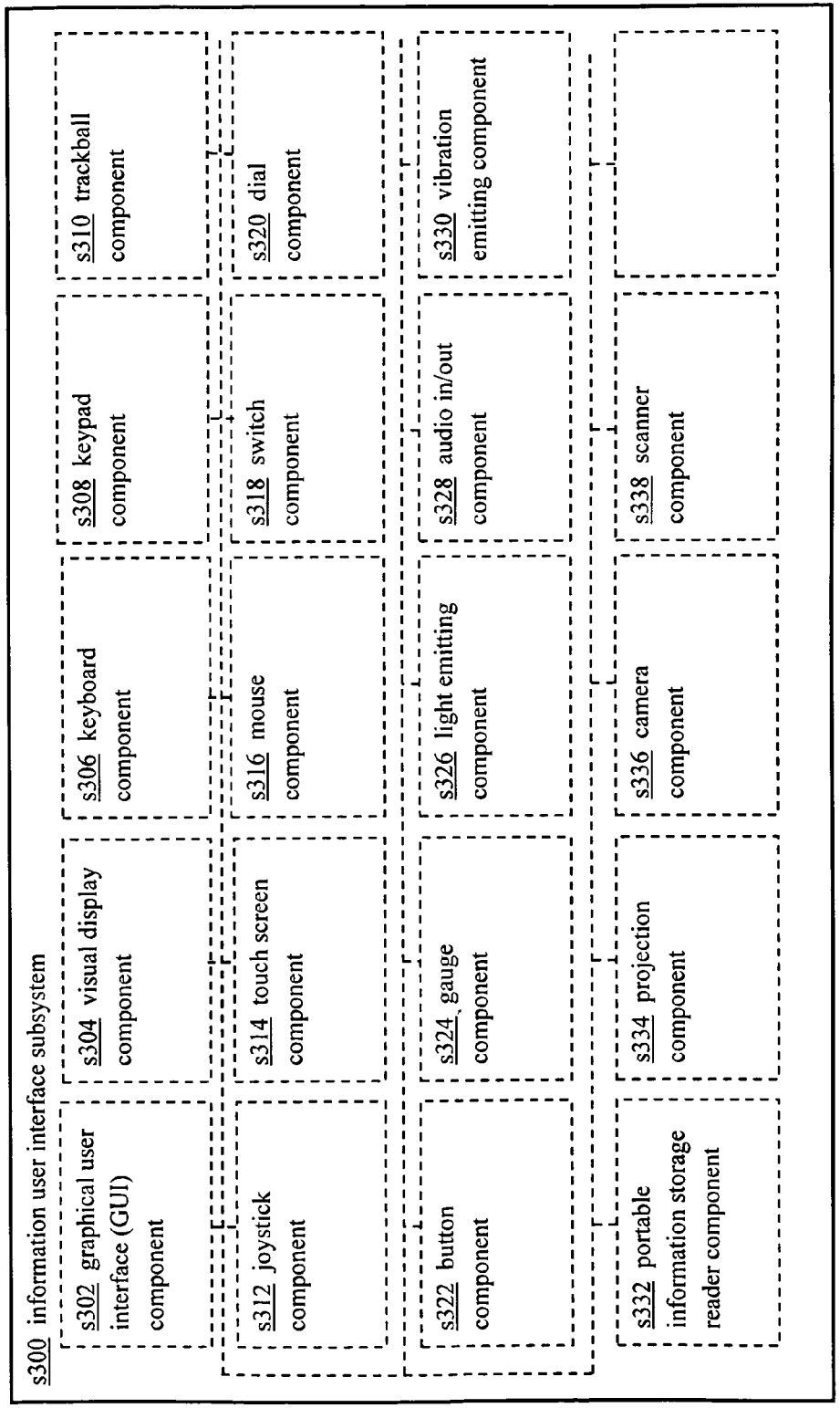
FIG. 14 is a block diagram depicting an information user interface subsystem s300 of an exemplary implementation of the ingestible product preparation system 10 of FIG. 1.

An exemplary implementation of the information user interface subsystem s300 is shown in FIG. 14 to optionally include various components such as graphical user interface (GUI) component s302, visual display component s304, keyboard component s306, keypad component s308, trackball component s310, joystick component s312, touch screen component s314, mouse component s316, switch component s318, dial component s320, button component s322, gauge component s324, light emitting component s326, audio in/out component s328, vibration emitting component s330, portable information storage reader component s332, projection component s334, camera component s336, and scanner component s338.

Figure 15:
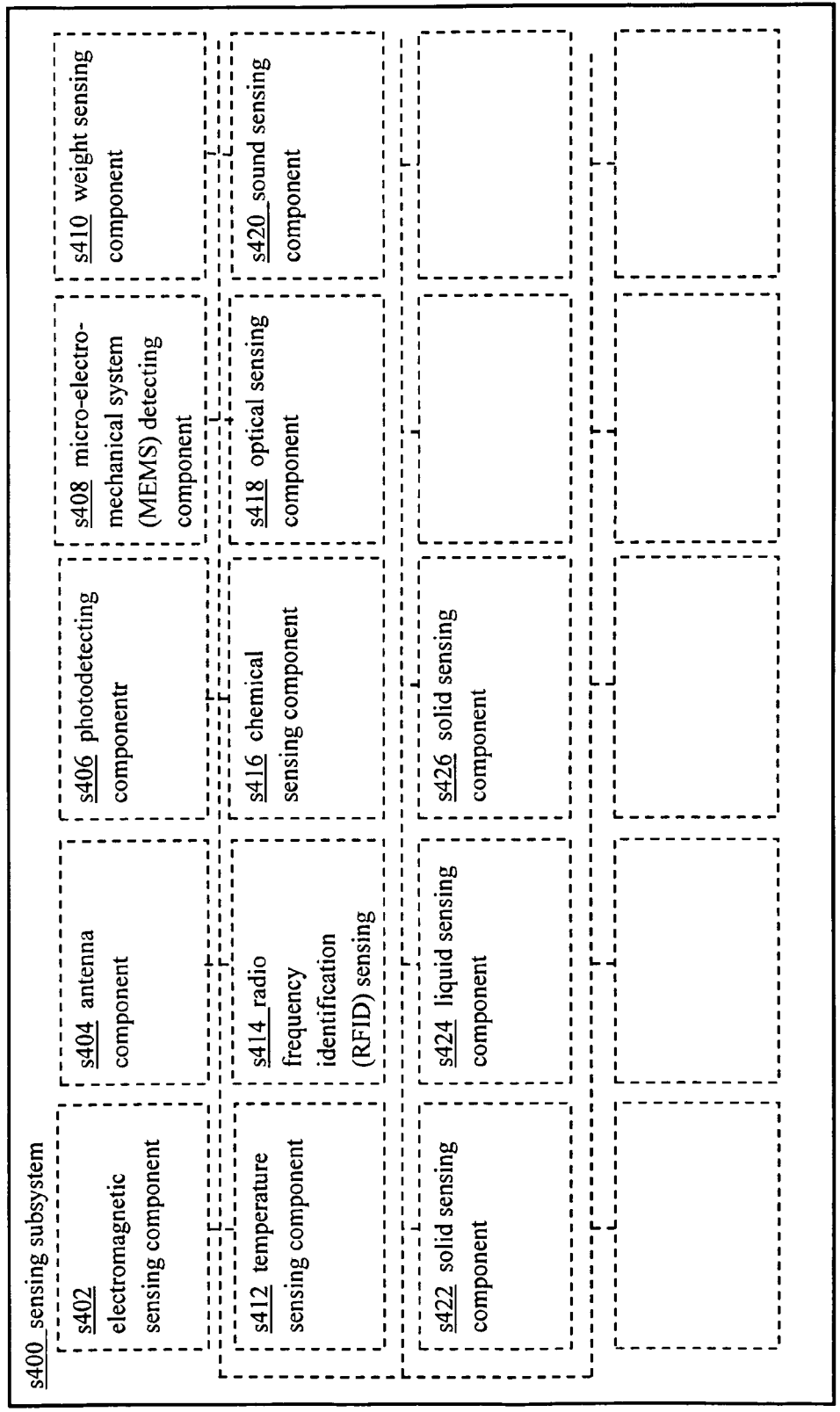
FIG. 15 is a block diagram depicting a sensing subsystem s400 of an exemplary implementation of the ingestible product preparation system 10 of FIG. 1.

An exemplary implementation of the sensing subsystem s400 is shown in FIG. 15 to optionally include various components such as electromagnetic sensing component s402, antenna component s404, photodetecting component s406, micro-electro-mechanical system (MEMS) detecting component s408, weight sensing component s410, temperature sensing component s412, radio frequency identification (RFID) sensing component s414, chemical sensing component s416, optical sensing component s418, sound sensing component s420, solid sensing component s422, liquid sensing component s424, and solid sensing component s426.

Figure 16:
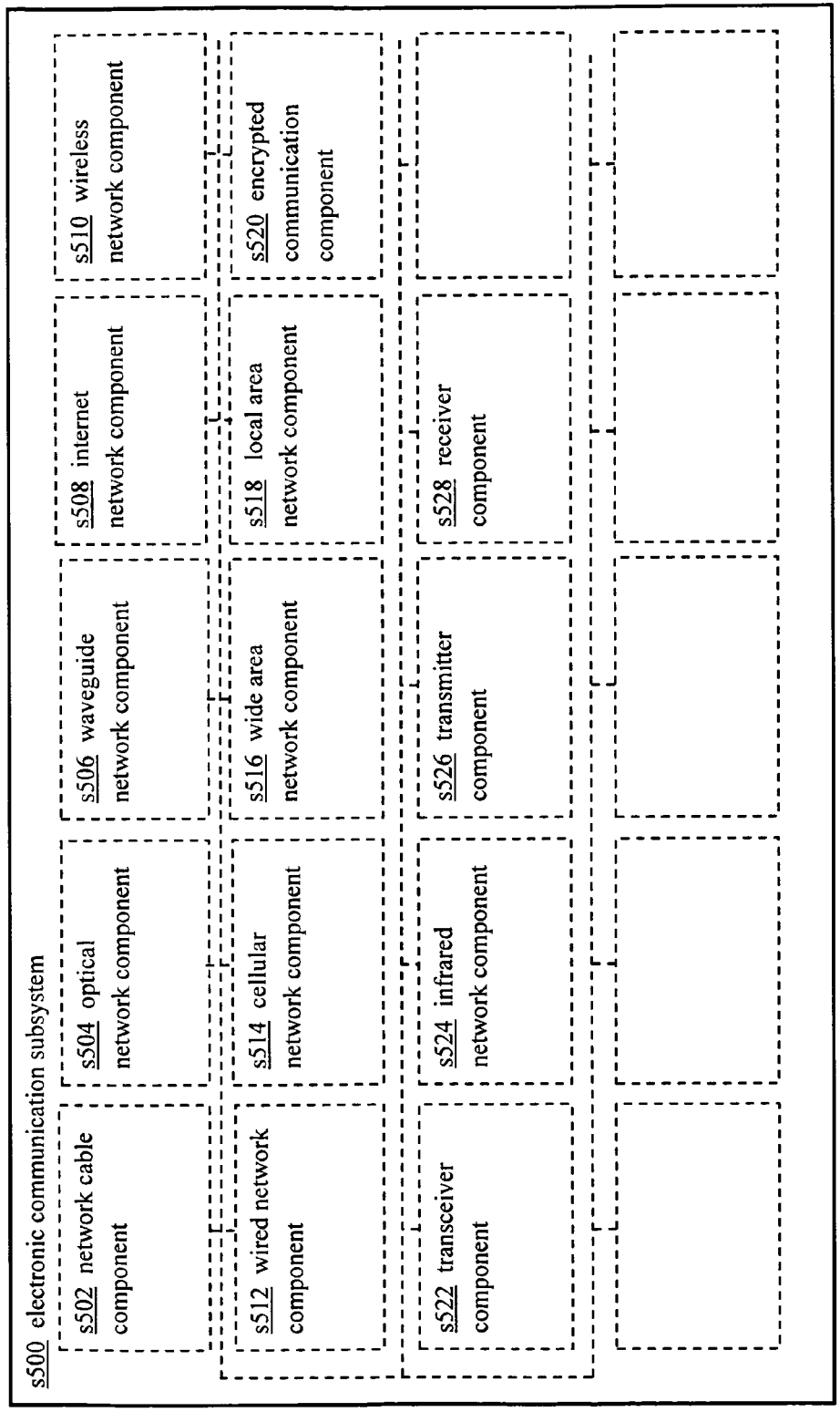
FIG. 16 is a block diagram depicting an electronic communication subsystem s500 of an exemplary implementation of the ingestible product preparation system 10 of FIG. 1.

An exemplary implementation of the electronic communication subsystem s500 is shown in FIG. 16 to optionally include various components such as network cable component s502, optical network component s504, waveguide network component s506, internet network component s508, wireless network component s510, wired network component s512, cellular network component s514, wide area network component s516, local area network component s518, encrypted communication component s520, transceiver component s522, infrared network component s524, transmitter component s526, and receiver component s528.

Figure 17:
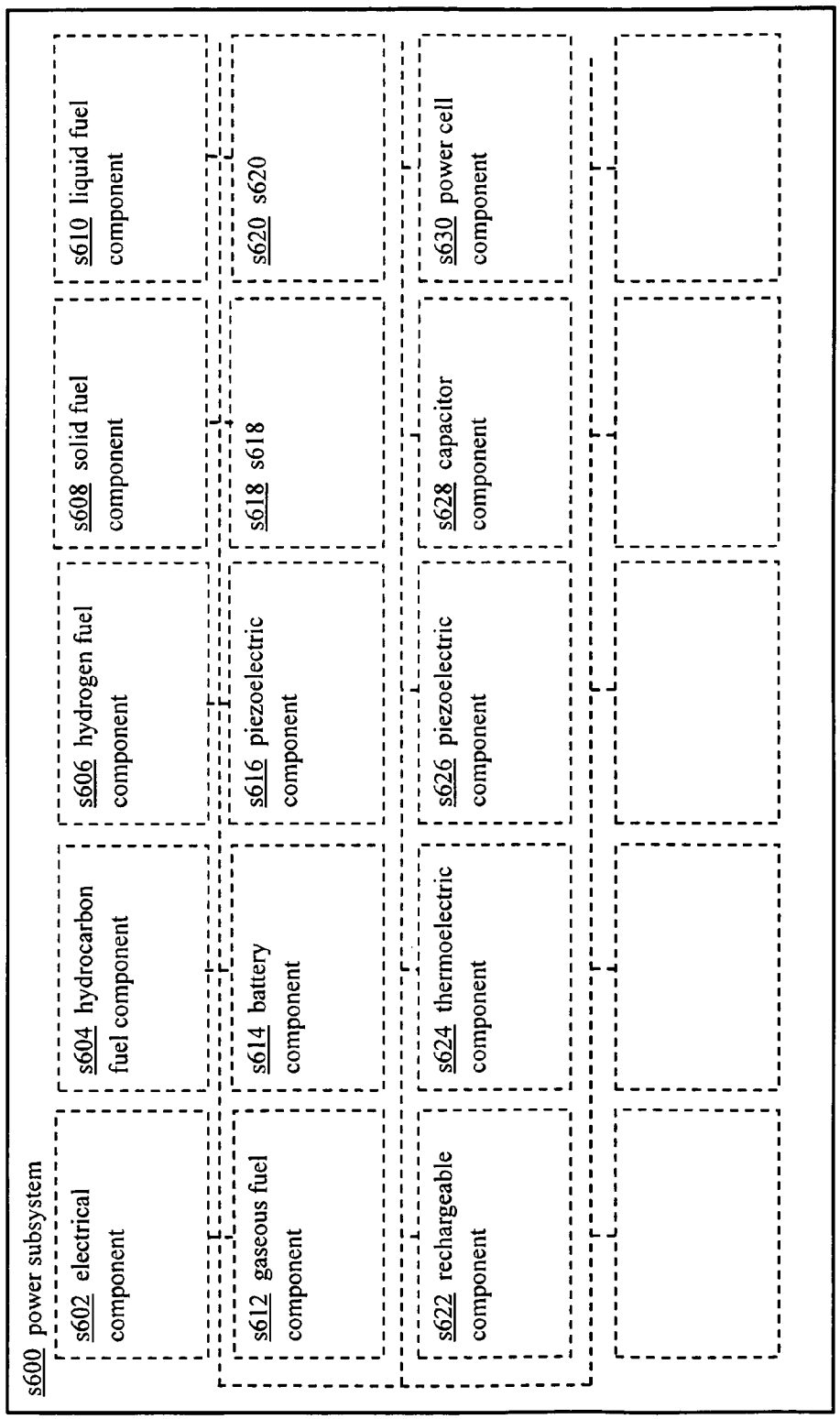
FIG. 17 is a block diagram depicting a power subsystem s600 of an exemplary implementation of the ingestible product preparation system 10 of FIG. 1.

An exemplary implementation of the power subsystem s600 is shown in FIG. 17 to optionally include various components such as electrical component s602, hydrocarbon fuel component s604, hydrogen fuel component s606, solid fuel component s608, liquid fuel component s610, gaseous fuel component s612, battery component s614, piezoelectric component s616, rechargeable component s622, thermoelectric component s624, piezoelectric component s626, capacitor component s628, and power cell component s630.

Figure 18:
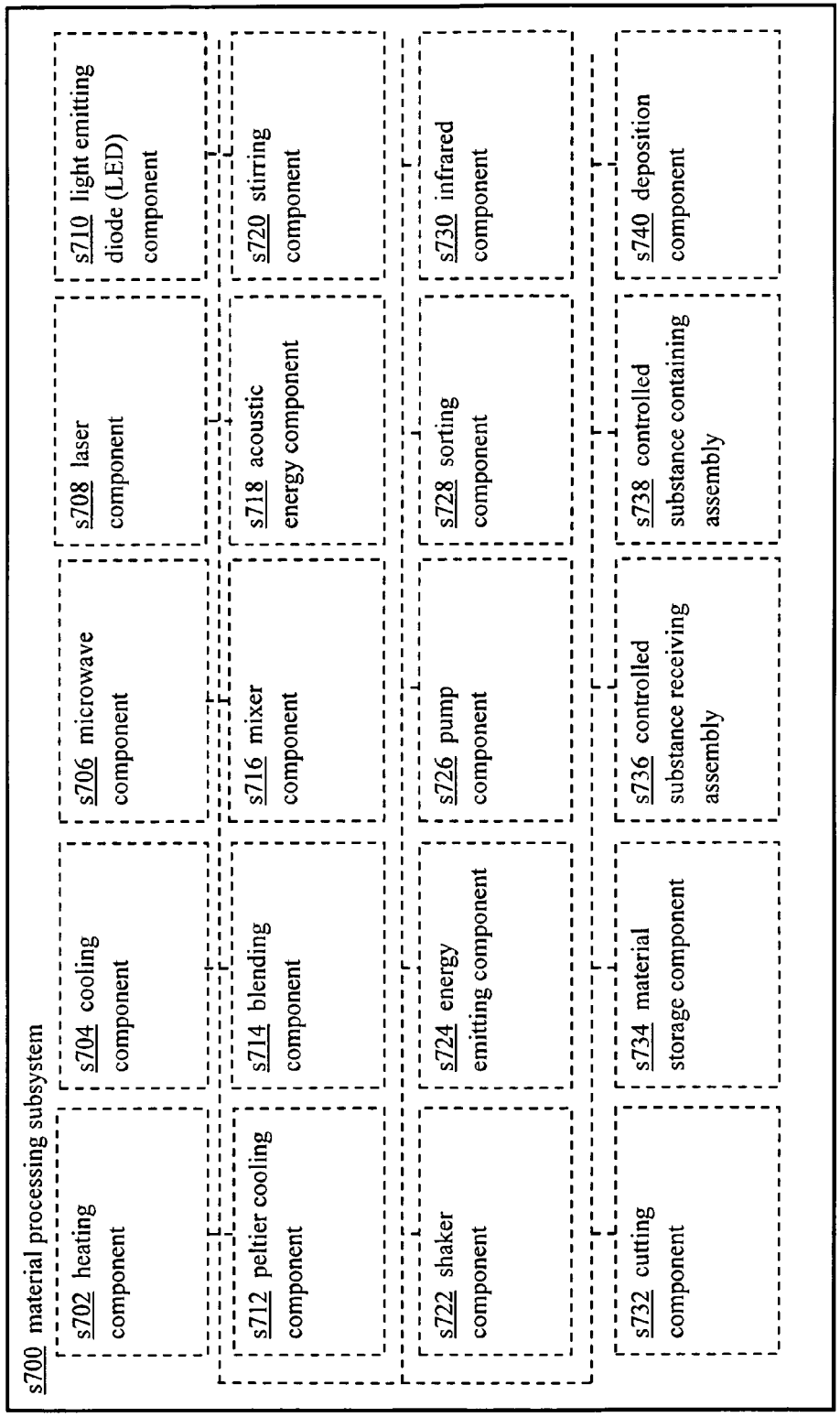
FIG. 18 is a block diagram depicting a material processing subsystem s700 of an exemplary implementation of the ingestible product preparation system 10 of FIG. 1.

An exemplary implementation of the material processing subsystem s700 is shown in FIG. 18 to optionally include various components such as heating component s702, cooling component s704, microwave component s706, laser component s708, light emitting diode (LED) component s710, peltier cooling component s712, blending component s714, mixer component s716, acoustic energy component s718, stirring component s720, shaker component s722, energy emitting component s724, pump component s726, sorting component s728, infrared component s730, cutting component s732, material storage component s734, controlled substance receiving assembly s736, controlled substance containing assembly s738, deposition component s740.

Figure 19:
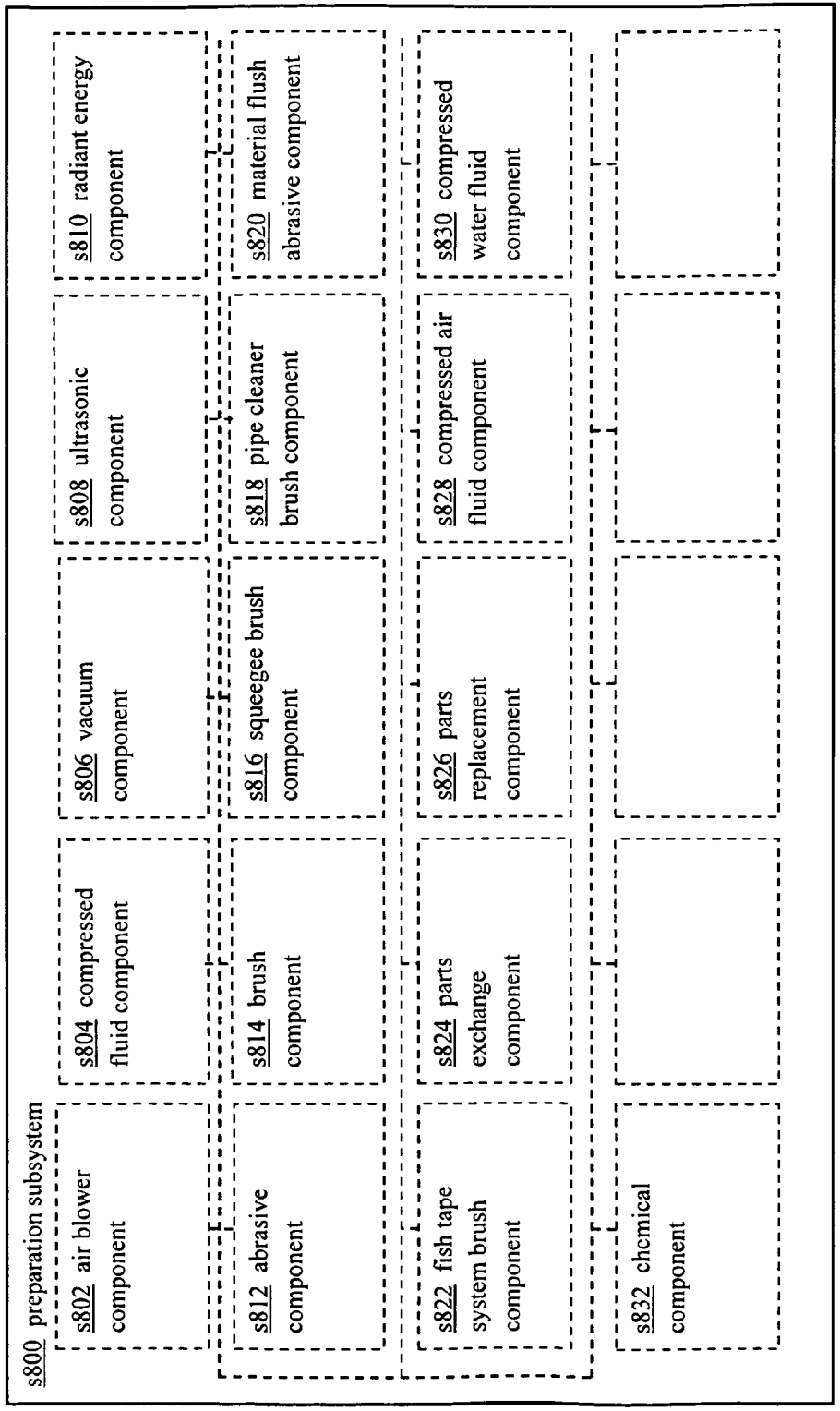
FIG. 19 is a block diagram depicting a preparation subsystem s800 of an exemplary implementation of the ingestible product preparation system 10 of FIG. 1.

An exemplary implementation of the preparation subsystem s800 is shown in FIG. 19 to optionally include various components such as air blower component s802, compressed fluid component s804, vacuum component s806, ultrasonic component s808, radiant energy component s810, abrasive component s812, brush component s814, squeegee brush component s816, pipe cleaner brush component s818, material flush abrasive component s820, fish tape system brush component s822, parts exchange component s824, parts replacement component s826, compressed air fluid component s828, compressed water fluid component s830, and chemical component s832.

Figure 20:
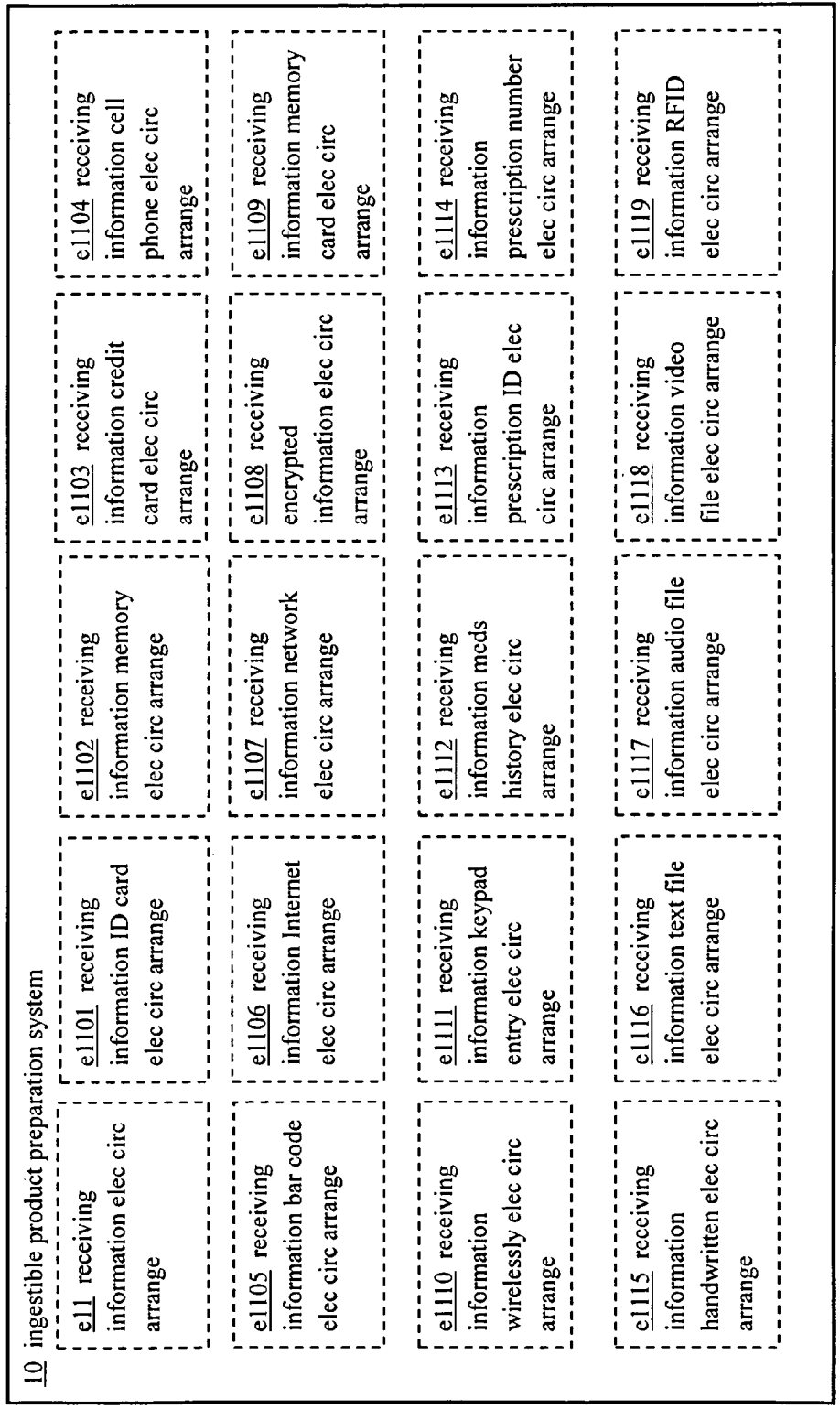
FIG. 20 is a block diagram depicting one or more exemplary electrical circuitry arrangements of the ingestible product preparation system 10 of FIG. 1.

Implementations involve different combinations (otherwise known as "electrical circuitry arrangements") of components from the subsystems of the ingestible product preparation system 10. Exemplary depictions of some of these electrical circuitry arrangements are shown in FIG. 20 to include receiving information electrical circuitry arrangement e11, receiving information ID card electrical circuitry arrangement e1101, receiving information memory electrical circuitry arrangement e1102, receiving information credit card electrical circuitry arrangement e1103, receiving information cell phone electrical circuitry arrangement e1104, receiving information bar code electrical circuitry arrangement e1105, receiving information Internet electrical circuitry arrangement e1106, receiving information network electrical circuitry arrangement e1107, receiving encrypted information electrical circuitry arrangement e1108, receiving information memory card electrical circuitry arrangement e1109, receiving information wirelessly electrical circuitry arrangement e1110, receiving information keypad entry electrical circuitry arrangement e1111, receiving information meds history electrical circuitry arrangement e1112, receiving information prescription ID electrical circuitry arrangement e1113, receiving information prescription number electrical circuitry arrangement e1114, receiving information handwritten electrical circuitry arrangement e1115, receiving information text file electrical circuitry arrangement e1116, receiving information audio file electrical circuitry arrangement e1117, receiving information video file electrical circuitry arrangement e1118, and receiving information RFID electrical circuitry arrangement e1119.

Figure 21:
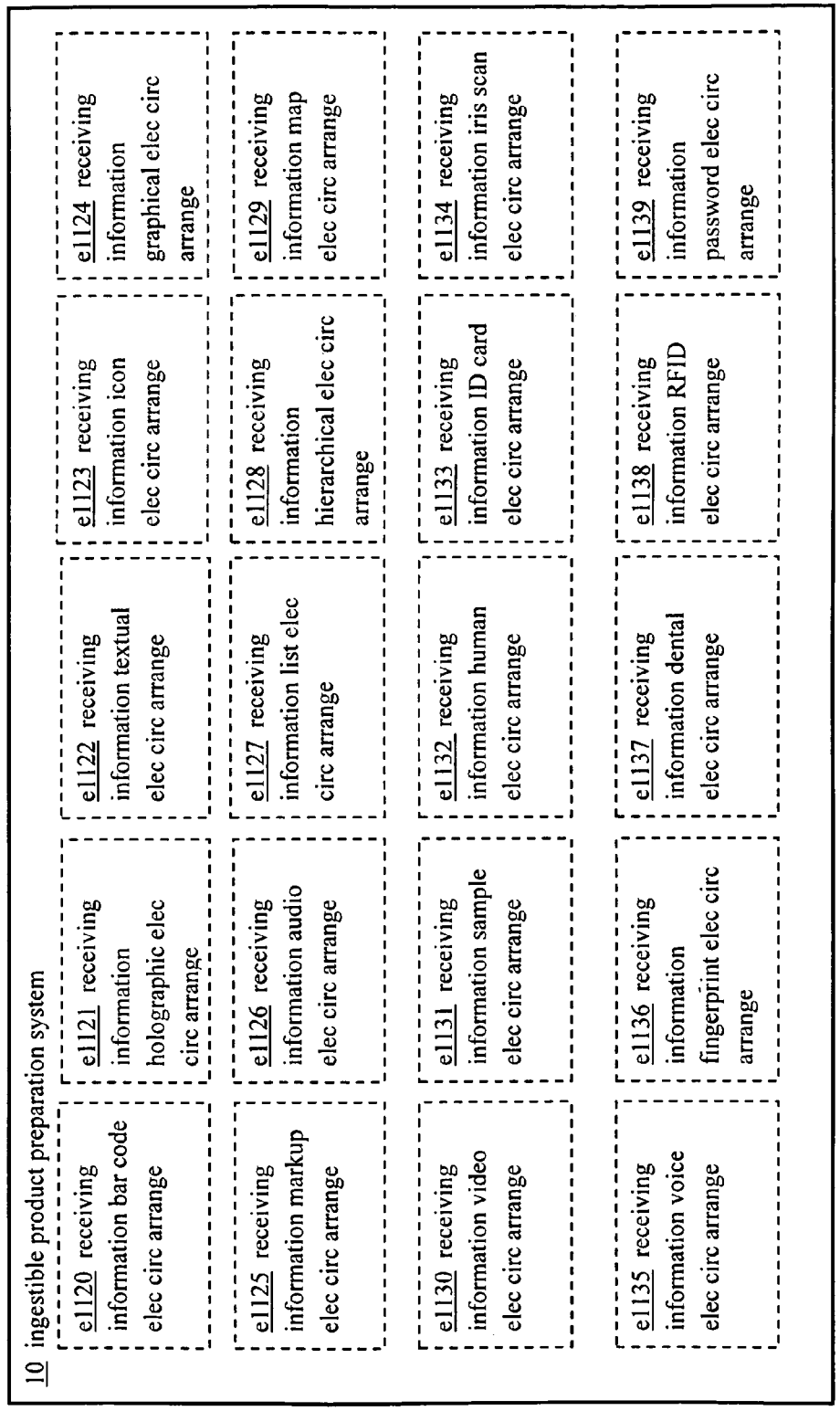
FIG. 21 is a block diagram depicting one or more exemplary electrical circuitry arrangements of the ingestible product preparation system 10 of FIG. 1.

Some of these electrical circuitry arrangements are depicted in FIG. 21 to include receiving information bar code electrical circuitry arrangement e1120, receiving information holographic electrical circuitry arrangement e1121, receiving information textual electrical circuitry arrangement e1122, receiving information icon electrical circuitry arrangement e1123, receiving information graphical electrical circuitry arrangement e1124, receiving information markup electrical circuitry arrangement e1125, receiving information audio electrical circuitry arrangement e1126, receiving information list electrical circuitry arrangement e1127, receiving information hierarchical electrical circuitry arrangement e1128, receiving information map electrical circuitry arrangement e1129, receiving information video electrical circuitry arrangement e1130, receiving information sample electrical circuitry arrangement e113, receiving information human electrical circuitry arrangement e1132, receiving information ID card electrical circuitry arrangement e1133, receiving information iris scan electrical circuitry arrangement e1134, receiving information voice electrical circuitry arrangement e1135, receiving information fingerprint electrical circuitry arrangement e1136, receiving information dental electrical circuitry arrangement e1137, receiving information RFID electrical circuitry arrangement e1138, and receiving information password electrical circuitry arrangement e1139.

Figure 22:
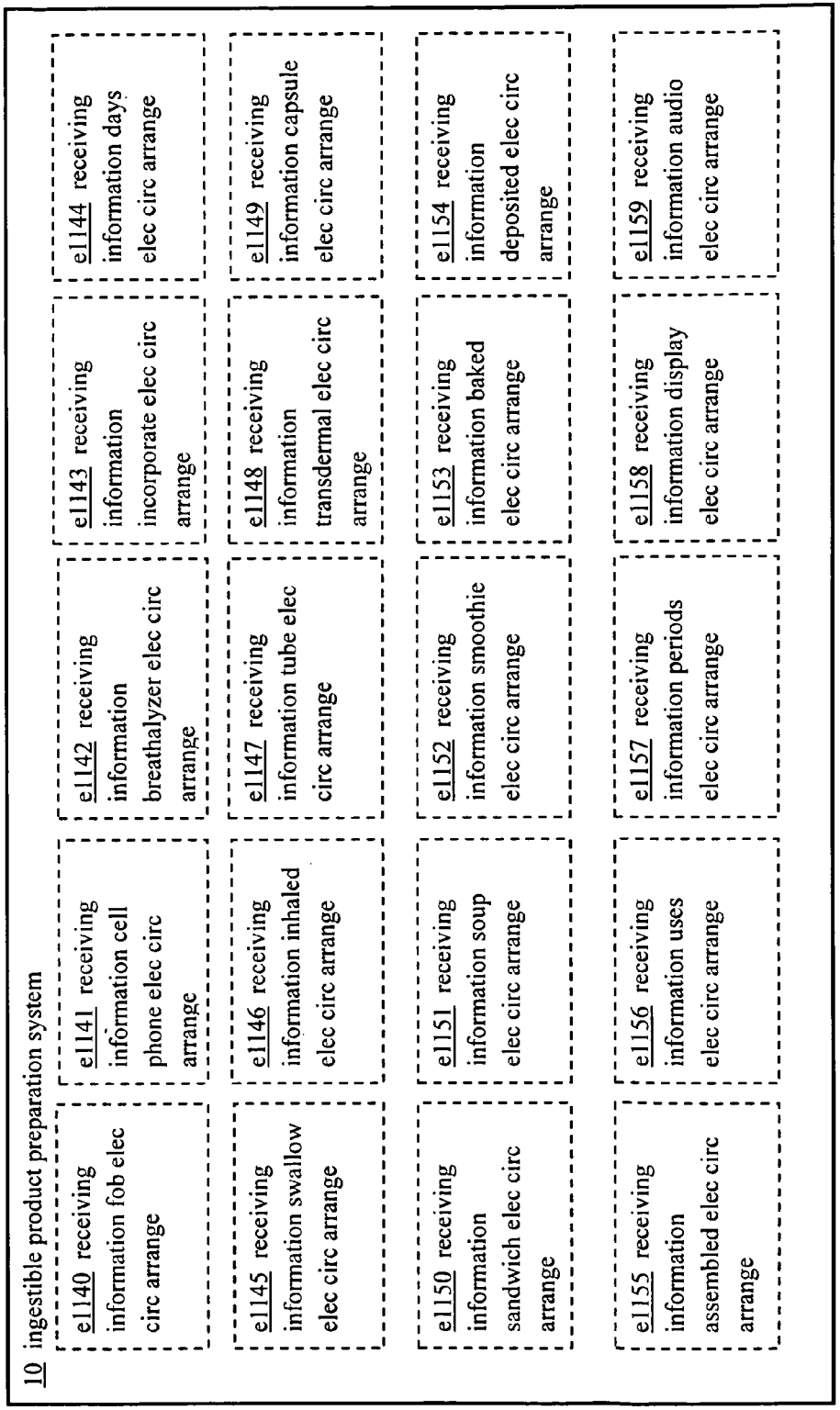
FIG. 22 is a block diagram depicting one or more exemplary electrical circuitry arrangements of the ingestible product preparation system 10 of FIG. 1.

Some of these electrical circuitry arrangements are depicted in FIG. 22 to include receiving information fob electrical circuitry arrangement e1140, receiving information cell phone electrical circuitry arrangement e1141, receiving information breathalyzer electrical circuitry arrangement e1142, receiving information incorporate electrical circuitry arrangement e1143, receiving information days electrical circuitry arrangement e1144, receiving information swallow electrical circuitry arrangement e1145, receiving information inhaled electrical circuitry arrangement e1146, receiving information tube electrical circuitry arrangement e1147, receiving information transdermal electrical circuitry arrangement e1148, receiving information capsule electrical circuitry arrangement e1149, receiving information sandwich electrical circuitry arrangement e1150, receiving information soup electrical circuitry arrangement e1151, receiving information smoothie electrical circuitry arrangement e1152, receiving information baked electrical circuitry arrangement e1153, receiving information deposited electrical circuitry arrangement e1154, receiving information assembled electrical circuitry arrangement e1155, receiving information uses electrical circuitry arrangement e1156, receiving information periods electrical circuitry arrangement e1157, receiving information display electrical circuitry arrangement e1158, and receiving information audio electrical circuitry arrangement e1159.

Figure 23:
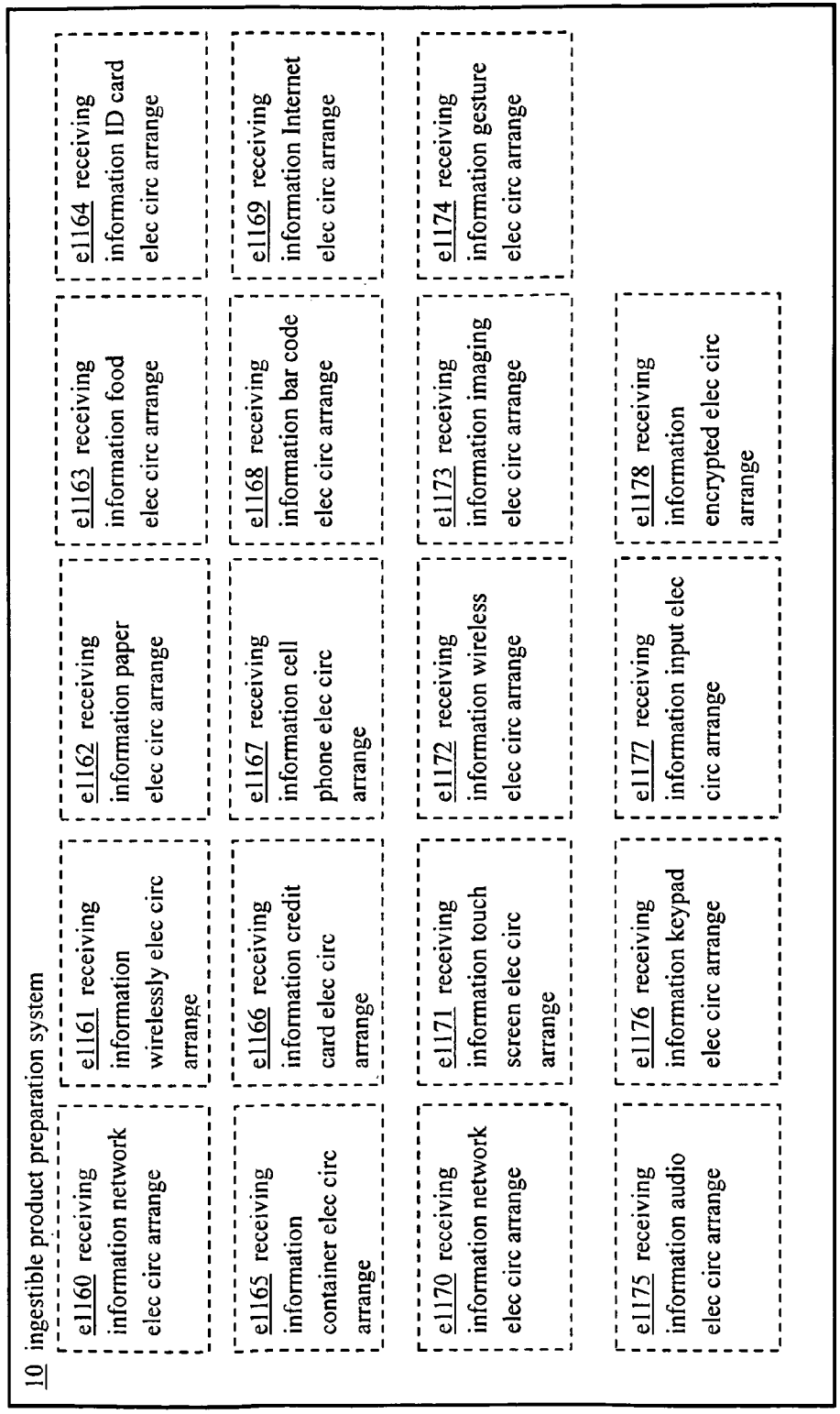
FIG. 23 is a block diagram depicting one or more exemplary electrical circuitry arrangements of the ingestible product preparation system 10 of FIG. 1.

Some of these electrical circuitry arrangements are depicted in FIG. 23 to include receiving information network electrical circuitry arrangement e1160, receiving information wirelessly electrical circuitry arrangement e1161, receiving information paper electrical circuitry arrangement e1162, receiving information food electrical circuitry arrangement e1163, receiving information ID card electrical circuitry arrangement e1164, receiving information container electrical circuitry arrangement e1165, and receiving information credit card electrical circuitry arrangement e1166, receiving information cell phone electrical circuitry arrangement e1167, receiving information bar code electrical circuitry arrangement e1168, receiving information Internet electrical circuitry arrangement e1169, receiving information network electrical circuitry arrangement e1170, receiving information touch screen electrical circuitry arrangement e1171, receiving information wireless electrical circuitry arrangement e1172, receiving information imaging electrical circuitry arrangement e1173, receiving information gesture electrical circuitry arrangement e1174, receiving information audio electrical circuitry arrangement e1175, receiving information keypad electrical circuitry arrangement e1176, receiving information input electrical circuitry arrangement e1177, and receiving information encrypted electrical circuitry arrangement e1178.

Some of these electrical circuitry arrangements are depicted in FIG. 24 to include controlling preparation electrical circuitry arrangement e12, control prep connected electrical circuitry arrangement e1201, control prep network electrical circuitry arrangement e1202, control prep thermal electrical circuitry arrangement e1203, control prep heating electrical circuitry arrangement e1204, control prep cooling electrical circuitry arrangement e1205, control prep portion electrical circuitry arrangement e1206, control prep mixing electrical circuitry arrangement e1207, control prep radiation electrical circuitry arrangement e1208, control prep sound electrical circuitry arrangement e1209, control prep infrared electrical circuitry arrangement e1210, control prep microwave electrical circuitry arrangement e1211, and control prep container electrical circuitry arrangement e1212, control prep syringe electrical circuitry arrangement e1213, control prep mix before thermal electrical circuitry arrangement e1214, control prep re mix after thermal electrical circuitry arrangement e1215, control prep heating cooling electrical circuitry arrangement e1216, control prep time control electrical circuitry arrangement e1217, control prep ingredient exclusion electrical circuitry arrangement e1218, and control prep ingredient inclusion electrical circuitry arrangement e1219.

Figure 25:
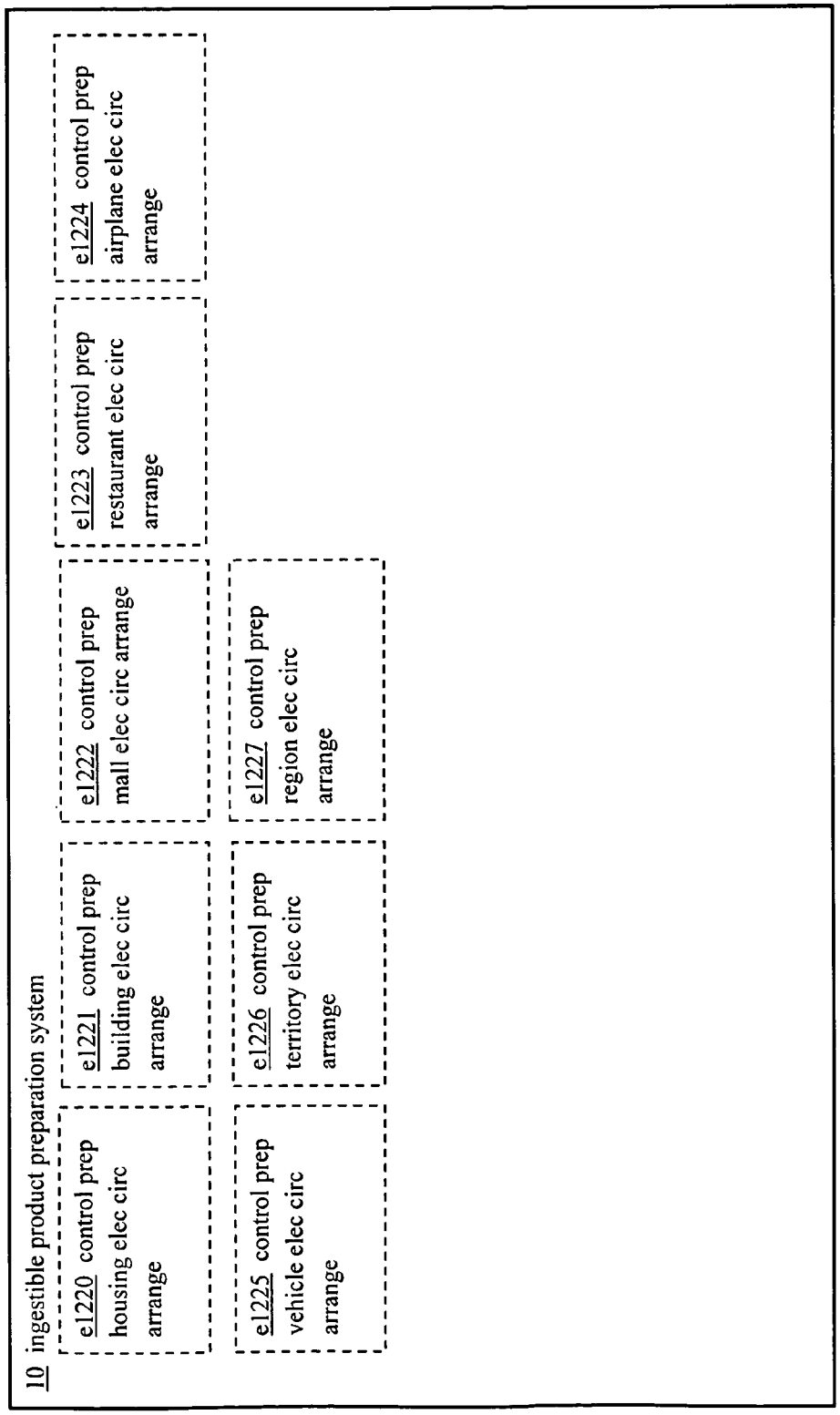
FIG. 25 is a block diagram depicting one or more exemplary electrical circuitry arrangements of the ingestible product preparation system 10 of FIG. 1.

Some of these electrical circuitry arrangements are depicted in FIG. 25 to include control prep housing electrical circuitry arrangement e1220, control prep building electrical circuitry arrangement e1221, control prep mall electrical circuitry arrangement e1222, control prep restaurant electrical circuitry arrangement e1223, control prep airplane electrical circuitry arrangement e1224, control prep vehicle electrical circuitry arrangement e1225, control prep territory electrical circuitry arrangement e1226, and control prep region electrical circuitry arrangement e1227.

Figure 26:
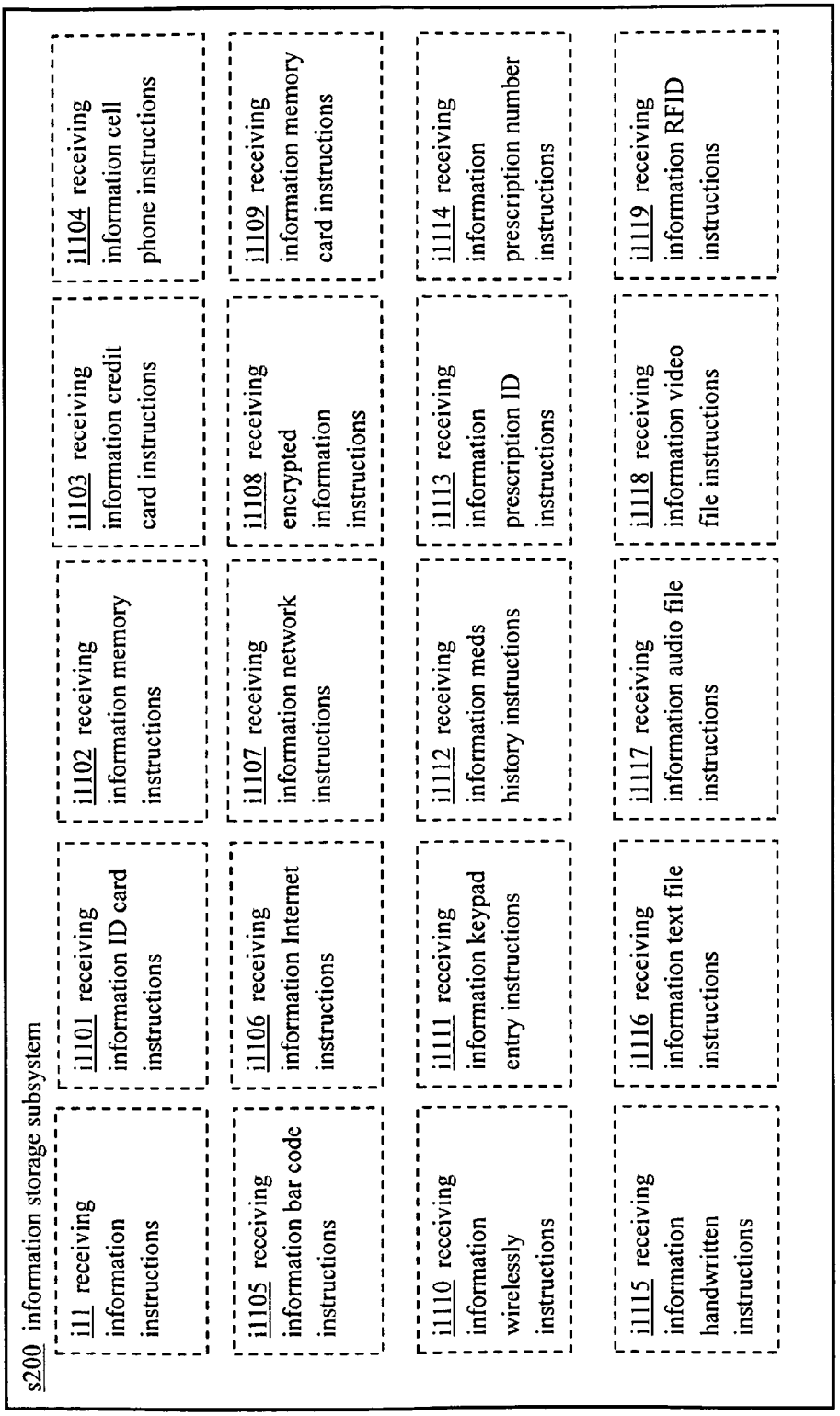
FIG. 26 is a block diagram depicting one or more exemplary instructions of the information storage subsystem s200 of the ingestible product preparation system 10 of FIG. 1.

In implementations one or more instructions are stored and/or otherwise borne in various subsystems, components, and/or accessories of the ingestible product preparation system 10 such as being borne in a non-transitory signal bearing medium of information storage subsystem s200. One or more exemplary instructions depicted in FIG. 26 as being borne in an exemplary version of a non-transitory signal bearing medium of information storage subsystem s200 include one or more receiving information instructions i11, one or more receiving information ID card instructions i1101, one or more receiving information memory instructions i1102, one or more receiving information credit card instructions i1103, one or more receiving information cell phone instructions i1104, one or more receiving information bar code instructions i1105, one or more receiving information Internet instructions i1106, one or more receiving information network instructions i1107, one or more receiving encrypted information instructions i1108, one or more receiving information memory card instructions i1109, one or more receiving information wirelessly instructions i1110, one or more receiving information keypad entry instructions i1111, one or more receiving information meds history instructions i1112, one or more receiving information prescription ID instructions i1113, one or more receiving information prescription number instructions i1114, one or more receiving information handwritten instructions i1115, one or more receiving information text file instructions i1116, one or more receiving information audio file instructions i1117, one or more receiving information video file instructions i1118, and one or more receiving information RFID instructions i1119.

Figure 27:
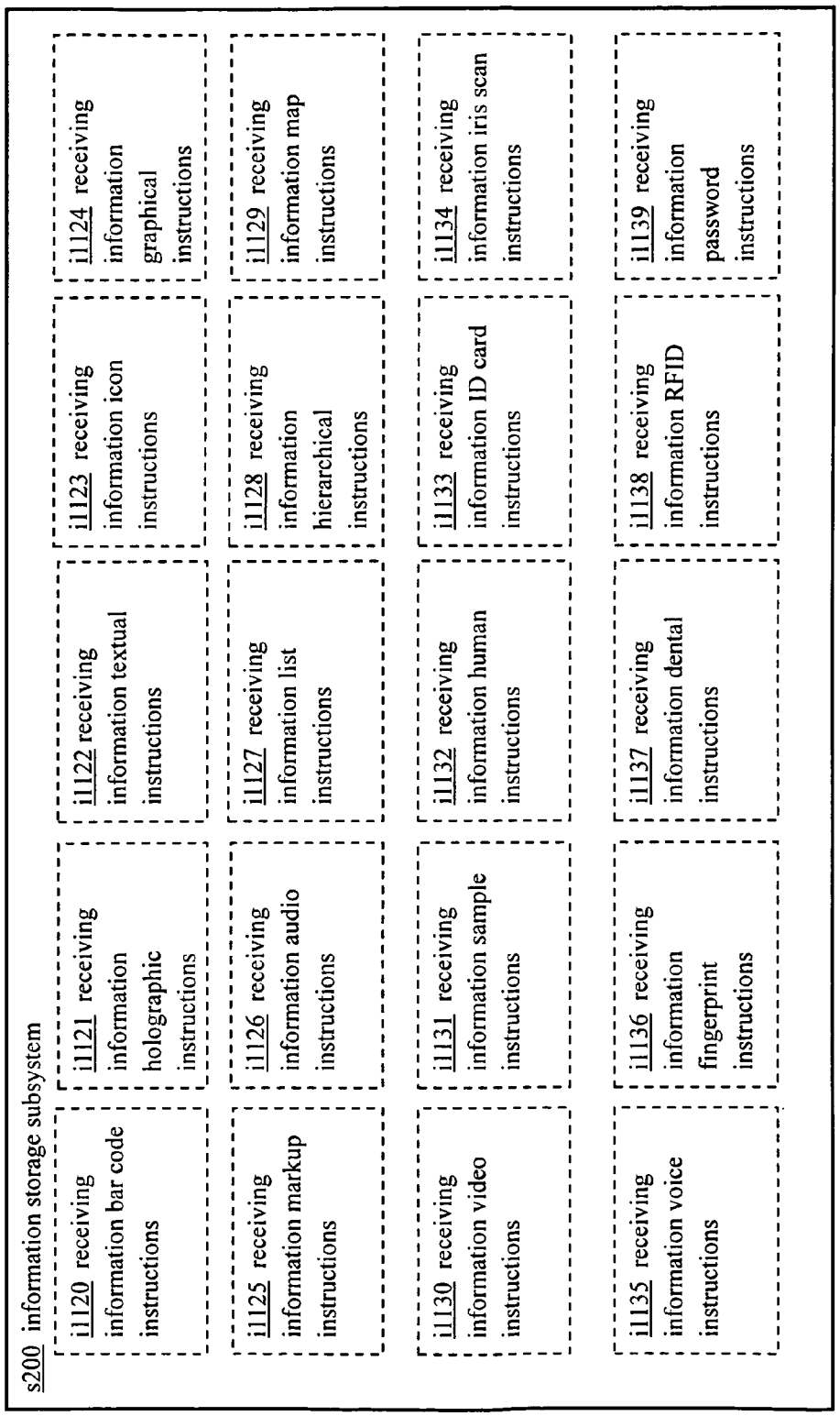
FIG. 27 is a block diagram depicting one or more exemplary instructions of the information storage subsystem s200 of the ingestible product preparation system 10 of FIG. 1.

One or more exemplary instructions depicted in FIG. 27 as being borne in an exemplary version of a non-transitory signal bearing medium of information storage subsystem s200 include one or more receiving information bar code instructions i1120, one or more receiving information holographic instructions i1121, one or more receiving information textual instructions i1122, one or more receiving information icon instructions i1123, one or more receiving information graphical instructions i1124, one or more receiving information markup instructions i1125, one or more receiving information audio instructions i1126, one or more receiving information list instructions i1127, one or more receiving information hierarchical instructions i1128, one or more receiving information map instructions i1129, one or more receiving information video instructions i1130, one or more receiving information sample instructions i1131, one or more receiving information human instructions i1132, one or more receiving information ID card instructions i1133, one or more receiving information iris scan instructions i1134, one or more receiving information voice instructions i1135, one or more receiving information fingerprint instructions i1136, one or more receiving information dental instructions i1137, one or more receiving information RFID instructions i1138, and one or more receiving information password instructions i1139.

Figure 28:
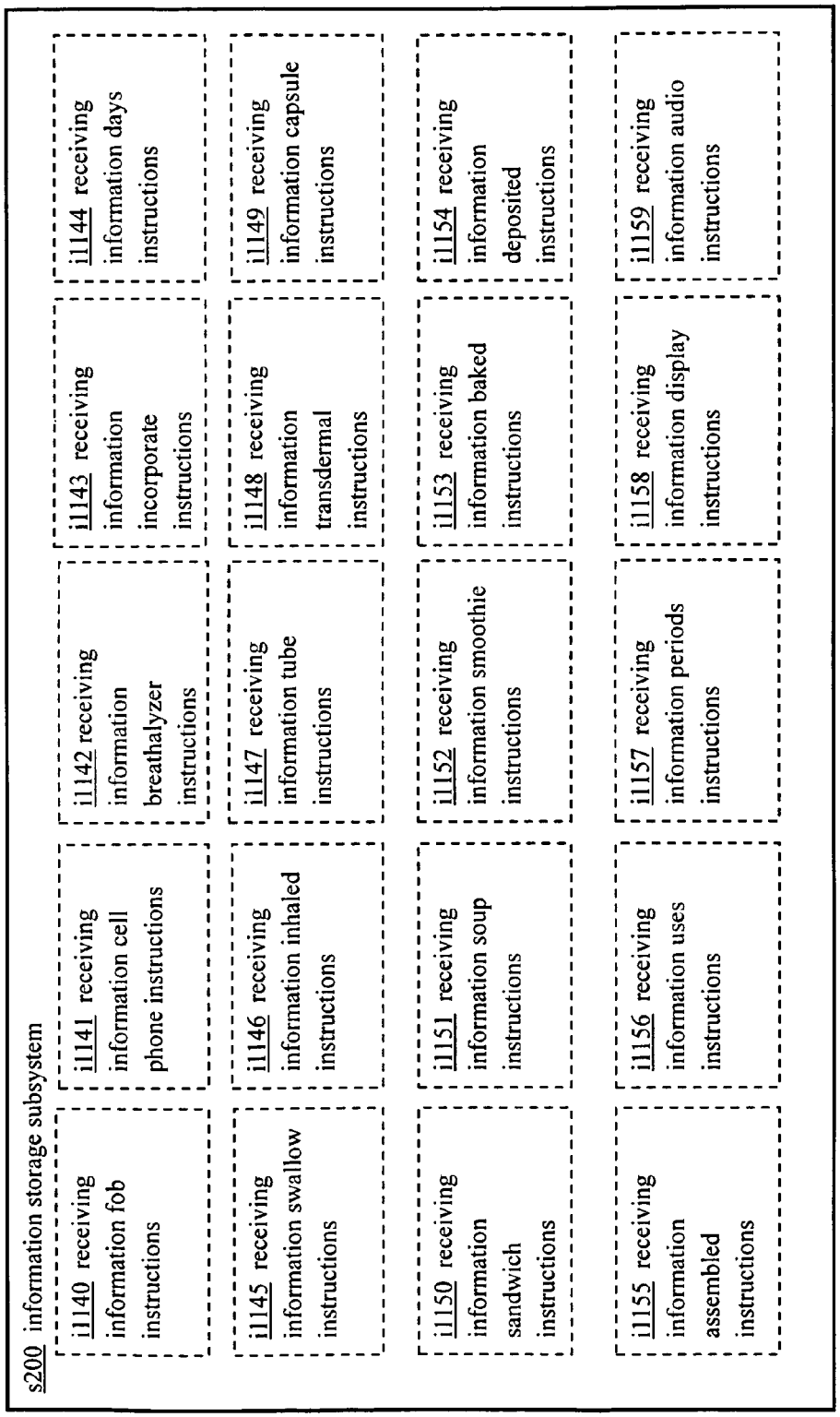
FIG. 28 is a block diagram depicting one or more exemplary instructions of the information storage subsystem s200 of the ingestible product preparation system 10 of FIG. 1.

One or more exemplary instructions depicted in FIG. 28 as being borne in an exemplary version of a non-transitory signal bearing medium of information storage subsystem s200 include one or more receiving information fob instructions i1140, one or more receiving information cell phone instructions i1141, one or more receiving information breathalyzer instructions i1142, one or more receiving information incorporate instructions i1143, one or more receiving information days instructions i1144, one or more receiving information swallow instructions i1145, one or more receiving information inhaled instructions i1146, one or more receiving information tube instructions i1147, one or more receiving information transdermal instructions i1148, one or more receiving information capsule instructions i1149, one or more receiving information sandwich instructions i1150, one or more receiving information soup instructions i1151, one or more receiving information smoothie instructions i1152, one or more receiving information baked instructions i1153, one or more receiving information deposited instructions i1154, one or more receiving information assembled instructions i1155, one or more receiving information uses instructions i1156, one or more receiving information periods instructions i1157, one or more receiving information display instructions i1158, and one or more receiving information audio instructions i1159.

Figure 29:
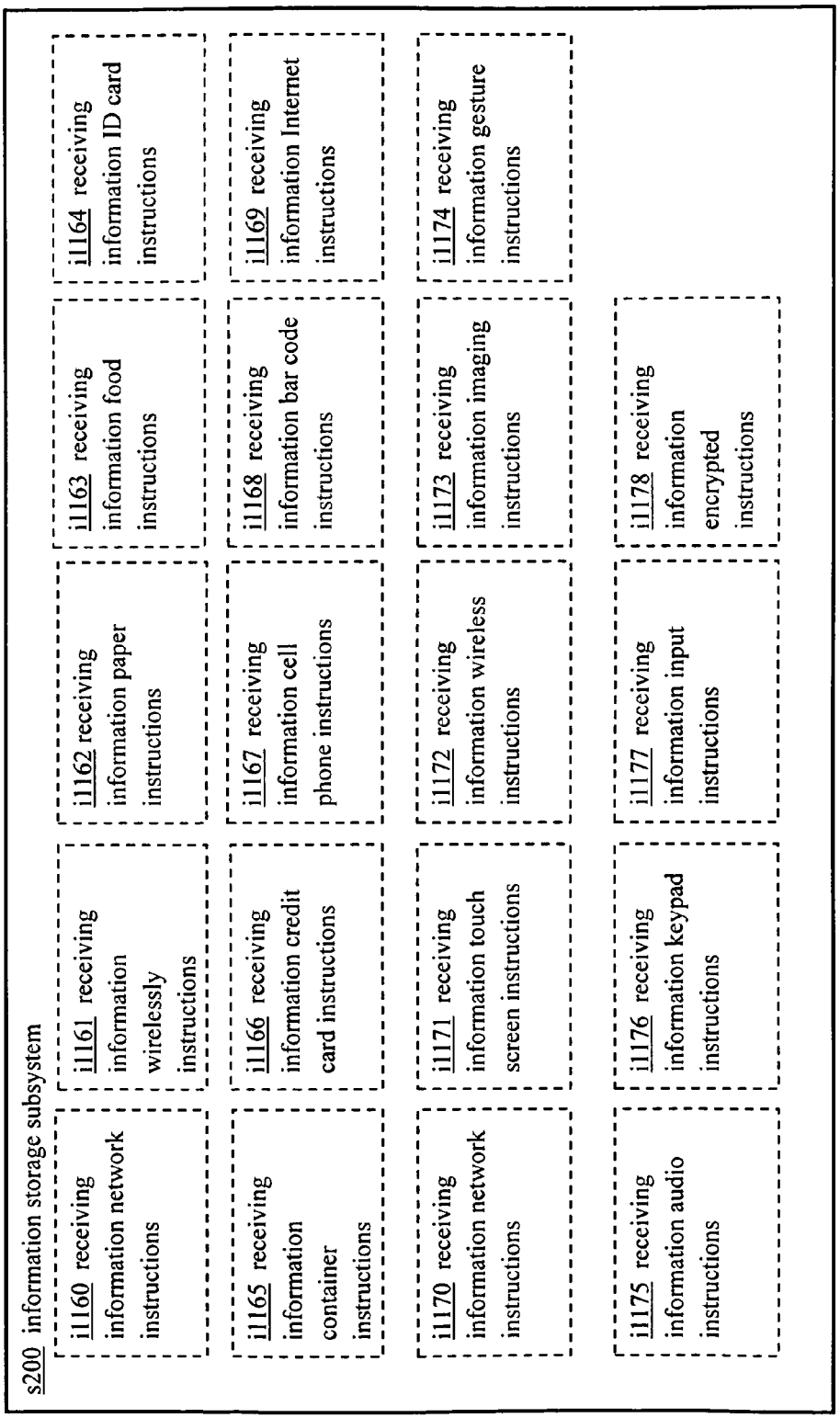
FIG. 29 is a block diagram depicting one or more exemplary instructions of the information storage subsystem s200 of the ingestible product preparation system 10 of FIG. 1.

One or more exemplary instructions depicted in FIG. 29 as being borne in an exemplary version of a non-transitory signal bearing medium of information storage subsystem s200 include one or more receiving information network instructions i1160, one or more receiving information wirelessly instructions i1161, one or more receiving information paper instructions i1162, one or more receiving information food instructions i1163, one or more receiving information ID card instructions i1164, one or more receiving information container instructions i1165, and one or more receiving information credit card instructions i1166, one or more receiving information cell phone instructions i1167, one or more receiving information bar code instructions i1168, one or more receiving information Internet instructions i1169, one or more receiving information network instructions i1170, one or more receiving information touch screen instructions i1171, one or more receiving information wireless instructions i1172, one or more receiving information imaging instructions i1173, one or more receiving information gesture instructions i1174, one or more receiving information audio instructions i1175, one or more receiving information keypad instructions i1176, one or more receiving information input instructions i1177, and one or more receiving information encrypted instructions i1178.

Figure 30:
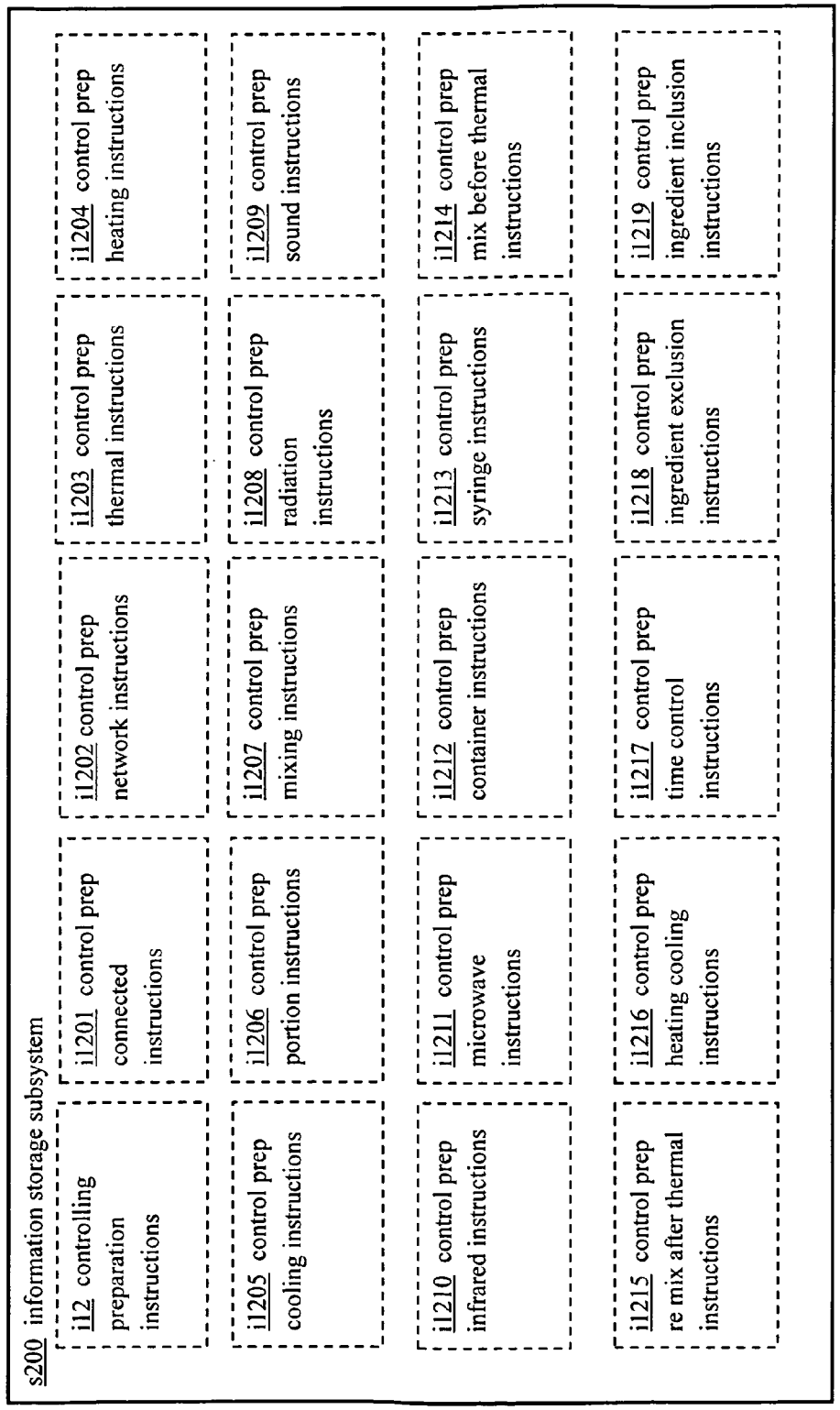
FIG. 30 is a block diagram depicting one or more exemplary instructions of the information storage subsystem s200 of the ingestible product preparation system 10 of FIG. 1.

One or more exemplary instructions depicted in FIG. 30 as being borne in an exemplary version of a non-transitory signal bearing medium of information storage subsystem s200 include one or more controlling preparation instructions i12, one or more control prep connected instructions i1201, one or more control prep network instructions i1202, one or more control prep thermal instructions i1203, one or more control prep heating instructions i1204, one or more control prep cooling instructions i1205, one or more control prep portion instructions i1206, one or more control prep mixing instructions i1207, one or more control prep radiation instructions i1208, one or more control prep sound instructions i1209, one or more control prep infrared instructions i1210, one or more control prep microwave instructions i1211, one or more control prep container instructions i1212, one or more control prep syringe instructions i1213, one or more control prep mix before thermal instructions i1214, one or more control prep re mix after thermal instructions i1215, one or more control prep heating cooling instructions i1216, one or more control prep time control instructions i1217, one or more control prep ingredient exclusion instructions i1218, and one or more control prep ingredient inclusion instructions i1219.

Figure 31:
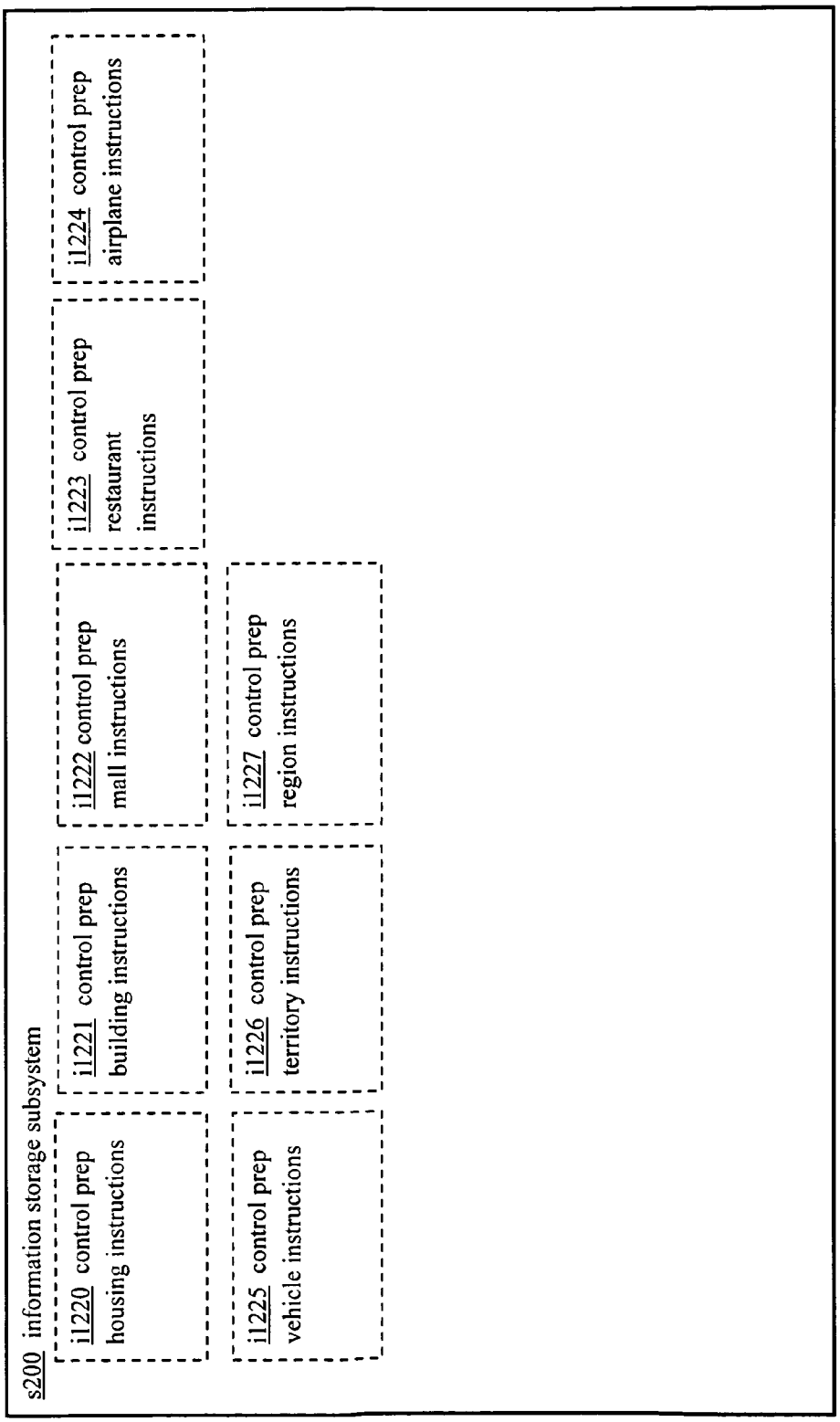
FIG. 31 is a block diagram depicting one or more exemplary instructions of the information storage subsystem s200 of the ingestible product preparation system 10 of FIG. 1.

One or more exemplary instructions depicted in FIG. 31 as being borne in an exemplary version of a non-transitory signal bearing medium of information storage subsystem s200 include one or more control prep housing instructions i1220, one or more control prep building instructions i1221, one or more control prep mall instructions i1222, one or more control prep restaurant instructions i1223, one or more control prep airplane instructions i1224, one or more control prep vehicle instructions i1225, one or more control prep territory instructions i1226, and one or more control prep region instructions i1227.

Figure 32:
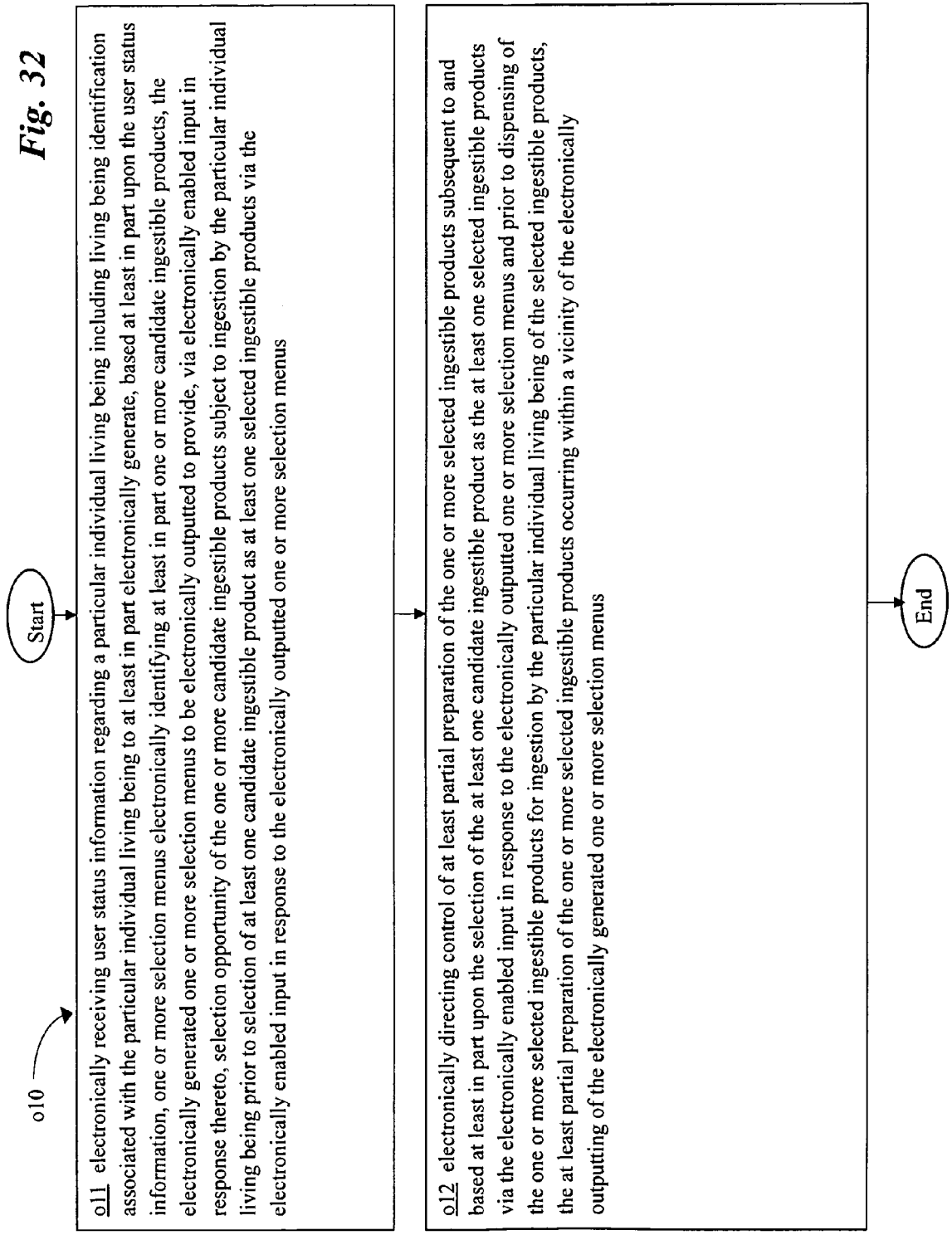
FIG. 32 is a high-level flowchart illustrating an operational flow o10 representing exemplary operations related to electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus, and electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus at least associated with the depicted exemplary implementations of the system.

An operational flow o10 as shown in FIG. 32 represents example operations related to electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus and electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus.

FIG. 32 and those figures that follow may have various examples of operational flows, and explanation may be provided with respect to the above-described examples of FIGS. 1-7 and/or with respect to other examples and contexts. Nonetheless, it should be understood that the operational flows may be executed in a number of other environments and contexts, and/or in modified versions of FIGS. 1-7. Furthermore, although the various operational flows are presented in the sequence(s) illustrated, it should be understood that the various operations may be performed in other orders than those which are illustrated, or may be performed concurrently.

In FIG. 32 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

As shown in FIG. 32, the operational flow o10 proceeds to operation o11 for electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus. An exemplary version of a non-transitory signal bearing medium of information storage subsystem s200 is depicted as bearing one or more receiving information instructions i11 that when executed will direct performance of the operation o11. In an implementation, the one or more receiving information instructions i11 when executed direct electronically receiving (e.g. the network cable component s502 carries information to the transceiver component s522, etc.) user status information regarding a particular individual living being (e.g. a particular human being, animal, etc.) including living being identification associated with the particular individual living being (e.g. identification numbers, passwords, biometric data such as voice prints, stored in information storage subsystem 200) to at least in part electronically generate (e.g. microprocessor component s102 uses the received user status information combined with database references to determine what to generate or otherwise be outputted), based at least in part upon the user status information (e.g. generating one or more menus based upon allergies, preferences, past selections, holidays, preparation and/or dispensing location, etc.) one or more selection menus (e.g. textual, graphical, audio-visual or other sorts of menus, etc.) electronically identifying at least in part one or more candidate ingestible products (e.g. textual descriptions on the menus of the one or more candidate ingestible products, etc.), the electronically generated one or more selection menus to be electronically outputted (e.g. outputted on electronic display screens, etc.) to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus (e.g. input using a keypad, voice commands, etc. to implement one or more selections, etc.). Furthermore, the receiving information electrical circuitry arrangement ("elec circ arrange") e11 when activated will perform the operation o11. In an implementation, the receiving information electrical circuitry arrangement e11, when activated performs electronically receiving (e.g. the network cable component s502 carries information to the transceiver component s522, etc.) user status information regarding a particular individual living being (e.g. a particular human being, animal, etc.) including living being identification associated with the particular individual living being (e.g. identification numbers, passwords, biometric data such as voice prints, stored in information storage subsystem 200) to at least in part electronically generate (e.g. microprocessor component s102 uses the received user status information combined with database references to determine what to generate or otherwise be outputted), based at least in part upon the user status information (e.g. generating one or more menus based upon allergies, preferences, past selections, holidays, preparation and/or dispensing location, etc.) one or more selection menus (e.g. textual, graphical, audio-visual or other sorts of menus, etc.) electronically identifying at least in part one or more candidate ingestible products (e.g. textual descriptions on the menus of the one or more candidate ingestible products, etc.), the electronically generated one or more selection menus to be electronically outputted (e.g. outputted on electronic display screens, etc.) to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus (e.g. input using a keypad, voice commands, etc. to implement one or more selections, etc.). In an implementation, the electronically receiving user status information regarding a particular individual living being including living being identification associated with the particular individual living being to at least in part electronically generate, based at least in part upon the user status information, one or more selection menus electronically identifying at least in part one or more candidate ingestible products, the electronically generated one or more selection menus to be electronically outputted to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus is carried out by electronically receiving (e.g. the network cable component s502 carries information to the transceiver component s522, etc.) user status information regarding a particular individual living being (e.g. a particular human being, animal, etc.) including living being identification associated with the particular individual living being (e.g. identification numbers, passwords, biometric data such as voice prints, stored in information storage subsystem 200) to at least in part electronically generate (e.g. microprocessor component s102 uses the received user status information combined with database references to determine what to generate or otherwise be outputted), based at least in part upon the user status information (e.g. generating one or more menus based upon allergies, preferences, past selections, holidays, preparation and/or dispensing location, etc.) one or more selection menus (e.g. textual, graphical, audio-visual or other sorts of menus, etc.) electronically identifying at least in part one or more candidate ingestible products (e.g. textual descriptions on the menus of the one or more candidate ingestible products, etc.), the electronically generated one or more selection menus to be electronically outputted (e.g. outputted on electronic display screens, etc.) to provide, via electronically enabled input in response thereto, selection opportunity of the one or more candidate ingestible products subject to ingestion by the particular individual living being prior to selection of at least one candidate ingestible product as at least one selected ingestible products via the electronically enabled input in response to the electronically outputted one or more selection menus (e.g. input using a keypad, voice commands, etc. to implement one or more selections, etc.).

Figure 33:
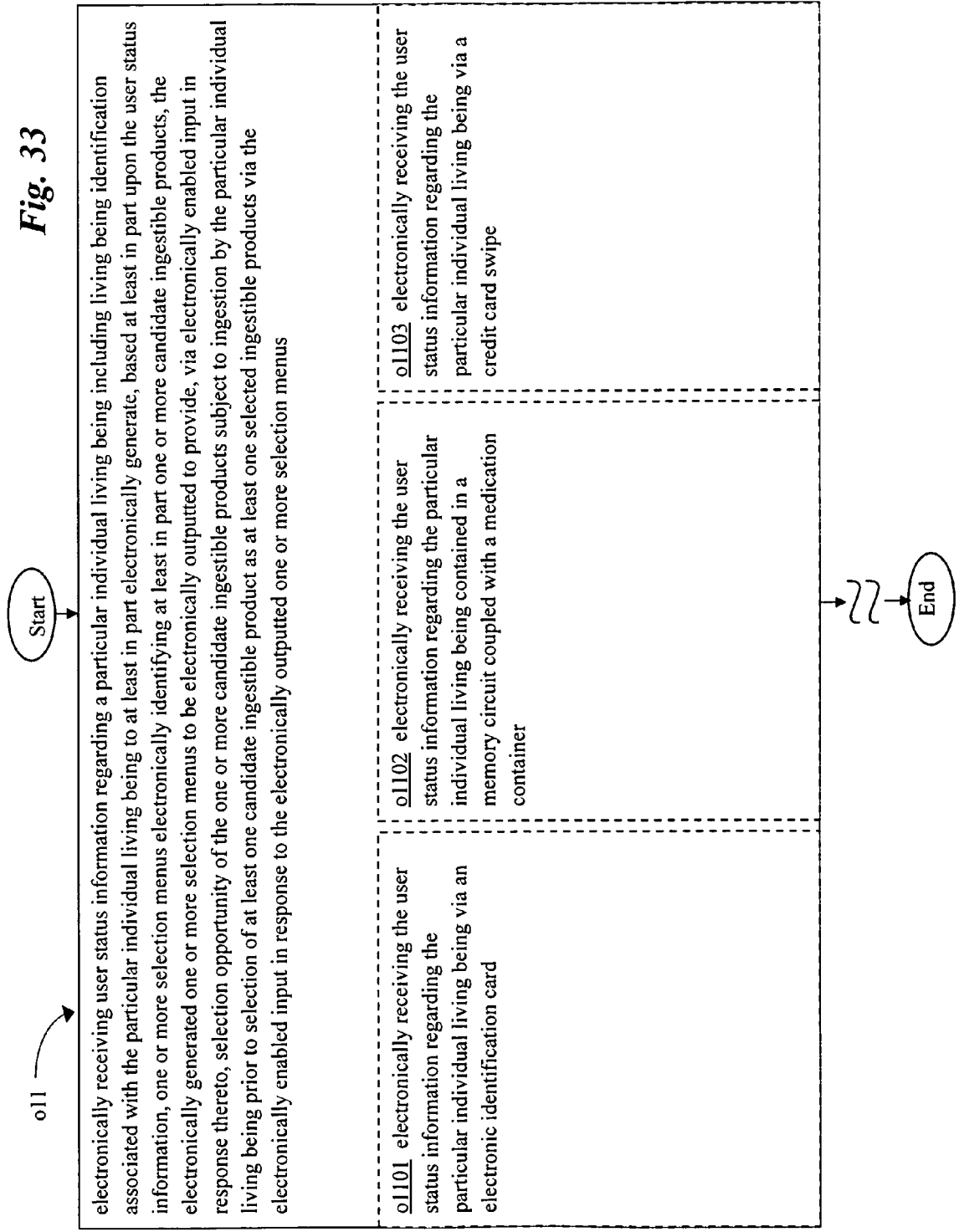
FIG. 33 is a high-level flowchart including exemplary implementations of operation O11 of FIG. 32.

In one or more implementations, as shown in FIG. 33, operation o11 includes an operation o1101 for electronically receiving the user status information regarding the particular individual living being via an electronic identification card. An exemplary version of a non-transitory signal bearing medium of information storage subsystem s200 is depicted as bearing one or more receiving information ID card instructions i1101 that when executed will direct performance of the operation o1101. In an implementation, the one or more receiving information ID card instructions i1101 when executed direct electronically receiving the user status information regarding the particular individual living being via an electronic identification card (e.g. an implementation of the receiver component s528 is configured to electronically engage with a card having memory storage holding the user status information, etc.). Furthermore, the receiving information ID card electrical circuitry arrangement ("elec circ arrange") e1101 when activated will perform the operation o1101. In an implementation, the receiving information ID card electrical circuitry arrangement e1101, when activated performs electronically receiving the user status information regarding the particular individual living being via an electronic identification card (e.g. an implementation of the receiver component s528 is configured to electronically engage with a card having memory storage holding the user status information, etc.). In an implementation, the electronically receiving the user status information regarding the particular individual living being via an electronic identification card is carried out by electronically receiving the user status information regarding the particular individual living being via an electronic identification card (e.g. an implementation of the receiver component s528 is configured to electronically engage with a card having memory storage holding the user status information, etc.).

In one or more implementations, operation o11 includes an operation o1102 for electronically receiving the user status information regarding the particular individual living being contained in a memory circuit coupled with a medication container. An exemplary version of a non-transitory signal bearing medium of information storage subsystem s200 is depicted as bearing one or more receiving information memory instructions i1102 that when executed will direct performance of the operation o1102. In an implementation, the one or more receiving information memory instructions i1102 when executed direct electronically receiving the user status information regarding the particular individual living being contained in a memory circuit coupled with a medication container (e.g. an implementation of the receiver component s528 is configured to electronically engage with a memory storage coupled with a medication container to receive the user status information in electronic form, etc.). Furthermore, the receiving information memory electrical circuitry arrangement e1102 when activated will perform the operation o1102. In an implementation, the receiving information memory electrical circuitry arrangement e1102, when activated performs electronically receiving the user status information regarding the particular individual living being contained in a memory circuit coupled with a medication container (e.g. an implementation of the receiver component s528 is configured to electronically engage with a memory storage coupled with a medication container to receive the user status information in electronic form, etc.). In an implementation, the electronically receiving the user status information regarding the particular individual living being contained in a memory circuit coupled with a medication container is carried out by electronically receiving the user status information regarding the particular individual living being contained in a memory circuit coupled with a medication container (e.g. an implementation of the receiver component s528 is configured to electronically engage with a memory storage coupled with a medication container to receive the user status information in electronic form, etc.).

In one or more implementations, operation o11 includes an operation o1103 for electronically receiving the user status information regarding the particular individual living being via a credit card swipe. An exemplary version of a non-transitory signal bearing medium of information storage subsystem s200 is depicted as bearing one or more receiving information credit card instructions i1103 that when executed will direct performance of the operation o1103. In an implementation, the one or more receiving information credit card instructions i1103 when executed direct electronically receiving the user status information regarding the particular individual living being via a credit card swipe (e.g. an implementation of the receiver component s528 is configured to electronically engage with an electronic memory stripe integrated into a credit card to receive the user status information, etc.). Furthermore, the receiving information credit card electrical circuitry arrangement e1103 when activated will perform the operation o1103. In an implementation, the receiving information credit card electrical circuitry arrangement e1103, when activated performs electronically receiving the user status information regarding the particular individual living being via a credit card swipe (e.g. an implementation of the receiver component s528 is configured to electronically engage with an electronic memory stripe integrated into a credit card to receive the user status information, etc.). In an implementation, the is electronically receiving the user status information regarding the particular individual living being via a credit card swipe carried out by electronically receiving the user status information regarding the particular individual living being via a credit card swipe (e.g. an implementation of the receiver component s528 is configured to electronically engage with an electronic memory stripe integrated into a credit card to receive the user status information, etc.).

Figure 34:
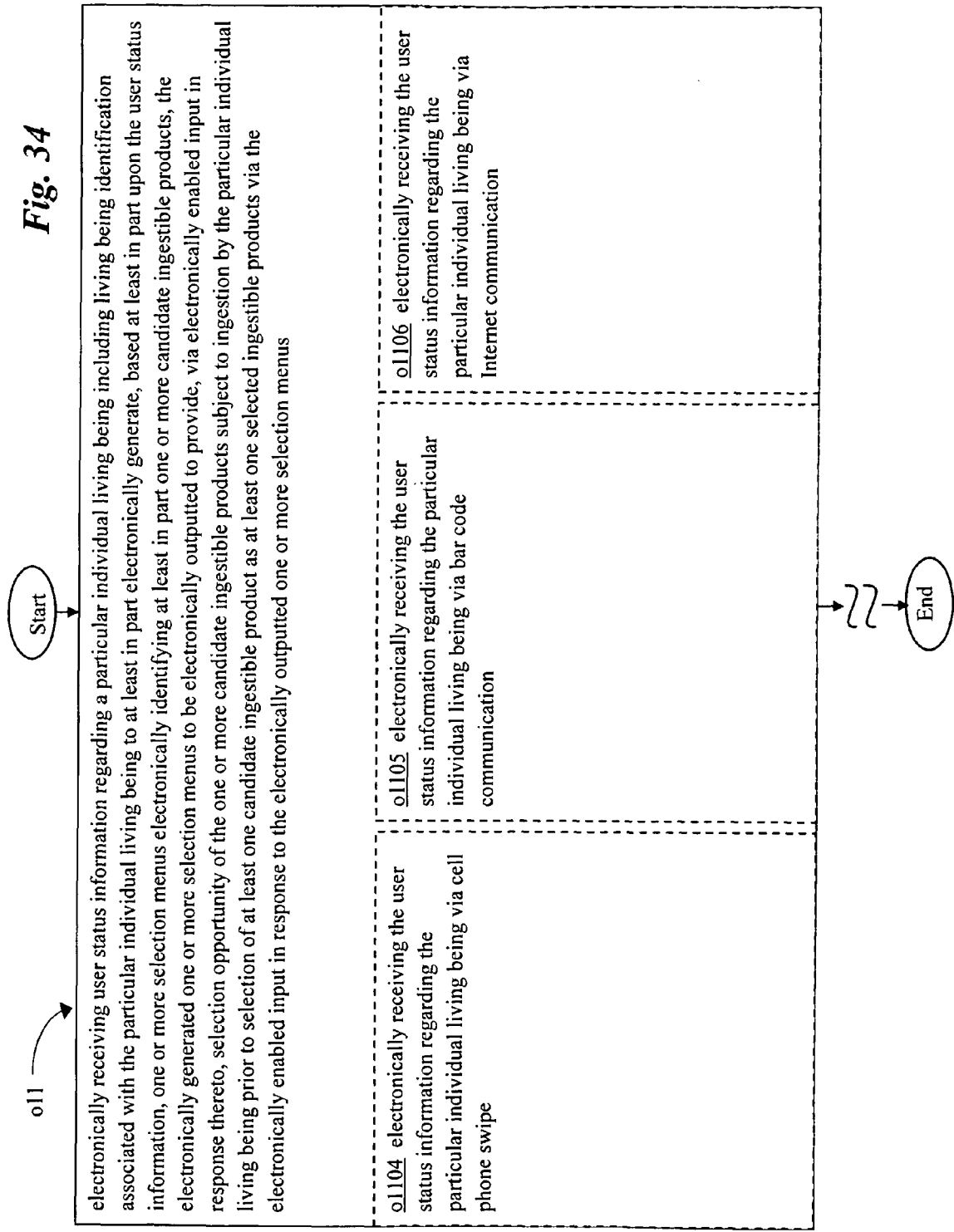
FIG. 34 is a high-level flowchart including exemplary implementations of operation O11 of FIG. 32.

In one or more implementations, as shown in FIG. 34, operation o11 includes an operation o1104 for electronically receiving the user status information regarding the particular individual living being via cell phone swipe. An exemplary version of a non-transitory signal bearing medium of information storage subsystem s200 is depicted as bearing one or more receiving information cell phone instructions i1104 that when executed will direct performance of the operation o1104. In an implementation, the one or more receiving information cell phone instructions i1104 when executed direct electronically receiving the user status information via cell phone swipe (e.g. an implementation of the receiver component s528 is configured to electronically engage with an electronic memory component integrated into a cell phone to receive the user status information, etc.). Furthermore, the receiving information cell phone electrical circuitry arrangement e1104 when activated will perform the operation o1104. In an implementation, the receiving information cell phone electrical circuitry arrangement e1104, when activated performs electronically receiving the user status information via cell phone swipe (e.g. an implementation of the receiver component s528 is configured to electronically engage with an electronic memory component integrated into a cell phone to receive the user status information, etc.). In an implementation, the is electronically receiving the user status information regarding the particular individual living being via cell phone swipe carried out by electronically receiving the user status information via cell phone swipe (e.g. an implementation of the receiver component s528 is configured to electronically engage with an electronic memory component integrated into a cell phone to receive the user status information, etc.).

In one or more implementations, operation o11 includes an operation o1105 for electronically receiving the user status information regarding the particular individual living being via bar code communication. An exemplary version of a non-transitory signal bearing medium of information storage subsystem s200 is depicted as bearing one or more receiving information bar code instructions i1105 that when executed will direct performance of the operation o1105. In an implementation, the one or more receiving information bar code instructions i1105 when executed direct electronically receiving the user status information via bar code communication (e.g. an implementation of the receiver component s528 is configured to electronically read a bar code label to receive the user status information, etc.). Furthermore, the receiving information bar code electrical circuitry arrangement e1105 when activated will perform the operation o1105. In an implementation, the receiving information bar code electrical circuitry arrangement e1105, when activated performs electronically receiving the user status information via bar code communication (e.g. an implementation of the receiver component s528 is configured to electronically read a bar code label to receive the user status information, etc.). In an implementation, the electronically receiving the user status information regarding the particular individual living being via bar code communication is carried out by electronically receiving the user status information via bar code communication (e.g. an implementation of the receiver component s528 is configured to electronically read a bar code label to receive the user status information, etc.).

In one or more implementations, operation o11 includes an operation o1106 for electronically receiving the user status information regarding the particular individual living being via Internet communication. An exemplary version of a non-transitory signal bearing medium of information storage subsystem s200 is depicted as bearing one or more receiving information Internet instructions i1106 that when executed will direct performance of the operation o1106. In an implementation, the one or more receiving information Internet instructions i1106 when executed direct electronically receiving the user status information via Internet communication (e.g. an implementation of the receiver component s528 is configured to electronically receive through the internet network component s508 the user status information, etc.). Furthermore, the receiving information Internet electrical circuitry arrangement e1106 when activated will perform the operation o1106. In an implementation, the receiving information Internet electrical circuitry arrangement e1106, when activated performs electronically receiving the user status information via Internet communication (e.g. an implementation of the receiver component s528 is configured to electronically receive through the internet network component s508 the user status information, etc.). In an implementation, the electronically receiving the user status information regarding the particular individual living being via Internet communication is carried out by electronically receiving the user status information via Internet communication (e.g. an implementation of the receiver component s528 is configured to electronically receive through the internet network component s508 the user status information, etc.).

Figure 35:
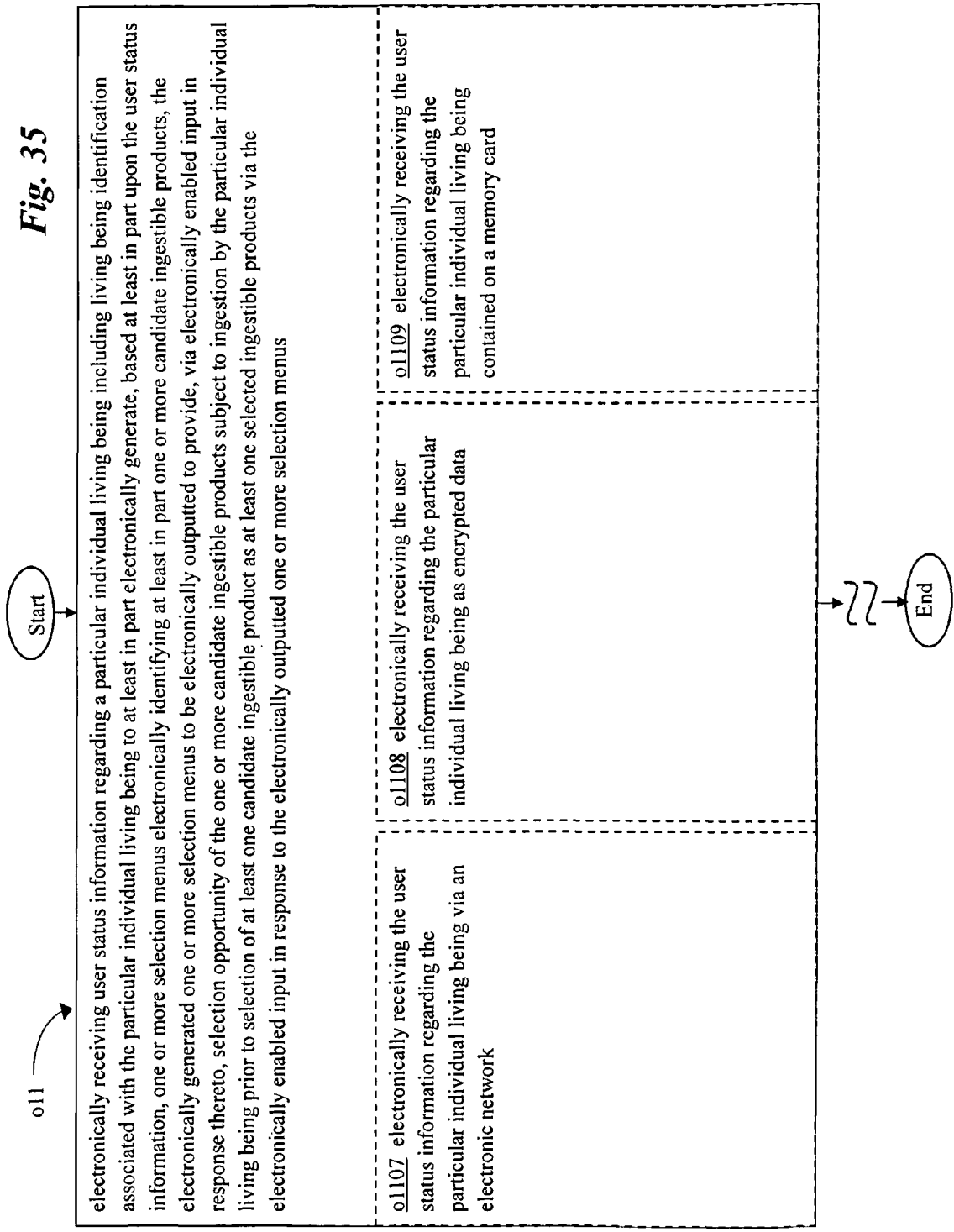
FIG. 35 is a high-level flowchart including exemplary implementations of operation O11 of FIG. 32.

In one or more implementations, as shown in FIG. 35, operation o11 includes an operation o1107 for electronically receiving the user status information regarding the particular individual living being via an electronic network. An exemplary version of a non-transitory signal bearing medium of information storage subsystem s200 is depicted as bearing one or more receiving information network instructions i1107 that when executed will direct performance of the operation o1107. In an implementation, the one or more receiving information network instructions i1107 when executed direct electronically receiving the user status information via an electronic network (e.g. an implementation of the receiver component s528 is configured to electronically engage with the network cable component s502 to receive the user status information, etc.). Furthermore, the receiving information network electrical circuitry arrangement e1107 when activated will perform the operation o1107. In an implementation, the receiving information network electrical circuitry arrangement e1107, when activated performs electronically receiving the user status information via an electronic network (e.g. an implementation of the receiver component s528 is configured to electronically engage with the network cable component s502 to receive the user status information, etc.). In an implementation, the electronically receiving the user status information regarding the particular individual living being via an electronic network is carried out by electronically receiving the user status information via an electronic network (e.g. an implementation of the receiver component s528 is configured to electronically engage with the network cable component s502 to receive the user status information, etc.).

In one or more implementations, operation o11 includes an operation o1108 for electronically receiving the user status information regarding the particular individual living being as encrypted data. An exemplary version of a non-transitory signal bearing medium of information storage subsystem s200 is depicted as bearing one or more receiving encrypted information instructions i1108 that when executed will direct performance of the operation o1108. In an implementation, the one or more receiving encrypted information instructions i1108 when executed direct electronically receiving the user status information as encrypted data (e.g. an implementation of the receiver component s528 is configured to electronically receive through the encrypted communication component s520 the user status information, etc.). Furthermore, the receiving encrypted information electrical circuitry arrangement e1108 when activated will perform the operation o1108. In an implementation, the receiving encrypted information electrical circuitry arrangement e1108, when activated performs electronically receiving the user status information as encrypted data (e.g. an implementation of the receiver component s528 is configured to electronically receive through the encrypted communication component s520 the user status information, etc.). In an implementation, the electronically receiving the user status information regarding the particular individual living being as encrypted data is carried out by electronically receiving the user status information as encrypted data (e.g. an implementation of the receiver component s528 is configured to electronically receive through the encrypted communication component s520 the user status information, etc.).

In one or more implementations, operation o11 includes an operation o1109 for electronically receiving the user status information regarding the particular individual living being contained on a memory card. An exemplary version of a non-transitory signal bearing medium of information storage subsystem s200 is depicted as bearing one or more receiving information memory card instructions i1109 that when executed will direct performance of the operation o1109. In an implementation, the one or more receiving information memory card instructions i1109 when executed direct electronically receiving the user status information contained on a memory card (e.g. an implementation of the receiver component s528 is configured to electronically engage with an electronic memory card to receive the user status information, etc.). Furthermore, the receiving information memory card electrical circuitry arrangement e1109 when activated will perform the operation o1109. In an implementation, the receiving information memory card electrical circuitry arrangement e1109, when activated performs electronically receiving the user status information contained on a memory card (e.g. an implementation of the receiver component s528 is configured to electronically engage with an electronic memory card to receive the user status information, etc.). In an implementation, the electronically receiving the user status information regarding the particular individual living being contained on a memory card is carried out by electronically receiving the user status information contained on a memory card (e.g. an implementation of the receiver component s528 is configured to electronically engage with an electronic memory card to receive the user status information, etc.).

Figure 36:
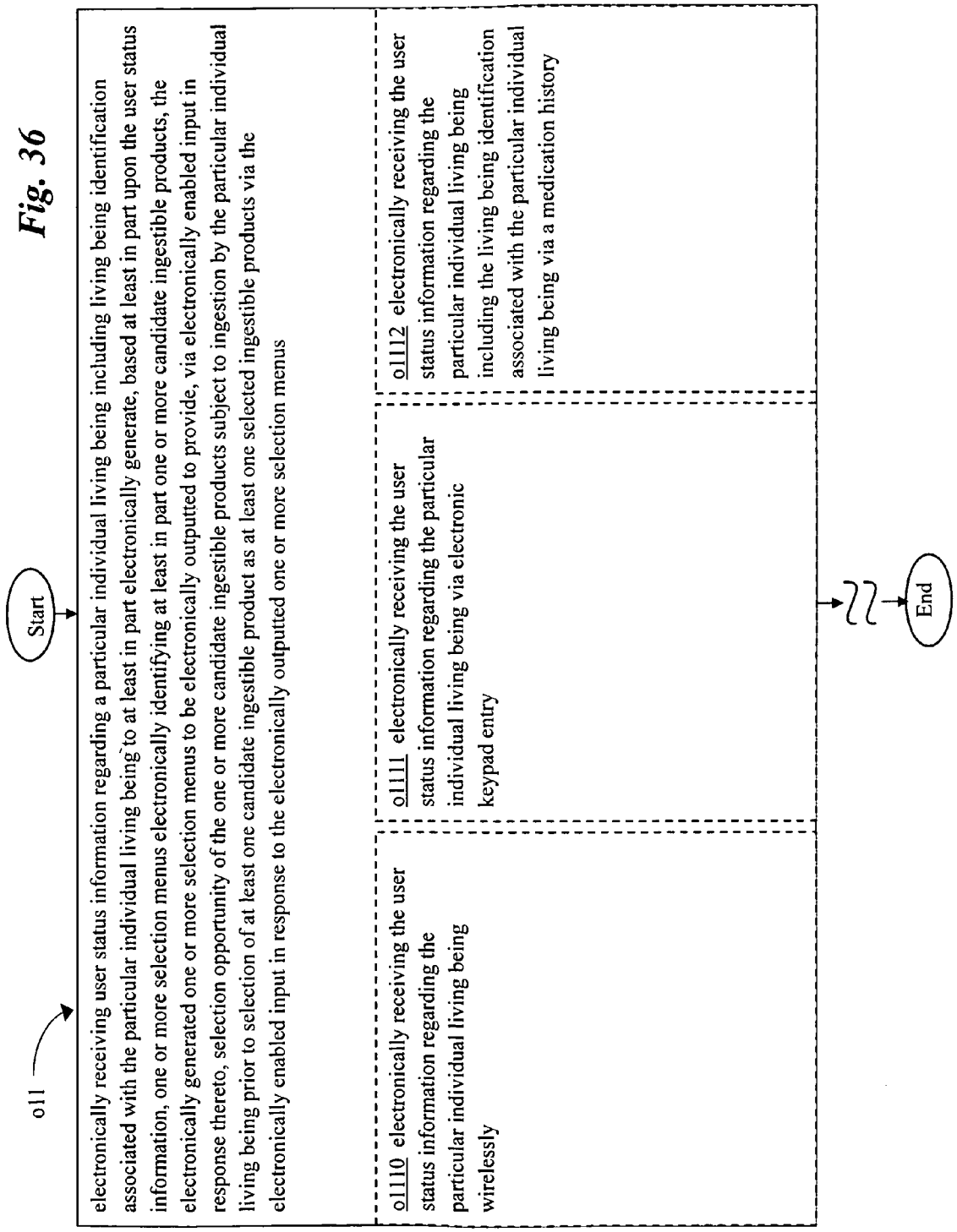
FIG. 36 is a high-level flowchart including exemplary implementations of operation O11 of FIG. 32.

In one or more implementations, as shown in FIG. 36, operation o11 includes an operation o1110 for electronically receiving the user status information regarding the particular individual living being wirelessly. An exemplary version of a non-transitory signal bearing medium of information storage subsystem s200 is depicted as bearing one or more receiving information wirelessly instructions i1110 that when executed will direct performance of the operation o1110. In an implementation, the one or more receiving information wirelessly instructions i1110 when executed direct electronically receiving the user status information wirelessly (e.g. an implementation of the receiver component s528 is configured to electronically receive through the wireless network component s512 the user status information, etc.). Furthermore, the receiving information wirelessly electrical circuitry arrangement e1110 when activated will perform the operation o1110. In an implementation, the receiving information wirelessly electrical circuitry arrangement e1110, when activated performs electronically receiving the user status information wirelessly (e.g. an implementation of the receiver component s528 is configured to electronically receive through the wireless network component s512 the user status information, etc.). In an implementation, the electronically receiving the user status information regarding the particular individual living being wirelessly is carried out by electronically receiving the user status information wirelessly (e.g. an implementation of the receiver component s528 is configured to electronically receive through the wireless network component s512 the user status information, etc.).

In one or more implementations, operation o11 includes an operation o1111 for electronically receiving the user status information regarding the particular individual living being via electronic keypad entry. An exemplary version of a non-transitory signal bearing medium of information storage subsystem s200 is depicted as bearing one or more receiving information keypad entry instructions i1111 that when executed will direct performance of the operation o1111. In an implementation, the one or more receiving information keypad entry instructions i1111 when executed direct electronically receiving the user status information via electronic keypad entry (e.g. an implementation of the receiver component s528 is configured to electronically engage with the keypad component s308 to receive the user status information as inputted by a user, etc.). Furthermore, the receiving information keypad entry electrical circuitry arrangement e1111 when activated will perform the operation o1111. In an implementation, the receiving information keypad entry electrical circuitry arrangement e1111, when activated performs electronically receiving the user status information via electronic keypad entry (e.g. an implementation of the receiver component s528 is configured to electronically engage with the keypad component s308 to receive the user status information as inputted by a user, etc.). In an implementation, the electronically receiving the user status information regarding the particular individual living being via electronic keypad entry is carried out by electronically receiving the user status information via electronic keypad entry (e.g. an implementation of the receiver component s528 is configured to electronically engage with the keypad component s308 to receive the user status information as inputted by a user, etc.).

In one or more implementations, operation o11 includes an operation o1112 for electronically receiving the user status information regarding the particular individual living being including the living being identification associated with the particular individual living being via a medication history. An exemplary version of a non-transitory signal bearing medium of information storage subsystem s200 is depicted as bearing one or more receiving information meds history instructions i1112 that when executed will direct performance of the operation o1112. In an implementation, the one or more receiving information meds history instructions i1112 when executed direct electronically receiving the user status information regarding the particular individual living being including the living being identification associated with the particular individual living being via a medication history (e.g. an implementation of the receiver component s528 is configured to electronically engage with the processor component s102 to receive the user status information including the living being identification associated with the particular individual living being as determined by the processor component to identify the name and control number of the medication history of the particular individual living being, etc.). Furthermore, the receiving information meds history electrical circuitry arrangement e1112 when activated will perform the operation o1112. In an implementation, the receiving information meds history electrical circuitry arrangement e1112, when activated performs electronically receiving the user status information regarding the particular individual living being including the living being identification associated with the particular individual living being via a medication history (e.g. an implementation of the receiver component s528 is configured to electronically engage with the processor component s102 to receive the user status information including the living being identification associated with the particular individual living being as determined by the processor component to identify the name and control number of the medication history of the particular individual living being, etc.). In an implementation, the electronically receiving the user status information regarding the particular individual living being including the living being identification associated with the particular individual living being via a medication history is carried out by electronically receiving the user status information regarding the particular individual living being including the living being identification associated with the particular individual living being via a medication history (e.g. an implementation of the receiver component s528 is configured to electronically engage with the processor component s102 to receive the user status information including the living being identification associated with the particular individual living being as determined by the processor component to identify the name and control number of the medication history of the particular individual living being, etc.).

Figure 37:
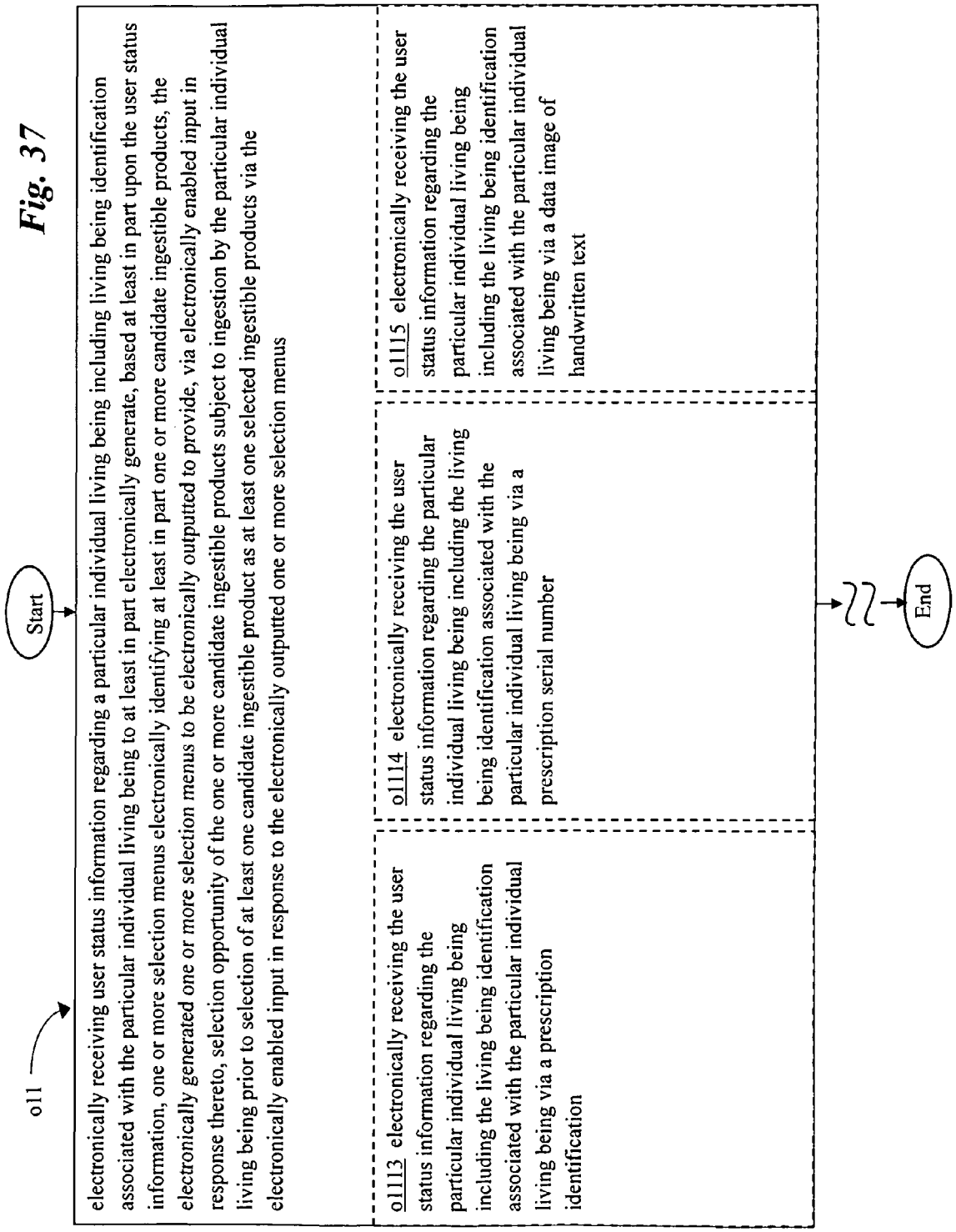
FIG. 37 is a high-level flowchart including exemplary implementations of operation O11 of FIG. 32.

In one or more implementations, as shown in FIG. 37, operation o11 includes an operation o1113 for electronically receiving the user status information regarding the particular individual living being including the living being identification associated with the particular individual living being via a prescription identification. An exemplary version of a non-transitory signal bearing medium of information storage subsystem s200 is depicted as bearing one or more receiving information prescription ID instructions i1113 that when executed will direct performance of the operation o1113. In an implementation, the one or more receiving information prescription ID instructions i1113 when executed direct electronically receiving the user status information regarding the particular individual living being including the living being identification associated with the particular individual living being via a prescription identification (e.g. an implementation of the receiver component s528 is configured to electronically engage with the processor component s102 to receive the user status information including the living being identification associated with the particular individual living being as determined by the processor component to include a prescription identification, etc.). Furthermore, the receiving information prescription ID electrical circuitry arrangement e1113 when activated will perform the operation o1113. In an implementation, the receiving information prescription ID electrical circuitry arrangement e1113, when activated performs electronically receiving the user status information regarding the particular individual living being including the living being identification associated with the particular individual living being via a prescription identification (e.g. an implementation of the receiver component s528 is configured to electronically engage with the processor component s102 to receive the user status information including the living being identification associated with the particular individual living being as determined by the processor component to include a prescription identification, etc.). In an implementation, the electronically receiving the user status information regarding the particular individual living being including the living being identification associated with the particular individual living being via a prescription identification is carried out by electronically receiving the user status information regarding the particular individual living being including the living being identification associated with the particular individual living being via a prescription identification (e.g. an implementation of the receiver component s528 is configured to electronically engage with the processor component s102 to receive the user status information including the living being identification associated with the particular individual living being as determined by the processor component to include a prescription identification, etc.).

In one or more implementations, operation o11 includes an operation o1114 for electronically receiving the user status information regarding the particular individual living being including the living being identification associated with the particular individual living being via a prescription serial number. An exemplary version of a non-transitory signal bearing medium of information storage subsystem s200 is depicted as bearing one or more receiving information prescription number instructions i1114 that when executed will direct performance of the operation o1114. In an implementation, the one or more receiving information prescription number instructions i1114 when executed direct electronically receiving the user status information regarding the particular individual living being including the living being identification associated with the particular individual living being via a prescription serial number (e.g. an implementation of the receiver component s528 is configured to electronically engage with the processor component s102 to receive the user status information including the living being identification associated with the particular individual living being as determined by the processor component to include a prescription serial number, etc.). Furthermore, the receiving information prescription number electrical circuitry arrangement e1114 when activated will perform the operation o1114. In an implementation, the receiving information prescription number electrical circuitry arrangement e1114, when activated performs electronically receiving the user status information regarding the particular individual living being including the living being identification associated with the particular individual living being via a prescription serial number (e.g. an implementation of the receiver component s528 is configured to electronically engage with the processor component s102 to receive the user status information including the living being identification associated with the particular individual living being as determined by the processor component to include a prescription serial number, etc.). In an implementation, the electronically receiving the user status information regarding the particular individual living being including the living being identification associated with the particular individual living being via a prescription serial number is carried out by electronically receiving the user status information regarding the particular individual living being including the living being identification associated with the particular individual living being via a prescription serial number (e.g. an implementation of the receiver component s528 is configured to electronically engage with the processor component s102 to receive the user status information including the living being identification associated with the particular individual living being as determined by the processor component to include a prescription serial number, etc.).

In one or more implementations, operation o11 includes an operation o1115 for electronically receiving the user status information regarding the particular individual living being including the living being identification associated with the particular individual living being via a data image of handwritten text. An exemplary version of a non-transitory signal bearing medium of information storage subsystem s200 is depicted as bearing one or more receiving information handwritten instructions i1115 that when executed will direct performance of the operation o1115. In an implementation, the one or more receiving information handwritten instructions i1115 when executed direct electronically receiving the user status information regarding the particular individual living being including the living being identification associated with the particular individual living being via a data image of handwritten text (e.g. an implementation of the receiver component s528 is configured to electronically engage with the processor component s102 to receive the user status information regarding the particular individual living being including the living being identification associated with the particular individual living being as determined by the processor component through electronic handwriting analysis of the data image of the handwritten text, etc.). Furthermore, the receiving information handwritten electrical circuitry arrangement e1115 when activated will perform the operation o1115. In an implementation, the receiving information handwritten electrical circuitry arrangement e1115, when activated performs electronically receiving the user status information regarding the particular individual living being including the living being identification associated with the particular individual living being via a data image of handwritten text (e.g. an implementation of the receiver component s528 is configured to electronically engage with the processor component s102 to receive the user status information regarding the particular individual living being including the living being identification associated with the particular individual living being as determined by the processor component through electronic handwriting analysis of the data image of the handwritten text, etc.). In an implementation, the electronically receiving the user status information regarding the particular individual living being including the living being identification associated with the particular individual living being via a data image of handwritten text is carried out by electronically receiving the user status information regarding the particular individual living being including the living being identification associated with the particular individual living being via a data image of handwritten text (e.g. an implementation of the receiver component s528 is configured to electronically engage with the processor component s102 to receive the user status information regarding the particular individual living being including the living being identification associated with the particular individual living being as determined by the processor component through electronic handwriting analysis of the data image of the handwritten text, etc.).

Figure 38:
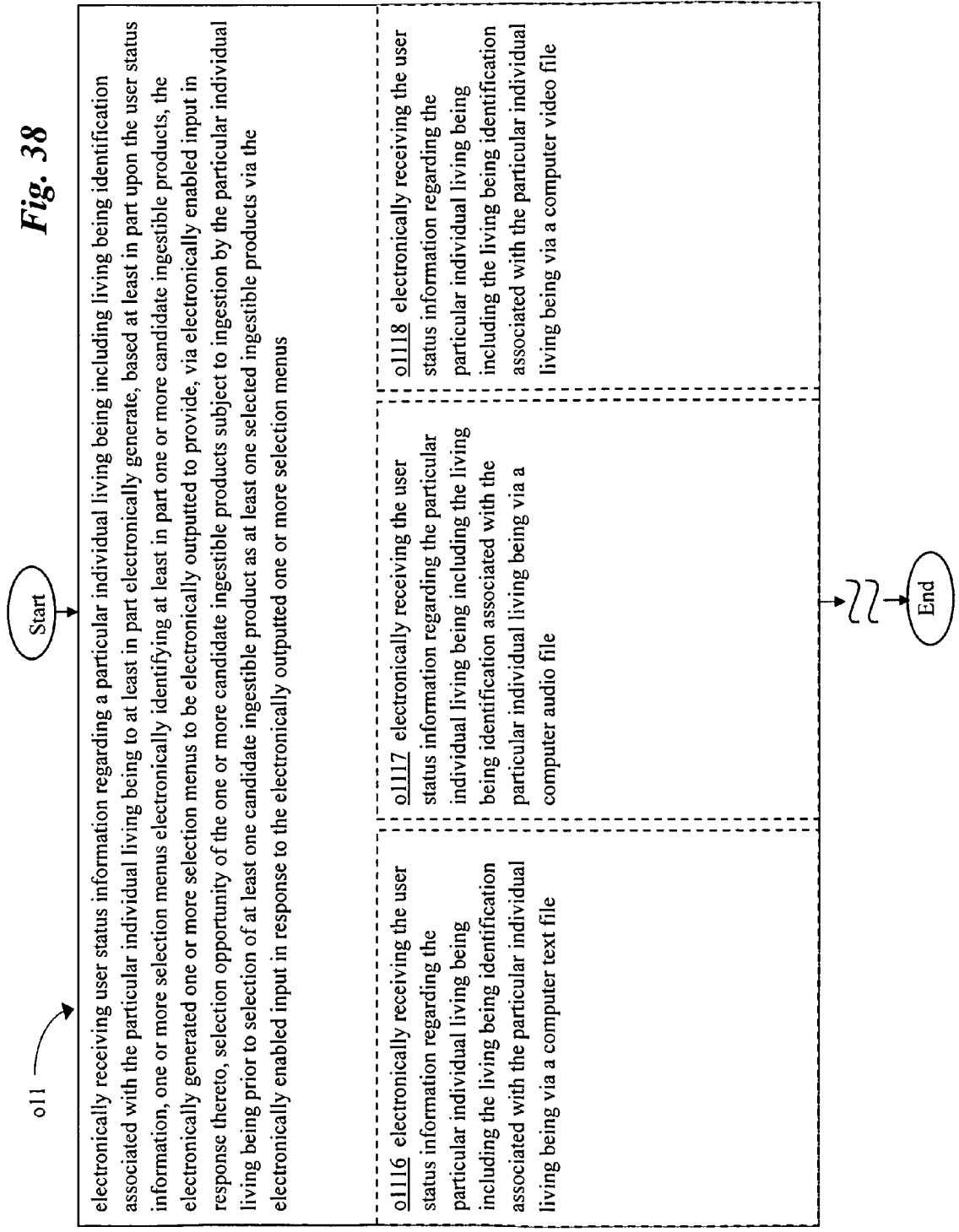
FIG. 38 is a high-level flowchart including exemplary implementations of operation O11 of FIG. 32.

In one or more implementations, as shown in FIG. 38, operation o11 includes an operation o1116 for electronically receiving the user status information regarding the particular individual living being including the living being identification associated with the particular individual living being via a computer text file. An exemplary version of a non-transitory signal bearing medium of information storage subsystem s200 is depicted as bearing one or more receiving information text file instructions i1116 that when executed will direct performance of the operation o1116. In an implementation, the one or more receiving information text file instructions i1116 when executed direct electronically receiving the user status information regarding the particular individual living being including the living being identification associated with the particular individual living being via a computer text file (e.g. an implementation of the receiver component s528 is configured to electronically engage with the processor component s102 to receive the user status information including the living being identification associated with the particular individual living being as determined by the processor component through electronic reading of the computer text file, etc.). Furthermore, the receiving information text file electrical circuitry arrangement e1116 when activated will perform the operation o1116. In an implementation, the receiving information text file electrical circuitry arrangement e1116, when activated performs electronically receiving the user status information regarding the particular individual living being including the living being identification associated with the particular individual living being via a computer text file (e.g. an implementation of the receiver component s528 is configured to electronically engage with the processor component s102 to receive the user status information including the living being identification associated with the particular individual living being as determined by the processor component through electronic reading of the computer text file, etc.). In an implementation, the electronically receiving the user status information regarding the particular individual living being including the living being identification associated with the particular individual living being via a computer text file is carried out by electronically receiving the user status information regarding the particular individual living being including the living being identification associated with the particular individual living being via a computer text file (e.g. an implementation of the receiver component s528 is configured to electronically engage with the processor component s102 to receive the user status information including the living being identification associated with the particular individual living being as determined by the processor component through electronic reading of the computer text file, etc.).

In one or more implementations, operation o11 includes an operation o1117 for electronically receiving the user status information regarding the particular individual living being including the living being identification associated with the particular individual living being via a computer audio file. An exemplary version of a non-transitory signal bearing medium of information storage subsystem s200 is depicted as bearing one or more receiving information audio file instructions i1117 that when executed will direct performance of the operation o1117. In an implementation, the one or more receiving information audio file instructions i1117 when executed direct electronically receiving the user status information regarding the particular individual living being including the living being identification associated with the particular individual living being via a computer audio file (e.g. an implementation of the receiver component s528 is configured to electronically engage with the processor component s102 to receive the user status information including the living being identification associated with the particular individual living being as determined by the processor component through electronic reading of the computer audio file, etc.). Furthermore, the receiving information audio file electrical circuitry arrangement e1117 when activated will perform the operation o1117. In an implementation, the receiving information audio file electrical circuitry arrangement e1117, when activated performs electronically receiving the user status information regarding the particular individual living being including the living being identification associated with the particular individual living being via a computer audio file (e.g. an implementation of the receiver component s528 is configured to electronically engage with the processor component s102 to receive the user status information including the living being identification associated with the particular individual living being as determined by the processor component through electronic reading of the computer audio file, etc.). In an implementation, the electronically receiving the user status information regarding the particular individual living being including the living being identification associated with the particular individual living being via a computer audio file is carried out by electronically receiving the user status information regarding the particular individual living being including the living being identification associated with the particular individual living being via a computer audio file (e.g. an implementation of the receiver component s528 is configured to electronically engage with the processor component s102 to receive the user status information including the living being identification associated with the particular individual living being as determined by the processor component through electronic reading of the computer audio file, etc.).

In one or more implementations, operation o11 includes an operation o1118 for electronically receiving the user status information regarding the particular individual living being including the living being identification associated with the particular individual living being via a computer video file. An exemplary version of a non-transitory signal bearing medium of information storage subsystem s200 is depicted as bearing one or more receiving information video file instructions i1118 that when executed will direct performance of the operation o1118. In an implementation, the one or more receiving information video file instructions i1118 when executed direct electronically receiving the user status information regarding the particular individual living being including the living being identification associated with the particular individual living being via a computer video file (e.g. an implementation of the receiver component s528 is configured to electronically engage with the processor component s102 to receive the user status information including the living being identification associated with the particular individual living being as determined by the processor component through electronic reading of the computer video file, etc.). Furthermore, the receiving information video file electrical circuitry arrangement e1118 when activated will perform the operation o1118. In an implementation, the receiving information video file electrical circuitry arrangement e1118, when activated performs electronically receiving the user status information regarding the particular individual living being including the living being identification associated with the particular individual living being via a computer video file (e.g. an implementation of the receiver component s528 is configured to electronically engage with the processor component s102 to receive the user status information including the living being identification associated with the particular individual living being as determined by the processor component through electronic reading of the computer video file, etc.). In an implementation, the electronically receiving the user status information regarding the particular individual living being including the living being identification associated with the particular individual living being via a computer video file is carried out by electronically receiving the user status information regarding the particular individual living being including the living being identification associated with the particular individual living being via a computer video file (e.g. an implementation of the receiver component s528 is configured to electronically engage with the processor component s102 to receive the user status information including the living being identification associated with the particular individual living being as determined by the processor component through electronic reading of the computer video file, etc.).

Figure 39:
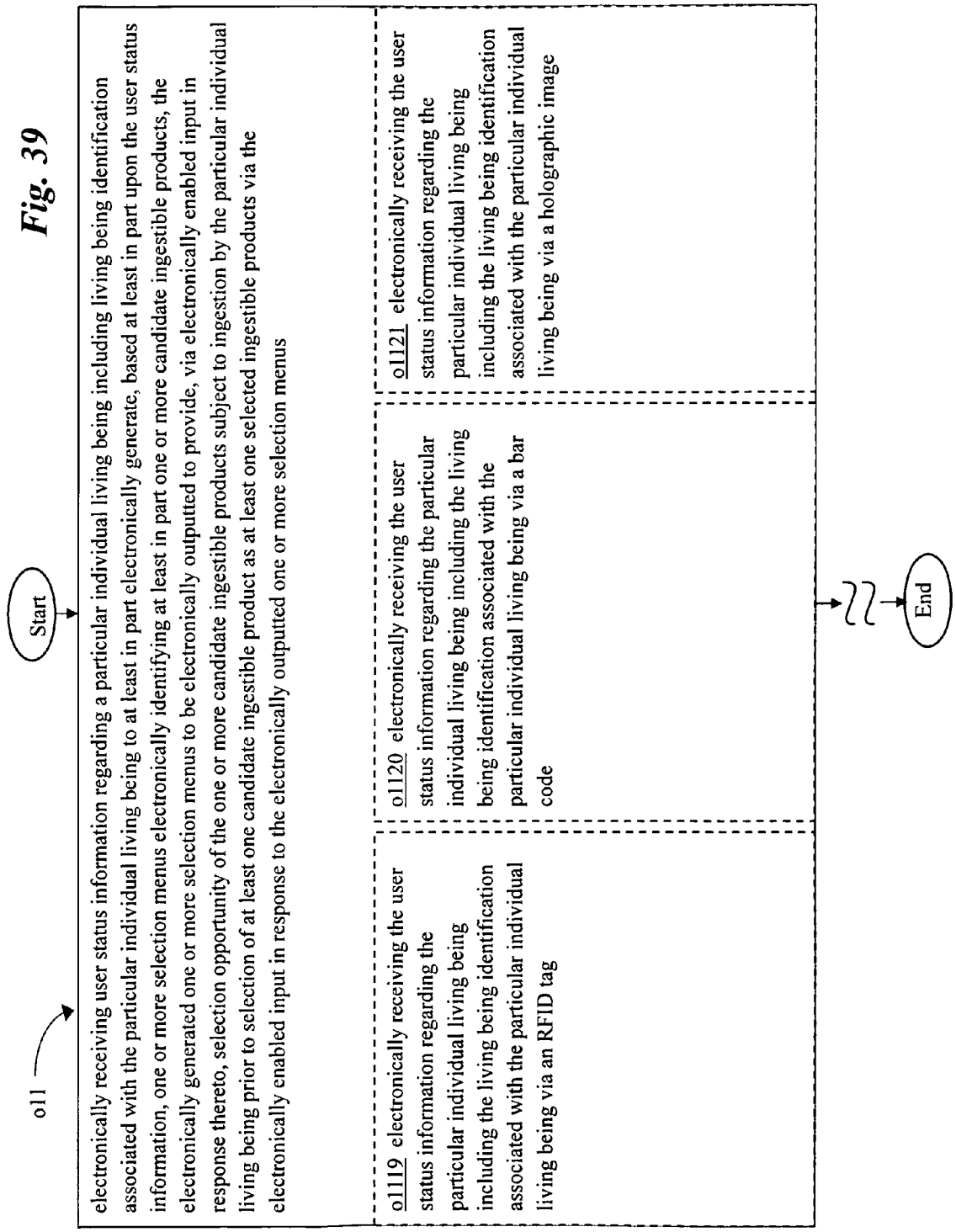
FIG. 39 is a high-level flowchart including exemplary implementations of operation O11 of FIG. 32.

In one or more implementations, as shown in FIG. 39, operation o11 includes an operation o1119 for electronically receiving the user status information regarding the particular individual living being including the living being identification associated with the particular individual living being via an RFID tag. An exemplary version of a non-transitory signal bearing medium of information storage subsystem s200 is depicted as bearing one or more receiving information RFID instructions i1119 that when executed will direct performance of the operation o1119. In an implementation, the one or more receiving information RFID instructions i1119 when executed direct electronically receiving the user status information regarding the particular individual living being including the living being identification associated with the particular individual living being via an RFID tag (e.g. an implementation of the receiver component s528 is configured to electronically engage with the processor component s102 to receive the user status information including the living being identification associated with the particular individual living being as determined by the processor component through electronic reading be the radio frequency identification (RFID) sensing component s414 of the RFID tag, etc.). Furthermore, the receiving information RFID electrical circuitry arrangement e1119 when activated will perform the operation o1119. In an implementation, the receiving information RFID electrical circuitry arrangement e1119, when activated performs electronically receiving the user status information regarding the particular individual living being including the living being identification associated with the particular individual living being via an RFID tag (e.g. an implementation of the receiver component s528 is configured to electronically engage with the processor component s102 to receive the user status information including the living being identification associated with the particular individual living being as determined by the processor component through electronic reading be the radio frequency identification (RFID) sensing component s414 of the RFID tag, etc.). In an implementation, the electronically receiving the user status information regarding the particular individual living being including the living being identification associated with the particular individual living being via an RFID tag is carried out by electronically receiving the user status information regarding the particular individual living being including the living being identification associated with the particular individual living being via an RFID tag (e.g. an implementation of the receiver component s528 is configured to electronically engage with the processor component s102 to receive the user status information including the living being identification associated with the particular individual living being as determined by the processor component through electronic reading be the radio frequency identification (RFID) sensing component s414 of the RFID tag, etc.).

In one or more implementations, operation o11 includes an operation o1120 for electronically receiving the user status information regarding the particular individual living being including the living being identification associated with the particular individual living being via a bar code. An exemplary version of a non-transitory signal bearing medium of information storage subsystem s200 is depicted as bearing one or more receiving information bar code instructions i1120 that when executed will direct performance of the operation o1120. In an implementation, the one or more receiving information bar code instructions i1120 when executed direct electronically receiving the user status information regarding the particular individual living being including the living being identification associated with the particular individual living being via a bar code (e.g. an implementation of the receiver component s528 is configured to electronically engage with the processor component s102 to receive the user status information including the living being identification associated with the particular individual living being as determined by the processor component through electronic reading of the bar code, etc.). Furthermore, the receiving information bar code electrical circuitry arrangement e1120 when activated will perform the operation electronically receiving the user status information regarding the particular individual living being including the living being identification associated with the particular individual living being via a bar code. In an implementation, the receiving information bar code electrical circuitry arrangement e1120, when activated performs electronically receiving the user status information regarding the particular individual living being including the living being identification associated with the particular individual living being via a bar code (e.g. an implementation of the receiver component s528 is configured to electronically engage with the processor component s102 to receive the user status information including the living being identification associated with the particular individual living being as determined by the processor component through electronic reading of the bar code, etc.). In an implementation, the electronically receiving the user status information regarding the particular individual living being including the living being identification associated with the particular individual living being via a bar code is carried out by electronically receiving the user status information regarding the particular individual living being including the living being identification associated with the particular individual living being via a bar code (e.g. an implementation of the receiver component s528 is configured to electronically engage with the processor component s102 to receive the user status information including the living being identification associated with the particular individual living being as determined by the processor component through electronic reading of the bar code, etc.).

In one or more implementations, operation o11 includes an operation o1121 for electronically receiving the user status information regarding the particular individual living being including the living being identification associated with the particular individual living being via a holographic image. An exemplary version of a non-transitory signal bearing medium of information storage subsystem s200 is depicted as bearing one or more receiving information holographic instructions i1121 that when executed will direct performance of the operation o1121. In an implementation, the one or more receiving information holographic instructions i1121 when executed direct electronically receiving the user status information regarding the particular individual living being including the living being identification associated with the particular individual living being via a holographic image (e.g. an implementation of the receiver component s528 is configured to electronically engage with the processor component s102 to receive the user status information including the living being identification associated with the particular individual living being as determined by the processor component through electronic reading of the holographic image, etc.). Furthermore, the receiving information holographic electrical circuitry arrangement e1121 when activated will perform the operation o1121. In an implementation, the receiving information holographic electrical circuitry arrangement e1121, when activated performs electronically receiving the user status information regarding the particular individual living being including the living being identification associated with the particular individual living being via a holographic image (e.g. an implementation of the receiver component s528 is configured to electronically engage with the processor component s102 to receive the user status information including the living being identification associated with the particular individual living being as determined by the processor component through electronic reading of the holographic image, etc.). In an implementation, the electronically receiving the user status information regarding the particular individual living being including the living being identification associated with the particular individual living being via a holographic image is carried out by electronically receiving the user status information regarding the particular individual living being including the living being identification associated with the particular individual living being via a holographic image (e.g. an implementation of the receiver component s528 is configured to electronically engage with the processor component s102 to receive the user status information including the living being identification associated with the particular individual living being as determined by the processor component through electronic reading of the holographic image, etc.).

Figure 40:
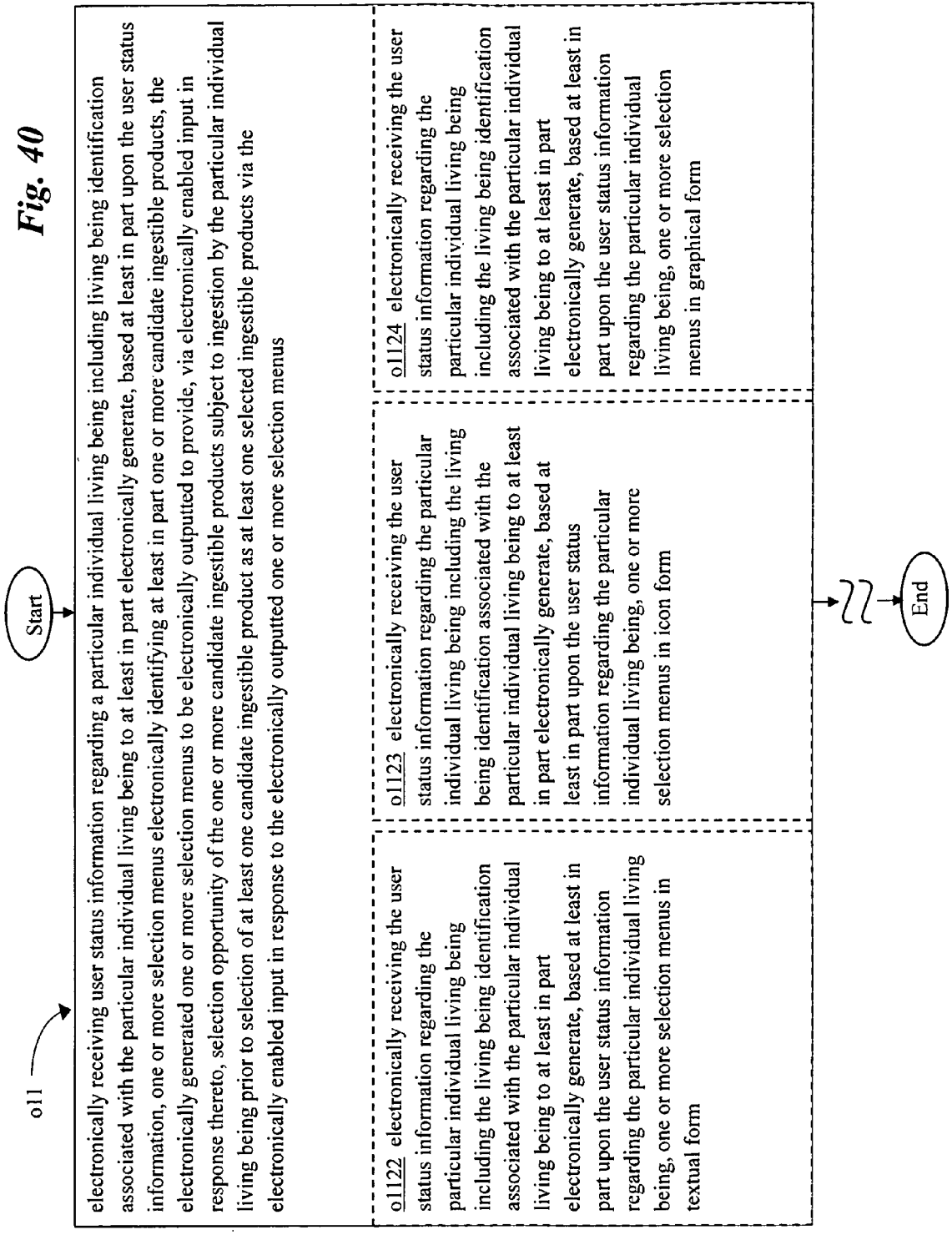
FIG. 40 is a high-level flowchart including exemplary implementations of operation O11 of FIG. 32.

In one or more implementations, as shown in FIG. 40, operation o11 includes an operation o1122 for electronically receiving the user status information regarding the particular individual living being including the living being identification associated with the particular individual living being to at least in part electronically generate, based at least in part upon the user status information regarding the particular individual living being, one or more selection menus in textual form. An exemplary version of a non-transitory signal bearing medium of information storage subsystem s200 is depicted as bearing one or more receiving information textual instructions i1122 that when executed will direct performance of the operation o1122. In an implementation, the one or more receiving information textual instructions i1122 when executed direct electronically receiving the user status information regarding the particular individual living being including the living being identification associated with the particular individual living being to at least in part electronically generate, based at least in part upon the user status information regarding the particular individual living being, one or more selection menus in textual form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated allergies, one or more selection menus in textual form, such as a menu containing textual one or more descriptions of possible ingestible product to select from, etc.). Furthermore, the receiving information textual electrical circuitry arrangement e1122 when activated will perform the operation o1122. In an implementation, the receiving information textual electrical circuitry arrangement e1122, when activated performs electronically receiving the user status information regarding the particular individual living being including the living being identification associated with the particular individual living being to at least in part electronically generate, based at least in part upon the user status information regarding the particular individual living being, one or more selection menus in textual form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated allergies, one or more selection menus in textual form, such as a menu containing textual one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in textual form is carried out by electronically receiving the user status information regarding the particular individual living being including the living being identification associated with the particular individual living being to at least in part electronically generate, based at least in part upon the user status information regarding the particular individual living being, one or more selection menus in textual form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated allergies, one or more selection menus in textual form, such as a menu containing textual one or more descriptions of possible ingestible product to select from, etc.).

In one or more implementations, operation o11 includes an operation o1123 for electronically receiving the user status information regarding the particular individual living being including the living being identification associated with the particular individual living being to at least in part electronically generate, based at least in part upon the user status information regarding the particular individual living being, one or more selection menus in icon form. An exemplary version of a non-transitory signal bearing medium of information storage subsystem s200 is depicted as bearing one or more receiving information icon instructions i1123 that when executed will direct performance of the operation o1123. In an implementation, the one or more receiving information icon instructions i1123 when executed direct electronically receiving the user status information regarding the particular individual living being including the living being identification associated with the particular individual living being to at least in part electronically generate, based at least in part upon the user status information regarding the particular individual living being, one or more selection menus in icon form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated previous meals, one or more selection menus in icon form, such as a menu containing iconic one or more descriptions of possible ingestible product to select from, etc.). Furthermore, the receiving information icon electrical circuitry arrangement e1123 when activated will perform the operation o1123. In an implementation, the receiving information icon electrical circuitry arrangement e1123, when activated performs electronically receiving the user status information regarding the particular individual living being including the living being identification associated with the particular individual living being to at least in part electronically generate, based at least in part upon the user status information regarding the particular individual living being, one or more selection menus in icon form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated previous meals, one or more selection menus in icon form, such as a menu containing iconic one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in icon form is carried out by electronically receiving the user status information regarding the particular individual living being including the living being identification associated with the particular individual living being to at least in part electronically generate, based at least in part upon the user status information regarding the particular individual living being, one or more selection menus in icon form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated previous meals, one or more selection menus in icon form, such as a menu containing iconic one or more descriptions of possible ingestible product to select from, etc.).

In one or more implementations, operation o11 includes an operation o1124 for electronically receiving the user status information regarding the particular individual living being including the living being identification associated with the particular individual living being to at least in part electronically generate, based at least in part upon the user status information regarding the particular individual living being, one or more selection menus in graphical form. An exemplary version of a non-transitory signal bearing medium of information storage subsystem s200 is depicted as bearing one or more receiving information graphical instructions i1124 that when executed will direct performance of the operation o1124. In an implementation, the one or more receiving information graphical instructions i1124 when executed direct electronically receiving the user status information regarding the particular individual living being including the living being identification associated with the particular individual living being to at least in part electronically generate, based at least in part upon the user status information regarding the particular individual living being, one or more selection menus in graphical form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated favorite foods as observed and recorded in a database, one or more selection menus in graphical form, such as a menu containing graphical one or more descriptions of possible ingestible product to select from, etc.). Furthermore, the receiving information graphical electrical circuitry arrangement e1124 when activated will perform the operation o1124. In an implementation, the receiving information graphical electrical circuitry arrangement e1124, when activated performs electronically receiving the user status information regarding the particular individual living being including the living being identification associated with the particular individual living being to at least in part electronically generate, based at least in part upon the user status information regarding the particular individual living being, one or more selection menus in graphical form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated favorite foods as observed and recorded in a database, one or more selection menus in graphical form, such as a menu containing graphical one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in graphical form is carried out by electronically receiving the user status information regarding the particular individual living being including the living being identification associated with the particular individual living being to at least in part electronically generate, based at least in part upon the user status information regarding the particular individual living being, one or more selection menus in graphical form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated favorite foods as observed and recorded in a database, one or more selection menus in graphical form, such as a menu containing graphical one or more descriptions of possible ingestible product to select from, etc.).

Figure 41:
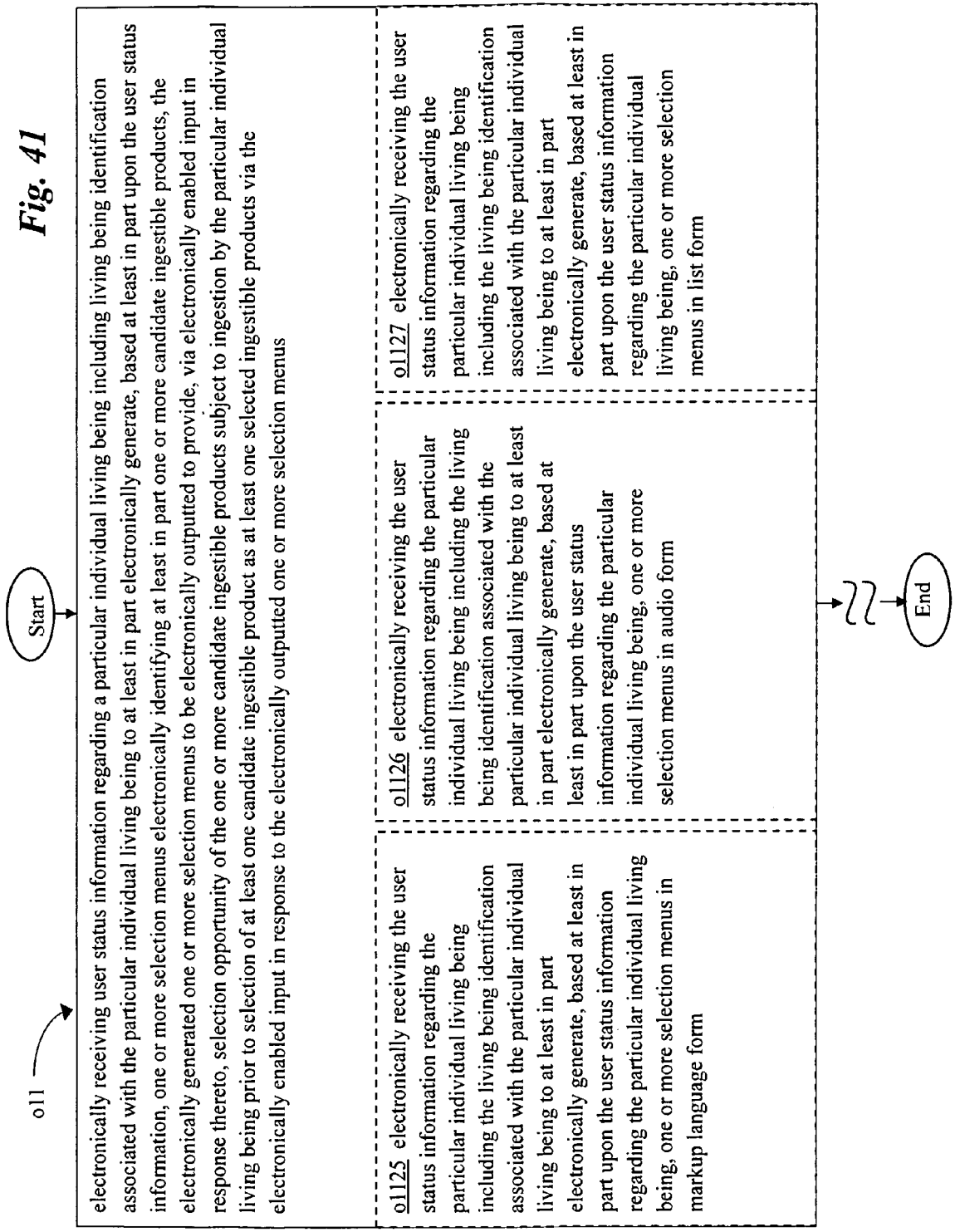
FIG. 41 is a high-level flowchart including exemplary implementations of operation O11 of FIG. 32.

In one or more implementations, as shown in FIG. 41, operation o11 includes an operation o1125 for electronically receiving the user status information regarding the particular individual living being including the living being identification associated with the particular individual living being to at least in part electronically generate, based at least in part upon the user status information regarding the particular individual living being, one or more selection menus in markup language form. An exemplary version of a non-transitory signal bearing medium of information storage subsystem s200 is depicted as bearing one or more receiving information markup instructions i1125 that when executed will direct performance of the operation o1125. In an implementation, the one or more receiving information markup instructions i1125 when executed direct electronically receiving the user status information regarding the particular individual living being including the living being identification associated with the particular individual living being to at least in part electronically generate, based at least in part upon the user status information regarding the particular individual living being, one or more selection menus in markup language form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated health building goals, one or more selection menus in markup language form, such as a menu containing markup language one or more descriptions of possible ingestible product to select from, etc.). Furthermore, the receiving information markup electrical circuitry arrangement e1125 when activated will perform the operation o1125. In an implementation, the receiving information markup electrical circuitry arrangement e1125, when activated performs electronically receiving the user status information regarding the particular individual living being including the living being identification associated with the particular individual living being to at least in part electronically generate, based at least in part upon the user status information regarding the particular individual living being, one or more selection menus in markup language form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated health building goals, one or more selection menus in markup language form, such as a menu containing markup language one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in markup language form is carried out by electronically receiving the user status information regarding the particular individual living being including the living being identification associated with the particular individual living being to at least in part electronically generate, based at least in part upon the user status information regarding the particular individual living being, one or more selection menus in markup language form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated health building goals, one or more selection menus in markup language form, such as a menu containing markup language one or more descriptions of possible ingestible product to select from, etc.).

In one or more implementations, operation o11 includes an operation o1126 for electronically receiving the user status information regarding the particular individual living being including the living being identification associated with the particular individual living being to at least in part electronically generate, based at least in part upon the user status information regarding the particular individual living being, one or more selection menus in audio form. An exemplary version of a non-transitory signal bearing medium of information storage subsystem s200 is depicted as bearing one or more receiving information audio instructions i1126 that when executed will direct performance of the operation o1126. In an implementation, the one or more receiving information audio instructions i1126 when executed direct electronically receiving the user status information regarding the particular individual living being including the living being identification associated with the particular individual living being to at least in part electronically generate, based at least in part upon the user status information regarding the particular individual living being, one or more selection menus in audio form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated disease mitigating measures, one or more selection menus in audio form, such as a menu containing audio one or more descriptions of possible ingestible product to select from, etc.). Furthermore, the receiving information audio electrical circuitry arrangement e1126 when activated will perform the operation o1126. In an implementation, the receiving information audio electrical circuitry arrangement e1126, when activated performs electronically receiving the user status information regarding the particular individual living being including the living being identification associated with the particular individual living being to at least in part electronically generate, based at least in part upon the user status information regarding the particular individual living being, one or more selection menus in audio form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated disease mitigating measures, one or more selection menus in audio form, such as a menu containing audio one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in audio form is carried out by electronically receiving the user status information regarding the particular individual living being including the living being identification associated with the particular individual living being to at least in part electronically generate, based at least in part upon the user status information regarding the particular individual living being, one or more selection menus in audio form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated disease mitigating measures, one or more selection menus in audio form, such as a menu containing audio one or more descriptions of possible ingestible product to select from, etc.).

In one or more implementations, operation o11 includes an operation o1127 for electronically receiving the user status information regarding the particular individual living being including the living being identification associated with the particular individual living being to at least in part electronically generate, based at least in part upon the user status information regarding the particular individual living being, one or more selection menus in list form. An exemplary version of a non-transitory signal bearing medium of information storage subsystem s200 is depicted as bearing one or more receiving information list instructions i1127 that when executed will direct performance of the operation o1127. In an implementation, the one or more receiving information list instructions i1127 when executed direct electronically receiving the user status information regarding the particular individual living being including the living being identification associated with the particular individual living being to at least in part electronically generate, based at least in part upon the user status information regarding the particular individual living being, one or more selection menus in list form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated dislikes, one or more selection menus in list form, such as a menu containing listed one or more descriptions of possible ingestible product to select from, etc.)l. Furthermore, the receiving information list electrical circuitry arrangement e1127 when activated will perform the operation o1127. In an implementation, the receiving information list electrical circuitry arrangement e1127, when activated performs electronically receiving the user status information regarding the particular individual living being including the living being identification associated with the particular individual living being to at least in part electronically generate, based at least in part upon the user status information regarding the particular individual living being, one or more selection menus in list form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated dislikes, one or more selection menus in list form, such as a menu containing listed one or more descriptions of possible ingestible product to select from, etc.)l. In an implementation, the electronically receiving the user status information regarding the particular individual living being including the living being identification associated with the particular individual living being to at least in part electronically generate, based at least in part upon the user status information regarding the particular individual living being, one or more selection menus in list form is carried out by electronically receiving the user status information regarding the particular individual living being including the living being identification associated with the particular individual living being to at least in part electronically generate, based at least in part upon the user status information regarding the particular individual living being, one or more selection menus in list form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated dislikes, one or more selection menus in list form, such as a menu containing listed one or more descriptions of possible ingestible product to select from, etc.).

Figure 42:
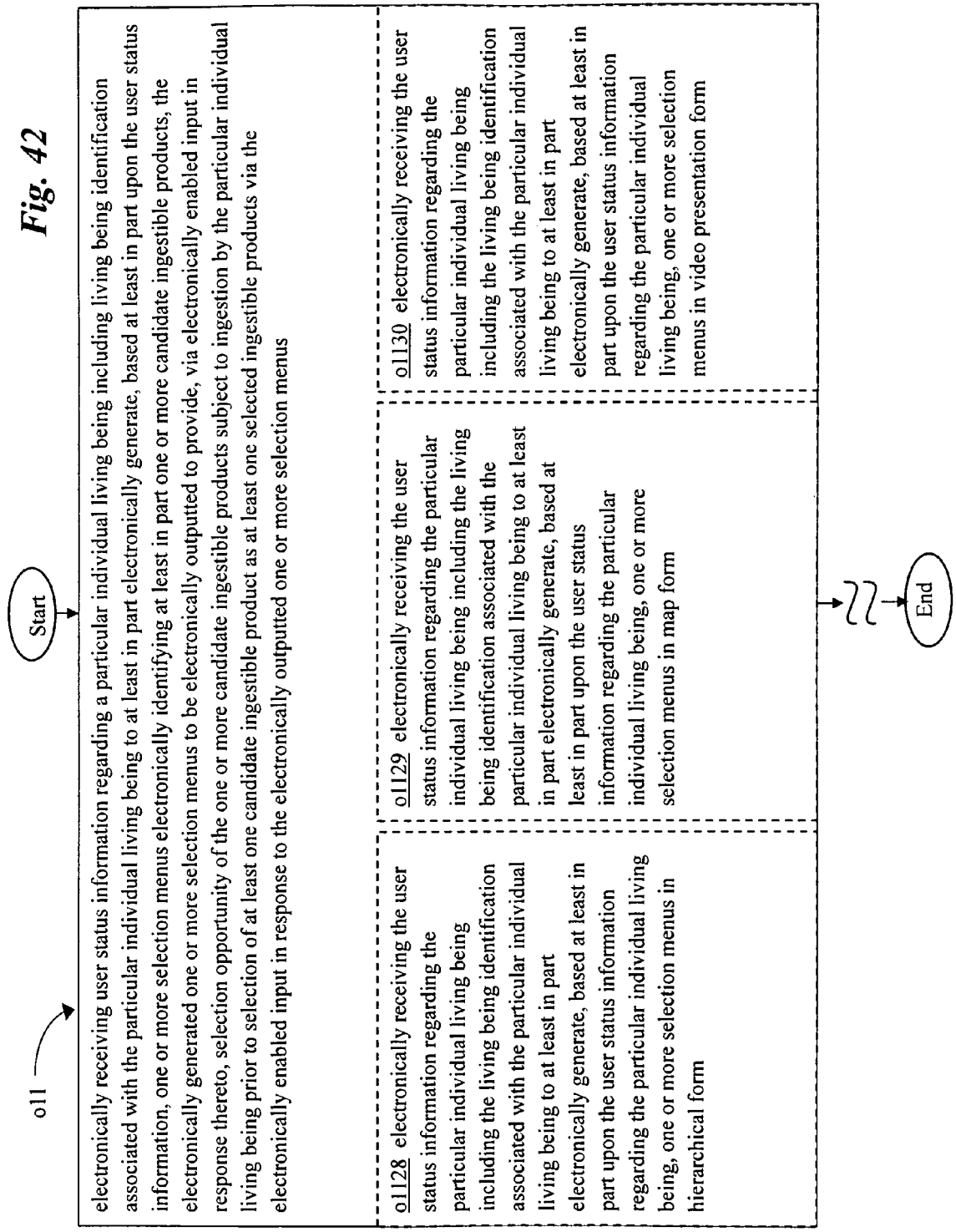
FIG. 42 is a high-level flowchart including exemplary implementations of operation O11 of FIG. 32.

In one or more implementations, as shown in FIG. 42, operation o11 includes an operation o1128 for electronically receiving the user status information regarding the particular individual living being including the living being identification associated with the particular individual living being to at least in part electronically generate, based at least in part upon the user status information regarding the particular individual living being, one or more selection menus in hierarchical form. An exemplary version of a non-transitory signal bearing medium of information storage subsystem s200 is depicted as bearing one or more receiving information hierarchical instructions i1128 that when executed will direct performance of the operation o1128. In an implementation, the one or more receiving information hierarchical instructions i1128 when executed direct electronically receiving the user status information regarding the particular individual living being including the living being identification associated with the particular individual living being to at least in part electronically generate, based at least in part upon the user status information regarding the particular individual living being, one or more selection menus in hierarchical form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated past purchases, one or more selection menus in hierarchical form; such as a menu containing hierarchical one or more descriptions of possible ingestible product to select from, etc.). Furthermore, the receiving information hierarchical electrical circuitry arrangement e1128 when activated will perform the operation o1128. In an implementation, the receiving information hierarchical electrical circuitry arrangement e1128, when activated performs electronically receiving the user status information regarding the particular individual living being including the living being identification associated with the particular individual living being to at least in part electronically generate, based at least in part upon the user status information regarding the particular individual living being, one or more selection menus in hierarchical form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated past purchases, one or more selection menus in hierarchical form, such as a menu containing hierarchical one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in hierarchical form is carried out by electronically receiving the user status information regarding the particular individual living being including the living being identification associated with the particular individual living being to at least in part electronically generate, based at least in part upon the user status information regarding the particular individual living being, one or more selection menus in hierarchical form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated past purchases, one or more selection menus in hierarchical form, such as a menu containing hierarchical one or more descriptions of possible ingestible product to select from, etc.).

In one or more implementations, operation o11 includes an operation o1129 for electronically receiving the user status information regarding the particular individual living being including the living being identification associated with the particular individual living being to at least in part electronically generate, based at least in part upon the user status information regarding the particular individual living being, one or more selection menus in map form. An exemplary version of a non-transitory signal bearing medium of information storage subsystem s200 is depicted as bearing one or more receiving information map instructions i1129 that when executed will direct performance of the operation o1129. In an implementation, the one or more receiving information map instructions i1129 when executed direct electronically receiving the user status information regarding the particular individual living being including the living being identification associated with the particular individual living being to at least in part electronically generate, based at least in part upon the user status information regarding the particular individual living being, one or more selection menus in map form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated food preferences determined from use history stored in one or more distributed databases, one or more selection menus in map form, such as a menu having arrangements resembling one or more maps containing one or more selections and one or more descriptions of possible ingestible product to select from, etc.). Furthermore, the receiving information map electrical circuitry arrangement e1129 when activated will perform the operation o1129. In an implementation, the receiving information map electrical circuitry arrangement e1129, when activated performs electronically receiving the user status information regarding the particular individual living being including the living being identification associated with the particular individual living being to at least in part electronically generate, based at least in part upon the user status information regarding the particular individual living being, one or more selection menus in map form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated food preferences determined from use history stored in one or more distributed databases, one or more selection menus in map form, such as a menu having arrangements resembling one or more maps containing one or more selections and one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in map form is carried out by electronically receiving the user status information regarding the particular individual living being including the living being identification associated with the particular individual living being to at least in part electronically generate, based at least in part upon the user status information regarding the particular individual living being, one or more selection menus in map form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated food preferences determined from use history stored in one or more distributed databases, one or more selection menus in map form, such as a menu having arrangements resembling one or more maps containing one or more selections and one or more descriptions of possible ingestible product to select from, etc.).

In one or more implementations, operation o11 includes an operation o1130 for electronically receiving the user status information regarding the particular individual living being including the living being identification associated with the particular individual living being to at least in part electronically generate, based at least in part upon the user status information regarding the particular individual living being, one or more selection menus in video presentation form. An exemplary version of a non-transitory signal bearing medium of information storage subsystem s200 is depicted as bearing one or more receiving information video instructions i1130 that when executed will direct performance of the operation o1130. In an implementation, the one or more receiving information video instructions i1130 when executed direct electronically receiving the user status information regarding the particular individual living being including the living being identification associated with the particular individual living being to at least in part electronically generate, based at least in part upon the user status information regarding the particular individual living being, one or more selection menus in video presentation form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more prescriptions, one or more selection menus in video presentation form, such as a menu containing one or more video presentations having one or more descriptions of possible ingestible product to select from, etc.). Furthermore, the receiving information video electrical circuitry arrangement e1130 when activated will perform the operation o1130. In an implementation, the receiving information video electrical circuitry arrangement e1130, when activated performs electronically receiving the user status information regarding the particular individual living being including the living being identification associated with the particular individual living being to at least in part electronically generate, based at least in part upon the user status information regarding the particular individual living being, one or more selection menus in video presentation form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more prescriptions, one or more selection menus in video presentation form, such as a menu containing one or more video presentations having one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in video presentation form is carried out by electronically receiving the user status information regarding the particular individual living being including the living being identification associated with the particular individual living being to at least in part electronically generate, based at least in part upon the user status information regarding the particular individual living being, one or more selection menus in video presentation form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more prescriptions, one or more selection menus in video presentation form, such as a menu containing one or more video presentations having one or more descriptions of possible ingestible product to select from, etc.).

Figure 43:
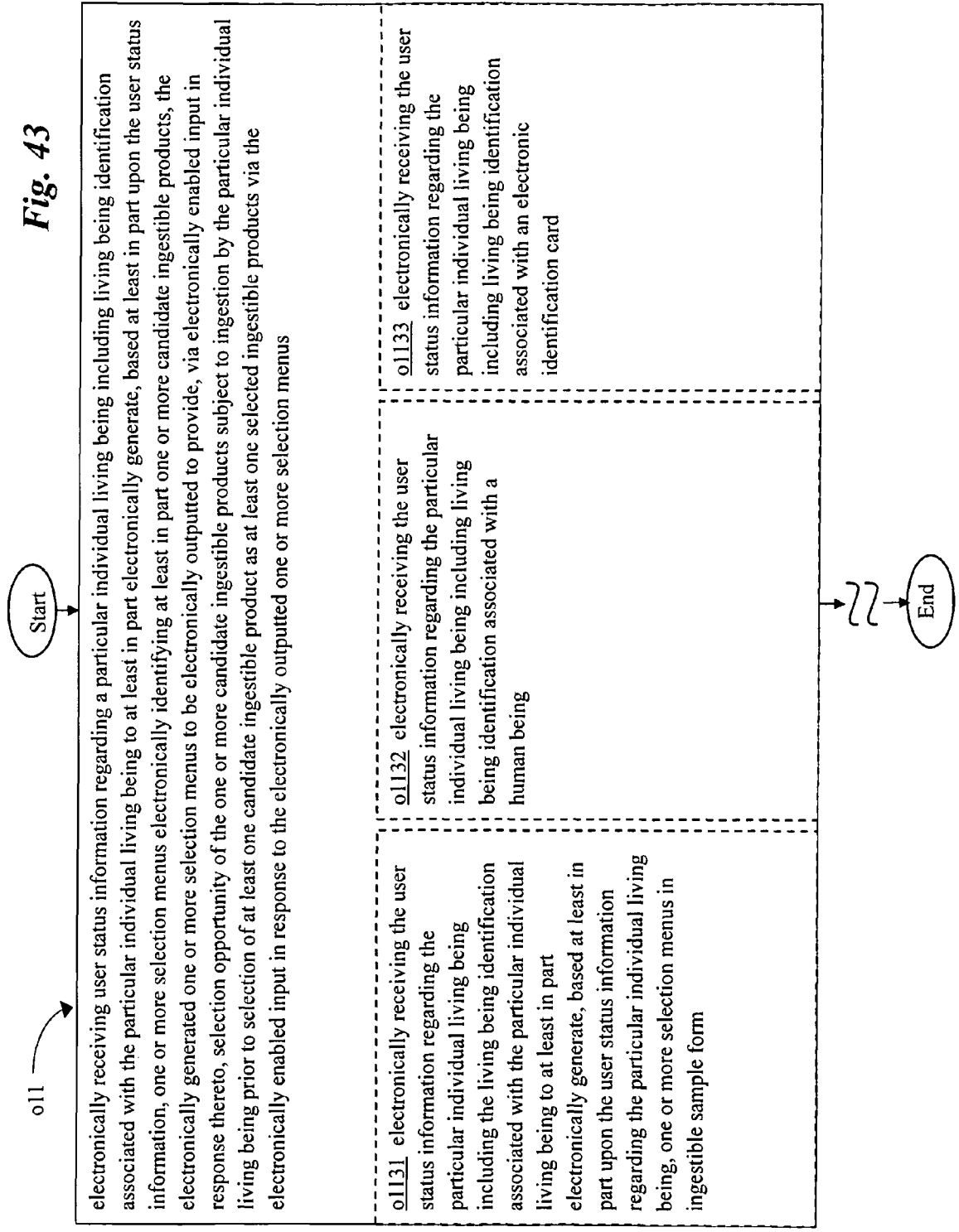
FIG. 43 is a high-level flowchart including exemplary implementations of operation O11 of FIG. 32.

In one or more implementations, as shown in FIG. 43, operation o11 includes an operation o1131 for electronically receiving the user status information regarding the particular individual living being including the living being identification associated with the particular individual living being to at least in part electronically generate, based at least in part upon the user status information regarding the particular individual living being, one or more selection menus in ingestible sample form. An exemplary version of a non-transitory signal bearing medium of information storage subsystem s200 is depicted as bearing one or more receiving information sample instructions i1131 that when executed will direct performance of the operation o1131. In an implementation, the one or more receiving information sample instructions i1131 when executed direct electronically receiving the user status information regarding the particular individual living being including the living being identification associated with the particular individual living being to at least in part electronically generate, based at least in part upon the user status information regarding the particular individual living being, one or more selection menus in ingestible sample form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more holidays stored in one or more databases, one or more selection menus in ingestible sample form, such as a menu containing ingestible samples that are either stored or produced in real time to serve as or otherwise complement one or more descriptions of possible ingestible product to select from, etc.). Furthermore, the receiving information sample electrical circuitry arrangement e1131 when activated will perform the operation o1131. In an implementation, the receiving information sample electrical circuitry arrangement e1131, when activated performs electronically receiving the user status information regarding the particular individual living being including the living being identification associated with the particular individual living being to at least in part electronically generate, based at least in part upon the user status information regarding the particular individual living being, one or more selection menus in ingestible sample form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more holidays stored in one or more databases, one or more selection menus in ingestible sample form, such as a menu containing ingestible samples that are either stored or produced in real time to serve as or otherwise complement one or more descriptions of possible ingestible product to select from, etc.). In an implementation, the electronically receiving the user status information regarding the particular individual living being including the living being identification associated with the particular individual living being to at least in part electronically generate, based at least in part upon the user status information regarding the particular individual living being, one or more selection menus in ingestible sample form is carried out by electronically receiving the user status information regarding the particular individual living being including the living being identification associated with the particular individual living being to at least in part electronically generate, based at least in part upon the user status information regarding the particular individual living being, one or more selection menus in ingestible sample form (e.g. an implementation of the receiver component s528 is configured to electronically engage with the processor component s102 to receive the user status information including the living being identification associated with the particular individual living being for the processor component to at least in part electronically generate, based at least in part upon the user status information regarding the particular individual living being, such as based on associated one or more holidays stored in one or more databases, one or more selection menus in ingestible sample form, such as a menu containing ingestible samples that are either stored or produced in real time to serve as or otherwise complement one or more descriptions of possible ingestible product to select from, etc.).

In one or more implementations, operation o11 includes an operation o1132 for electronically receiving the user status information regarding the particular individual living being including living being identification associated with a human being. An exemplary version of a non-transitory signal bearing medium of information storage subsystem s200 is depicted as bearing one or more receiving information human instructions i1132 that when executed will direct performance of the operation o1132. In an implementation, the one or more receiving information human instructions i1132 when executed direct electronically receiving the user status information regarding the particular individual living being including living being identification associated with a human being (e.g. an implementation of the receiver component s528 is configured to electronically engage with the processor component s102 to receive the user status information regarding the particular individual living being including living being identification as determined by the processor component to be identifying a human being, etc.). Furthermore, the receiving information human electrical circuitry arrangement e1132 when activated will perform the operation o1132. In an implementation, the receiving information human electrical circuitry arrangement e1132, when activated performs electronically receiving the user status information regarding the particular individual living being including living being identification associated with a human being (e.g. an implementation of the receiver component s528 is configured to electronically engage with the processor component s102 to receive the user status information regarding the particular individual living being including living being identification as determined by the processor component to be identifying a human being, etc.). In an implementation, the electronically receiving the user status information regarding the particular individual living being including living being identification associated with a human being is carried out by electronically receiving the user status information regarding the particular individual living being including living being identification associated with a human being (e.g. an implementation of the receiver component s528 is configured to electronically engage with the processor component s102 to receive the user status information regarding the particular individual living being including living being identification as determined by the processor component to be identifying a human being, etc.).

In one or more implementations, operation o11 includes an operation o1133 for electronically receiving the user status information regarding the particular individual living being including living being identification associated with an electronic identification card. An exemplary version of a non-transitory signal bearing medium of information storage subsystem s200 is depicted as bearing one or more receiving information ID card instructions i1133 that when executed will direct performance of the operation o1133. In an implementation, the one or more receiving information ID card instructions i1133 when executed direct electronically receiving the user-status information regarding the particular individual living being including living being identification associated with an electronic identification card (e.g. an implementation of the receiver component s528 is configured to electronically engage with the processor component s102 to receive the user status information regarding the particular individual living being including living being identification as determined by the processor component to be identifying a living being through the electronic identification card, etc.). Furthermore, the receiving information ID card electrical circuitry arrangement e1133 when activated will perform the operation o1133. In an implementation, the receiving information ID card electrical circuitry arrangement e1133, when activated performs electronically receiving the user status information regarding the particular individual living being including living being identification associated with an electronic identification card (e.g. an implementation of the receiver component s528 is configured to electronically engage with the processor component s102 to receive the user status information regarding the particular individual living being including living being identification as determined by the processor component to be identifying a living being through the electronic identification card, etc.). In an implementation, the electronically receiving the user status information regarding the particular individual living being including living being identification associated with an electronic identification card is carried out by electronically receiving the user status information regarding the particular individual living being including living being identification associated with an electronic identification card (e.g. an implementation of the receiver component s528 is configured to electronically engage with the processor component s102 to receive the user status information regarding the particular individual living being including living being identification as determined by the processor component to be identifying a living being through the electronic identification card, etc.).

Figure 44:
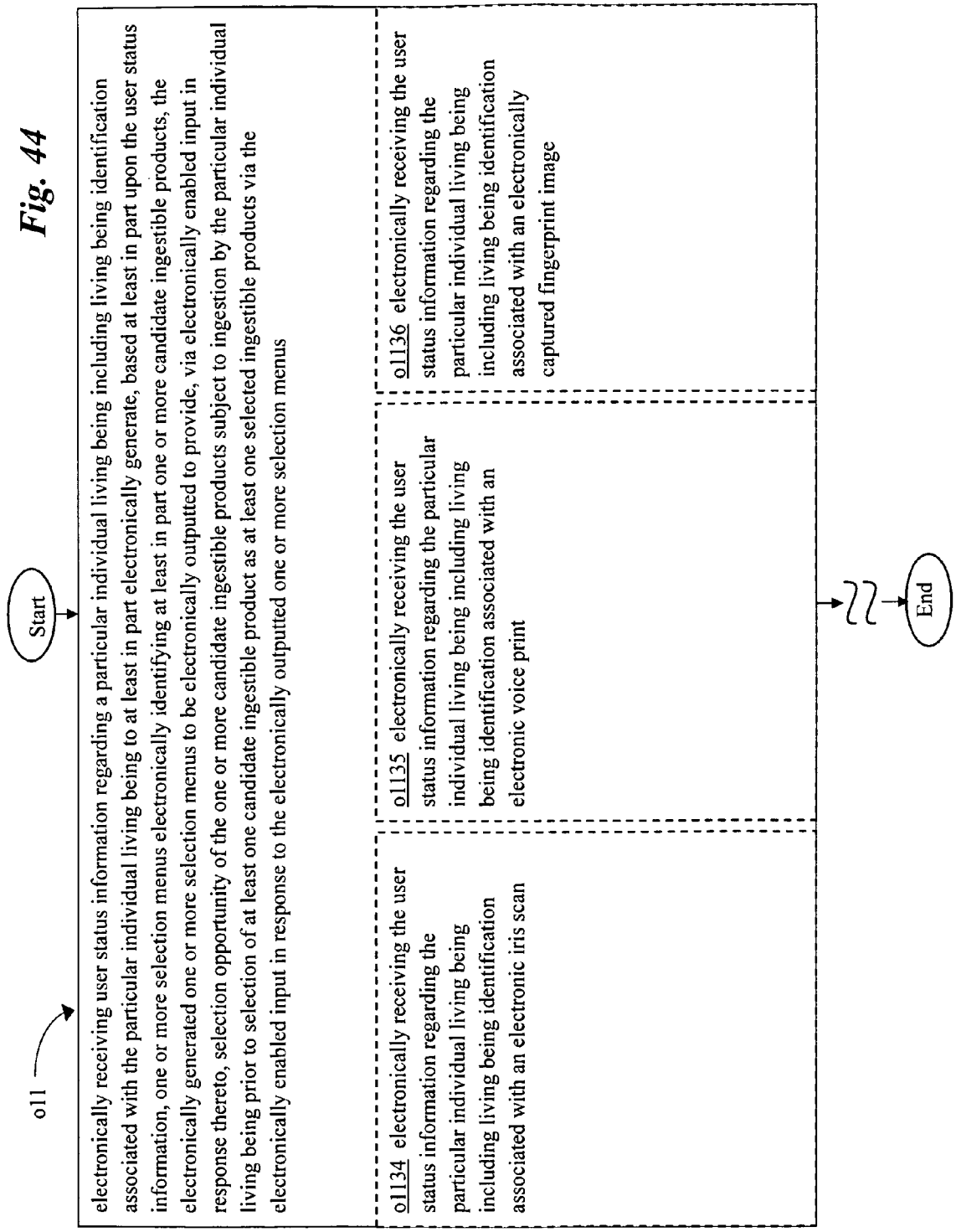
FIG. 44 is a high-level flowchart including exemplary implementations of operation O11 of FIG. 32.

In one or more implementations, as shown in FIG. 44, operation o11 includes an operation o1134 for electronically receiving the user status information regarding the particular individual living being including living being identification associated with an electronic iris scan. An exemplary version of a non-transitory signal bearing medium of information storage subsystem s200 is depicted as bearing one or more receiving information iris scan instructions i1134 that when executed will direct performance of the operation o1134. In an implementation, the one or more receiving information iris scan instructions i1134 when executed direct electronically receiving the user status information regarding the particular individual living being including living being identification associated with an electronic iris scan (e.g. an implementation of the receiver component s528 is configured to electronically engage with the processor component s102 to receive the user status information regarding the particular individual living being including living being identification as determined by the processor component to be identifying the living being through the electronic iris scan, etc.). Furthermore, the receiving information iris scan electrical circuitry arrangement e1134 when activated will perform the operation o1134. In an implementation, the receiving information iris scan electrical circuitry arrangement e1134, when activated performs electronically receiving the user status information regarding the particular individual living being including living being identification associated with an electronic iris scan (e.g. an implementation of the receiver component s528 is configured to electronically engage with the processor component s102 to receive the user status information regarding the particular individual living being including living being identification as determined by the processor component to be identifying the living being through the electronic iris scan, etc.). In an implementation, the electronically receiving the user status information regarding the particular individual living being including living being identification associated with an electronic iris scan is carried out by electronically receiving the user status information regarding the particular individual living being including living being identification associated with an electronic iris scan (e.g. an implementation of the receiver component s528 is configured to electronically engage with the processor component s102 to receive the user status information regarding the particular individual living being including living being identification as determined by the processor component to be identifying the living being through the electronic iris scan, etc.).

In one or more implementations, operation o11 includes an operation o1135 for electronically receiving the user status information regarding the particular individual living being including living being identification associated with an electronic voice print. An exemplary version of a non-transitory signal bearing medium of information storage subsystem s200 is depicted as bearing one or more receiving information voice instructions i1135 that when executed will direct performance of the operation o1135. In an implementation, the one or more receiving information voice instructions i1135 when executed direct electronically receiving the user status information regarding the particular individual living being including living being identification associated with an electronic voice print (e.g. an implementation of the receiver component s528 is configured to electronically engage with the processor component s102 to receive the user status information regarding the particular individual living being including living being identification as determined by the processor component to be identifying the living being through the electronic voice print, etc.). Furthermore, the receiving information voice electrical circuitry arrangement e1135 when activated will perform the operation o1135. In an implementation, the receiving information voice electrical circuitry arrangement e1135, when activated performs electronically receiving the user status information regarding the particular individual living being including living being identification associated with an electronic voice print (e.g. an implementation of the receiver component s528 is configured to electronically engage with the processor component s102 to receive the user status information regarding the particular individual living being including living being identification as determined by the processor component to be identifying the living being through the electronic voice print, etc.). In an implementation, the electronically receiving the user status information regarding the particular individual living being including living being identification associated with an electronic voice print is carried out by electronically receiving the user status information regarding the particular individual living being including living being identification associated with an electronic voice print (e.g. an implementation of the receiver component s528 is configured to electronically engage with the processor component s102 to receive the user status information regarding the particular individual living being including living being identification as determined by the processor component to be identifying the living being through the electronic voice print, etc.).

In one or more implementations, operation o11 includes an operation o1136 for electronically receiving the user status information regarding the particular individual living being including living being identification associated with an electronically captured fingerprint image. An exemplary version of a non-transitory signal bearing medium of information storage subsystem s200 is depicted as bearing one or more receiving information fingerprint instructions i1136 that when executed will direct performance of the operation o1136. In an implementation, the one or more receiving information fingerprint instructions i1136 when executed direct electronically receiving the user status information regarding the particular individual living being including living being identification associated with an electronically captured fingerprint image (e.g. an implementation of the receiver component s528 is configured to electronically engage with the processor component s102 to receive the user status information regarding the particular individual living being including living being identification as determined by the processor component to be identifying the living being through the electronically captured fingerprint image, etc.). Furthermore, the receiving information fingerprint electrical circuitry arrangement e1136 when activated will perform the operation o1136. In an implementation, the receiving information fingerprint electrical circuitry arrangement e1136, when activated performs electronically receiving the user status information regarding the particular individual living being including living being identification associated with an electronically captured fingerprint image (e.g. an implementation of the receiver component s528 is configured to electronically engage with the processor component s102 to receive the user status information regarding the particular individual living being including living being identification as determined by the processor component to be identifying the living being through the electronically captured fingerprint image, etc.). In an implementation, the electronically receiving the user status information regarding the particular individual living being including living being identification associated with an electronically captured fingerprint image is carried out by electronically receiving the user status information regarding the particular individual living being including living being identification associated with an electronically captured fingerprint image (e.g. an implementation of the receiver component s528 is configured to electronically engage with the processor component s102 to receive the user status information regarding the particular individual living being including living being identification as determined by the processor component to be identifying the living being through the electronically captured fingerprint image, etc.).

Figure 45:
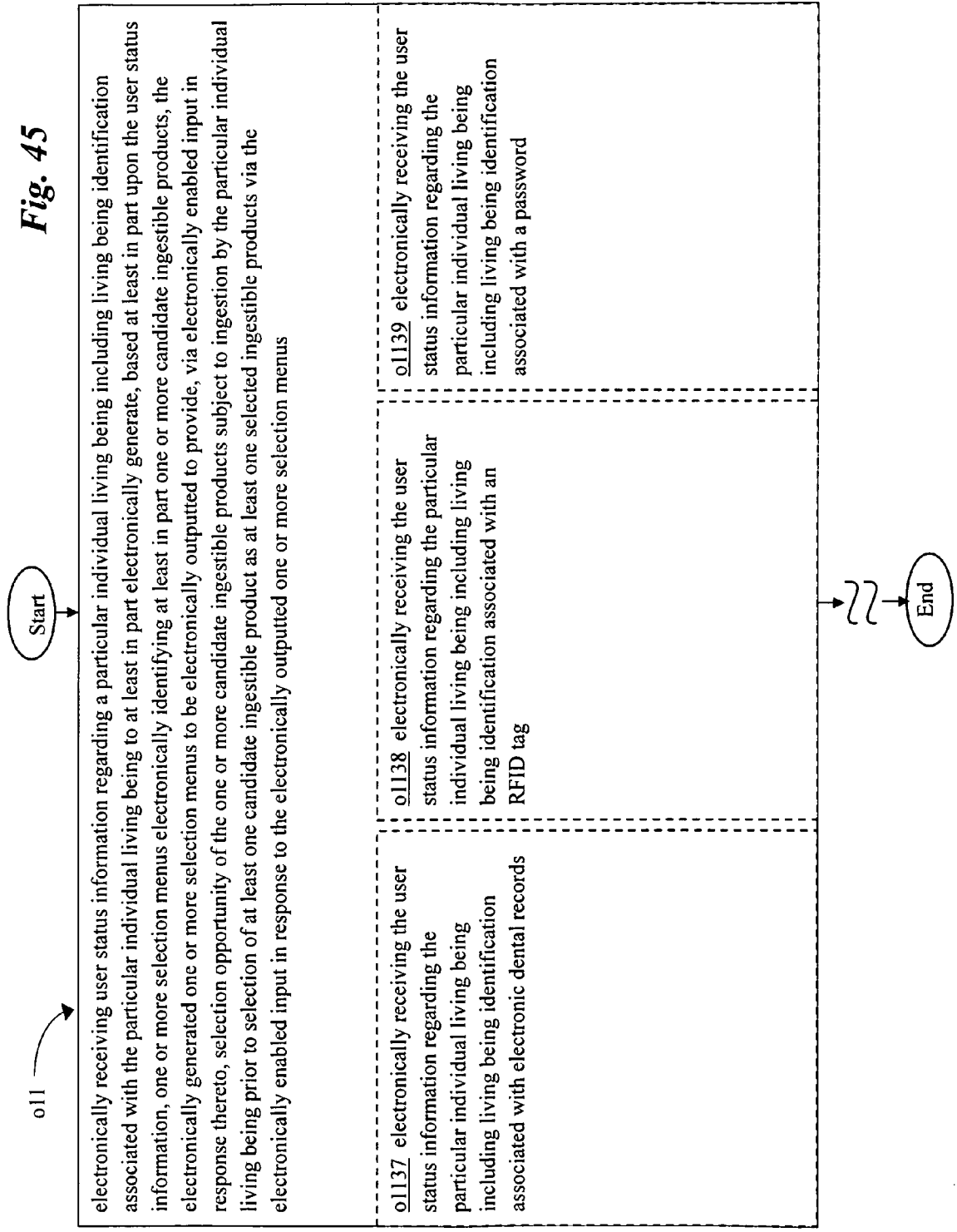
FIG. 45 is a high-level flowchart including exemplary implementations of operation O11 of FIG. 32.

In one or more implementations, as shown in FIG. 45, operation o11 includes an operation o1137 for electronically receiving the user status information regarding the particular individual living being including living being identification associated with electronic dental records. An exemplary version of a non-transitory signal bearing medium of information storage subsystem s200 is depicted as bearing one or more receiving information dental instructions i1137 that when executed will direct performance of the operation o1137. In an implementation, the one or more receiving information dental instructions i1137 when executed direct electronically receiving the user status information regarding the particular individual living being including living being identification associated with electronic dental records (e.g. an implementation of the receiver component s528 is configured to electronically engage with the processor component s102 to receive the user status information regarding the particular individual living being including living being identification as determined by the processor component to be identifying the living being through the electronic dental records, etc.). Furthermore, the receiving information dental electrical circuitry arrangement e1137 when activated will perform the operation o1137. In an implementation, the receiving information dental electrical circuitry arrangement e1137, when activated performs electronically receiving the user status information regarding the particular individual living being including living being identification associated with electronic dental records (e.g. an implementation of the receiver component s528 is configured to electronically engage with the processor component s102 to receive the user status information regarding the particular individual living being including living being identification as determined by the processor component to be identifying the living being through the electronic dental records, etc.). In an implementation, the electronically receiving the user status information regarding the particular individual living being including living being identification associated with electronic dental records is carried out by electronically receiving the user status information regarding the particular individual living being including living being identification associated with electronic dental records (e.g. an implementation of the receiver component s528 is configured to electronically engage with the processor component s102 to receive the user status information regarding the particular individual living being including living being identification as determined by the processor component to be identifying the living being through the electronic dental records, etc.).

In one or more implementations, operation o11 includes an operation o1138 for electronically receiving the user status information regarding the particular individual living being including living being identification associated with an RFID tag. An exemplary version of a non-transitory signal bearing medium of information storage subsystem s200 is depicted as bearing one or more receiving information RFID instructions i1138 that when executed will direct performance of the operation o1138. In an implementation, the one or more receiving information RFID instructions i1138 when executed direct electronically receiving the user status information regarding the particular individual living being including living being identification associated with an RFID tag (e.g. an implementation of the receiver component s528 is configured to electronically engage with the processor component s102 to receive the user status information regarding the particular individual living being including living being identification as determined by the processor component to be identifying the living being through the RFID tag, etc.). Furthermore, the receiving information RFID electrical circuitry arrangement e1138 when activated will perform the operation o1138. In an implementation, the receiving information RFID electrical circuitry arrangement e1138, when activated performs electronically receiving the user status information regarding the particular individual living being including living being identification associated with an RFID tag (e.g. an implementation of the receiver component s528 is configured to electronically engage with the processor component s102 to receive the user status information regarding the particular individual living being including living being identification as determined by the processor component to be identifying the living being through the RFID tag, etc.). In an implementation, the electronically receiving the user status information regarding the particular individual living being including living being identification associated with an RFID tag is carried out by electronically receiving the user status information regarding the particular individual living being including living being identification associated with an RFID tag (e.g. an implementation of the receiver component s528 is configured to electronically engage with the processor component s102 to receive the user status information regarding the particular individual living being including living being identification as determined by the processor component to be identifying the living being through the RFID tag, etc.).

In one or more implementations, operation o11 includes an operation o1139 for electronically receiving the user status information regarding the particular individual living being including living being identification associated with a password. An exemplary version of a non-transitory signal bearing medium of information storage subsystem s200 is depicted as bearing one or more receiving information password instructions i1139 that when executed will direct performance of the operation o1139. In an implementation, the one or more receiving information password instructions i1139 when executed direct electronically receiving the user status information regarding the particular individual living being including living being identification associated with a password (e.g. an implementation of the receiver component s528 is configured to electronically engage with the processor component s102 to receive the user status information regarding the particular individual living being including living being identification as determined by the processor component to be identifying the living being through the password, etc.). Furthermore, the receiving information password electrical circuitry arrangement e1139 when activated will perform the operation o1139. In an implementation, the receiving information password electrical circuitry arrangement e1139, when activated performs electronically receiving the user status information regarding the particular individual living being including living being identification associated with a password (e.g. an implementation of the receiver component s528 is configured to electronically engage with the processor component s102 to receive the user status information regarding the particular individual living being including living being identification as determined by the processor component to be identifying the living being through the password, etc.). In an implementation, the electronically receiving the user status information regarding the particular individual living being including living being identification associated with a password is carried out by electronically receiving the user status information regarding the particular individual living being including living being identification associated with a password (e.g. an implementation of the receiver component s528 is configured to electronically engage with the processor component s102 to receive the user status information regarding the particular individual living being including living being identification as determined by the processor component to be identifying the living being through the password, etc.).

Figure 46:
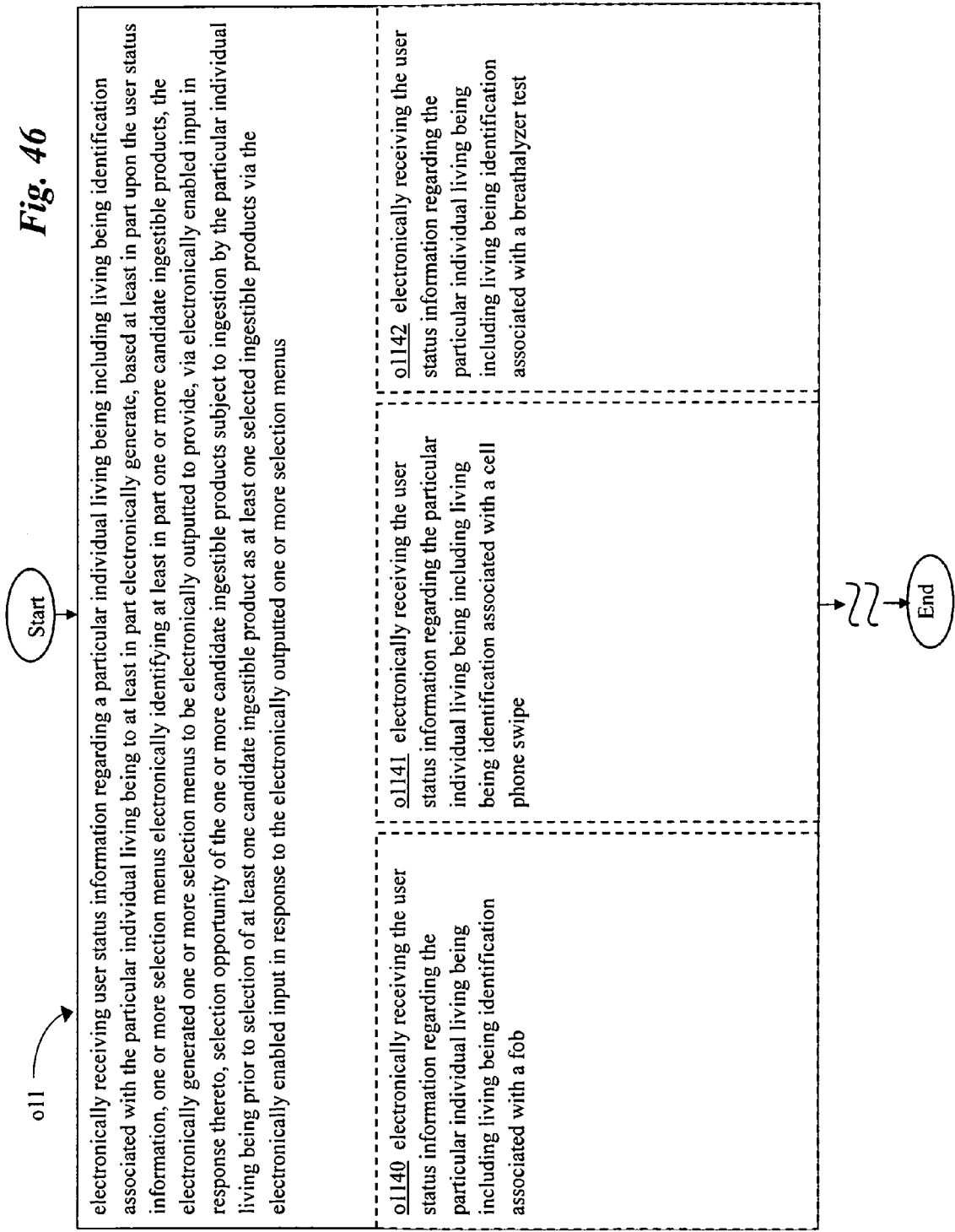
FIG. 46 is a high-level flowchart including exemplary implementations of operation O11 of FIG. 32.

In one or more implementations, as shown in FIG. 46, operation o11 includes an operation o1140 for electronically receiving the user status information regarding the particular individual living being including living being identification associated with a fob. An exemplary version of a non-transitory signal bearing medium of information storage subsystem s200 is depicted as bearing one or more receiving information fob instructions i1140 that when executed will direct performance of the operation o1140. In an implementation, the one or more receiving information fob instructions i1140 when executed direct electronically receiving the user status information regarding the particular individual living being including living being identification associated with a fob (e.g. an implementation of the receiver component s528 is configured to electronically engage with the processor component s102 to receive the user status information regarding the particular individual living being including living being identification as determined by the processor component to be identifying the living being through electronic data contained on the fob, etc.). Furthermore, the receiving information fob electrical circuitry arrangement e1140 when activated will perform the operation o1140. In an implementation, the receiving information fob electrical circuitry arrangement e1140, when activated performs electronically receiving the user status information regarding the particular individual living being including living being identification associated with a fob (e.g. an implementation of the receiver component s528 is configured to electronically engage with the processor component s102 to receive the user status information regarding the particular individual living being including living being identification as determined by the processor component to be identifying the living being through electronic data contained on the fob, etc.). In an implementation, the electronically receiving the user status information regarding the particular individual living being including living being identification associated with a fob is carried out by electronically receiving the user status information regarding the particular individual living being including living being identification associated with a fob (e.g. an implementation of the receiver component s528 is configured to electronically engage with the processor component s102 to receive the user status information regarding the particular individual living being including living being identification as determined by the processor component to be identifying the living being through electronic data contained on the fob, etc.).

In one or more implementations, operation o11 includes an operation o1141 for electronically receiving the user status information regarding the particular individual living being including living being identification associated with a cell phone swipe. An exemplary version of a non-transitory signal bearing medium of information storage subsystem s200 is depicted as bearing one or more receiving information cell phone instructions i1141 that when executed will direct performance of the operation o1141. In an implementation, the one or more receiving information cell phone instructions i1141 when executed direct electronically receiving the user status information regarding the particular individual living being including living being identification associated with a cell phone swipe (e.g. an implementation of the receiver component s528 is configured to electronically engage with the processor component s102 to receive the user status information regarding the particular individual living being including living being identification as determined by the processor component to be identifying the living being through passing the cell phone in close proximity to the cell phone, etc.). Furthermore, the receiving information cell phone electrical circuitry arrangement e1141 when activated will perform the operation o1141. In an implementation, the receiving information cell phone electrical circuitry arrangement e1141, when activated performs electronically receiving the user status information regarding the particular individual living being including living being identification associated with a cell phone swipe (e.g. an implementation of the receiver component s528 is configured to electronically engage with the processor component s102 to receive the user status information regarding the particular individual living being including living being identification as determined by the processor component to be identifying the living being through passing the cell phone in close proximity to the cell phone, etc.). In an implementation, the electronically receiving the user status information regarding the particular individual living being including living being identification associated with a cell phone swipe is carried out by electronically receiving the user status information regarding the particular individual living being including living being identification associated with a cell phone swipe (e.g. an implementation of the receiver component s528 is configured to electronically engage with the processor component s102 to receive the user status information regarding the particular individual living being including living being identification as determined by the processor component to be identifying the living being through passing the cell phone in close proximity to the cell phone, etc.).

In one or more implementations, operation o11 includes an operation o1142 for electronically receiving the user status information regarding the particular individual living being including living being identification associated with a breathalyzer test. An exemplary version of a non-transitory signal bearing medium of information storage subsystem s200 is depicted as bearing one or more receiving information breathalyzer instructions i1142 that when executed will direct performance of the operation o1142. In an implementation, the one or more receiving information breathalyzer instructions i1142 when executed direct electronically receiving the user status information regarding the particular individual living being including living being identification associated with a breathalyzer test (e.g. an implementation of the receiver component s528 is configured to electronically engage with the processor component s102 to receive the user status information regarding the particular individual living being including living being identification as determined by the processor component to be identifying the living being through the breathalyzer test of the living being, etc.). Furthermore, the receiving information breathalyzer electrical circuitry arrangement e1142 when activated will perform the operation o1142. In an implementation, the receiving information breathalyzer electrical circuitry arrangement e1142, when activated performs electronically receiving the user status information regarding the particular individual living being including living being identification associated with a breathalyzer test (e.g. an implementation of the receiver component s528 is configured to electronically engage with the processor component s102 to receive the user status information regarding the particular individual living being including living being identification as determined by the processor component to be identifying the living being through the breathalyzer test of the living being, etc.). In an implementation, the electronically receiving the user status information regarding the particular individual living being including living being identification associated with a breathalyzer test is carried out by electronically receiving the user status information regarding the particular individual living being including living being identification associated with a breathalyzer test (e.g. an implementation of the receiver component s528 is configured to electronically engage with the processor component s102 to receive the user status information regarding the particular individual living being including living being identification as determined by the processor component to be identifying the living being through the breathalyzer test of the living being, etc.).

Figure 47:
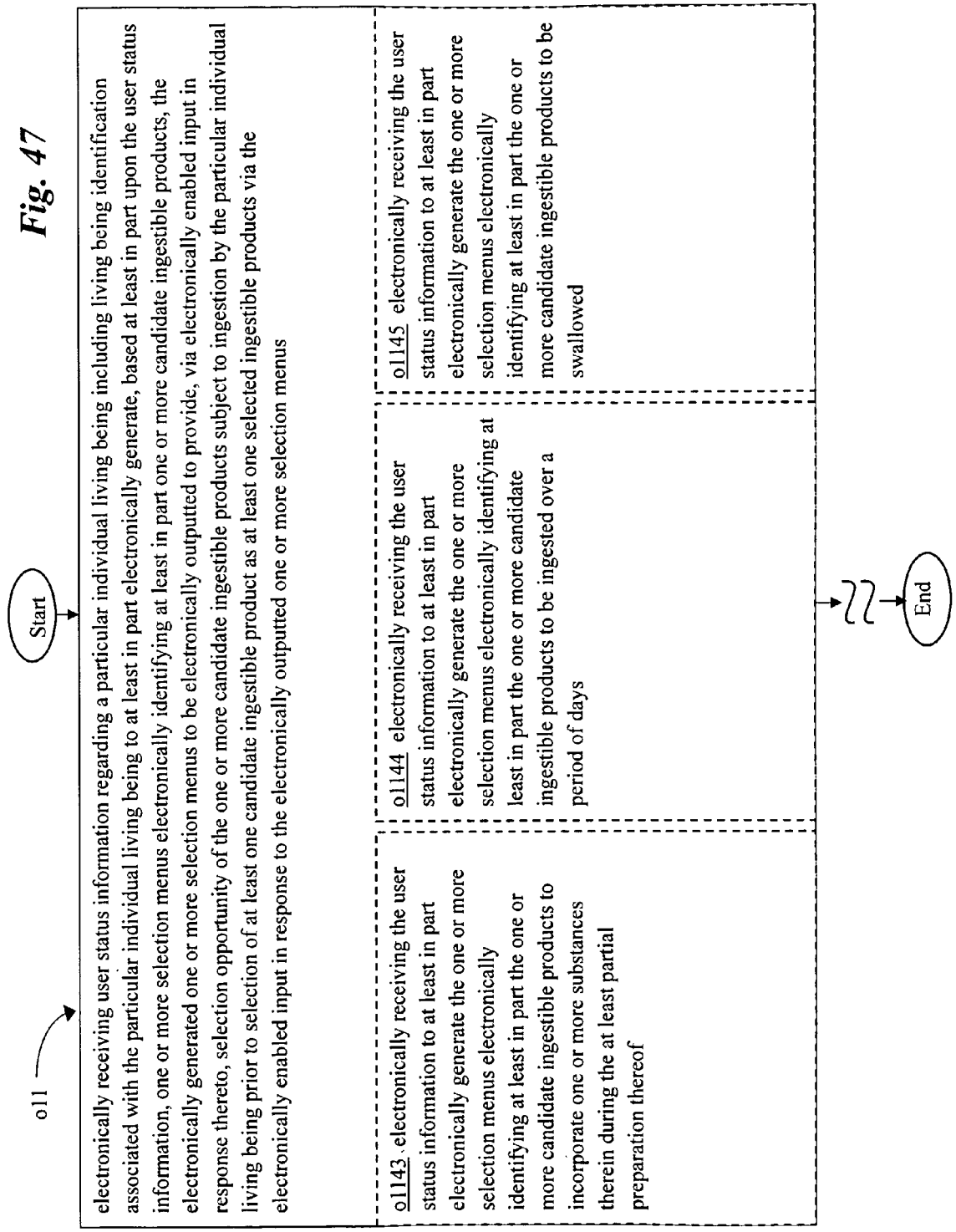
FIG. 47 is a high-level flowchart including exemplary implementations of operation O11 of FIG. 32.

In one or more implementations, as shown in FIG. 47, operation o11 includes an operation o1143 for electronically receiving the user status information to at least in part electronically generate the one or more selection menus electronically identifying at least in part the one or more candidate ingestible products to incorporate one or more substances therein during the at least partial preparation thereof. An exemplary version of a non-transitory signal bearing medium of information storage subsystem s200 is depicted as bearing one or more receiving information incorporate instructions i1143 that when executed will direct performance of the operation o1143. In an implementation, the one or more receiving information incorporate instructions i1143 when executed direct electronically receiving the user status information to at least in part electronically generate the one or more selection menus electronically identifying at least in part the one or more candidate ingestible products to incorporate one or more substances therein during the at least partial preparation thereof (e.g. an implementation of the receiver component s528 is configured to electronically receive the user status information and engage with the processor component s102 to at least in part electronically generate the one or more selection menus electronically identifying at least in part the one or more candidate ingestible products to incorporate one or more substances therein during the at least partial preparation thereof such as a sandwich to include the substance as an amino acid incorporated into the sandwich, etc.). Furthermore, the receiving information incorporate electrical circuitry arrangement e1143 when activated will perform the operation o1143. In an implementation, the receiving information incorporate electrical circuitry arrangement e1143, when activated performs electronically receiving the user status information to at least in part electronically generate the one or more selection menus electronically identifying at least in part the one or more candidate ingestible products to incorporate one or more substances therein during the at least partial preparation thereof (e.g. an implementation of the receiver component s528 is configured to electronically receive the user status information and engage with the processor component s102 to at least in part electronically generate the one or more selection menus electronically identifying at least in part the one or more candidate ingestible products to incorporate one or more substances therein during the at least partial preparation thereof such as a sandwich to include the substance as an amino acid incorporated into the sandwich, etc.). In an implementation, the electronically receiving the user status information to at least in part electronically generate the one or more selection menus electronically identifying at least in part the one or more candidate ingestible products to incorporate one or more substances therein during the at least partial preparation thereof is carried out by electronically receiving the user status information to at least in part electronically generate the one or more selection menus electronically identifying at least in part the one or more candidate ingestible products to incorporate one or more substances therein during the at least partial preparation thereof (e.g. an implementation of the receiver component s528 is configured to electronically receive the user status information and engage with the processor component s102 to at least in part electronically generate the one or more selection menus electronically identifying at least in part the one or more candidate ingestible products to incorporate one or more substances therein during the at least partial preparation thereof such as a sandwich to include the substance as an amino acid incorporated into the sandwich, etc.).

In one or more implementations, operation o11 includes an operation o1144 for electronically receiving the user status information to at least in part electronically generate the one or more selection menus electronically identifying at least in part the one or more candidate ingestible products to be ingested over a period of days. An exemplary version of a non-transitory signal bearing medium of information storage subsystem s200 is depicted as bearing one or more receiving information days instructions i1144 that when executed will direct performance of the operation o1144. In an implementation, the one or more receiving information days instructions i1144 when executed direct electronically receiving the user status information to at least in part electronically generate the one or more selection menus electronically identifying at least in part the one or more candidate ingestible products to be ingested over a period of days (e.g. an implementation of the receiver component s528 is configured to electronically receive the user status information and engage with the processor component s102 to at least in part electronically generate the one or more selection menus electronically identifying at least in part the one or more candidate ingestible products to be ingested over a period of days such as a smoothie to contain an activator that is designed to interact with a substance, such as a pharmaceutical agent that is encapsulated in pill form to be ingested over a period of days by a living being, such as a boy, at the same time that the smoothie is being ingested by the boy, etc.). Furthermore, the receiving information days electrical circuitry arrangement e1144 when activated will perform the operation o1144. In an implementation, the receiving information days electrical circuitry arrangement e1144, when activated performs electronically receiving the user status information to at least in part electronically generate the one or more selection menus electronically identifying at least in part the one or more candidate ingestible, products to be ingested over a period of days (e.g. an implementation of the receiver component s528 is configured to electronically receive the user status information and engage with the processor component s102 to at least in part electronically generate the one or more selection menus electronically identifying at least in part the one or more candidate ingestible products to be ingested over a period of days such as a smoothie to contain an activator that is designed to interact with a substance, such as a pharmaceutical agent that is encapsulated in pill form to be ingested over a period of days by a living being, such as a boy, at the same time that the smoothie is being ingested by the boy, etc.). In an implementation, the electronically receiving the user status information to at least in part electronically generate the one or more selection menus electronically identifying at least in part the one or more candidate ingestible products to be ingested over a period of days is carried out by electronically receiving the user status information to at least in part electronically generate the one or more selection menus electronically identifying at least in part the one or more candidate ingestible products to be ingested over a period of days (e.g. an implementation of the receiver component s528 is configured to electronically receive the user status information and engage with the processor component s102 to at least in part electronically generate the one or more selection menus electronically identifying at least in part the one or more candidate ingestible products to be ingested over a period of days such as a smoothie to contain an activator that is designed to interact with a substance, such as a pharmaceutical agent that is encapsulated in pill form to be ingested over a period of days by a living being, such as a boy, at the same time that the smoothie is being ingested by the boy, etc.).

In one or more implementations, operation o11 includes an operation o1145 for electronically receiving the user status information to at least in part electronically generate the one or more selection menus electronically identifying at least in part the one or more candidate ingestible products to be swallowed. An exemplary version of a non-transitory signal bearing medium of information storage subsystem s200 is depicted as bearing one or more receiving information swallow instructions i1145 that when executed will direct performance of the operation o1145. In an implementation, the one or more receiving information swallow instructions i1145 when executed direct electronically receiving the user status information to at least in part electronically generate the one or more selection menus electronically identifying at least in part the one or more candidate ingestible products to be swallowed (e.g., an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be swallowed such as a snack bar, etc.). Furthermore, the receiving information swallow electrical circuitry arrangement e1145 when activated will perform the operation o1145. In an implementation, the receiving information swallow electrical circuitry arrangement e1145, when activated performs electronically receiving the user status information to at least in part electronically generate the one or more selection menus electronically identifying at least in part the one or more candidate ingestible products to be swallowed (e.g., an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be swallowed such as a snack bar, etc.). In an implementation, the electronically receiving the user status information to at least in part electronically generate the one or more selection menus electronically identifying at least in part the one or more candidate ingestible products to be swallowed is carried out by electronically receiving the user status information to at least in part electronically generate the one or more selection menus electronically identifying at least in part the one or more candidate ingestible products to be swallowed (e.g., an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be swallowed such as a snack bar, etc.).

Figure 48:
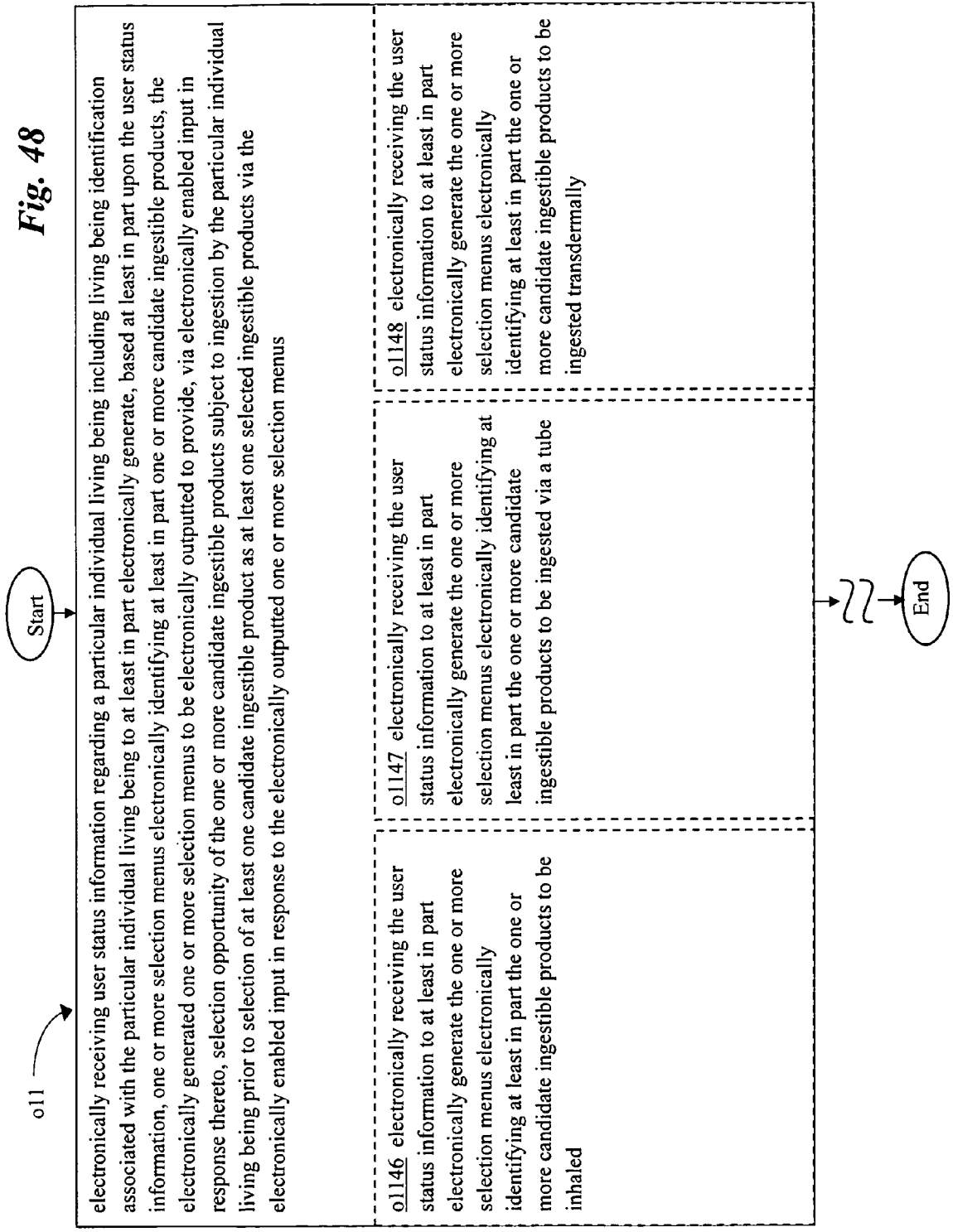
FIG. 48 is a high-level flowchart including exemplary implementations of operation O11 of FIG. 32.

In one or more implementations, as shown in FIG. 48, operation o11 includes an operation o1146 for electronically receiving the user status information to at least in part electronically generate the one or more selection menu's electronically identifying at least in part the one or more candidate ingestible products to be inhaled. An exemplary version of a non-transitory signal bearing medium of information storage subsystem s200 is depicted as bearing one or more receiving information inhaled instructions i1146 that when executed will direct performance of the operation o1146. In an implementation, the one or more receiving information inhaled instructions i1146 when executed direct electronically receiving the user status information to at least in part electronically generate the one or more selection menus electronically identifying at least in part the one or more candidate ingestible products to be inhaled (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be inhaled such as a medicament dispensed through a nebulizer, etc.). Furthermore, the receiving information inhaled electrical circuitry arrangement e1146 when activated will perform the operation o1146. In an implementation, the receiving information inhaled electrical circuitry arrangement e1146, when activated performs electronically receiving the user status information to at least in part electronically generate the one or more selection menus electronically identifying at least in part the one or more candidate ingestible products to be inhaled (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be inhaled such as a medicament dispensed through a nebulizer, etc.). In an implementation, the electronically receiving the user status information to at least in part electronically generate the one or more selection menus electronically identifying at least in part the one or more candidate ingestible products to be inhaled is carried out by electronically receiving the user status information to at least in part electronically generate the one or more selection menus electronically identifying at least in part the one or more candidate ingestible products to be inhaled (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be inhaled such as a medicament dispensed through a nebulizer, etc.).

In one or more implementations, operation o11 includes an operation o1147 for electronically receiving the user status information to at least in part electronically generate the one or more selection menus electronically identifying at least in part the one or more candidate ingestible products to be ingested via a tube. An exemplary version of a non-transitory signal bearing medium of information storage subsystem s200 is depicted as bearing one or more receiving information tube instructions i1147 that when executed will direct performance of the operation o1147. In an implementation, the one or more receiving information tube instructions i1147 when executed direct electronically receiving the user status information to at least in part electronically generate the one or more selection menus electronically identifying at least in part the one or more candidate ingestible products to be ingested thru a tube (e.g., an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be ingested via a tube such as a liquid meal replacement, etc.). Furthermore, the receiving information tube electrical circuitry arrangement e1147 when activated will perform the operation o1147. In an implementation, the receiving information tube electrical circuitry arrangement e1147, when activated performs electronically receiving the user status information to at least in part electronically generate the one or more selection menus electronically identifying at least in part the one or more candidate ingestible products to be ingested thru a tube (e.g., an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be ingested via a tube such as a liquid meal replacement, etc.). In an implementation, the electronically receiving the user status information to at least in part electronically generate the one or more selection menus electronically identifying at least in part the one or more candidate ingestible products to be ingested via a tube is carried out by electronically receiving the user status information to at least in part electronically generate the one or more selection menus electronically identifying at least in part the one or more candidate ingestible products to be ingested thru a tube (e.g., an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be ingested via a tube such as a liquid meal replacement, etc.).

In one or more implementations, operation o11 includes an operation o1148 for electronically receiving the user status information to at least in part electronically generate the one or more selection menus electronically identifying at least in part the one or more candidate ingestible products to be ingested transdermally. An exemplary version of a non-transitory signal bearing medium of information storage subsystem s200 is depicted as bearing one or more receiving information transdermal instructions i1148 that when executed will direct performance of the operation o1148. In an implementation, the one or more receiving information transdermal instructions i1148 when executed direct electronically receiving the user status information to at least in part electronically generate the one or more selection menus electronically identifying at least in part the one or more candidate ingestible products to be ingested transdermally (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be ingested transdermally such as a cream, etc.). Furthermore, the receiving information transdermal electrical circuitry arrangement e1148 when activated will perform the operation o1148. In an implementation, the receiving information transdermal electrical circuitry arrangement e1148, when activated performs electronically receiving the user status information to at least in part electronically generate the one or more selection menus electronically identifying at least in part the one or more candidate ingestible products to be ingested transdermally (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be ingested transdermally such as a cream, etc.). In an implementation, the electronically receiving the user status information to at least in part electronically generate the one or more selection menus electronically identifying at least in part the one or more candidate ingestible products to be ingested transdermally is carried out by electronically receiving the user status information to at least in part electronically generate the one or more selection menus electronically identifying at least in part the one or more candidate ingestible products to be ingested transdermally (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be ingested transdermally such as a cream, etc.).

Figure 49:
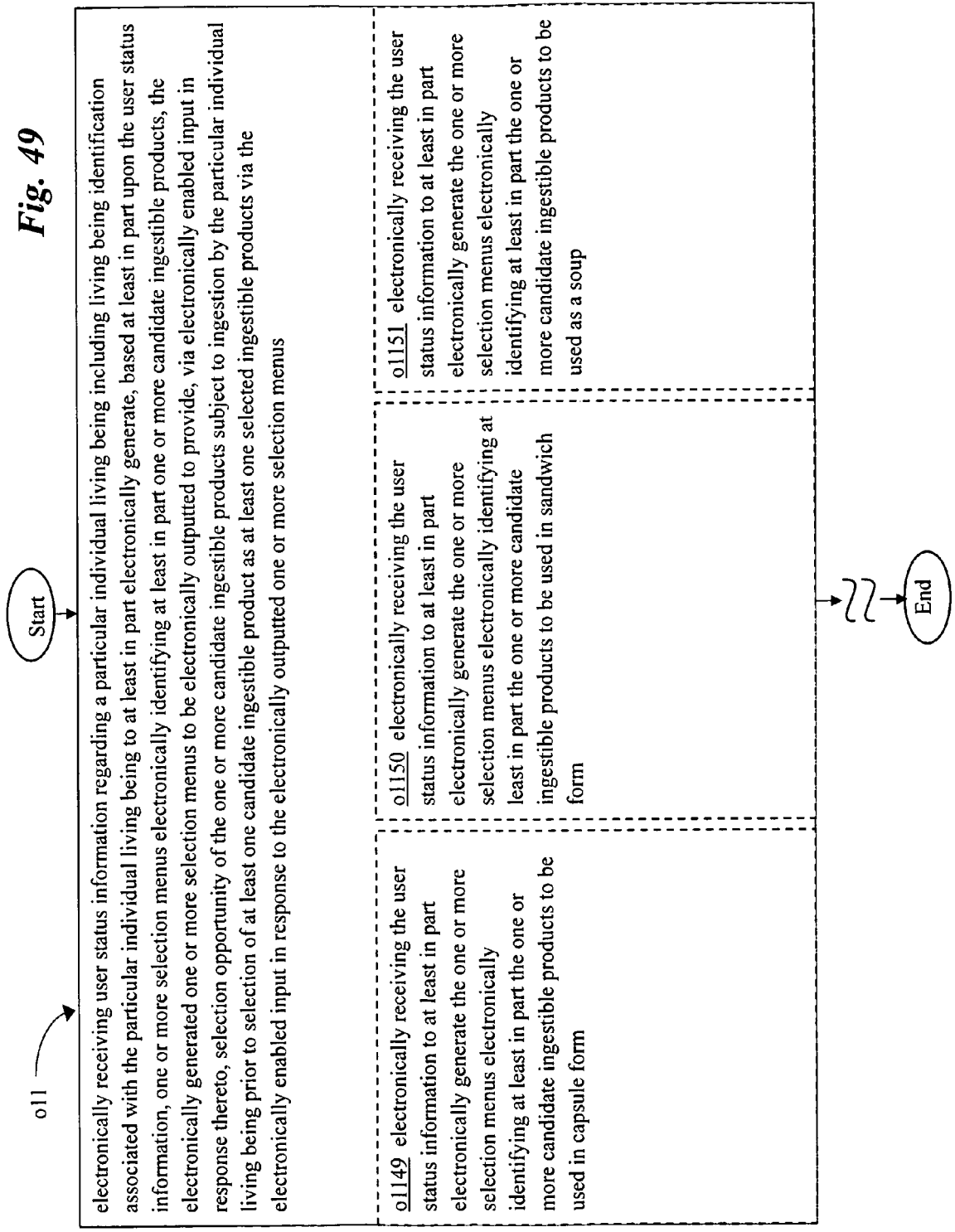
FIG. 49 is a high-level flowchart including exemplary implementations of operation O11 of FIG. 32.

In one or more implementations, as shown in FIG. 49, operation o11 includes an operation o1149 for electronically receiving the user status information to at least in part electronically generate the one or more selection menus electronically identifying at least in part the one or more candidate ingestible products to be used in capsule form. An exemplary version of a non-transitory signal bearing medium of information storage subsystem s200 is depicted as bearing one or more receiving information capsule instructions i1149 that when executed will direct performance of the operation o1149. In an implementation, the one or more receiving information capsule instructions i1149 when executed direct electronically receiving the user status information to at least in part electronically generate the one or more selection menus electronically identifying at least in part the one or more candidate ingestible products to be used in a capsule form (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used in capsule form, such as through capsules via encapsulation, etc.). Furthermore, the receiving information capsule electrical circuitry arrangement e1149 when activated will perform the operation o1149. In an implementation, the receiving information capsule electrical circuitry arrangement e1149, when activated performs electronically receiving the user status information to at least in part electronically generate the one or more selection menus electronically identifying at least in part the one or more candidate ingestible products to be used in a capsule form (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used in capsule form, such as through capsules via encapsulation, etc.). In an implementation, the electronically receiving the user status information to at least in part electronically generate the one or more selection menus electronically identifying at least in part the one or more candidate ingestible products to be used in capsule form is carried out by electronically receiving the user status information to at least in part electronically generate the one or more selection menus electronically identifying at least in part the one or more candidate ingestible products to be used in a capsule form (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used in capsule form, such as through capsules via encapsulation, etc.).

In one or more implementations, operation o11 includes an operation o1150 for electronically receiving the user status information to at least in part electronically generate the one or more selection menus electronically identifying at least in part the one or more candidate ingestible products to be used in sandwich form. An exemplary version of a non-transitory signal bearing medium of information storage subsystem s200 is depicted as bearing one or more receiving information sandwich instructions i1150 that when executed will direct performance of the operation o1150. In an implementation, the one or more receiving information sandwich instructions i1150 when executed direct electronically receiving the user status information to at least in part electronically generate the one or more selection menus electronically identifying at least in part the one or more candidate ingestible products to be used in sandwich form (e.g. an implementation of the receiver component s528 is configured to electronically receive the user status information and engage with the processor component s102 to at least in part electronically generate the one or more selection menus electronically identifying at least in part the one or more candidate ingestible products in sandwich form such as a hamburger, etc.). Furthermore, the receiving information sandwich electrical circuitry arrangement e1150 when activated will perform the operation o1150. In an implementation, the receiving information sandwich electrical circuitry arrangement e1150, when activated performs electronically receiving the user status information to at least in part electronically generate the one or more selection menus electronically identifying at least in part the one or more candidate ingestible products to be used in sandwich form (e.g. an implementation of the receiver component s528 is configured to electronically receive the user status information and engage with the processor component s102 to at least in part electronically generate the one or more selection menus electronically identifying at least in part the one or more candidate ingestible products in sandwich form such as a hamburger, etc.). In an implementation, the electronically receiving the user status information to at least in part electronically generate the one or more selection menus electronically identifying at least in part the one or more candidate ingestible products to be used in sandwich form is carried out by electronically receiving the user status information to at least in part electronically generate the one or more selection menus electronically identifying at least in part the one or more candidate ingestible products to be used in sandwich form (e.g. an implementation of the receiver component s528 is configured to electronically receive the user status information and engage with the processor component s102 to at least in part electronically generate the one or more selection menus electronically identifying at least in part the one or more candidate ingestible products in sandwich form such as a hamburger, etc.).

In one or more implementations, operation o11 includes an operation o1151 for electronically receiving the user status information to at least in part electronically generate the one or more selection menus electronically identifying at least in part the one or more candidate ingestible products to be used as a soup. An exemplary version of a non-transitory signal bearing medium of information storage subsystem s200 is depicted as bearing one or more receiving information soup instructions i1151 that when executed will direct performance of the operation o1151. In an implementation, the one or more receiving information soup instructions i1151 when executed direct electronically receiving the user status information to at least in part electronically generate the one or more selection menus electronically identifying at least in part the one or more candidate ingestible products to be used as a soup (e.g. an implementation of the receiver component s528 is configured to electronically receive the user status information and engage with the processor component s102 to at least in part electronically generate the one or more selection menus electronically identifying at least in part the one or more candidate ingestible products to be used as a soup such as tomato soup, etc.). Furthermore, the receiving information soup electrical circuitry arrangement e1151 when activated will perform the operation o1151. In an implementation, the receiving information soup electrical circuitry arrangement e1151, when activated performs electronically receiving the user status information to at least in part electronically generate the one or more selection menus electronically identifying at least in part the one or more candidate ingestible products to be used as a soup (e.g. an implementation of the receiver component s528 is configured to electronically receive the user status information and engage with the processor component s102 to at least in part electronically generate the one or more selection menus electronically identifying at least in part the one or more candidate ingestible products to be used as a soup such as tomato soup, etc.). In an implementation, the electronically receiving the user status information to at least in part electronically generate the one or more selection menus electronically identifying at least in part the one or more candidate ingestible products to be used as a soup is carried out by electronically receiving the user status information to at least in part electronically generate the one or more selection menus electronically identifying at least in part the one or more candidate, ingestible products to be used as a soup (e.g. an implementation of the receiver component s528 is configured to electronically receive the user status information and engage with the processor component s102 to at least in part electronically generate the one or more selection menus electronically identifying at least in part the one or more candidate ingestible products to be used as a soup such as tomato soup, etc.).

Figure 50:
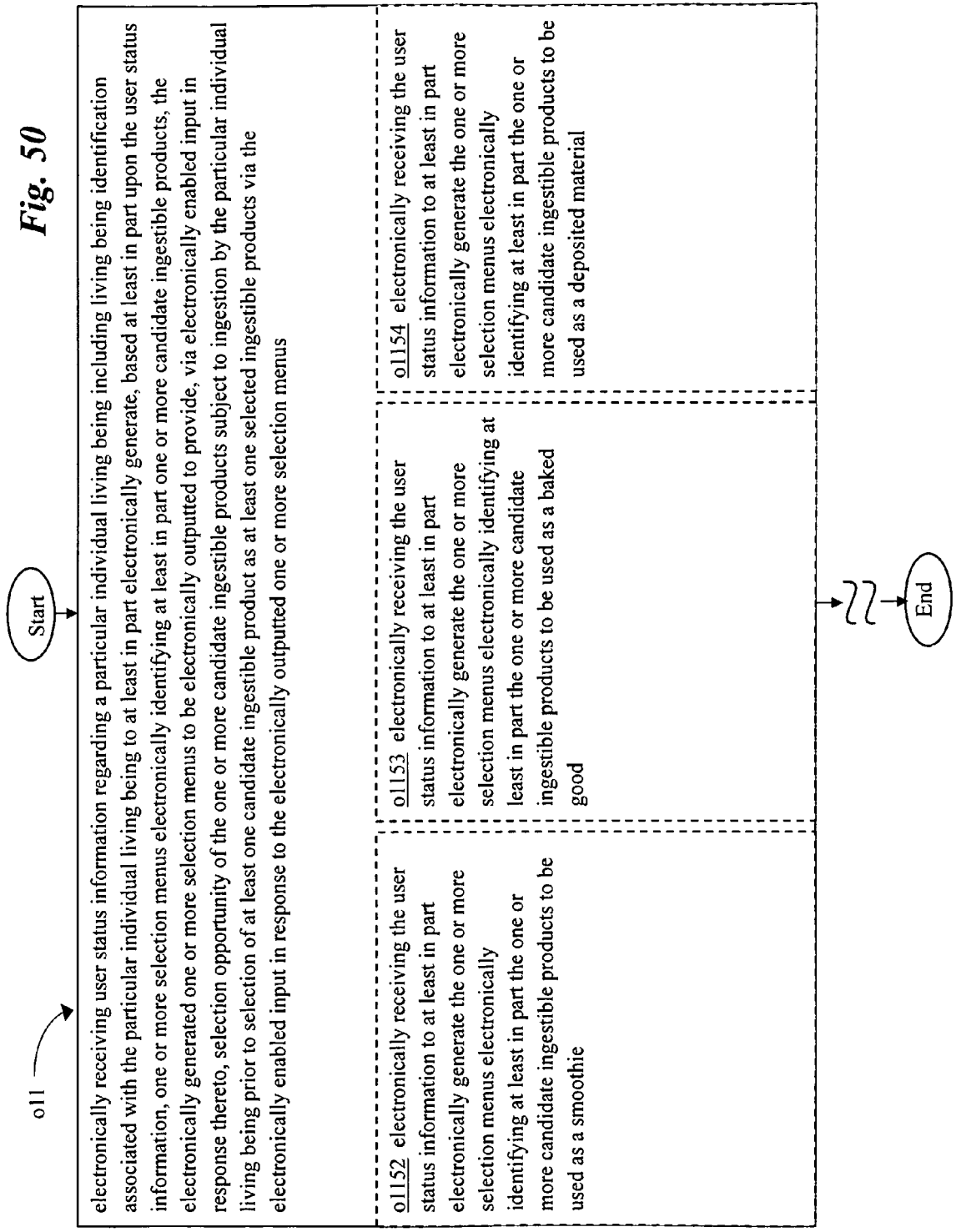
FIG. 50 is a high-level flowchart including exemplary implementations of operation O11 of FIG. 32.

In one or more implementations, as shown in FIG. 50, operation o11 includes an operation o1152 for electronically receiving the user status information to at least in part electronically generate the one or more selection menus electronically identifying at least in part the one or more candidate ingestible products to be used as a smoothie. An exemplary version of a non-transitory signal bearing medium of information storage subsystem s200 is depicted as bearing one or more receiving information smoothie instructions i1152 that when executed will direct performance of the operation o1152. In an implementation, the one or more receiving information smoothie instructions i1152 when executed direct electronically receiving the user status information to at least in part electronically generate the one or more selection menus electronically identifying at least in part the one or more candidate ingestible products to be used as a smoothie (e.g. an implementation of the receiver component s528 is configured to electronically receive the user status information and engage with the processor component s102 to at least in part electronically generate the one or more selection menus electronically identifying at least in part the one or more candidate ingestible products to be used a smoothie such as a fruit smoothie, etc.). Furthermore, the receiving information smoothie electrical circuitry arrangement e1152 when activated will perform the operation o1152. In an implementation, the receiving information smoothie electrical circuitry arrangement e1152, when activated performs electronically receiving the user status information to at least in part electronically generate the one or more selection menus electronically identifying at least in part the one or more candidate ingestible products to be used as a smoothie (e.g. an implementation of the receiver component s528 is configured to electronically receive the user status information and engage with the processor component s102 to at least in part electronically generate the one or more selection menus electronically identifying at least in part the one or more candidate ingestible products to be used as a smoothie such as a fruit smoothie, etc.). In an implementation, the electronically receiving the user status information to at least in part electronically generate the one or more selection menus electronically identifying at least in part the one or more candidate ingestible products to be used as a smoothie is carried out by electronically receiving the user status information to at least in part electronically generate the one or more selection menus electronically identifying at least in part the one or more candidate ingestible products to be used as a smoothie (e.g. an implementation of the receiver component s528 is configured to electronically receive the user status information and engage with the processor component s102 to at least in part electronically generate the one or more selection menus electronically identifying at least in part the one or more candidate ingestible products to be used a smoothie such as a fruit smoothie, etc.).

In one or more implementations, operation o11 includes an operation o1153 for electronically receiving the user status information to at least in part electronically generate the one or more selection menus electronically identifying at least in part the one or more candidate ingestible products to be used as a baked good. An exemplary version of a non-transitory signal bearing medium of information storage subsystem s200 is depicted as bearing one or more receiving information baked instructions i1153 that when executed will direct performance of the operation o1153. In an implementation, the one or more receiving information baked instructions i1153 when executed direct electronically receiving the user status information to at least in part electronically generate the one or more selection menus electronically identifying at least in part the one or more candidate ingestible products to be used as a baked good (e.g. an implementation of the receiver component s528 is configured to electronically receive the user status information and engage with the processor component s102 to at least in part electronically generate the one or more selection menus electronically identifying at least in part the one or more candidate ingestible products to be used as a baked good such as a muffin, etc.). Furthermore, the receiving information baked electrical circuitry arrangement e1153 when activated will perform the operation o1153. In an implementation, the receiving information baked electrical circuitry arrangement e1153, when activated performs electronically receiving the user status information to at least in part electronically generate the one or more selection menus electronically identifying at least in part the one or more candidate ingestible products to be used as a baked good (e.g. an implementation of the receiver component s528 is configured to electronically receive the user status information and engage with the processor component s102 to at least in part electronically generate the one or more selection menus electronically identifying at least in part the one or more candidate ingestible products to be used as a baked good such as a muffin, etc.). In an implementation, the electronically receiving the user status information to at least in part electronically generate the one or more selection menus electronically identifying at least in part the one or more candidate ingestible products to be used as a baked good is carried out by electronically receiving the user status information to at least in part electronically generate the one or more selection menus electronically identifying at least in part the one or more candidate ingestible products to be used as a baked good (e.g. an implementation of the receiver component s528 is configured to electronically receive the user status information and engage with the processor component s102 to at least in part electronically generate the one or more selection menus electronically identifying at least in part the one or more candidate ingestible products to be used as a baked good such as a muffin, etc.).

In one or more implementations, operation o11 includes an operation o1154 for electronically receiving the user status information to at least in part electronically generate the one or more selection menus electronically identifying at least in part the one or more candidate ingestible products to be used as a deposited material. An exemplary version of a non-transitory signal bearing medium of information storage subsystem s200 is depicted as bearing one or more receiving information deposited instructions i1154 that when executed will direct performance of the operation o1154. In an implementation, the one or more receiving information deposited instructions i1154 when executed direct electronically receiving the user status information to at least in part electronically generate the one or more selection menus electronically identifying at least in part the one or more candidate ingestible products to be used as a deposited material (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used as a deposited material such as a multi-layered cake, etc.). Furthermore, the receiving information deposited electrical circuitry arrangement e1154 when activated will perform the operation o1154. In an implementation, the receiving information deposited electrical circuitry arrangement e1154, when activated performs electronically receiving the user status information to at least in part electronically generate the one or more selection menus electronically identifying at least in part the one or more candidate ingestible products to be used as a deposited material (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used as a deposited material such as a multi-layered cake, etc.). In an implementation, the electronically receiving the user status information to at least in part electronically generate the one or more selection menus electronically identifying at least in part the one or more candidate ingestible products to be used as a deposited material is carried out by electronically receiving the user status information to at least in part electronically generate the one or more selection menus electronically identifying at least in part the one or more candidate ingestible products to be used as a deposited material (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used as a deposited material such as a multi-layered cake, etc.).

Figure 51:
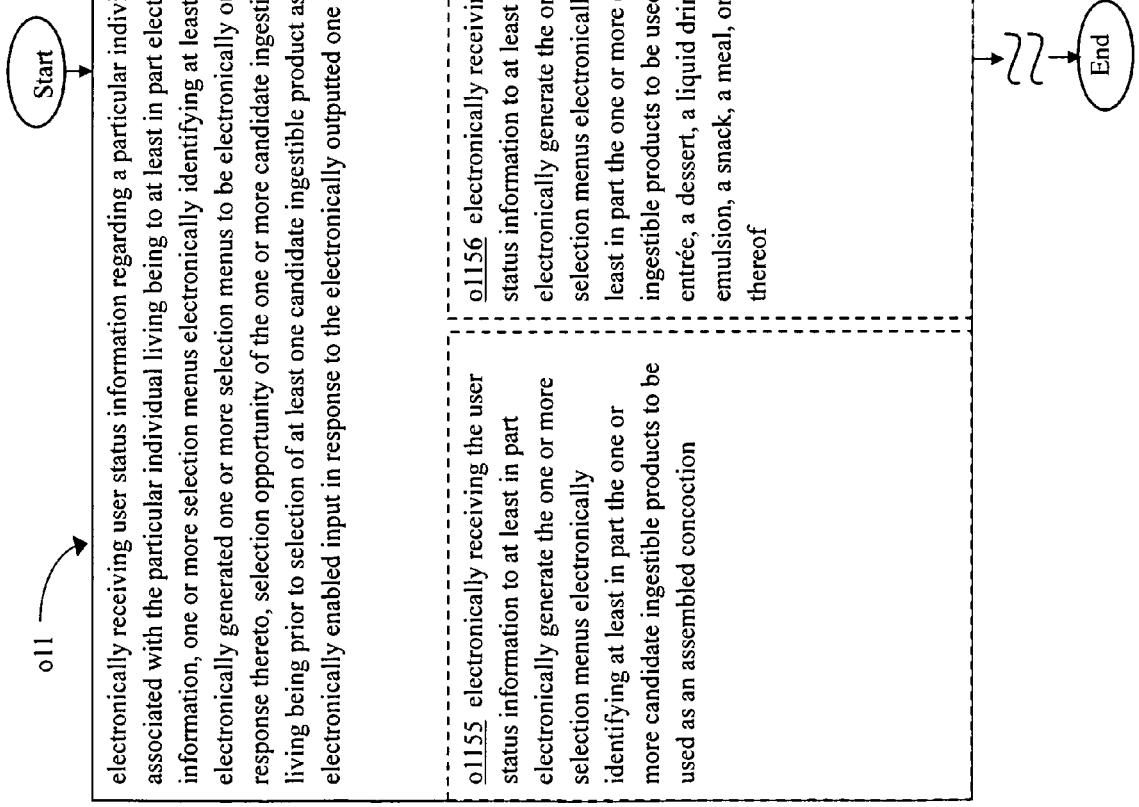
FIG. 51 is a high-level flowchart including exemplary implementations of operation O11 of FIG. 32.

In one or more implementations, as shown in FIG. 51, operation o11 includes an operation o1155 for electronically receiving the user status information to at least in part electronically generate the one or more selection menus electronically identifying at least in part the one or more candidate ingestible products to be used as an assembled concoction. An exemplary version of a non-transitory signal bearing medium of information storage subsystem s200 is depicted as bearing one or more receiving information assembled instructions i1155 that when executed will direct performance of the operation o1155. In an implementation, the one or more receiving information assembled instructions i1155 when executed direct electronically receiving the user status information to at least in part electronically generate the one or more selection menus electronically identifying at least in part the one or more candidate ingestible products to be used as an assembled concoction (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used as an assembled concoction such as a decorated confection, etc.). Furthermore, the receiving information assembled electrical circuitry arrangement e1155 when activated will perform the operation o1155. In an implementation, the receiving information assembled electrical circuitry arrangement e1155, when activated performs electronically receiving the user status information to at least in part electronically generate the one or more selection menus electronically identifying at least in part the one or more candidate ingestible products to be used as an assembled concoction (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used as an assembled concoction such as a decorated confection, etc.). In an implementation, the electronically receiving the user status information to at least in part electronically generate the one or more selection menus electronically identifying at least in part the one or more candidate ingestible products to be used as an assembled concoction is carried out by electronically receiving the user status information to at least in part electronically generate the one or more selection menus electronically identifying at least in part the one or more candidate ingestible products to be used as an assembled concoction (e.g. an implementation of the receiver component s528 is configured to electronically receive the user status information and engage with the processor component s102 to direct the material processing subsystem s700 to at least in part electronically generate the one or more selection menus electronically identifying at least in part the one or more candidate ingestible products to be used as an assembled concoction such as a decorated confection, etc.).

In one or more implementations, operation o11 includes an operation o1156 for electronically receiving the user status information to at least in part electronically generate the one or more selection menus electronically identifying at least in part the one or more candidate ingestible products to be used as a main entrée, a dessert, a liquid drink, an emulsion, a snack, a meal, or a combination thereof. An exemplary version of a non-transitory signal bearing medium of information storage subsystem s200 is depicted as bearing one or more receiving information uses instructions i1156 that when executed will direct performance of the operation o1156. In an implementation, the one or more receiving information uses instructions i1156 when executed direct electronically receiving the user status information to at least in part electronically generate the one or more selection menus electronically identifying at least in part the one or more candidate ingestible products to be used as a main entrée, a dessert, a liquid drink, an emulsion, a snack, a meal, or a combination thereof (e.g. an implementation of the receiver component s528 is configured to electronically receive the user status information and engage with the processor component s102 to at least in part electronically generate the one or more selection menus electronically identifying at least in part the one or more candidate ingestible products to be used as a as a main entrée, a dessert, a liquid drink, an emulsion, a snack, a meal, or a combination thereof such as a steak dinner, etc.). Furthermore, the receiving information uses electrical circuitry arrangement e1156 when activated will perform the operation o1156. In an implementation, the receiving information uses electrical circuitry arrangement e1156, when activated performs electronically receiving the user status information to at least in part electronically generate the one or more selection menus electronically identifying at least in part the one or more candidate ingestible products to be used as a main entrée, a dessert, a liquid drink, an emulsion, a snack, a meal, or a combination thereof (e.g. an implementation of the receiver component s528 is configured to electronically receive the user status information and engage with the processor component s102 to at least in part electronically generate the one or more selection menus electronically identifying at least in part the one or more candidate ingestible products to be used as a as a main entrée, a dessert, a liquid drink, an emulsion, a snack, a meal, or a combination thereof such as a steak dinner, etc.). In an implementation, the electronically receiving the user status information to at least in part electronically generate the one or more selection menus electronically identifying at least in part the one or more candidate ingestible products to be used as a main entrée, a dessert, a liquid drink, an emulsion, a snack, a meal, or a combination thereof is carried out by electronically receiving the user status information to at least in part electronically generate the one or more selection menus electronically identifying at least in part the one or more candidate ingestible products to be used as a main entrée, a dessert, a liquid drink, an emulsion, a snack, a meal, or a combination thereof (e.g. an implementation of the receiver component s528 is configured to electronically receive the user status information and engage with the processor component s102 to at least in part electronically generate the one or more selection menus electronically identifying at least in part the one or more candidate ingestible products to be used as a as a main entrée, a dessert, a liquid drink, an emulsion, a snack, a meal, or a combination thereof such as a steak dinner, etc.).

In one or more implementations, operation o11 includes an operation o1157 for electronically receiving the user status information to at least in part electronically generate the one or more selection menus electronically identifying at least in part the one or more candidate ingestible products to be used periodically. An exemplary version of a non-transitory signal bearing medium of information storage subsystem s200 is depicted as bearing one or more receiving information periods instructions i1157 that when executed will direct performance of the operation o1157. In an implementation, the one or more receiving information periods instructions i1157 when executed direct electronically receiving the user status information to at least in part electronically generate the one or more selection menus electronically identifying at least in part the one or more candidate ingestible products to be used periodically (e.g. an implementation of the receiver component s528 is configured to electronically receive the user status information and engage with the processor component s102 to at least in part electronically generate the one or more selection menus electronically identifying at least in part the one or more candidate ingestible products to be used periodically such as once a week, etc.). Furthermore, the receiving information periods electrical circuitry arrangement e1157 when activated will perform the operation o1157. In an implementation, the receiving information periods electrical circuitry arrangement e1157, when activated performs electronically receiving the user status information to at least in part electronically generate the one or more selection menus electronically identifying at least in part the one or more candidate ingestible products to be used periodically (e.g. an implementation of the receiver component s528 is configured to electronically receive the user status information and engage with the processor component s102 to at least in part electronically generate the one or more selection menus electronically identifying at least in part the one or more candidate ingestible products to be used periodically such as once a week, etc.). In an implementation, the electronically receiving the user status information to at least in part electronically generate the one or more selection menus electronically identifying at least in part the one or more candidate ingestible products to be used periodically is carried out by electronically receiving the user status information to at least in part electronically generate the one or more selection menus electronically identifying at least in part the one or more candidate ingestible products to be used periodically (e.g. an implementation of the receiver component s528 is configured to electronically receive the user status information and engage with the processor component s102 to at least in part electronically generate the one or more selection menus electronically identifying at least in part the one or more candidate ingestible products to be used periodically such as once a week, etc.).

Figure 52:
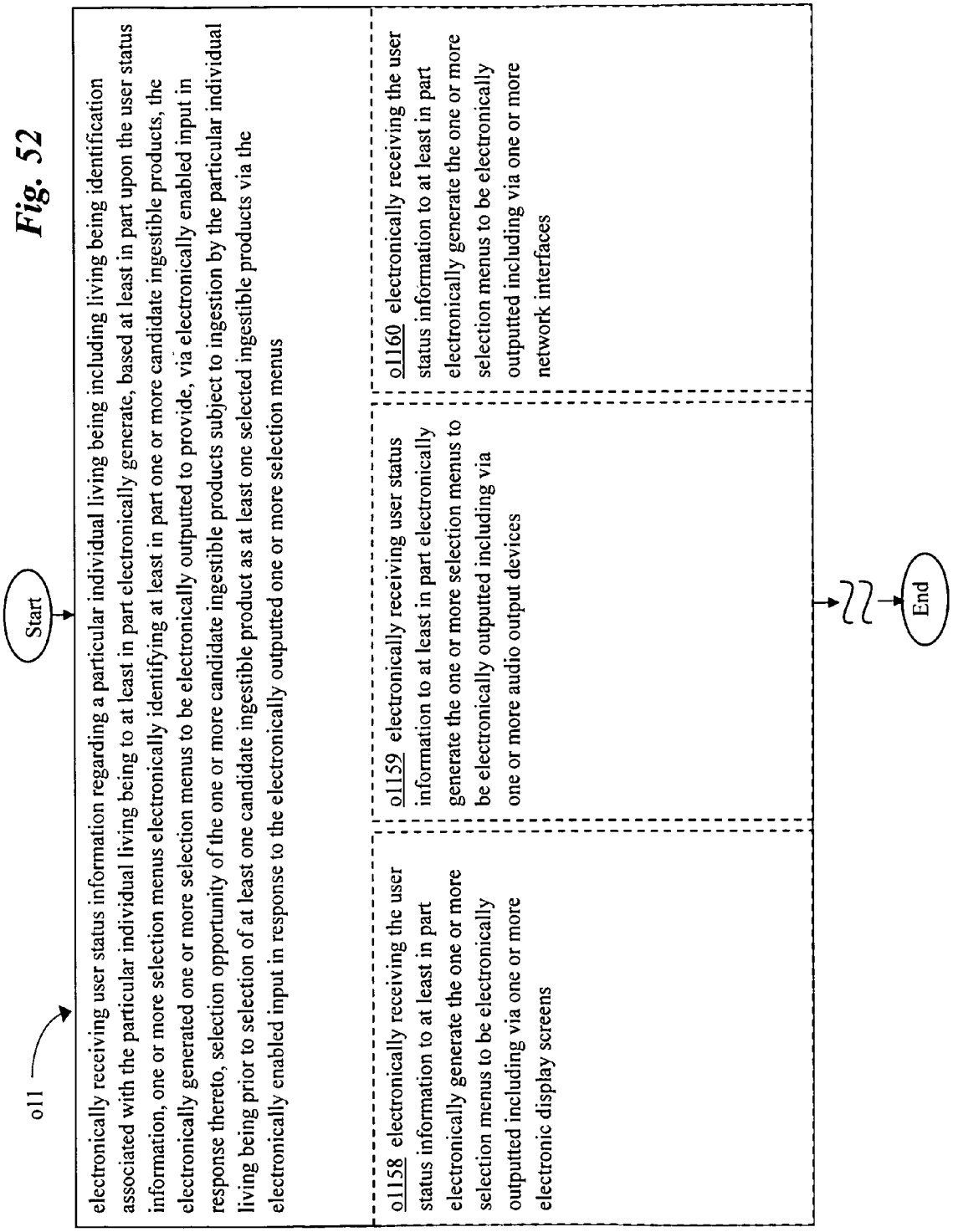
FIG. 52 is a high-level flowchart including exemplary implementations of operation O11 of FIG. 32.

In one or more implementations, as shown in FIG. 52, operation o11 includes an operation o1158 for electronically receiving the user status information to at least in part electronically generate the one or more selection menus to be electronically outputted including via one or more electronic display screens. An exemplary version of a non-transitory signal bearing medium of information storage subsystem s200 is depicted as bearing one or more receiving information display instructions i1158 that when executed will direct performance of the operation o1158. In an implementation, the one or more receiving information display instructions i1158 when executed direct electronically receiving the user status information to at least in part electronically generate the one or more selection menus to be electronically outputted including via one or more electronic display screens (e.g. an implementation of the receiver component s528 is configured to electronically receive the user status information in a format for the processor component s102 to at least in part electronically generate the one or more selection menus to be electronically outputted including via one or more display screens such as via graphical user interface (GUI) component s302, etc.). Furthermore, the receiving information display electrical circuitry arrangement e1158 when activated will perform the operation o1158. In an implementation, the receiving information display electrical circuitry arrangement e1158, when activated performs electronically receiving the user status information to at least in part electronically generate the one or more selection menus to be electronically outputted including via one or more electronic display screens (e.g. an implementation of the receiver component s528 is configured to electronically receive the user status information in a format for the processor component s102 to at least in part electronically generate the one or more selection menus to be electronically outputted including via one or more display screens such as via graphical user interface (GUI) component s302, etc.). In an implementation, the electronically receiving the user status information to at least in part electronically generate the one or more selection menus to be electronically outputted including via one or more electronic display screens is carried out by electronically receiving the user status information to at least in part electronically generate the one or more selection menus to be electronically outputted including via one or more electronic display screens (e.g. an implementation of the receiver component s528 is configured to electronically receive the user status information in a format for the processor component s102 to at least in part electronically generate the one or more selection menus to be electronically outputted including via one or more display screens such as via graphical user interface (GUI) component s302, etc.).

In one or more implementations, operation o11 includes an operation o1159 for electronically receiving user status information to at least in part electronically generate the one or more selection menus to be electronically outputted including via one or more audio output devices. An exemplary version of a non-transitory signal bearing medium of information storage subsystem s200 is depicted as bearing one or more receiving information audio instructions i1159 that when executed will direct performance of the operation o1159. In an implementation, the one or more receiving information audio instructions i1159 when executed direct electronically receiving the user status information to at least in part electronically generate the one or more selection menus to be electronically outputted including via one or more audio output devices (e.g. an implementation of the receiver component s528 is configured to electronically receive the user status information in a format for the processor component s102 to at least in part electronically generate the one or more selection menus to be electronically outputted including via one or more audio output devices such as via audio in/out component s328, etc.). Furthermore, the receiving information audio electrical circuitry arrangement e1159 when activated will perform the operation o1159. In an implementation, the receiving information audio electrical circuitry arrangement e1159, when activated performs electronically receiving the user status information to at least in part electronically generate the one or more selection menus to be electronically outputted including via one or more audio output devices (e.g. an implementation of the receiver component s528 is configured to electronically receive the user status information in a format for the processor component s102 to at least in part electronically generate the one or more selection menus to be electronically outputted including via one or more audio output devices such as via audio in/out component s328, etc.). In an implementation, the electronically receiving user status information to at least in part electronically generate the one or more selection menus to be electronically outputted including via one or more audio output devices is carried out by electronically receiving the user status information to at least in part electronically generate the one or more selection menus to be electronically outputted including via one or more audio output devices (e.g. an implementation of the receiver component s528 is configured to electronically receive the user status information in a format for the processor component s102 to at least in part electronically generate the one or more selection menus to be electronically outputted including via one or more audio output devices such as via audio in/out component s328, etc.).

In one or more implementations, operation o11 includes an operation o1160 for electronically receiving the user status information to at least in part electronically generate the one or more selection menus to be electronically outputted including via one or more network interfaces. An exemplary version of a non-transitory signal bearing medium of information storage subsystem s200 is depicted as bearing one or more receiving information network instructions i1160 that when executed will direct performance of the operation o1160. In an implementation, the one or more receiving information network instructions i1160 when executed direct electronically receiving the user status information to at least in part electronically generate the one or more selection menus to be electronically outputted including via one or more network interfaces (e.g. an implementation of the receiver component s528 is configured to electronically receive the user status information in a format for the processor component s102 to at least in part electronically generate the one or more selection menus to be electronically outputted including via one or more network interfaces such as via wide area network component s516, etc.). Furthermore, the receiving information network electrical circuitry arrangement e1160 when activated will perform the operation o1160. In an implementation, the receiving information network electrical circuitry arrangement e1160, when activated performs electronically receiving the user status information to at least in part electronically generate the one or more selection menus to be electronically outputted including via one or more network interfaces (e.g. an implementation of the receiver component s528 is configured to electronically receive the user status information in a format for the processor component s102 to at least in part electronically generate the one or more selection menus to be electronically outputted including via one or more network interfaces such as via wide area network component s516, etc.). In an implementation, the electronically receiving the user status information to at least in part electronically generate the one or more selection menus to be electronically outputted including via one or more network interfaces is carried out by electronically receiving the user status information to at least in part electronically generate the one or more selection menus to be electronically outputted including via one or more network interfaces (e.g. an implementation of the receiver component s528 is configured to electronically receive the user status information in a format for the processor component s102 to at least in part electronically generate the one or more selection menus to be electronically outputted including via one or more network interfaces such as via wide area network component s516, etc.).

Figure 53:
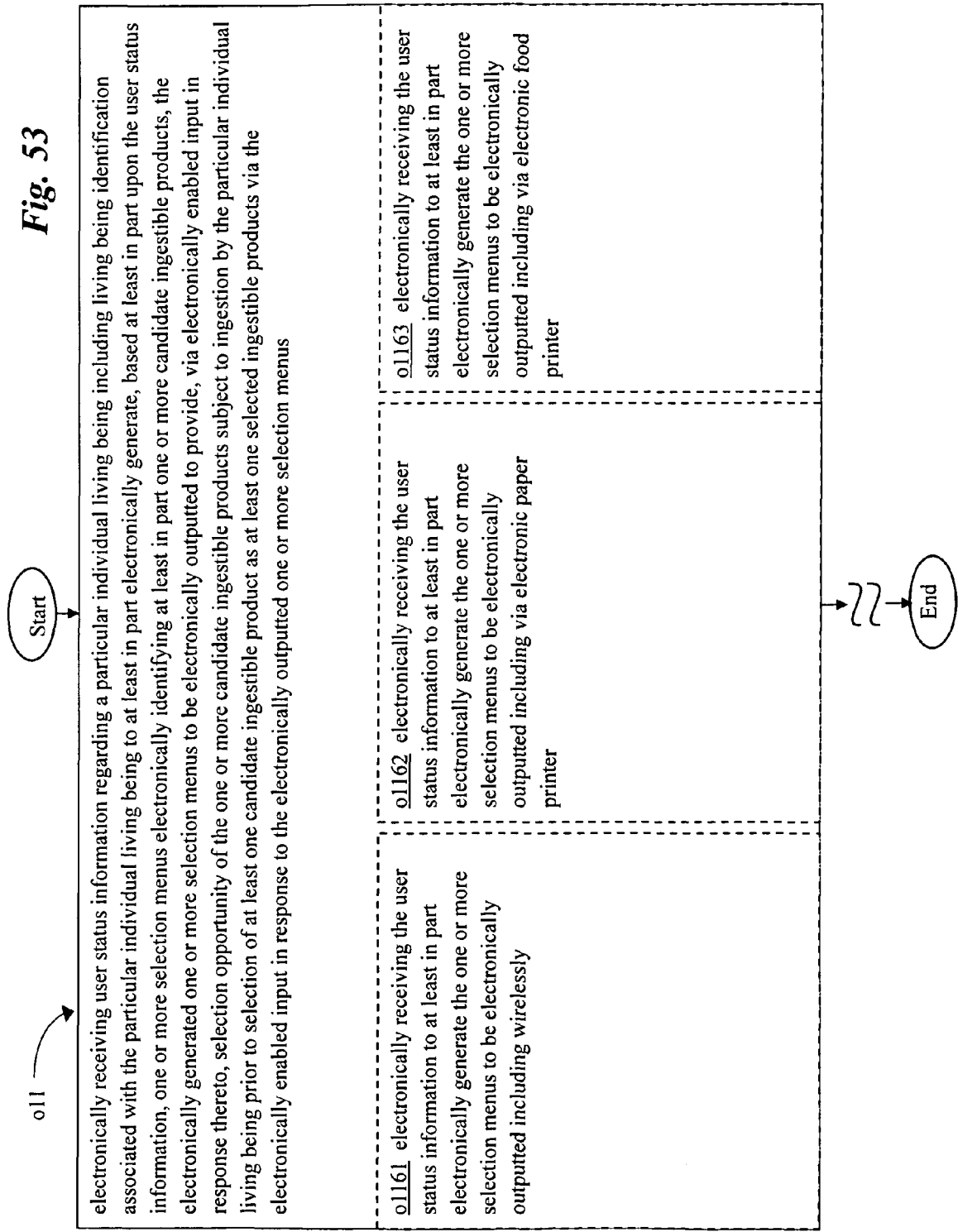
FIG. 53 is a high-level flowchart including exemplary implementations of operation O11 of FIG. 32.

In one or more implementations, as shown in FIG. 53, operation o11 includes an operation o1161 for electronically receiving the user status information to at least in part electronically generate the one or more selection menus to be electronically outputted including wirelessly. An exemplary version of a non-transitory signal bearing medium of information storage subsystem s200 is depicted as bearing one or more receiving information wirelessly instruction's i1161 that when executed will direct performance of the operation o1161. In an implementation, the one or more receiving information wirelessly instructions i1161 when executed direct electronically receiving the user status information to at least in part electronically generate the one or more selection menus to be electronically outputted including wirelessly (e.g. an implementation of the receiver component s528 is configured to electronically receive the user status information in a format for the processor component s102 to at least in part electronically generate the one or more selection menus to be electronically outputted including wirelessly such as via wireless network component s510, etc.). Furthermore, the receiving information wirelessly electrical circuitry arrangement e1161 when activated will perform the operation o1161. In an implementation, the receiving information wirelessly electrical circuitry arrangement e1161, when activated performs electronically receiving the user status information to at least in part electronically generate the one or more selection menus to be electronically outputted including wirelessly (e.g. an implementation of the receiver component s528 is configured to electronically receive the user status information in a format for the processor component s102 to at least in part electronically generate the one or more selection menus to be electronically outputted including wirelessly such as via wireless network component s510, etc.). In an implementation, the electronically receiving the user status information to at least in part electronically generate the one or more selection menus to be electronically outputted including wirelessly is carried out by electronically receiving the user status information to at least in part electronically generate the one or more selection menus to be electronically outputted including wirelessly (e.g. an implementation of the receiver component s528 is configured to electronically receive the user status information in a format for the processor component s102 to at least in part electronically generate the one or more selection menus to be electronically outputted including wirelessly such as via wireless network component s510, etc.).

In one or more implementations, operation o11 includes an operation o1162 for electronically receiving the user status information to at least in part electronically generate the one or more selection menus to be electronically outputted including via electronic paper printer. An exemplary version of a non-transitory signal bearing medium of information storage subsystem s200 is depicted as bearing one or more receiving information paper instructions i1162 that when executed will direct performance of the operation o1162. In an implementation, the one or more receiving information paper instructions i1162 when executed direct electronically receiving the user status information to at least in part electronically generate the one or more selection menus to be electronically outputted including via electronic paper printer (e.g. an implementation of the receiver component s528 is configured to electronically receive the user status information in a format for the processor component s102 to at least in part electronically generate the one or more selection menus to be electronically outputted including via electronic paper printer such as via scanner component s338, etc.). Furthermore, the receiving information paper electrical circuitry arrangement e1162 when activated will perform the operation o1162. In an implementation, the receiving information paper electrical circuitry arrangement e1162, when activated performs electronically receiving the user status information to at least in part electronically generate the one or more selection menus to be electronically outputted including via electronic paper printer (e.g. an implementation of the receiver component s528 is configured to electronically receive the user status information in a format for the processor component s102 to at least in part electronically generate the one or more selection menus to be electronically outputted including via electronic paper printer such as via scanner component s338, etc.). In an implementation, the electronically receiving the user status information to at least in part electronically generate the one or more selection menus to be electronically outputted including via electronic paper printer is carried out by electronically receiving the user status information to at least in part electronically generate the one or more selection menus to be electronically outputted including via electronic paper printer (e.g. an implementation of the receiver component s528 is configured to electronically receive the user status information in a format for the processor component s102 to at least in part electronically generate the one or more selection menus to be electronically outputted including via electronic paper printer such as via scanner component s338, etc.).

In one or more implementations, operation o11 includes an operation o1163 for electronically receiving the user status information to at least in part electronically generate the one or more selection menus to be electronically outputted including via electronic food printer. An exemplary version of a non-transitory signal bearing medium of information storage subsystem s200 is depicted as bearing one or more receiving information food instructions i1163 that when executed will direct performance of the operation o1163. In an implementation, the one or more receiving information food instructions i1163 when executed direct electronically receiving the user status information to at least in part electronically generate the one or more selection menus to be electronically outputted including via electronic food printer (e.g. an implementation of the receiver component s528 is configured to electronically receive the user status information in a format for the processor component s102 to at least in part electronically generate the one or more selection menus to be electronically outputted including via electronic food printer such as via deposition component s740, etc.). Furthermore, the receiving information food electrical circuitry arrangement e1163 when activated will perform the operation o1163. In an implementation, the receiving information food electrical circuitry arrangement e1163, when activated performs electronically receiving the user status information to at least in part electronically generate the one or more selection menus to be electronically outputted including via electronic food printer (e.g. an implementation of the receiver component s528 is configured to electronically receive the user status information in a format for the processor component s102 to at least in part electronically generate the one or more selection menus to be electronically outputted including via electronic food printer such as via deposition component s740, etc.). In an implementation, the electronically receiving the user status information to at least in part electronically generate the one or more selection menus to be electronically outputted including via electronic food printer is carried out by electronically receiving the user status information to at least in part electronically generate the one or more selection menus to be electronically outputted including via electronic food printer (e.g. an implementation of the receiver component s528 is configured to electronically receive the user status information in a format for the processor component s102 to at least in part electronically generate the one or more selection menus to be electronically outputted including via electronic food printer such as via deposition component s740, etc.).

Figure 54:
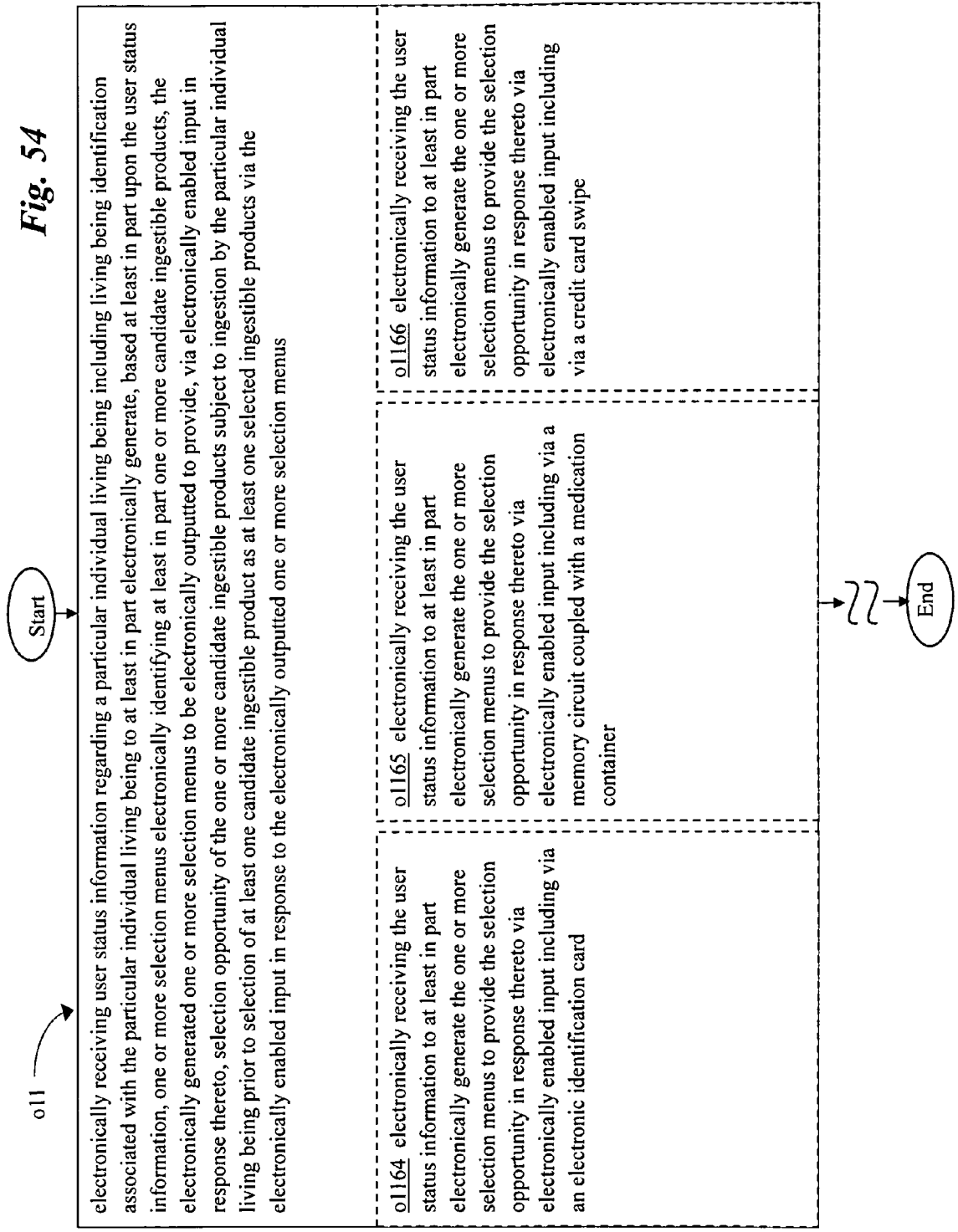
FIG. 54 is a high-level flowchart including exemplary implementations of operation O11 of FIG. 32.

In one or more implementations, as shown in FIG. 54, operation o11 includes an operation o1164 for electronically receiving the user status information to at least in part electronically generate the one or more selection menus to provide the selection opportunity in response thereto via electronically enabled input including via an electronic identification card. An exemplary version of a non-transitory signal bearing medium of information storage subsystem s200 is depicted as bearing one or more receiving information ID card instructions i1164 that when executed will direct performance of the operation o1164. In an implementation, the one or more receiving information ID card instructions i1164 when executed direct electronically receiving the user status information to at least in part electronically generate the one or more selection menus to provide the selection opportunity in response thereto via electronically enabled input including via an electronic identification card (e.g. an implementation of the receiver component s528 is configured to electronically engage with a card having memory storage holding the user status information to be used by the processor component s102 to generate the one or more selection menus, etc.). Furthermore, the receiving information ID card electrical circuitry arrangement e1164 when activated will perform the operation o1164. In an implementation, the receiving information ID card electrical circuitry arrangement e1164, when activated performs electronically receiving the user status information to at least in part electronically generate the one or more selection menus to provide the selection opportunity in response thereto via electronically enabled input including via an electronic identification card (e.g. an implementation of the receiver component s528 is configured to electronically engage with a card having memory storage holding the user status information to be used by the processor component s102 to generate the one or more selection menus, etc.). In an implementation, the electronically receiving the user status information to at least in part electronically generate the one or more selection menus to provide the selection opportunity in response thereto via electronically enabled input including via an electronic identification card is carried out by electronically receiving the user status information to at least in part electronically generate the one or more selection menus to provide the selection opportunity in response thereto via electronically enabled input including via an electronic identification card (e.g. an implementation of the receiver component s528 is configured to electronically engage with a card having memory storage holding the user status information to be used by the processor component s102 to generate the one or more selection menus, etc.).

In one or more implementations, operation o11 includes an operation o1165 for electronically receiving the user status information to at least in part electronically generate the one or more selection menus to provide the selection opportunity in response thereto via electronically enabled input including via a memory circuit coupled with a medication container. A non-transitory signal bearing medium includes one or more receiving information container instructions i1165 that when executed will direct performance of the operation o1165. In an implementation, the one or more receiving information container instructions i1165 when executed direct electronically receiving the user status information to at least in part electronically generate the one or more selection menus to provide the selection opportunity in response thereto via electronically enabled input including via in a memory circuit coupled with a medication container (e.g. an implementation of the receiver component s528 is configured to electronically engage with a memory storage coupled with a medication container to receive the electronically enabled input in electronic form to be used by the processor component s102 to generate the one or more selection menus, etc.). Furthermore, the receiving information container electrical circuitry arrangement e1165 when activated will perform the operation o1165. In an implementation, the receiving information container electrical circuitry arrangement e1165, when activated performs electronically receiving the user status information to at least in part electronically generate the one or more selection menus to provide the selection opportunity in response thereto via electronically enabled input including via in a memory circuit coupled with a medication container (e.g. an implementation of the receiver component s528 is configured to electronically engage with a memory storage coupled with a medication container to receive the electronically enabled input in electronic form to be used by the processor component s102 to generate the one or more selection menus, etc.). In an implementation, the electronically receiving the user status information to at least in part electronically generate the one or more selection menus to provide the selection opportunity in response thereto via electronically enabled input including via a memory circuit coupled with a medication container is carried out by electronically receiving the user status information to at least in part electronically generate the one or more selection menus to provide the selection opportunity in response thereto via electronically enabled input including via in a memory circuit coupled with a medication container (e.g. an implementation of the receiver component s528 is configured to electronically engage with a memory storage coupled with a medication container to receive the electronically enabled input in electronic form to be used by the processor component s102 to generate the one or more selection menus, etc.).

In one or more implementations, operation o11 includes an operation o1166 for electronically receiving the user status information to at least in part electronically generate the one or more selection menus to provide the selection opportunity in response thereto via electronically enabled input including via a credit card swipe. A non-transitory signal bearing medium includes one or more receiving information credit card instructions i1166 that when executed will direct performance of the operation o1166. In an implementation, the one or more receiving information credit card instructions i1166 when executed direct electronically receiving the user status information to at least in part electronically generate the one or more selection menus to provide the selection opportunity in response thereto via electronically enabled input including via a credit card swipe (e.g. an implementation of the receiver component s528 is configured to electronically engage with an electronic memory stripe integrated into a credit card to receive the electronically enabled input to be used by the processor component s102 to generate the one or more selection menus, etc.). Furthermore, the receiving information credit card electrical circuitry arrangement e1166 when activated will perform the operation o1166. In an implementation, the receiving information credit card electrical circuitry arrangement e1166, when activated performs electronically receiving the user status information to at least in part electronically generate the one or more selection menus to provide the selection opportunity in response thereto via electronically enabled input including via a credit card swipe (e.g. an implementation of the receiver component s528 is configured to electronically engage with an electronic memory stripe integrated into a credit card to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via a credit card swipe is carried out by electronically receiving the user status information to at least in part electronically generate the one or more selection menus to provide the selection opportunity in response thereto via electronically enabled input including via a credit card swipe (e.g. an implementation of the receiver component s528 is configured to electronically engage with an electronic memory stripe integrated into a credit card to receive the electronically enabled input to be used by the processor component s102 to generate the one or more selection menus, etc.).

Figure 55:
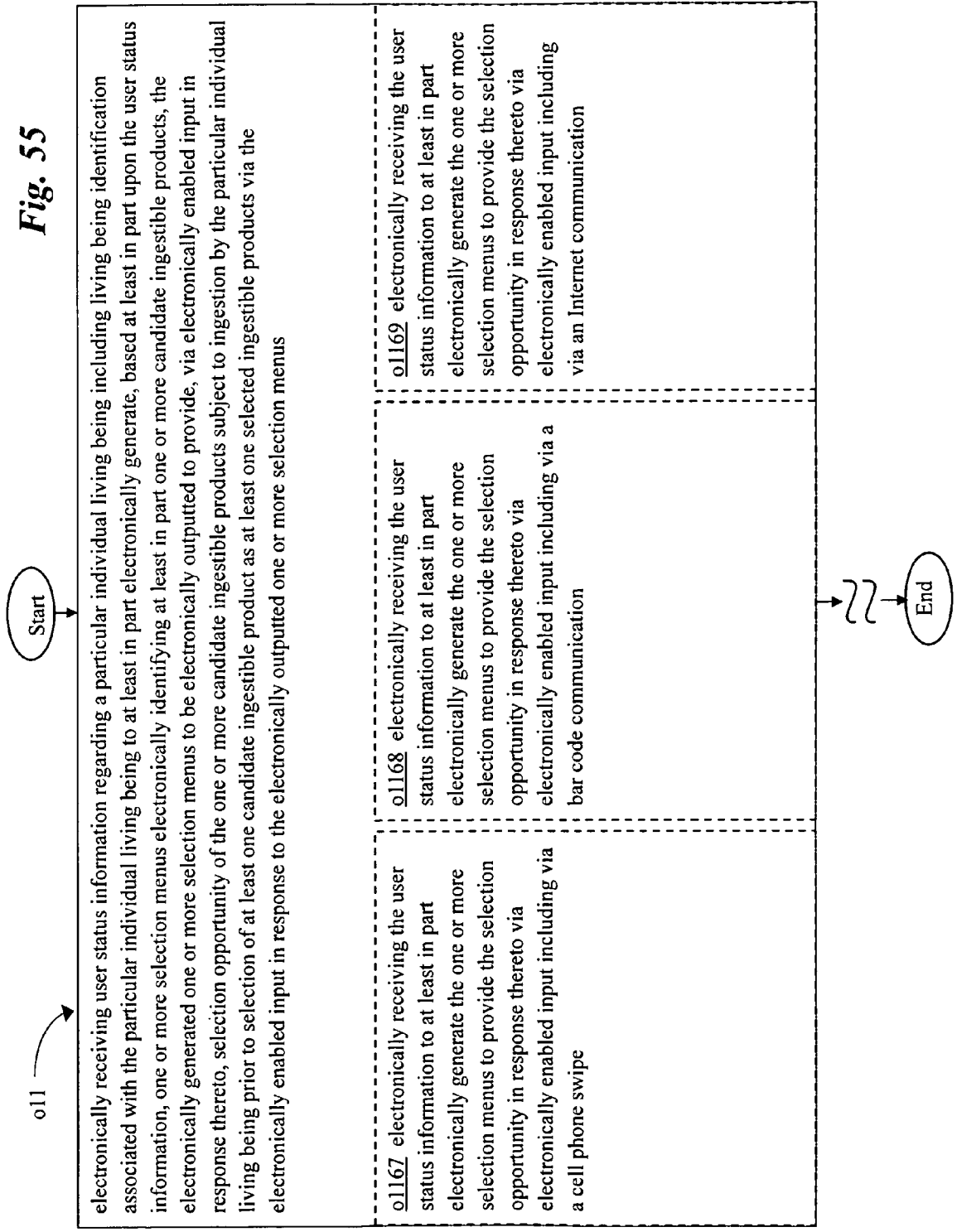
FIG. 55 is a high-level flowchart including exemplary implementations of operation O11 of FIG. 32.

In one or more implementations, as shown in FIG. 55, operation o11 includes an operation o1167 for electronically receiving the user status information to at least in part electronically generate the one or more selection menus to provide the selection opportunity in response thereto via electronically enabled input including via a cell phone swipe. An exemplary version of a non-transitory signal bearing medium of information storage subsystem s200 is depicted as bearing one or more receiving information cell phone instructions i1167 that when executed will direct performance of the operation o1167. In an implementation, the one or more receiving information cell phone instructions i1167 when executed direct electronically receiving the user status information to at least in part electronically generate the one or more selection menus to provide the selection opportunity in response thereto via electronically enabled input including via cell phone swipe (e.g. an implementation of the receiver component s528 is configured to electronically engage with an electronic memory component integrated into a cell phone to receive the electronically enabled input to be used by the processor component s102 to generate the one or more selection menus, etc.). Furthermore, the receiving information cell phone electrical circuitry arrangement e1167 when activated will perform the operation o1167. In an implementation, the receiving information cell phone electrical circuitry arrangement e1167, when activated performs electronically receiving the user status information to at least in part electronically generate the one or more selection menus to provide the selection opportunity in response thereto via electronically enabled input including via cell phone swipe (e.g. an implementation of the receiver component s528 is configured to electronically engage with an electronic memory component integrated into a cell phone to receive the electronically enabled input to be used by the processor component s102 to generate the one or more selection menus, etc.).

In one or more implementations, operation o11 includes an operation o1168 for electronically receiving the user status information to at least in part electronically generate the one or more selection menus to provide the selection opportunity in response thereto via electronically enabled input including via a bar code communication. A non-transitory signal bearing medium includes one or more receiving information bar code instructions i1168 that when executed will direct performance of the operation o1168. In an implementation, the one or more receiving information bar code instructions i1168 when executed direct electronically receiving the user status information to at least in part electronically generate the one or more selection menus to provide the selection opportunity in response thereto via electronically enabled input including via bar code communication (e.g. an implementation of the receiver component s528 is configured to electronically read a bar code label to receive the electronically enabled input to be used by the processor component s102 to generate the one or more selection menus, etc.). Furthermore, the receiving information bar code electrical circuitry arrangement e1168 when activated will perform the operation o1168. In an implementation, the receiving information bar code electrical circuitry arrangement e1168, when activated performs electronically receiving the user status information to at least in part electronically generate the one or more selection menus to provide the selection opportunity in response thereto via electronically enabled input including via bar code communication (e.g. an implementation of the receiver component s528 is configured to electronically read a bar code label to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via bar code communication is carried out by electronically receiving the user status information to at least in part electronically generate the one or more selection menus to provide the selection opportunity in response thereto via electronically enabled input including via bar code communication (e.g. an implementation of the receiver component s528 is configured to electronically read a bar code label to receive the electronically enabled input to be used by the processor component s102 to generate the one or more selection menus, etc.).

In one or more implementations, operation o11 includes an operation o1169 for electronically receiving the user status information to at least in part electronically generate the one or more selection menus to provide the selection opportunity in response thereto via electronically enabled input including via an Internet communication. A non-transitory signal bearing medium includes one or more receiving information Internet instructions i1169 that when executed will direct performance of the operation o1169. In an implementation, the one or more receiving information Internet instructions i1169 when executed direct electronically receiving the user status information to at least in part electronically generate the one or more selection menus to provide the selection opportunity in response thereto via electronically enabled input including via Internet communication (e.g. an implementation of the receiver component s528 is configured to electronically receive through the internet network component s508 the user status information to be used by the processor component s102 to generate the one or more selection menus, etc.). Furthermore, the receiving information Internet electrical circuitry arrangement e1169 when activated will perform the operation o1169. In an implementation, the receiving information Internet electrical circuitry arrangement e1169, when activated performs electronically receiving the user status information to at least in part electronically generate the one or more selection menus to provide the selection opportunity in response thereto via electronically enabled input including via Internet communication (e.g. an implementation of the receiver component s528 is configured to electronically receive through the internet network component s508 the user status information to be used by the processor component s102 to generate the one or more selection menus, etc.). In an implementation, the electronically receiving the user status information to at least in part electronically generate the one or more selection menus to provide the selection opportunity in response thereto via electronically enabled input including via an Internet communication is carried out by electronically receiving the user status information to at least in part electronically generate the one or more selection menus to provide the selection opportunity in response thereto via electronically enabled input including via Internet communication (e.g. an implementation of the receiver component s528 is configured to electronically receive through the internet network component s508 the user status information to be used by the processing component s102 to generate the one or more selection menus, etc.).

Figure 56:
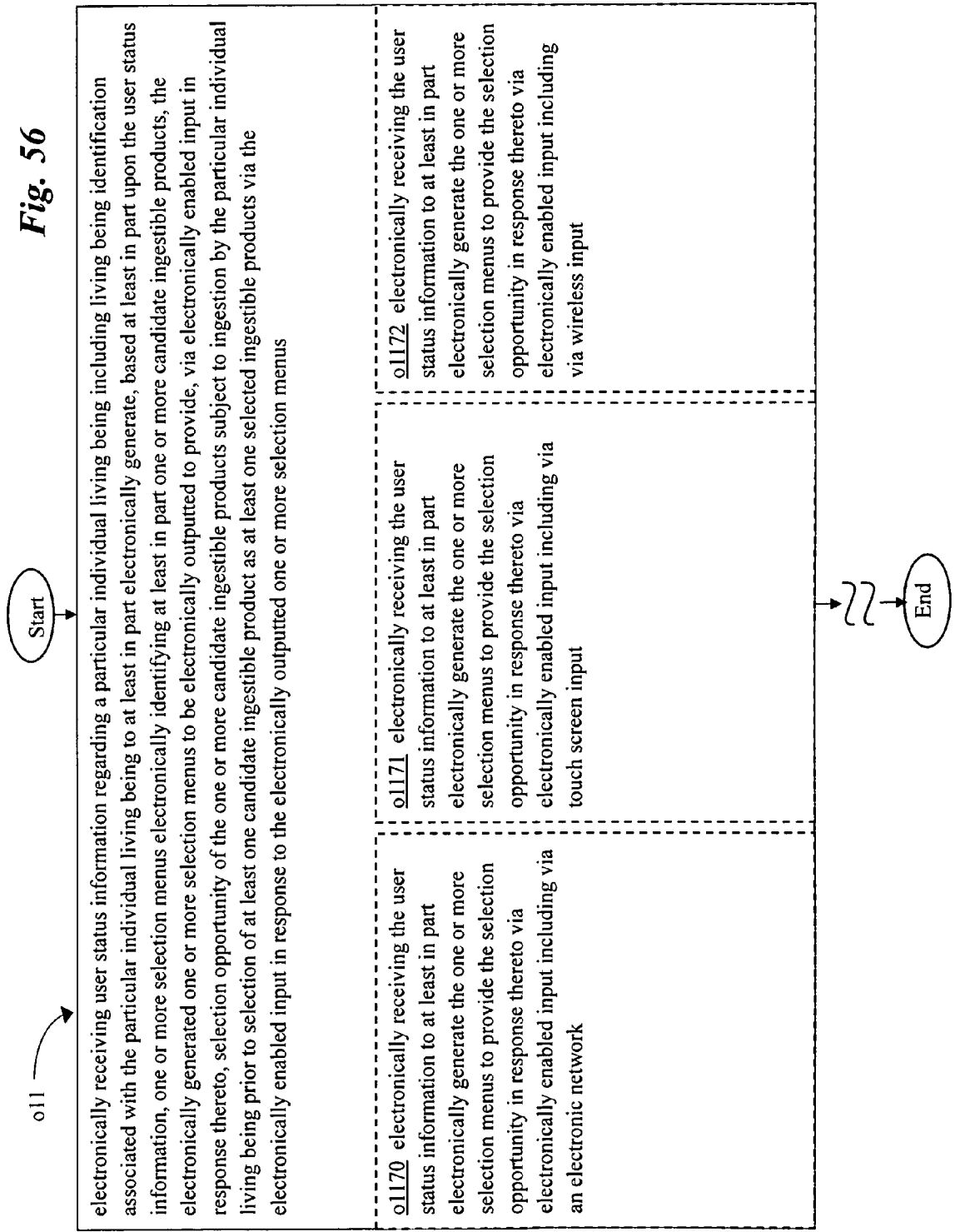
FIG. 56 is a high-level flowchart including exemplary implementations of operation O11 of FIG. 32.

In one or more implementations, as shown in FIG. 56, operation o11 includes an operation o1170 for electronically receiving the user status information to at least in part electronically generate the one or more selection menus to provide the selection opportunity in response thereto via electronically enabled input including via an electronic network. An exemplary version of a non-transitory signal bearing medium of information storage subsystem s200 is depicted as bearing one or more receiving information network instructions i1170 that when executed will direct performance of the operation o1170. In an implementation, the one or more receiving information network instructions i1170 when executed direct electronically receiving the user status information to at least in part electronically generate the one or more selection menus to provide the selection opportunity in response thereto via electronically enabled input including via an electronic network (e.g. an implementation of the receiver component s528 is configured to electronically engage with the network cable component s502 to receive the electronically enabled input to be used by the processor component s102 to generate the one or more selection menus, etc.). Furthermore, the receiving information network electrical circuitry arrangement e1170 when activated will perform the operation o1170. In an implementation, the receiving information network electrical circuitry arrangement e1170, when activated performs electronically receiving the user status information to at least in part electronically generate the one or more selection menus to provide the selection opportunity in response thereto via electronically enabled input including via an electronic network (e.g. an implementation of the receiver component s528 is configured to electronically engage with the network cable component s502 to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via an electronic network is carried out by electronically receiving the user status information to at least in part electronically generate the one or more selection menus to provide the selection opportunity in response thereto via electronically enabled input including via an electronic network (e.g. an implementation of the receiver component s528 is configured to electronically engage with the network cable component s502 to receive the electronically enabled input to be used by the processor component s102 to generate the one or more selection menus, etc.).

In one or more implementations, operation o11 includes an operation o1171 for electronically receiving the user status information to at least in part electronically generate the one or more selection menus to provide the selection opportunity in response thereto via electronically enabled input including via touch screen input. A non-transitory signal bearing medium includes one or more receiving information touch screen instructions i1171 that when executed will direct performance of the operation o1171. In an implementation, the one or more receiving information touch screen instructions i1171 when executed direct electronically receiving the user status information to at least in part electronically generate the one or more selection menus to provide the selection opportunity in response thereto via electronically enabled input including via touch screen input (e.g. an implementation of the receiver component s528 is configured to electronically receive through the touch screen component s314 the user status information to be used by the processor component s102 to generate the one or more selection menus, etc.). Furthermore, the receiving information touch screen electrical circuitry arrangement e1171 when activated will perform the operation o1171. In an implementation, the receiving information touch screen electrical circuitry arrangement e1171, when activated performs electronically receiving the user status information to at least in part electronically generate the one or more selection menus to provide the selection opportunity in response thereto via electronically enabled input including via touch screen input (e.g. an implementation of the receiver component s528 is configured to electronically receive through the touch screen component s314 the user status information to be used by the processor component s102 to generate the one or more selection menus, etc.). In an implementation, the electronically receiving the user status information to at least in part electronically generate the one or more selection menus to provide the selection opportunity in response thereto via electronically enabled input including via touch screen input is carried out by electronically receiving the user status information to at least in part electronically generate the one or more selection menus to provide the selection opportunity in response thereto via electronically enabled input including via touch screen input (e.g. an implementation of the receiver component s528 is configured to electronically receive through the touch screen component s314 the user status information to be used by the processor component s102 to generate the one or more selection menus, etc.).

In one or more implementations, operation o11 includes an operation o1172 for electronically receiving the user status information to at least in part electronically generate the one or more selection menus to provide the selection opportunity in response thereto via electronically enabled input including via wireless input. A non-transitory signal bearing medium includes one or more receiving information wireless instructions i1172 that when executed will direct performance of the operation o1172. In an implementation, the one or more receiving information wireless instructions i1172 when executed direct electronically receiving the user status information to at least in part electronically generate the one or more selection menus to provide the selection opportunity in response thereto via electronically enabled input including via wireless input (e.g. an implementation of the receiver component s528 is configured to electronically receive through the wireless network component s510 to receive the electronically enabled input to be used by the processor component s102 to generate the one or more selection menus, etc.). Furthermore, the receiving information wireless electrical circuitry arrangement e1172 when activated will perform the operation o1172. In an implementation, the receiving information wireless electrical circuitry arrangement e1172, when activated performs electronically receiving the user status information to at least in part electronically generate the one or more selection menus to provide the selection opportunity in response thereto via electronically enabled input including via wireless input (e.g. an implementation of the receiver component s528 is configured to electronically receive through the wireless network component s510 to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via wireless input is carried out by electronically receiving the user status information to at least in part electronically generate the one or more selection menus to provide the selection opportunity in response thereto via electronically enabled input including via wireless input (e.g. an implementation of the receiver component s528 is configured to electronically receive through the wireless network component s510 to receive the electronically enabled input to be used by the processor component s102 to generate the one or more selection menus, etc.).

Figure 57:
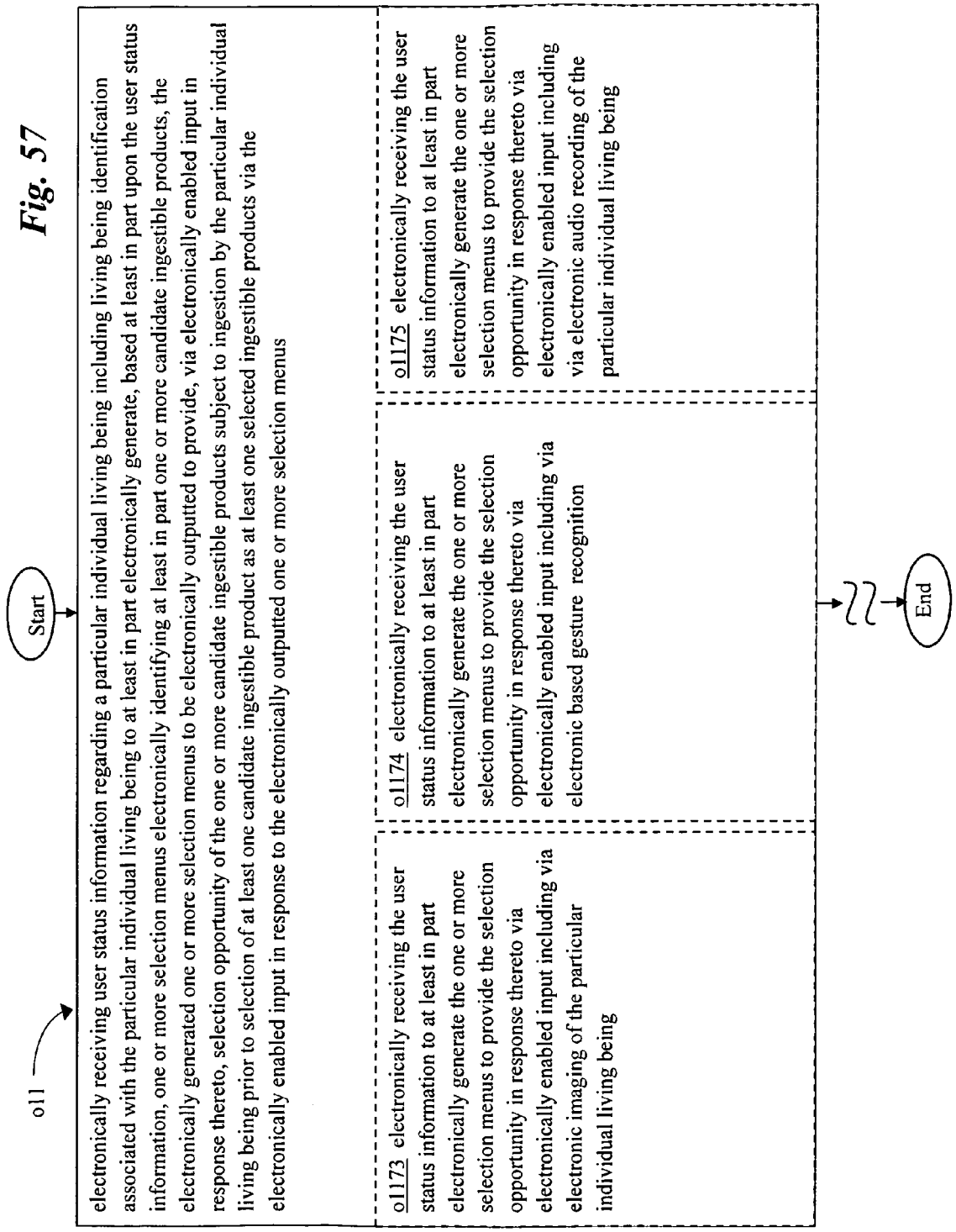
FIG. 57 is a high-level flowchart including exemplary implementations of operation O11 of FIG. 32.

In one or more implementations, as shown in FIG. 57, operation o11 includes an operation o1173 for electronically receiving the user status information to at least in part electronically generate the one or more selection menus to provide the selection opportunity in response thereto via electronically enabled input including via electronic imaging of the particular individual living being. An exemplary version of a non-transitory signal bearing medium of information storage subsystem s200 is depicted as bearing one or more receiving information imaging instructions i1173 that when executed will direct performance of the operation o1173. In an implementation, the one or more receiving information imaging instructions i1173 when executed direct electronically receiving the user status information to at least in part electronically generate the one or more selection menus to provide the selection opportunity in response thereto via electronically enabled input including via electronic imaging of the particular individual living being (e.g. an implementation of the receiver component s528 is configured to electronically receive through the camera component s336 the user status information to be used by the processor component s102 to generate the one or more selection menus, etc.). Furthermore, the receiving information imaging electrical circuitry arrangement e1173 when activated will perform the operation o1173. In an implementation, the receiving information imaging electrical circuitry arrangement e1173, when activated performs electronically receiving the user status information to at least in part electronically generate the one or more selection menus to provide the selection opportunity in response thereto via electronically enabled input including via electronic imaging of the particular individual living being (e.g. an implementation of the receiver component s528 is configured to electronically receive through the camera component s336 the user status information to be used by the processor component s102 to generate the one or more selection menus, etc.). In an implementation, the electronically receiving the user status information to at least in part electronically generate the one or more selection menus to provide the selection opportunity in response thereto via electronically enabled input including via electronic imaging of the particular individual living being is carried out by electronically receiving the user status information to at least in part electronically generate the one or more selection menus to provide the selection opportunity in response thereto via electronically enabled input including via electronic imaging of the particular individual living being (e.g. an implementation of the receiver component s528 is configured to electronically receive through the camera component s336 the user status information to be used by the processor component s102 to generate the one or more selection menus, etc.).

In one or more implementations, operation o11 includes an operation o1174 for electronically receiving the user status information to at least in part electronically generate the one or more selection menus to provide the selection opportunity in response thereto via electronically enabled input including via electronic based gesture recognition. A non-transitory signal bearing medium includes one or more receiving information gesture instructions i1174 that when executed will direct performance of the operation o1174. In an implementation, the one or more receiving information gesture instructions i1174 when executed direct electronically receiving the user status information to at least in part electronically generate the one or more selection menus to provide the selection opportunity in response thereto via electronically enabled input including via electronic based gesture recognition (e.g. an implementation of the receiver component s528 is configured to electronically engage with the optical sensing component s418 to receive the electronically enabled input as inputted by a user to be used by the processor component s102 to generate the one or more selection menus, etc.). Furthermore, the receiving information gesture electrical circuitry arrangement e1174 when activated will perform the operation o1174. In an implementation, the receiving information gesture electrical circuitry arrangement e1174, when activated performs electronically receiving the user status information to at least in part electronically generate the one or more selection menus to provide the selection opportunity in response thereto via electronically enabled input including via electronic based gesture recognition (e.g. an implementation of the receiver component s528 is configured to electronically engage with the optical sensing component s418 to receive the electronically enabled input as inputted by a user to be used by the processor component s102 to generate the one or more selection menus, etc.). In an implementation, the electronically receiving the user status information to at least in part electronically generate the one or more selection menus to provide the selection opportunity in response thereto via electronically enabled input including via electronic based gesture recognition is carried out by electronically receiving the user status information to at least in part electronically generate the one or more selection menus to provide the selection opportunity in response thereto via electronically enabled input including via electronic based gesture recognition (e.g. an implementation of the receiver component s528 is configured to electronically engage with the optical sensing component s418 to receive the electronically enabled input as inputted by a user to be used by the processor component s102 to generate the one or more selection menus, etc.).

In one or more implementations, operation o11 includes an operation o1175 for electronically receiving the user status information to at least in part electronically generate the one or more selection menus to provide the selection opportunity in response thereto via electronically enabled input including via electronic audio recording of the particular individual living being. A non-transitory signal bearing medium includes one or more receiving information audio instructions i1175 that when executed will direct performance of the operation o1175. In an implementation, the one or more receiving information audio instructions i1175 when executed direct electronically receiving the user status information to at least in part electronically generate the one or more selection menus to provide the selection opportunity in response thereto via electronically enabled input including via an electronic audio recording of the particular individual living being (e.g. an implementation of the receiver component s528 is configured to electronically engage with the sound sensing component s420 to receive the electronically enabled input to be used by the processor component s102 to generate the one or more selection menus, etc.). Furthermore, the receiving information audio electrical circuitry arrangement e1175 when activated will perform the operation o1175. In an implementation, the receiving information audio electrical circuitry arrangement e1175, when activated performs electronically receiving the user status information to at least in part electronically generate the one or more selection menus to provide the selection opportunity in response thereto via electronically enabled input including via an electronic audio recording of the particular individual living being (e.g. an implementation of the receiver component s528 is configured to electronically engage with the sound sensing component s420 to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via electronic audio recording of the particular individual living being is carried out by electronically receiving the user status information to at least in part electronically generate the one or more selection menus to provide the selection opportunity in response thereto via electronically enabled input including via an electronic audio recording of the particular individual living being (e.g. an implementation of the receiver component s528 is configured to electronically engage with the sound sensing component s420 to receive the electronically enabled input to be used by the processor component s102 to generate the one or more selection menus, etc.).

Figure 58:
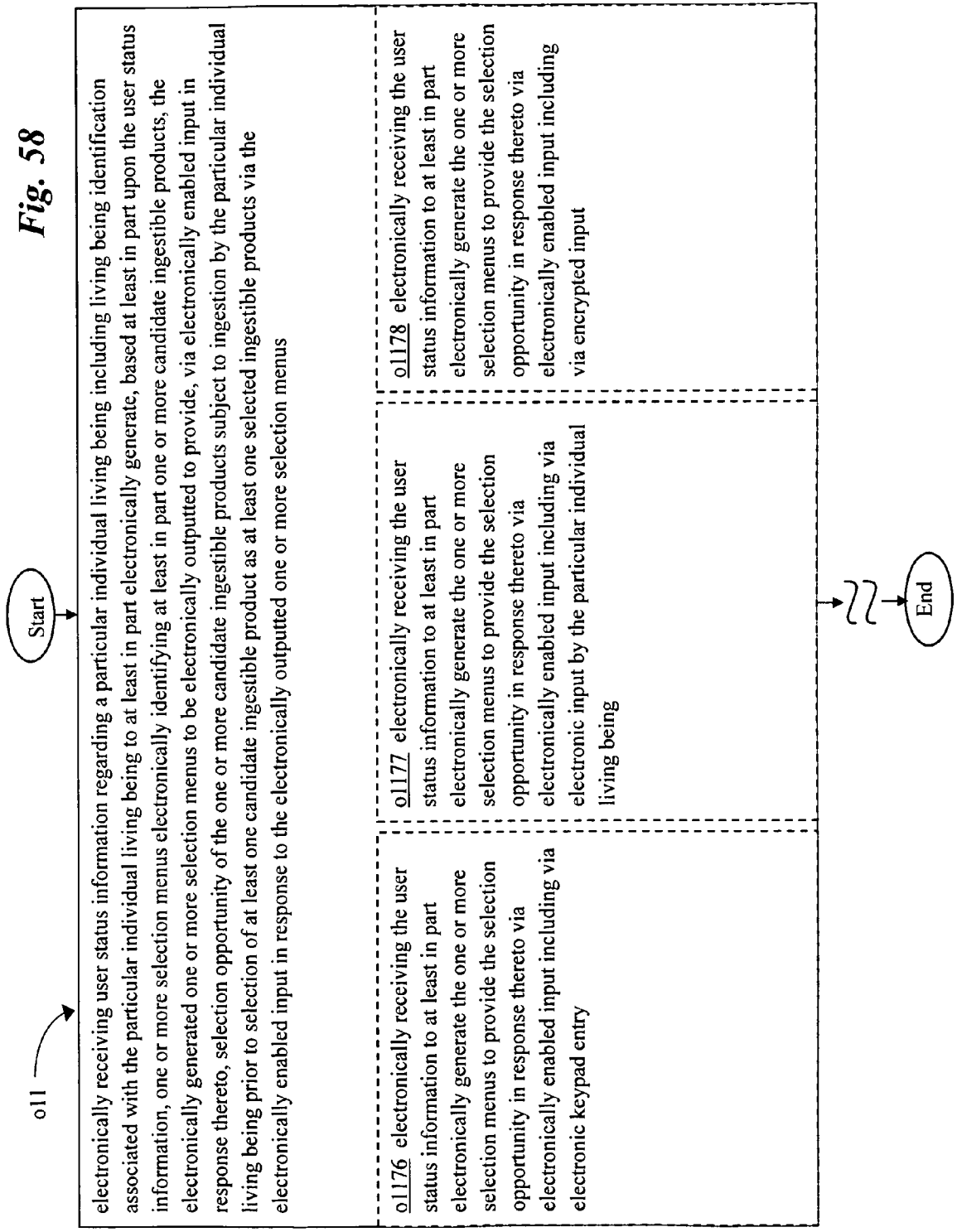
FIG. 58 is a high-level flowchart including exemplary implementations of operation O11 of FIG. 32.

In one or more implementations, as shown in FIG. 58, operation o11 includes an operation o1176 for electronically receiving the user status information to at least in part electronically generate the one or more selection menus to provide the selection opportunity in response thereto via electronically enabled input including via electronic keypad entry. An exemplary version of a non-transitory signal bearing medium of information storage subsystem s200 is depicted as bearing one or more receiving information keypad instructions i1176 that when executed will direct performance of the operation o1176. In an implementation, the one or more receiving information keypad instructions i1176 when executed direct electronically receiving the user status information to at least in part electronically generate the one or more selection menus to provide the selection opportunity in response thereto via electronically enabled input including via electronic keypad entry (e.g. an implementation of the receiver component s528 is configured to electronically engage with the keypad component s308 to receive the electronically enabled input to be used by the processor component s102 to generate the one or more selection menus, etc.). Furthermore, the receiving information keypad electrical circuitry arrangement e1176 when activated will perform the operation o1176. In an implementation, the receiving information keypad electrical circuitry arrangement e1176, when activated performs electronically receiving the user status information to at least in part electronically generate the one or more selection menus to provide the selection opportunity in response thereto via electronically enabled input including via electronic keypad entry (e.g. an implementation of the receiver component s528 is configured to electronically engage with the keypad component s308 to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via electronic keypad entry is carried out by electronically receiving the user status information to at least in part electronically generate the one or more selection menus to provide the selection opportunity in response thereto via electronically enabled input including via electronic keypad entry (e.g. an implementation of the receiver component s528 is configured to electronically engage with the keypad component s308 to receive the electronically enabled input to be used by the processor component s102 to generate the one or more selection menus, etc.).

In one or more implementations, operation o11 includes an operation o1177 for electronically receiving the user status information to at least in part electronically generate the one or more selection menus to provide the selection opportunity in response thereto via electronically enabled input including via electronic input by the particular individual living being. A non-transitory signal bearing medium includes one or more receiving information input instructions i1177 that when executed will direct performance of the operation o1177. In an implementation, the one or more receiving information input instructions i1177 when executed direct electronically receiving the user status information to at least in part electronically generate the one or more selection menus to provide the selection opportunity in response thereto via electronically enabled input including via an electronic input (e.g. an implementation of the receiver component s528 is configured to electronically engage with the electromagnetic sensing component s402 to receive the electronically enabled input to be used by the processor component s102 to generate the one or more selection menus, etc.). Furthermore, the receiving information input electrical circuitry arrangement e1177 when activated will perform the operation o1177. In an implementation, the receiving information input electrical circuitry arrangement e1177, when activated performs electronically receiving the user status information to at least in part electronically generate the one or more selection menus to provide the selection opportunity in response thereto via electronically enabled input including via an electronic input (e.g. an implementation of the receiver component s528 is configured to electronically engage with the electromagnetic sensing component s402 to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via electronic input by the particular individual living being is carried out by electronically receiving the user status information to at least in part electronically generate the one or more selection menus to provide the selection opportunity in response thereto via electronically enabled input including via an electronic input (e.g. an implementation of the receiver component s528 is configured to electronically engage with the electromagnetic sensing component s402 to receive the electronically enabled input to be used by the processor component s102 to generate the one or more selection menus, etc.).

In one or more implementations, operation o11 includes an operation o1178 for electronically receiving the user status information to at least in part electronically generate the one or more selection menus to provide the selection opportunity in response thereto via electronically enabled input including via encrypted input. A non-transitory signal bearing medium includes one or more receiving information encrypted instructions i1178 that when executed will direct performance of the operation o1178. In an implementation, the one or more receiving information encrypted instructions i1178 when executed direct electronically receiving the user status information to at least in part electronically generate the one or more selection menus to provide the selection opportunity in response thereto via electronically enabled input including via encrypted input (e.g. an implementation of the receiver component s528 is configured to electronically engage with the encrypted communication component s520 to receive the electronically enabled input to be used by the processor component s102 to generate the one or more selection menus, etc.). Furthermore, the receiving information encrypted electrical circuitry arrangement e1178 when activated will perform the operation o1178. In an implementation, the receiving information encrypted electrical circuitry arrangement e1178, when activated performs electronically receiving the user status information to at least in part electronically generate the one or more selection menus to provide the selection opportunity in response thereto via electronically enabled input including via encrypted input (e.g. an implementation of the receiver component s528 is configured to electronically engage with the encrypted communication component s520 to receive the electronically enabled input to be used by the processor component s102 to generate the one or more selection menus, etc.). In an implementation, the electronically receiving the user status information to at least in part electronically generate the one or more selection menus to provide the selection opportunity in response thereto via electronically enabled input including via encrypted input is carried out by electronically receiving the user status information to at least in part electronically generate the one or more selection menus to provide the selection opportunity in response thereto via electronically enabled input including via encrypted input (e.g. an implementation of the receiver component s528 is configured to electronically engage with the encrypted communication component s520 to receive the electronically enabled input to be used by the processor component s102 to generate the one or more selection menus, etc.).

As shown in FIG. 32, the operational flow o10 proceeds to operation o12 for electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus. An exemplary version of a non-transitory signal bearing medium of information storage subsystem s200 is depicted as bearing one or more controlling preparation instructions i12 that when executed will direct performance of the operation o12. In an implementation, the one or more controlling preparation instructions i12 when executed direct electronically directing control (e.g. the microprocessor component s102 can direct control, etc.) of at least partial preparation (e.g. mixing and blending steps of making a smoothie, etc.) of the one or more selected ingestible products (e.g. a fruit smoothie, etc.) subsequent to and based at least in part upon the selection of the at least one candidate ingestible product as the at least one selected ingestible products via the electronically enabled input (e.g. graphical user interface s302 is used to input selection of a fruit smoothie to be prepared by the digestible product preparation system 10, etc.) in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus (e.g. the graphical user interface s302 displaying the one or more selection menus is located with a room of a building that also houses the material processing subsystem 700 used to prepare the selected fruit smoothie, etc.). Furthermore, the controlling preparation electrical circuitry arrangement e12 when activated will perform the operation o12. In an implementation, the controlling preparation electrical circuitry arrangement e12, when activated performs electronically directing control (e.g. the microprocessor component s102 can direct control, etc.) of at least partial preparation (e.g. mixing and blending steps of making a smoothie, etc.) of the one or more selected ingestible products (e.g. a fruit smoothie, etc.) subsequent to and based at least in part upon the selection of the at least one candidate ingestible product as the at least one selected ingestible products via the electronically enabled input (e.g. graphical user interface s302 is used to input selection of a fruit smoothie to be prepared by the digestible product preparation system 10, etc.) in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus (e.g. the graphical user interface s302 displaying the one or more selection menus is located with a room of a building that also houses the material processing subsystem 700 used to prepare the selected fruit smoothie, etc.). In an implementation, the electronically directing control of at least partial preparation of the one or more selected ingestible products subsequent to and based at least in part upon the selection of the at least one candidate ingestible product as the at least one selected ingestible products via the electronically enabled input in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus is carried out by electronically directing control (e.g. the microprocessor component s102 can direct control, etc.) of at least partial preparation (e.g. mixing and blending steps of making a smoothie, etc.) of the one or more selected ingestible products (e.g. a fruit smoothie, etc.) subsequent to and based at least in part upon the selection of the at least one candidate ingestible product as the at least one selected ingestible products via the electronically enabled input (e.g. graphical user interface s302 is used to input selection of a fruit smoothie to be prepared by the digestible product preparation system 10, etc.) in response to the electronically outputted one or more selection menus and prior to dispensing of the one or more selected ingestible products for ingestion by the particular individual living being of the selected ingestible products, the at least partial preparation of the one or more selected ingestible products occurring within a vicinity of the electronically outputting of the electronically generated one or more selection menus (e.g. the graphical user interface s302 displaying the one or more selection menus is located with a room of a building that also houses the material processing subsystem 700 used to prepare the selected fruit smoothie, etc.).

Figure 59:
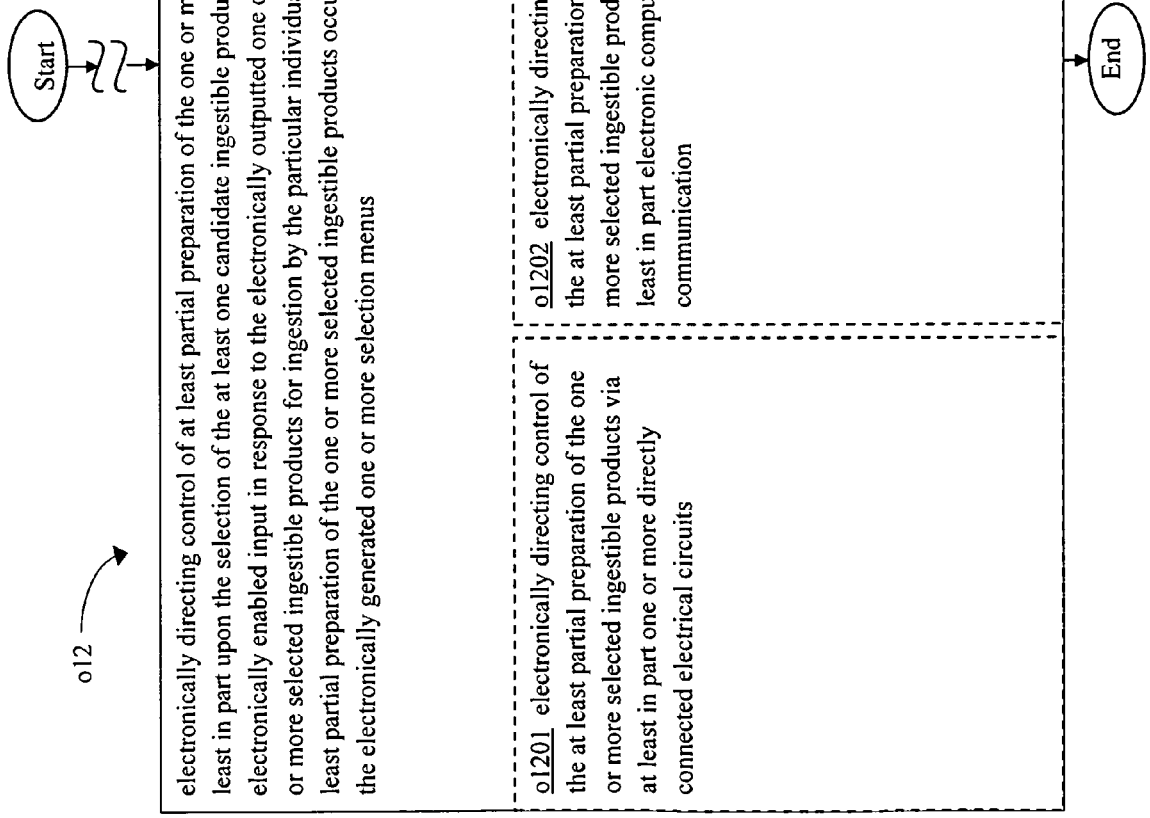
FIG. 59 is a high-level flowchart including exemplary implementations of operation O12 of FIG. 32.

In one or more implementations, as shown in FIG. 59, operation o12 includes an operation o1201 for electronically directing control of the at least partial preparation of the one or more selected ingestible products via at least in part one or more directly connected electrical circuits. An exemplary version of a non-transitory signal bearing medium of information storage subsystem s200 is depicted as bearing one or more control prep connected instructions i1201 that when executed will direct performance of the operation o1201. In an implementation, the one or more control prep connected instructions i1201 when executed direct electronically directing control of the at least partial preparation of the one or more selected ingestible products via at least in part one or more directly connected electrical circuits (e.g. an implementation of the processor component s102 is configured to electronically receive directing control through receiver component s528 co-located within a common housing of the ingestible product preparation system 10 to control the material processing subsystem 700 in preparation of the one or more ingestible products, etc.). Furthermore, the control prep connected electrical circuitry arrangement e1201 when activated will perform the operation o1201. In an implementation, the control prep connected electrical circuitry arrangement e1201, when activated performs electronically directing control of the at least partial preparation of the one or more selected ingestible products via at least in part one or more directly connected electrical circuits (e.g. an implementation of the processor component s102 is configured to electronically receive directing control through receiver component s528 co-located within a common housing of the ingestible product preparation system 10 to control the material processing subsystem 700 in preparation of the one or more ingestible products, etc.). In an implementation, the electronically directing control of the at least partial preparation of the one or more selected ingestible products via at least in part one or more directly connected electrical circuits is carried out by electronically directing control of the at least partial preparation of the one or more selected ingestible products via at least in part one or more directly connected electrical circuits (e.g. an implementation of the processor component s102 is configured to electronically receive directing control through receiver component s528 co-located within a common housing of the ingestible product preparation system 10 to control the material processing subsystem 700 in preparation of the one or more ingestible products, etc.).

In one or more implementations, operation o12 includes an operation o1202 for electronically directing control of the at least partial preparation of the one or more selected ingestible products via at least in part electronic computer network communication. An exemplary version of a non-transitory signal bearing medium of information storage subsystem s200 is depicted as bearing one or more control prep network instructions i1202 that when executed will direct performance of the operation o1202. In an implementation, the one or more control prep network instructions i1202 when executed direct electronically directing control of the at least partial preparation of the one or more selected ingestible products via at least in part electronic computer network communication (e.g. an implementation of the processor component s102 is configured to electronically receive directing control through internet network components s508 to control the material processing subsystem 700 in preparation of the one or more ingestible products, etc.). Furthermore, the control prep network electrical circuitry arrangement e1202 when activated will perform the operation o1202. In an implementation, the control prep network electrical circuitry arrangement e1202, when activated performs electronically directing control of the at least partial preparation of the one or more selected ingestible products via at least in part electronic computer network communication (e.g. an implementation of the processor component s102 is configured to electronically receive directing control through internet network components s508 to control the material processing subsystem 700 in preparation of the one or more ingestible products, etc.). In an implementation, the electronically directing control of the at least partial preparation of the one or more selected ingestible products via at least in part electronic computer network communication is carried out by electronically directing control of the at least partial preparation of the one or more selected ingestible products via at least in part electronic computer network communication (e.g. an implementation of the processor component s102 is configured to electronically receive directing control through internet network components s508 to control the material processing subsystem 700 in preparation of the one or more ingestible products, etc.).

In one or more implementations; operation o12 includes an operation o1203 for electronically directing control of the at least partial preparation of the one or more selected ingestible products via thermal control of an enclosure containing ingredients to be used for preparation of the ingestible product. An exemplary version of a non-transitory signal bearing medium of information storage subsystem s200 is depicted as bearing one or more control prep thermal instructions i1203 that when executed will direct performance of the operation o1203. In an implementation, the one or more control prep thermal instructions i1203 when executed direct electronically directing control of the at least partial preparation of the one or more selected ingestible products via thermal control of an enclosure containing ingredients to be used for preparation of the ingestible product (e.g. an implementation of the processor component s102 is configured to electronically control the laser component s708 according to a temperature profile included in the user status information, etc.). Furthermore, the control prep thermal electrical circuitry arrangement e1203 when activated will perform the operation o1203. In an implementation, the control prep thermal electrical circuitry arrangement e1203, when activated performs electronically directing control of the at least partial preparation of the one or more selected ingestible products via thermal control of an enclosure containing ingredients to be used for preparation of the ingestible product (e.g. an implementation of the processor component s102 is configured to electronically control the laser component s708 according to a temperature profile included in the user status information, etc.). In an implementation, the electronically directing control of the at least partial preparation of the one or more selected ingestible products via thermal control of an enclosure containing ingredients to be used for preparation of the ingestible product is carried out by electronically directing control of the at least partial preparation of the one or more selected ingestible products via thermal control of an enclosure containing ingredients to be used for preparation of the ingestible product (e.g. an implementation of the processor component s102 is configured to electronically control the laser component s708 according to a temperature profile included in the user status information, etc.).

Figure 60:
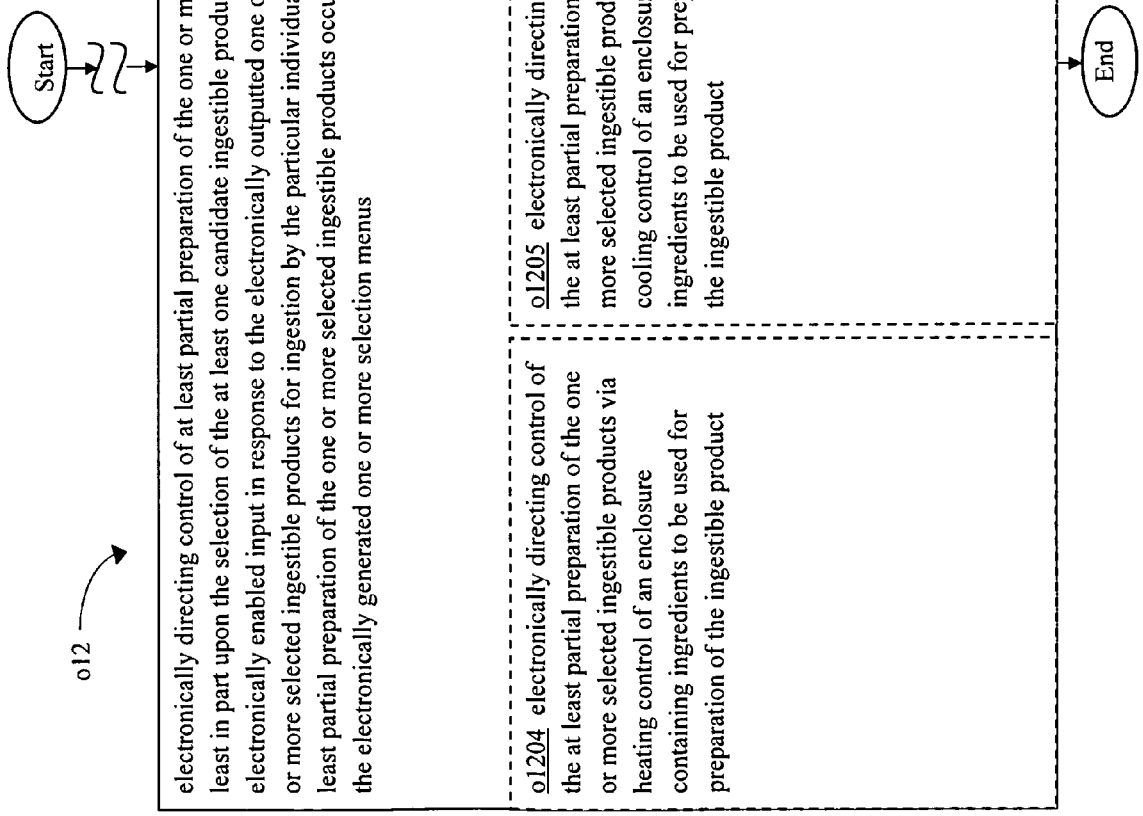
FIG. 60 is a high-level flowchart including exemplary implementations of operation O12 of FIG. 32.

In one or more implementations, as shown in FIG. 60, operation o12 includes an operation o1204 for electronically directing control of the at least partial preparation of the one or more selected ingestible products via heating control of an enclosure containing ingredients to be used for preparation of the ingestible product. An exemplary version of a non-transitory signal bearing medium of information storage subsystem s200 is depicted as bearing one or more control prep heating instructions i1204 that when executed will direct performance of the operation o1204. In an implementation, the one or more control prep heating instructions i1204 when executed direct electronically directing control of the at least partial preparation of the one or more selected ingestible products via heating control of an enclosure containing ingredients to be used for preparation of the ingestible product (e.g. an implementation of the processor component s102 is configured to electronically control the heating component s702 according to a temperature profile included in the user status information, etc.). Furthermore, the control prep connected electrical circuitry arrangement e1204 when activated will perform the operation o1204. In an implementation, the control prep heating electrical circuitry arrangement e1204, when activated performs electronically directing control of the at least partial preparation of the one or more selected ingestible products via heating control of an enclosure containing ingredients to be used for preparation of the ingestible product (e.g. an implementation of the processor component s102 is configured to electronically control the heating component s702 according to a temperature profile included in the user status information, etc.). In an implementation, the electronically directing control of the at least partial preparation of the one or more selected ingestible products via heating control of an enclosure containing ingredients to be used for preparation of the ingestible product is carried out by electronically directing control of the at least partial preparation of the one or more selected ingestible products via heating control of an enclosure containing ingredients to be used for preparation of the ingestible product (e.g. an implementation of the processor component s102 is configured to electronically control the heating component s702 according to a temperature profile included in the user status information, etc.).

In one or more implementations, operation o12 includes an operation o1205 for electronically directing control of the at least partial preparation of the one or more selected ingestible products via cooling control of an enclosure containing ingredients to be used for preparation of the ingestible product. An exemplary version of a non-transitory signal bearing medium of information storage subsystem s200 is depicted as bearing one or more control prep cooling instructions i1205 that when executed will direct performance of the operation o1205. In an implementation, the one or more control prep cooling instructions i1205 when executed direct electronically directing control of the at least partial preparation of the one or more selected ingestible products via cooling control of an enclosure containing ingredients to be used for preparation of the ingestible product (e.g. an implementation of the processor component s102 is configured to electronically control the cooling component s704 according to a temperature profile included in the user status information, etc.). Furthermore, the control prep cooling electrical circuitry arrangement e1205 when activated will perform the operation o1205. In an implementation, the control prep cooling electrical circuitry arrangement e1205, when activated performs electronically directing control of the at least partial preparation of the one or more selected ingestible products via cooling control of an enclosure containing ingredients to be used for preparation of the ingestible product (e.g. an implementation of the processor component s102 is configured to electronically control the cooling component s704 according to a temperature profile included in the user status information, etc.). In an implementation, the electronically directing control of the at least partial preparation of the one or more selected ingestible products via cooling control of an enclosure containing ingredients to be used for preparation of the ingestible product is carried out by electronically directing control of the at least partial preparation of the one or more selected ingestible products via cooling control of an enclosure containing ingredients to be used for preparation of the ingestible product (e.g. an implementation of the processor component s102 is configured to electronically control the cooling component s704 according to a temperature profile included in the user status information, etc.).

In one or more implementations, operation o12 includes an operation o1206 for electronically directing control of the at least partial preparation of the one or more selected ingestible products via portion size control of an amount of the substance to be used in preparation of the ingestible product. An exemplary version of a non-transitory signal bearing medium of information storage subsystem s200 is depicted as bearing one or more control prep portion instructions i1206 that when executed will direct performance of the operation o1206. In an implementation, the one or more control prep portion instructions i1206 when executed direct electronically directing control of the at least partial preparation of the one or more selected ingestible products via portion size control of an amount of the substance to be used in preparation of the ingestible product (e.g. an implementation of the processor component s102 is configured to electronically control the sorting component s728 according to a ingredient size distribution profile included in the user status information, etc.). Furthermore, the control prep portion electrical circuitry arrangement e1206 when activated will perform the operation o1205. In an implementation, the control prep portion electrical circuitry arrangement e1206, when activated performs electronically directing control of the at least partial preparation of the one or more selected ingestible products via portion size control of an amount of the substance to be used in preparation of the ingestible product (e.g. an implementation of the processor component s102 is configured to electronically control the sorting component s728 according to an ingredient size distribution profile included in the user status information, etc.). In an implementation, the electronically directing control of the at least partial preparation of the one or more selected ingestible products via portion size control of an amount of the substance to be used in preparation of the ingestible product is carried out by electronically directing control of the at least partial preparation of the one or more selected ingestible products via portion size control of an amount of the substance to be used in preparation of the ingestible product (e.g. an implementation of the processor component s102 is configured to electronically control the sorting component s728 according to an ingredient size distribution profile included in the user status information, etc.).

Figure 61:
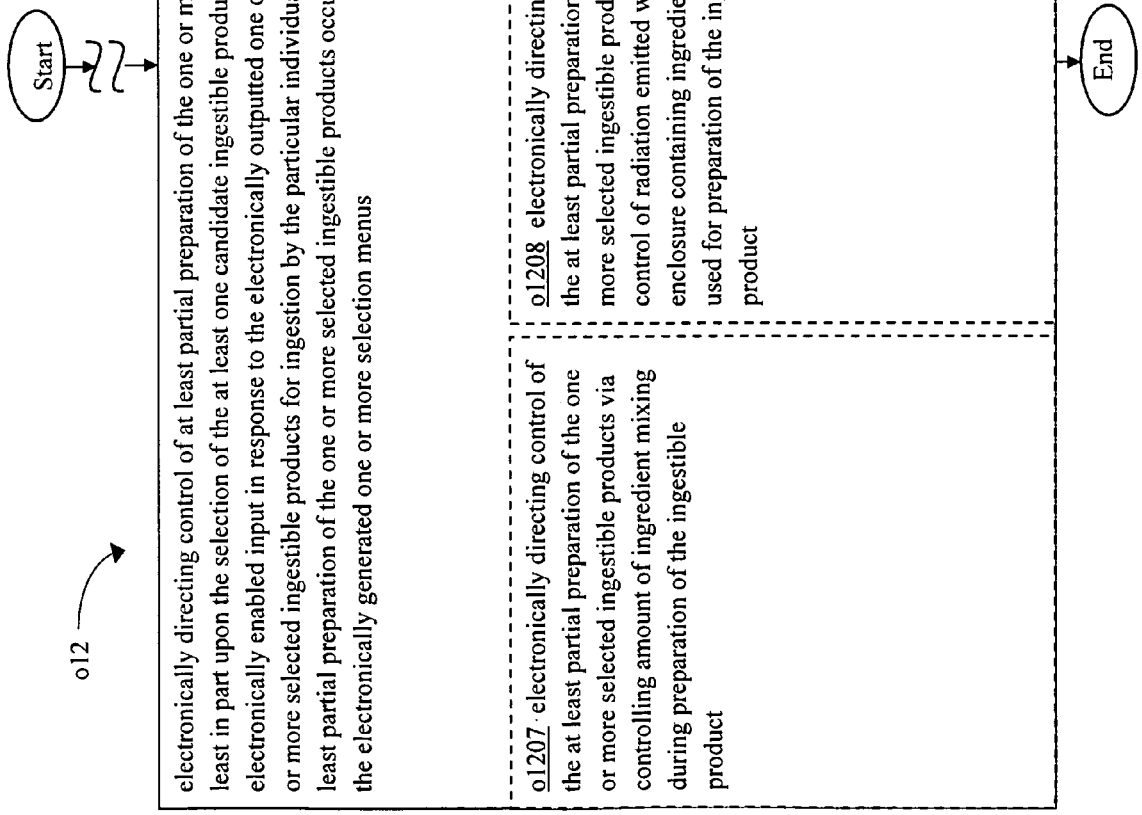
FIG. 61 is a high-level flowchart including exemplary implementations of operation O12 of FIG. 32.

In one or more implementations, as shown in FIG. 61, operation o12 includes an operation o1207 for electronically directing control of the at least partial preparation of the one or more selected ingestible products via controlling amount of ingredient mixing during preparation of the ingestible product. An exemplary version of a non-transitory signal bearing medium of information storage subsystem s200 is depicted as bearing one or more control prep mixing instructions i1207 that when executed will direct performance of the operation o1207. In an implementation, the one or more control prep mixing instructions i1207 when executed direct electronically directing control of the at least partial preparation of the one or more selected ingestible products via controlling amount of ingredient mixing during preparation of the ingestible product (e.g. an implementation of the processor component s102 is configured to electronically control the mixer component s716 according to a mixing profile included in the user status information, etc.). Furthermore, the control prep mixing electrical circuitry arrangement e1207 when activated will perform the operation o1207. In an implementation, the control prep mixing electrical circuitry arrangement e1207, when activated performs electronically directing control of the at least partial preparation of the one or more selected ingestible products via controlling amount of ingredient mixing during preparation of the ingestible product (e.g. an implementation of the processor component s102 is configured to electronically control the mixer component s716 according to a mixing profile included in the user status information, etc.). In an implementation, the electronically directing control of the at least partial preparation of the one or more selected ingestible products via controlling amount of ingredient mixing during preparation of the ingestible product is carried out by electronically directing control of the at least partial preparation of the one or more selected ingestible products via controlling amount of ingredient mixing during preparation of the ingestible product (e.g. an implementation of the processor component s102 is configured to electronically control the mixer component s716 according to a mixing profile included in the user status information, etc.).

In one or more implementations, operation o12 includes an operation o1208 for electronically directing control of the at least partial preparation of the one or more selected ingestible products via control of radiation emitted within an enclosure containing ingredients to be used for preparation of the ingestible product. An exemplary version of a non-transitory signal bearing medium of information storage subsystem s200 is depicted as bearing one or more control prep radiation instructions i1208 that when executed will direct performance of the operation o1208. In an implementation, the one or more control prep radiation instructions i1208 when executed direct electronically directing control of the at least partial preparation of the one or more selected ingestible products via control of radiation emitted within an enclosure containing ingredients to be used for preparation of the ingestible product (e.g. an implementation of the processor component s102 is configured to electronically control the energy emitting component s724 configured to emit radiation according to a radiation profile included in the user status information, etc.). Furthermore, the control prep radiation electrical circuitry arrangement e1208 when activated will perform the operation o1208. In an implementation, the control prep radiation electrical circuitry arrangement e1208, when activated performs electronically directing control of the at least partial preparation of the one or more selected ingestible products via control of radiation emitted within an enclosure containing ingredients to be used for preparation of the ingestible product (e.g. an implementation of the processor component s102 is configured to electronically control the energy emitting component s724 configured to emit radiation according to a radiation profile included in the user status information, etc.). In an implementation, the electronically directing control of the at least partial preparation of the one or more selected ingestible products via control of radiation emitted within an enclosure containing ingredients to be used for preparation of the ingestible product is carried out by electronically directing control of the at least partial preparation of the one or more selected ingestible products via control of radiation emitted within an enclosure containing ingredients to be used for preparation of the ingestible product (e.g. an implementation of the processor component s102 is configured to electronically control the energy emitting component s724 configured to emit radiation according to a radiation profile included in the user status information, etc.).

In one or more implementations, operation o12 includes an operation o1209 for electronically directing control of the at least partial preparation of the one or more selected ingestible products via control of sound emitted within an enclosure containing ingredients to be used for preparation of the ingestible product. An exemplary version of a non-transitory signal bearing medium of information storage subsystem s200 is depicted as bearing one or more control prep sound instructions i1209 that when executed will direct performance of the operation o1209. In an implementation, the one or more control prep sound instructions i1209 when executed direct electronically directing control of the at least partial preparation of the one or more selected ingestible products via control of sound emitted within an enclosure containing ingredients to be used for preparation of the ingestible product (e.g. an implementation of the processor component s102 is configured to electronically control the acoustic energy component s718 according to an acoustic energy profile included in the user status information, etc.). Furthermore, the control prep sound electrical circuitry arrangement e1209 when activated will perform the operation o1209. In an implementation, the control prep sound electrical circuitry arrangement e1209, when activated performs electronically directing control of the at least partial preparation of the one or more selected ingestible products via control of sound emitted within an enclosure containing ingredients to be used for preparation of the ingestible product (e.g. an implementation of the processor component s102 is configured to electronically control the acoustic energy component s718 according to an acoustic energy profile included in the user status information, etc.). In an implementation, the electronically directing control of the at least partial preparation of the one or more selected ingestible products via control of sound emitted within an enclosure containing ingredients to be used for preparation of the ingestible product is carried out by electronically directing control of the at least partial preparation of the one or more selected ingestible products via control of sound emitted within an enclosure containing ingredients to be used for preparation of the ingestible product (e.g. an implementation of the processor component s102 is configured to electronically control the acoustic energy component s718 according to an acoustic energy profile included in the user status information, etc.).

Figure 62:
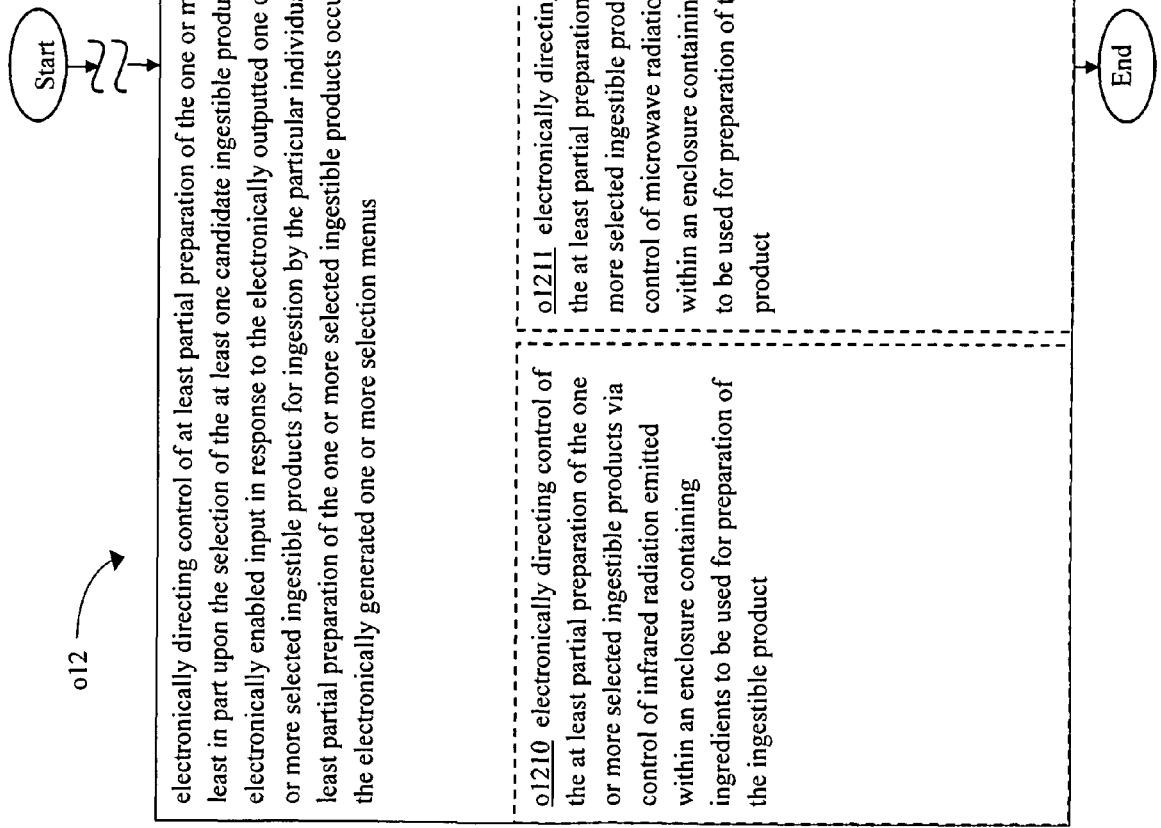
FIG. 62 is a high-level flowchart including exemplary implementations of operation O12 of FIG. 32.

In one or more implementations, as shown in FIG. 62, operation o12 includes an operation o1210 for electronically directing control of the at least partial preparation of the one or more selected ingestible products via control of infrared radiation emitted within an enclosure containing ingredients to be used for preparation of the ingestible product. An exemplary version of a non-transitory signal bearing medium of information storage subsystem s200 is depicted as bearing one or more control prep infrared instructions i1210 that when executed will direct performance of the operation o1210. In an implementation, the one or more control prep infrared instructions i1210 when executed direct electronically directing control of the at least partial preparation of the one or more selected ingestible products via control of infrared radiation emitted within an enclosure containing ingredients to be used for preparation of the ingestible product (e.g. an implementation of the processor component s102 is configured to electronically control the infrared component s730 according to a temperature profile included in the user status information, etc.). Furthermore, the control prep infrared electrical circuitry arrangement e1210 when activated will perform the operation o1210. In an implementation, the control prep infrared electrical circuitry arrangement e1210, when activated performs electronically directing control of the at least partial preparation of the one or more selected ingestible products via control of infrared radiation emitted within an enclosure containing ingredients to be used for preparation of the ingestible product (e.g. an implementation of the processor component s102 is configured to electronically control the infrared component s730 according to a temperature profile included in the user status information, etc.). In an implementation, the electronically directing control of the at least partial preparation of the one or more selected ingestible products via control of infrared radiation emitted within an enclosure containing ingredients to be used for preparation of the ingestible product is carried out by electronically directing control of the at least partial preparation of the one or more selected ingestible products via control of infrared radiation emitted within an enclosure containing ingredients to be used for preparation of the ingestible product (e.g. an implementation of the processor component s102 is configured to electronically control the infrared component s730 according to a temperature profile included in the user status information, etc.).

In one or more implementations, operation o12 includes an operation o1211 for electronically directing control of the at least partial preparation of the one or more selected ingestible products via control of microwave radiation emitted within an enclosure containing ingredients to be used for preparation of the ingestible product. An exemplary version of a non-transitory signal bearing medium of information storage subsystem s200 is depicted as bearing one or more control prep microwave instructions i1211 that when executed will direct performance of the operation o1211. In an implementation, the one or more control prep microwave instructions i1211 when executed direct electronically directing control of the at least partial preparation of the one or more selected ingestible products via control of microwave radiation emitted within an enclosure containing ingredients to be used for preparation of the ingestible product (e.g. an implementation of the processor component s102 is configured to electronically control the microwave component s706 according to a temperature profile included in the user status information, etc.). Furthermore, the control prep microwave electrical circuitry arrangement e1211 when activated will perform the operation o1211. In an implementation, the control prep microwave electrical circuitry arrangement e1211, when activated performs electronically directing control of the at least partial preparation of the one or more selected ingestible products via control of microwave radiation emitted within an enclosure containing ingredients to be used for preparation of the ingestible product (e.g. an implementation of the processor component s102 is configured to electronically control the microwave component s706 according to a temperature profile included in the user status information, etc.). In an implementation, the electronically directing control of the at least partial preparation of the one or more selected ingestible products via control of microwave radiation emitted within an enclosure containing ingredients to be used for preparation of the ingestible product is carried out by electronically directing control of the at least partial preparation of the one or more selected ingestible products via control of microwave radiation emitted within an enclosure containing ingredients to be used for preparation of the ingestible product (e.g. an implementation of the processor component s102 is configured to electronically control the microwave component s706 according to a temperature profile included in the user status information, etc.).

In one or more implementations, operation o12 includes an operation o1212 for electronically directing control of the at least partial preparation of the one or more selected ingestible products via control of an outlet of an ingredient container holding an ingredient used for preparation of the ingestible product. An exemplary version of a non-transitory signal bearing medium of information storage subsystem s200 is depicted as bearing one or more control prep container instructions i1212 that when executed will direct performance of the operation o1212. In an implementation, the one or more control prep container instructions i1212 when executed direct electronically directing control of the at least partial preparation of the one or more selected ingestible products via control of an outlet of an ingredient container holding an ingredient used for preparation of the ingestible product (e.g. an implementation of the processor component s102 is configured to electronically control an outlet of the material storage component s734 configured as an ingredient container according to an access profile included in the user status information, etc.). Furthermore, the control prep container electrical circuitry arrangement e1212 when activated will perform the operation o1212. In an implementation, the control prep container electrical circuitry arrangement e1212, when activated performs electronically directing control of the at least partial preparation of the one or more selected ingestible products via control of an outlet of an ingredient container holding an ingredient used for preparation of the ingestible product (e.g. an implementation of the processor component s102 is configured to electronically control an outlet of the material storage component s734 configured as an ingredient container according to an access profile included in the user status information, etc.). In an implementation, the electronically directing control of the at least partial preparation of the one or more selected ingestible products via control of an outlet of an ingredient container holding an ingredient used for preparation of the ingestible product is carried out by electronically directing control of the at least partial preparation of the one or more selected ingestible products via control of an outlet of an ingredient container holding an ingredient used for preparation of the ingestible product (e.g. an implementation of the processor component s102 is configured to electronically control an outlet of the material storage component s734 configured as an ingredient container according to an access profile included in the user status information, etc.).

Figure 63:
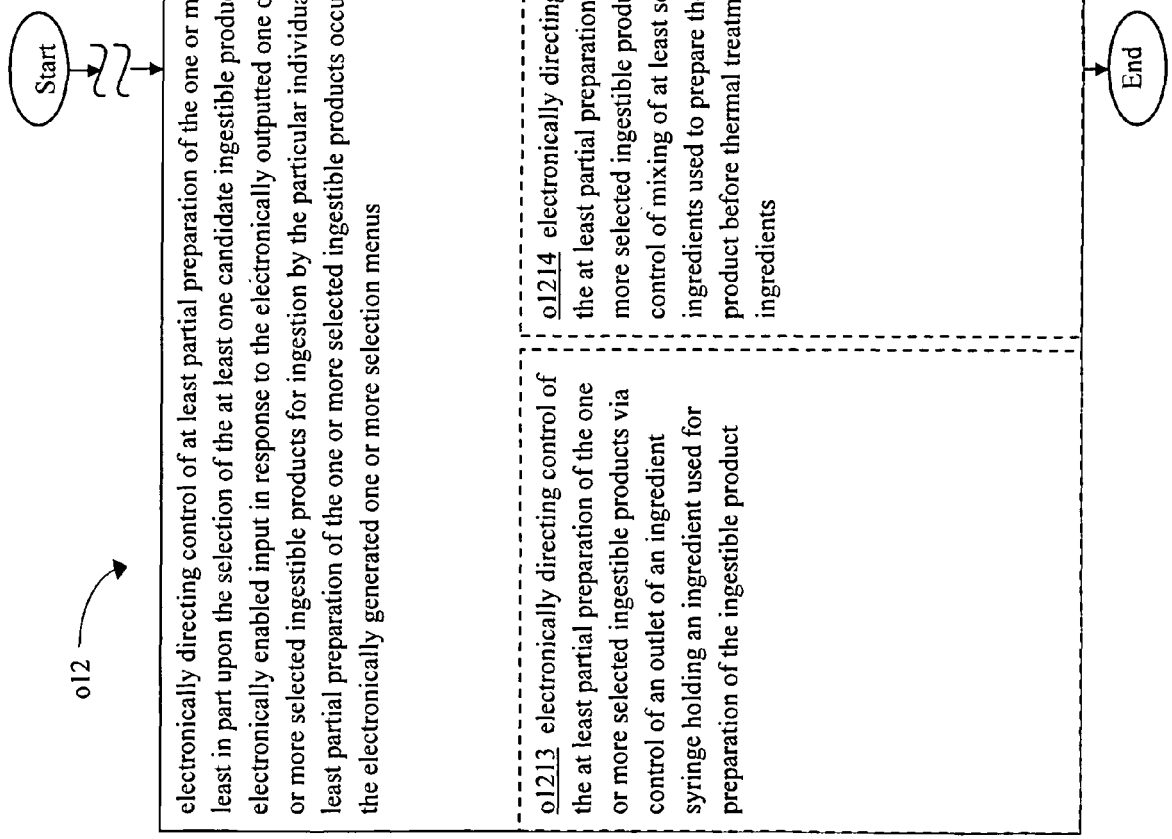
FIG. 63 is a high-level flowchart including exemplary implementations of operation O12 of FIG. 32.

In one or more implementations, as shown in FIG. 63, operation o12 includes an operation o1213 for electronically directing control of the at least partial preparation of the one or more selected ingestible products via control of an outlet of an ingredient syringe holding an ingredient used for preparation of the ingestible product. An exemplary version of a non-transitory signal bearing medium of information storage subsystem s200 is depicted as bearing one or more control prep syringe instructions i1213 that when executed will direct performance of the operation o1213. In an implementation, the one or more control prep syringe instructions i1213 when executed direct electronically directing control of the at least partial preparation of the one or more selected ingestible products via control of an outlet of an ingredient syringe holding an ingredient used for preparation of the ingestible product (e.g. an implementation of the processor component s102 is configured to electronically control an outlet of the material storage component s734 configured as an ingredient syringe according to an access profile included in the user status information, etc.). Furthermore, the control prep syringe electrical circuitry arrangement e1213 when activated will perform the operation o1213. In an implementation, the control prep syringe electrical circuitry arrangement e1213, when activated performs electronically directing control of the at least partial preparation of the one or more selected ingestible products via control of an outlet of an ingredient syringe holding an ingredient used for preparation of the ingestible product (e.g. an implementation of the processor component s102 is configured to electronically control an outlet of the material storage component s734 configured as an ingredient syringe according to an access profile included in the user status information, etc.). In an implementation, the electronically directing control of the at least partial preparation of the one or more selected ingestible products via control of an outlet of an ingredient syringe holding an ingredient used for preparation of the ingestible product is carried out by electronically directing control of the at least partial preparation of the one or more selected ingestible products via control of an outlet of an ingredient syringe holding an ingredient used for preparation of the ingestible product (e.g. an implementation of the processor component s102 is configured to electronically control an outlet of the material storage component s734 configured as an ingredient syringe according to an access profile included in the user status information, etc.).

In one or more implementations, operation o12 includes an operation o1214 for electronically directing control of the at least partial preparation of the one or more selected ingestible products via control of mixing of at least some of the ingredients used to prepare the ingestible product before thermal treatment of the ingredients. An exemplary version of a non-transitory signal bearing medium of information storage subsystem s200 is depicted as bearing one or more control prep mix before thermal instructions i1214 that when executed will direct performance of the operation o1214. In an implementation, the one or more control prep mix before thermal instructions i1214 when executed direct electronically directing control of the at least partial preparation of the one or more selected ingestible products via control of mixing of at least some of the ingredients used to prepare the ingestible product before thermal treatment of the ingredients (e.g. an implementation of the processor component s102 is configured to electronically control the mixer component s716 according to a mixing profile included in the user status information, etc.). Furthermore, the control prep mix before thermal electrical circuitry arrangement e1214 when activated will perform the operation o1214. In an implementation, the control prep mix before thermal electrical circuitry arrangement e1214, when activated performs electronically directing control of the at least partial preparation of the one or more selected ingestible products via control of mixing of at least some of the ingredients used to prepare the ingestible product before thermal treatment of the ingredients (e.g. an implementation of the processor component s102 is configured to electronically control the mixer component s716 according to a mixing profile included in the user status information, etc.). In an implementation, the electronically directing control of the at least partial preparation of the one or more selected ingestible products via control of mixing of at least some of the ingredients used to prepare the ingestible product before thermal treatment of the ingredients is carried out by electronically directing control of the at least partial preparation of the one or more selected ingestible products via control of mixing of at least some of the ingredients used to prepare the ingestible product before thermal treatment of the ingredients (e.g. an implementation of the processor component s102 is configured to electronically control the mixer component s716 according to a mixing profile included in the user status information, etc.).

In one or more implementations, operation o12 includes an operation o1215 for electronically directing control of the at least partial preparation of the one or more selected ingestible products via control of blending of at least some of the ingredients used to prepare the ingestible product after thermal treatment of the ingredients. An exemplary version of a non-transitory signal bearing medium of information storage subsystem s200 is depicted as bearing one or more control prep re mix after thermal instructions i1215 that when executed will direct performance of the operation o1215. In an implementation, the one or more control prep re mix after thermal instructions i1215 when executed direct electronically directing control of the at least partial preparation of the one or more selected ingestible products via control of blending of at least some of the ingredients used to prepare the ingestible product after thermal treatment of the ingredients (e.g. an implementation of the processor component s102 is configured to electronically control the blending component s714 according to a blending profile involving some of the ingredients used to prepare the ingestible product included in the user status information, etc.). Furthermore, the control prep re mix after thermal electrical circuitry arrangement e1215 when activated will perform the operation o1215. In an implementation, the control prep re mix after thermal electrical circuitry arrangement e1215, when activated performs electronically directing control of the at least partial preparation of the one or more selected ingestible products via control of blending of at least some of the ingredients used to prepare the ingestible product after thermal treatment of the ingredients (e.g. an implementation of the processor component s102 is configured to electronically control the blending component s714 according to a blending profile involving some of the ingredients used to prepare the ingestible product included in the user status information, etc.). In an implementation, the electronically directing control of the at least partial preparation of the one or more selected ingestible products via control of blending of at least some of the ingredients used to prepare the ingestible product after thermal treatment of the ingredients is carried out by electronically directing control of the at least partial preparation of the one or more selected ingestible products via control of blending of at least some of the ingredients used to prepare the ingestible product after thermal treatment of the ingredients (e.g. an implementation of the processor component s102 is configured to electronically control the blending component s714 according to a blending profile involving some of the ingredients used to prepare the ingestible product included in the user status information, etc.).

Figure 64:
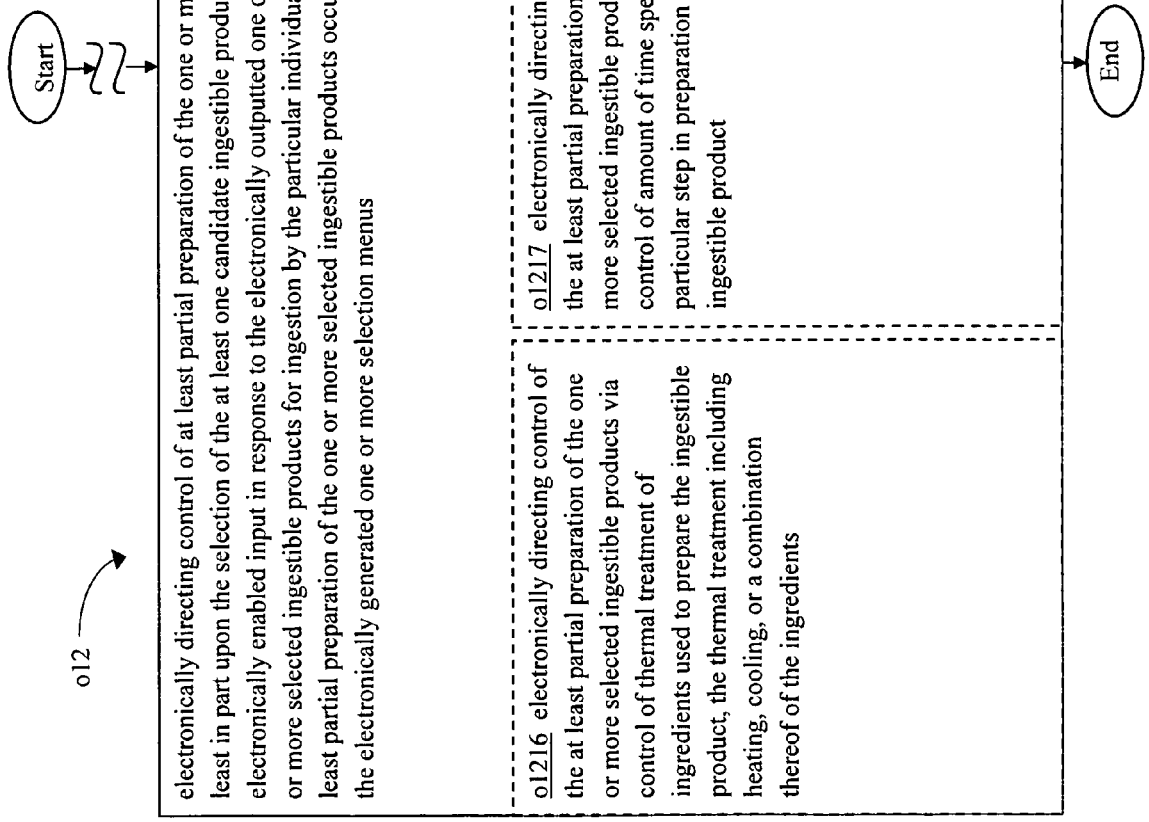
FIG. 64 is a high-level flowchart including exemplary implementations of operation O12 of FIG. 32.

In one or more implementations, as shown in FIG. 64, operation o12 includes an operation o1216 for electronically directing control of the at least partial preparation of the one or more selected ingestible products via control of thermal treatment of ingredients used to prepare the ingestible product, the thermal treatment including heating, cooling, or a combination thereof of the ingredients. An exemplary version of a non-transitory signal bearing medium of information storage subsystem s200 is depicted as bearing one or more control prep heating cooling instructions i1216 that when executed will direct performance of the operation o1216. In an implementation, the one or more control prep heating cooling instructions i1216 when executed direct electronically directing control of the at least partial preparation of the one or more selected ingestible products via control of thermal treatment of ingredients used to prepare the ingestible product, the thermal treatment including heating, cooling, or a combination thereof of the ingredients (e.g. an implementation of the processor component s102 is configured to electronically control the heating component s702 and/or the cooling component s704 according to a thermal profile included in the user status information, etc.). Furthermore, the control prep heating cooling electrical circuitry arrangement e1216 when activated will perform the operation o1216. In an implementation, the control prep heating cooling electrical circuitry arrangement e1216, when activated performs electronically directing control of the at least partial preparation of the one or more selected ingestible products via control of thermal treatment of ingredients used to prepare the ingestible product, the thermal treatment including heating, cooling, or a combination thereof of the ingredients (e.g. an implementation of the processor component s102 is configured to electronically control the heating component s702 and/or the cooling component s704 according to a thermal profile included in the user status information, etc.). In an implementation, the electronically directing control of the at least partial preparation of the one or more selected ingestible products via control of thermal treatment of ingredients used to prepare the ingestible product, the thermal treatment including heating, cooling, or a combination thereof of the ingredients is carried out by electronically directing control of the at least partial preparation of the one or more selected ingestible products via control of thermal treatment of ingredients used to prepare the ingestible product, the thermal treatment including heating, cooling, or a combination thereof of the ingredients (e.g. an implementation of the processor component s102 is configured to electronically control the heating component s702 and/or the cooling component s704 according to a thermal profile included in the user status information, etc.).

In one or more implementations, operation o12 includes an operation o1217 for electronically directing control of the at least partial preparation of the one or more selected ingestible products via control of amount of time spent for a particular step in preparation of the ingestible product. An exemplary version of a non-transitory signal bearing medium of information storage subsystem s200 is depicted as bearing one or more control prep time control instructions i1217 that when executed will direct performance of the operation o1217. In an implementation, the one or more control prep time control instructions i1217 when executed direct electronically directing control of the at least partial preparation of the one or more selected ingestible products via control of amount of time spent for a particular step in preparation of the ingestible product (e.g. an implementation of the processor component s102 is configured to electronically control components of the material processing subsystem s700 based upon an internal clock of the processor according to a time profile included in the user status information, etc.). Furthermore, the control prep time control electrical circuitry arrangement e1217 when activated will perform the operation o1217. In an implementation, the control prep time control electrical circuitry arrangement e1217, when activated performs electronically directing control of the at least partial preparation of the one or more selected ingestible products via control of amount of time spent for a particular step in preparation of the ingestible product (e.g. an implementation of the processor component s102 is configured to electronically control components of the material processing subsystem s700 based upon an internal clock of the processor according to a time profile included in the user status information, etc.). In an implementation, the electronically directing control of the at least partial preparation of the one or more selected ingestible products via control of amount of time spent for a particular step in preparation of the ingestible product is carried out by electronically directing control of the at least partial preparation of the one or more selected ingestible products via control of amount of time spent for a particular step in preparation of the ingestible product (e.g. an implementation of the processor component s102 is configured to electronically control components of the material processing subsystem s700 based upon an internal clock of the processor according to a time profile included in the user status information, etc.).

In one or more implementations, operation o12 includes an operation o1218 for electronically directing control of the at least partial preparation of the one or more selected ingestible products via electronically excluding ingredients from being included in the preparation of the ingestible product. An exemplary version of a non-transitory signal bearing medium of information storage subsystem s200 is depicted as bearing one or more control prep ingredient exclusion instructions i1218 that when executed will direct performance of the operation o1218. In an implementation, the one or more control prep ingredient exclusion instructions i1218 when executed direct electronically directing control of the at least partial preparation of the one or more selected ingestible products via electronically excluding ingredients from being included in the preparation of the ingestible product (e.g. an implementation of the processor component s102 is configured to electronically control the sorting component s728 to exclude one or more ingredients from being included in the ingestible product according to an exclusion profile included in the user status information, etc.). Furthermore, the control prep ingredient exclusion electrical circuitry arrangement e1218 when activated will perform the operation o1218. In an implementation, the control prep ingredient exclusion electrical circuitry arrangement e1218, when activated performs electronically directing control of the at least partial preparation of the one or more selected ingestible products via electronically excluding ingredients from being included in the preparation of the ingestible product (e.g. an implementation of the processor component s102 is configured to electronically control the sorting component s728 to exclude one or more ingredients from being included in the ingestible product according to an exclusion profile included in the user status information, etc.). In an implementation, the electronically directing control of the at least partial preparation of the one or more selected ingestible products via electronically excluding ingredients from being included in the preparation of the ingestible product is carried out by electronically directing control of the at least partial preparation of the one or more selected ingestible products via electronically excluding ingredients from being included in the preparation of the ingestible product (e.g. an implementation of the processor component s102 is configured to electronically control the sorting component s728 to exclude one or more ingredients from being included in the ingestible product according to an exclusion profile included in the user status information, etc.).

In one or more implementations, as shown in FIG. 65, operation o12 includes an operation o1219 for electronically directing control of the at least partial preparation of the one or more selected ingestible products via electronically including ingredients in the preparation of the ingestible product. An exemplary version of a non-transitory signal bearing medium of information storage subsystem s200 is depicted as bearing one or more control prep ingredient inclusion instructions i1219 that when executed will direct performance of the operation o1219. In an implementation, the one or more control prep ingredient inclusion instructions i1219 when executed direct electronically directing control of the at least partial preparation of the one or more selected ingestible products via electronically including ingredients in the preparation of the ingestible product (e.g. an implementation of the processor component s102 is configured to electronically control the sorting component s728 to include one or more ingredients in the ingestible product according to an inclusion profile included in the user status information, etc.). Furthermore, the control prep ingredient inclusion electrical circuitry arrangement e1219 when activated will perform the operation o1219. In an implementation, the control prep ingredient inclusion electrical circuitry arrangement e1219, when activated performs electronically directing control of the at least partial preparation of the one or more selected ingestible products via electronically including ingredients in the preparation of the ingestible product (e.g. an implementation of the processor component s102 is configured to electronically control the sorting component s728 to include one or more ingredients in the ingestible product according to an inclusion profile included in the user status information, etc.). In an implementation, the electronically directing control of the at least partial preparation of the one or more selected ingestible products via electronically including ingredients in the preparation of the ingestible product is carried out by electronically directing control of the at least partial preparation of the one or more selected ingestible products via electronically including ingredients in the preparation of the ingestible product (e.g. an implementation of the processor component s102 is configured to electronically control the sorting component s728 to include one or more ingredients in the ingestible product according to an inclusion profile included in the user status information, etc.).

In one or more implementations, operation o12 includes an operation o1220 for electronically directing control of the at least partial preparation of the one or more selected ingestible products, the at least partial preparation of the one or more selected ingestible products within the vicinity of the electronically outputting of the electronically generated one or more selection menus as within an interior of a dispensing machine housing. An exemplary version of a non-transitory signal bearing medium of information storage subsystem s200 is depicted as bearing one or more control prep housing instructions i1220 that when executed will direct performance of the operation o1220. In an implementation, the one or more control prep housing instructions i1220 when executed direct electronically directing control of the at least partial preparation of the one or more selected ingestible products, the at least partial preparation of the one or more selected ingestible products within the vicinity of the electronically outputting of the electronically generated one or more selection menus as within an interior of a dispensing machine housing (e.g. an implementation of the processor component s102 is configured to receive through the electronic communication subsystem 500 directing control to electronically control the material processing subsystem 700 for at least partial preparation of the one or more selected ingestible products within the interior of the digestible product preparation system 10 that uses for instance visual display component s304 to electronically output the electronically generated one or more selection menus, etc.). Furthermore, the control prep housing electrical circuitry arrangement e1220 when activated will perform the operation o1220. In an implementation, the control prep housing electrical circuitry arrangement e1220, when activated performs electronically directing control of the at least partial preparation of the one or more selected ingestible products, the at least partial preparation of the one or more selected ingestible products within the vicinity of the electronically outputting of the electronically generated one or more selection menus as within an interior of a dispensing machine housing (e.g. an implementation of the processor component s102 is configured to receive through the electronic communication subsystem 500 directing control to electronically control the material processing subsystem 700 for at least partial preparation of the one or more selected ingestible products within the interior of the digestible product preparation system 10 that uses for instance visual display component s304 to electronically output the electronically generated one or more selection menus, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within an interior of a dispensing machine housing is carried out by electronically directing control of the at least partial preparation of the one or more selected ingestible products, the at least partial preparation of the one or more selected ingestible products within the vicinity of the electronically outputting of the electronically generated one or more selection menus as within an interior of a dispensing machine housing (e.g. an implementation of the processor component s102 is configured to receive through the electronic communication subsystem 500 directing control to electronically control the material processing subsystem 700 for at least partial preparation of the one or more selected ingestible products within the interior of the digestible product preparation system 10 that uses for instance visual display component s304 to electronically output the electronically generated one or more selection menus, etc.).

In one or more implementations, operation o12 includes an operation o1221 for electronically directing control of the at least partial preparation of the one or more selected ingestible products, the at least partial preparation of the one or more selected ingestible products within the vicinity of the electronically outputting of the electronically generated one or more selection menus as within an interior of a architectural building containing a dispensing machine. An exemplary version of a non-transitory signal bearing medium of information storage subsystem s200 is depicted as bearing one or more control prep building instructions i1221 that when executed will direct performance of the operation o1221. In an implementation, the one or more control prep building instructions i1221 when executed direct electronically directing control of the at least partial preparation of the one or more selected ingestible products, the at least partial preparation of the one or more selected ingestible products within the vicinity of the electronically outputting of the electronically generated one or more selection menus as within an interior of a architectural building containing a dispensing machine (e.g. an implementation of the processor component s102 is configured to receive through the electronic communication subsystem 500 directing control to electronically control the material processing subsystem 700 for at least partial preparation of the one or more selected ingestible products within the interior of an airport wherein the digestible product preparation system 10 is located that communicates with for instance the visual display component s304 to electronically output the electronically generated one or more selection menus also within the airport, etc.). Furthermore, the control prep building electrical circuitry arrangement e1221 when activated will perform the operation o1221. In an implementation, the control prep building electrical circuitry arrangement e1221, when activated performs electronically directing control of the at least partial preparation of the one or more selected ingestible products, the at least partial preparation of the one or more selected ingestible products within the vicinity of the electronically outputting of the electronically generated one or more selection menus as within an interior of a architectural building containing a dispensing machine (e.g. an implementation of the processor component s102 is configured to receive through the electronic communication subsystem 500 directing control to electronically control the material processing subsystem 700 for at least partial preparation of the one or more selected ingestible products within the interior of an airport wherein the digestible product preparation system 10 is located that communicates with for instance the visual display component s304 to electronically output the electronically generated one or more selection menus also within the airport, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within an interior of a architectural building containing a dispensing machine is carried out by electronically directing control of the at least partial preparation of the one or more selected ingestible products, the at least partial preparation of the one or more selected ingestible products within the vicinity of the electronically outputting of the electronically generated one or more selection menus as within an interior of a architectural building containing a dispensing machine (e.g. an implementation of the processor component s102 is configured to receive through the electronic communication subsystem 500 directing control to electronically control the material processing subsystem 700 for at least partial preparation of the one or more selected ingestible products within the interior of an airport wherein the digestible product preparation system 10 is located that communicates with for instance the visual display component s304 to electronically output the electronically generated one or more selection menus also within the airport, etc.).

In one or more implementations, as shown in FIG. 66, operation o12 includes an operation o1222 for electronically directing control of the at least partial preparation of the one or more selected ingestible products, the at least partial preparation of the one or more selected ingestible products within the vicinity of the electronically outputting of the electronically generated one or more selection menus as within a food court of a shopping mall. An exemplary version of a non-transitory signal bearing medium of information storage subsystem s200 is depicted as bearing one or more control prep mall instructions i1222 that when executed will direct performance of the operation o1222. In an implementation, the one or more control prep mall instructions i1222 when executed direct electronically directing control of the at least partial preparation of the one or more selected ingestible products, the at least partial preparation of the one or more selected ingestible products within the vicinity of the electronically outputting of the electronically generated one or more selection menus as within a food court of a shopping mall (i.e. an implementation of the processor component s102 is configured to receive through the electronic communication subsystem 500 directing control to electronically control the material processing subsystem 700 for at least partial preparation of the one or more selected ingestible products within the food court of the shopping mall wherein the digestible product preparation system 10 is located that communicates with for instance the visual display component s304 to electronically output the electronically generated one or more selection menus also within the food court of the shopping mall, etc.). Furthermore, the control prep mall electrical circuitry arrangement e1222 when activated will perform the operation o1222. In an implementation, the control prep mall electrical circuitry arrangement e1222, when activated performs electronically directing control of the at least partial preparation of the one or more selected ingestible products, the at least partial preparation of the one or more selected ingestible products within the vicinity of the electronically outputting of the electronically generated one or more selection menus as within a food court of a shopping mall (i.e. an implementation of the processor component s102 is configured to receive through the electronic communication subsystem 500 directing control to electronically control the material processing subsystem 700 for at least partial preparation of the one or more selected ingestible products within the food court of the shopping mall wherein the digestible product preparation system 10 is located that communicates with for instance the visual display component s304 to electronically output the electronically generated one or more selection menus also within the food court of the shopping mall, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within a food court of a shopping mall is carried out by electronically directing control of the at least partial preparation of the one or more selected ingestible products, the at least partial preparation of the one or more selected ingestible products within the vicinity of the electronically outputting of the electronically generated one or more selection menus as within a food court of a shopping mall (i.e. an implementation of the processor component s102 is configured to receive through the electronic communication subsystem 500 directing control to electronically control the material processing subsystem 700 for at least partial preparation of the one or more selected ingestible products within the food court of the shopping mall wherein the digestible product preparation system 10 is located that communicates with for instance the visual display component s304 to electronically output the electronically generated one or more selection menus also within the food court of the shopping mall, etc.)

In one or more implementations, operation o12 includes an operation o1223 for electronically directing control of the at least partial preparation of the one or more selected ingestible products, the at least partial preparation of the one or more selected ingestible products within the vicinity of the electronically outputting of the electronically generated one or more selection menus as within an interior of a restaurant. An exemplary version of a non-transitory signal bearing medium of information storage subsystem s200 is depicted as bearing one or more control prep restaurant instructions i1223 that when executed will direct performance of the operation o1223. In an implementation, the one or more control prep restaurant instructions i1223 when executed direct electronically directing control of the at least partial preparation of the one or more selected ingestible products, the at least partial preparation of the one or more selected ingestible products within the vicinity of the electronically outputting of the electronically generated one or more selection menus as within an interior of a restaurant (i.e. an implementation of the processor component s102 is configured to receive through the electronic communication subsystem 500 directing control to electronically control the material processing subsystem 700 for at least partial preparation of the one or more selected ingestible products within the interior of the restaurant wherein the digestible product preparation system 10 is located that communicates with for instance the visual display component s304 to electronically output the electronically generated one or more selection menus also within the restaurant, etc.). Furthermore, the control prep restaurant electrical circuitry arrangement e1223 when activated will perform the operation o1223. In an implementation, the control prep restaurant electrical circuitry arrangement e1223, when activated performs electronically directing control of the at least partial preparation of the one or more selected ingestible products, the at least partial preparation of the one or more selected ingestible products within the vicinity of the electronically outputting of the electronically generated one or more, selection menus as within an interior of a restaurant (i.e. an implementation of the processor component s102 is configured to receive through the electronic communication subsystem 500 directing control to electronically control the material processing subsystem 700 for at least partial preparation of the one or more selected ingestible products within the interior of the restaurant wherein the digestible product preparation system 10 is located that communicates with for instance the visual display component s304 to electronically output the electronically generated one or more selection menus also within the restaurant, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within an interior of a restaurant is carried out by electronically directing control of the at least partial preparation of the one or more selected ingestible products, the at least partial preparation of the one or more selected ingestible products within the vicinity of the electronically outputting of the electronically generated one or more selection menus as within an interior of a restaurant (i.e. an implementation of the processor component s102 is configured to receive through the electronic communication subsystem 500 directing control to electronically control the material processing subsystem 700 for at least partial preparation of the one or more selected ingestible products within the interior of the restaurant wherein the digestible product preparation system 10 is located that communicates with for instance the visual display component s304 to electronically output the electronically generated one or more selection menus also within the restaurant, etc.).

In one or more implementations, operation o12 includes an operation o1224 for electronically directing control of the at least partial preparation of the one or more selected ingestible products, the at least partial preparation of the one or more selected ingestible products within the vicinity of the electronically outputting of the electronically generated one or more selection menus as within an interior of an airplane. An exemplary version of a non-transitory signal bearing medium of information storage subsystem s200 is depicted as bearing one or more control prep airplane instructions i1224 that when executed will direct performance of the operation o1224. In an implementation, the one or more control prep airplane instructions i1224 when executed direct electronically directing control of the at least partial preparation of the one or more selected ingestible products, the at least partial preparation of the one or more selected ingestible products within the vicinity of the electronically outputting of the electronically generated one or more selection menus as within an interior of an airplane (i.e. an implementation of the processor component s102 is configured to receive through the electronic communication subsystem 500 directing control to electronically control the material processing subsystem 700 for at least partial preparation of the one or more selected ingestible products within the interior of the airplane wherein the digestible product preparation system 10 is located that communicates with for instance the visual display component s304 to electronically output the electronically generated one or more selection menus also within the airplane, etc.). Furthermore, the control prep airplane electrical circuitry arrangement e1224 when activated will perform the operation o1224. In an implementation, the control prep airplane electrical circuitry arrangement e1224, when activated performs electronically directing control of the at least partial preparation of the one or more selected ingestible products, the at least partial preparation of the one or more selected ingestible products within the vicinity of the electronically outputting of the electronically generated one or more selection menus as within an interior of an airplane (i.e. an implementation of the processor component s102 is configured to receive through the electronic communication subsystem 500 directing control to electronically control the material processing subsystem 700 for at least partial preparation of the one or more selected ingestible products within the interior of the airplane wherein the digestible product preparation system 10 is located that communicates with for instance the visual display component s304 to electronically output the electronically generated one or more selection menus also within the airplane, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within an interior of an airplane is carried out by electronically directing control of the at least partial preparation of the one or more selected ingestible products, the at least partial preparation of the one or more selected ingestible products within the vicinity of the electronically outputting of the electronically generated one or more selection menus as within an interior of an airplane (i.e. an implementation of the processor component s102 is configured to receive through the electronic communication subsystem 500 directing control to electronically control the material processing subsystem 700 for at least partial preparation of the one or more selected ingestible products within the interior of the airplane wherein the digestible product preparation system 10 is located that communicates with for instance the visual display component s304 to electronically output the electronically generated one or more selection menus also within the airplane, etc.).

In one or more implementations, as shown in FIG. 67, operation o12 includes an operation o1225 for electronically directing control of the at least partial preparation of the one or more selected ingestible products via thermal control of an enclosure containing ingredients to be used for preparation of the ingestible product. An exemplary version of a non-transitory signal bearing medium of information storage subsystem s200 is depicted as bearing one or more control prep vehicle instructions i1225 that when executed will direct performance of the operation o1225. In an implementation, the one or more control prep vehicle instructions i1225 when executed direct electronically directing control of the at least partial preparation of the one or more selected ingestible products, the at least partial preparation of the one or more selected ingestible products within the vicinity of the electronically outputting of the electronically generated one or more selection menus as within an interior of a ground vehicle (i.e. an implementation of the processor component s102 is configured to receive through the electronic communication subsystem 500 directing control to electronically control the material processing subsystem 700 for at least partial preparation of the one or more selected ingestible products within the interior of the ground vehicle wherein the digestible product preparation system 10 is located that communicates with for instance the visual display component s304 to electronically output the electronically generated one or more selection menus also within the ground vehicle, etc.). Furthermore, the control prep vehicle electrical circuitry arrangement e1225 when activated will perform the operation o1225. In an implementation, the control prep vehicle electrical circuitry arrangement e1225, when activated performs electronically directing control of the at least partial preparation of the one or more selected ingestible products, the at least partial preparation of the one or more selected ingestible products within the vicinity of the electronically outputting of the electronically generated one or more selection menus as within an interior of a ground vehicle (i.e. an implementation of the processor component s102 is configured to receive through the electronic communication subsystem 500 directing control to electronically control the material processing subsystem 700 for at least partial preparation of the one or more selected ingestible products within the interior of the ground vehicle wherein the digestible product preparation system 10 is located that communicates with for instance the visual display component s304 to electronically output the electronically generated one or more selection menus also within the ground vehicle, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within an interior of a ground vehicle is carried out by electronically directing control of the at least partial preparation of the one or more selected ingestible products, the at least partial preparation of the one or more selected ingestible products within the vicinity of the electronically outputting of the electronically generated one or more selection menus as within an interior of a ground vehicle (i.e. an implementation of the processor component s102 is configured to receive through the electronic communication subsystem 500 directing control to electronically control the material processing subsystem 700 for at least partial preparation of the one or more selected ingestible products within the interior of the ground vehicle wherein the digestible product preparation system 10 is located that communicates with for instance the visual display component s304 to electronically output the electronically generated one or more selection menus also within the ground vehicle, etc.)

In one or more implementations, operation o12 includes an operation o1226 for electronically directing control of the at least partial preparation of the one or more selected ingestible products, the at least partial preparation of the one or more selected ingestible products within the vicinity of the electronically outputting of the electronically generated one or more selection menus as within a multi-state territory. An exemplary version of a non-transitory signal bearing medium of information storage subsystem s200 is depicted as bearing one or more control prep territory instructions i1226 that when executed will direct performance of the operation o1226. In an implementation, the one or more control prep territory instructions i1226 when executed direct electronically directing control of the at least partial preparation of the one or more selected ingestible products, the at least partial preparation of the one or more selected ingestible products within the vicinity of the electronically outputting of the electronically generated one or more selection menus as within a multi-state territory (i.e. an implementation of the processor component s102 is configured to receive through the electronic communication subsystem 500 directing control to electronically control the material processing subsystem 700 for at least partial preparation of the one or more selected ingestible products within the interior of the multi-state territory of Colorado, Wyoming, Montana, Utah, New Mexico, and Texas wherein the digestible product preparation system 10 is located that communicates with for instance the visual display component s304 to electronically output the electronically generated one or more selection menus also within the multi-state territory of Colorado, Wyoming, Montana, Utah, New Mexico, and Texas, etc.). Furthermore, the control prep territory electrical circuitry arrangement e1226 when activated will perform the operation o1226. In an implementation, the control prep territory electrical circuitry arrangement e1226, when activated performs electronically directing control of the at least partial preparation of the one or more selected ingestible products, the at least partial preparation of the one or more selected ingestible products within the vicinity of the electronically outputting of the electronically generated one or more selection menus as within a multi-state territory (i.e. an implementation of the processor component s102 is configured to receive through the electronic communication subsystem 500 directing control to electronically control the material processing subsystem 700 for at least partial preparation of the one or more selected ingestible products within the interior of the multi-state territory of Colorado, Wyoming, Montana, Utah, New Mexico, and Texas wherein the digestible product preparation system 10 is located that communicates with for instance the visual display component s304 to electronically output the electronically generated one or more selection menus also within the multi-state territory of Colorado, Wyoming, Montana, Utah, New Mexico, and Texas, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within a multi-state territory is carried out by electronically directing control of the at least partial preparation of the one or more selected ingestible products, the at least partial preparation of the one or more selected ingestible products within the vicinity of the electronically outputting of the electronically generated one or more selection menus as within a multi-state territory (i.e. an implementation of the processor component s102 is configured to receive through the electronic communication subsystem 500 directing control to electronically control the material processing subsystem 700 for at least partial preparation of the one or more selected ingestible products within the interior of the multi-state territory of Colorado, Wyoming, Montana, Utah, New Mexico, and Texas wherein the digestible product preparation system 10 is located that communicates with for instance the visual display component s304 to electronically output the electronically generated one or more selection menus also within the multi-state territory of Colorado, Wyoming, Montana, Utah, New Mexico, and Texas, etc.).

In one or more implementations, operation o12 includes an operation o1227 for electronically directing control of the at least partial preparation of the one or more selected ingestible products, the at least partial preparation of the one or more selected ingestible products within the vicinity of the electronically outputting of the electronically generated one or more selection menus as within an international region. An exemplary version of a non-transitory signal bearing medium of information storage subsystem s200 is depicted as bearing one or more control prep region instructions i1227 that when executed will direct performance of the operation o1227. In an implementation, the one or more control prep region instructions i1227 when executed direct electronically directing control of the at least partial preparation of the one or more selected ingestible products, the at least partial preparation of the one or more selected ingestible products within the vicinity of the electronically outputting of the electronically generated one or more selection menus as within an international region (i.e. an implementation of the processor component s102 is configured to receive through the electronic communication subsystem 500 directing control to electronically control the material processing subsystem 700 for at least partial preparation of the one or more selected ingestible products within the international region of England, Germany, France, Brazil, Russia, India, China, and the United States wherein the digestible product preparation system 10 is located that communicates with for instance the visual display component s304 to electronically output the electronically generated one or more selection menus also within the international region of England, Germany, France, Brazil, Russia, India, China, and the United States, etc.). Furthermore, the control prep region electrical circuitry arrangement e1227 when activated will perform the operation o1227. In an implementation, the control prep region electrical circuitry arrangement e1227, when activated performs electronically directing control of the at least partial preparation of the one or more selected ingestible products, the at least partial preparation of the one or more selected ingestible products within the vicinity of the electronically outputting of the electronically generated one or more selection menus as within an international region (i.e. an implementation of the processor component s102 is configured to receive through the electronic communication subsystem 500 directing control to electronically control the material processing subsystem 700 for at least partial preparation of the one or more selected ingestible products within the international region of England, Germany, France, Brazil, Russia, India, China, and the United States wherein the digestible product preparation system 10 is located that communicates with for instance the visual display component s304 to electronically output the electronically generated one or more selection menus also within the international region of England, Germany, France, Brazil, Russia, India, China, and the United States, etc.). In an implementation, the electronically directing control of the at least partial preparation of the one or more selected ingestible products, the at least partial preparation of the one or more selected ingestible products within the vicinity of the electronically outputting of the electronically generated one or more selection menus as within an international region is carried out by electronically directing control of the at least partial preparation of the one or more selected ingestible products, the at least partial preparation of the one or more selected ingestible products within the vicinity of the electronically outputting of the electronically generated one or more selection menus as within an international region (i.e. an implementation of the processor component s102 is configured to receive through the electronic communication subsystem 500 directing control to electronically control the material processing subsystem 700 for at least partial preparation of the one or more selected ingestible products within the international region of England, Germany, France, Brazil, Russia, India, China, and the United States wherein the digestible product preparation system 10 is located that communicates with for instance the visual display component s304 to electronically output the electronically generated one or more selection menus also within the international region of England, Germany, France, Brazil, Russia, India, China, and the United States, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution.

Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof (limited to patentable subject matter under 35 U.S.C. 101) can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated"-such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory, phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method, comprising:
electronically receiving user status information regarding a particular individual living being including at least living being identification associated with the particular individual living being;
at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time;
electronically outputting the at least in part electronically generated one or more selections menus to provide, via electronically enabled input in response thereto, selection opportunity of the one or more candidate ingestible products subject to ingestion by the particular individual living being prior to selection of at least one candidate ingestible product as at least one selected ingestible product via the electronically enabled input in response to the electronically outputted one or more selection menus; and
electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being.

2. The method of claim 1, further comprising:
electronically receiving a second user status information regarding the particular individual living being from a remotely located user via an electronic network.

3. The method of claim 2, wherein the electronically receiving a second user status information regarding the particular individual living being from a remotely located user via an electronic network comprises:
electronically receiving the second user status information regarding the particular individual living being from at least one of a physician, nurse, nutritionist, health expert, sports coach, physician assistant, pharmacist, or laboratory technician.

4. The method of claim 3, wherein the electronically receiving the second user status information regarding the particular individual living being from at least one of a physician, nurse, nutritionist, health expert, sports coach, physician assistant, pharmacist, or laboratory technician comprises:
electronically receiving at least one of a new prescription or a prescription renewal regarding the particular individual living being.

5. The method of claim 1, wherein the electronically receiving user status information regarding a particular individual living being including at least living being identification associated with the particular individual living being comprises:
electronically receiving the user status information regarding the particular individual living being including at least the living being identification associated with the particular individual living being via a prescription identification.

6. The method of claim 1, wherein the electronically receiving user status information regarding a particular individual living being including at least living being identification associated with the particular individual living being comprises:
electronically receiving the user status information regarding the particular individual living being including at least the living being identification associated with the particular individual living being via a data image of handwritten text.

7. The method of claim 1, wherein the electronically receiving user status information regarding a particular individual living being including at least living being identification associated with the particular individual living being comprises:
electronically receiving the user status information regarding the particular individual living being including at least the living being identification associated with the particular individual living being via a computer audio file.

8. The method of claim 1, wherein the electronically receiving user status information regarding a particular individual living being including at least living being identification associated with the particular individual living being comprises:
electronically receiving the user status information regarding the particular individual living being including at least the living being identification associated with the particular individual living being via an RFID tag.

9. The method of claim 1, wherein the electronically receiving user status information regarding a particular individual living being including at least living being identification associated with the particular individual living being comprises:
electronically receiving the user status information regarding the particular individual living being including at least the living being identification associated with the particular individual living being via a holographic image.

10. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
at least in part electronically generating, based at least in part upon the user status information regarding the particular individual living being, one or more selection menus in icon form.

11. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:

at least in part electronically generating, based at least in part upon the user status information regarding the particular individual living being, one or more selection menus in markup language form.

12. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
   at least in part electronically generating, based at least in part upon the user status information regarding the particular individual living being, one or more selection menus in list form.

13. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
   at least in part electronically generating, based at least in part upon the user status information regarding the particular individual living being, one or more selection menus in map form.

14. The method of claim 1, wherein the electronically receiving user status information regarding a particular individual living being including at least living being identification associated with the particular individual living being comprises:
   electronically receiving the user status information regarding the particular individual living being including at least living being identification associated with an electronic identification card.

15. The method of claim 1, wherein the electronically receiving user status information regarding a particular individual living being including at least living being identification associated with the particular individual living being comprises:
   electronically receiving the user status information regarding the particular individual living being including at least living being identification associated with an electronic voice print.

16. The method of claim 1, wherein the electronically receiving user status information regarding a particular individual living being including at least living being identification associated with the particular individual living being comprises:
   electronically receiving the user status information regarding the particular individual living being including at least living being identification associated with electronic dental records.

17. The method of claim 1, wherein the electronically receiving user status information regarding a particular individual living being including at least living being identification associated with the particular individual living being comprises:
   electronically receiving the user status information regarding the particular individual living being including at least living being identification associated with a password.

18. The method of claim 1, wherein the electronically receiving user status information regarding a particular individual living being including at least living being identification associated with the particular individual living being comprises:
   electronically receiving the user status information regarding the particular individual living being including at least living being identification associated with a cell phone swipe.

19. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
   at least in part electronically generating the one or more selection menus identifying at least in part the one or more candidate ingestible products to incorporate one or more substances therein during the at least partial preparation thereof.

20. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
   at least in part electronically generating the one or more selection menus electronically identifying at least in part the one or more candidate ingestible products to be swallowed.

21. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
   at least in part electronically generating the one or more selection menus identifying at least in part the one or more candidate ingestible products to be ingested via a tube.

22. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
   at least in part electronically generating the one or more selection menus identifying at least in part the one or more candidate ingestible products to be used in capsule form.

23. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
   at least in part electronically generating the one or more selection menus identifying at least in part the one or more candidate ingestible products to be used as a soup.

24. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
- at least in part electronically generating the one or more selection menus identifying at least in part the one or more candidate ingestible products to be used as a baked good.

25. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
- at least in part electronically generating the one or more selection menus electronically identifying at least in part the one or more candidate ingestible products to be used as an assembled concoction.

26. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
- at least in part electronically generating the one or more selection menus identifying at least in part the one or more candidate ingestible products to be used periodically.

27. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
- at least in part electronically generating the one or more selection menus to be electronically outputted including via one or more audio output devices.

28. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
- at least in part electronically generating the one or more selection menus to be electronically outputted including wirelessly.

29. The method of claim 1, wherein the at least in part electronically generating, based at least in part upon the user status information, one or more selection menus in ingestible sample form identifying at least in part one or more candidate ingestible products, the electronically generated one or more selection menus including at least one or more ingestible samples that are at least one of a stored sample or a sample produced in real time comprises:
- at least in part electronically generating the one or more selection menus to be electronically outputted including via electronic food printer.

30. The method of claim 1, wherein the electronically receiving user status information regarding a particular individual living being including at least living being identification associated with the particular individual living being comprises:
- electronically receiving the user status information via electronically enabled input including via a memory circuit coupled with a medication container.

31. The method of claim 1, wherein the electronically receiving user status information regarding a particular individual living being including at least living being identification associated with the particular individual living being comprises:
- electronically receiving the user status information via electronically enabled input including via a cell phone swipe.

32. The method of claim 1, wherein the electronically receiving user status information regarding a particular individual living being including at least living being identification associated with the particular individual living being comprises:
- electronically receiving the user status information via electronically enabled input including via an Internet communication.

33. The method of claim 1, wherein the electronically receiving user status information regarding a particular individual living being including at least living being identification associated with the particular individual living being comprises:
- electronically receiving the user status information via electronically enabled input including via touch screen input.

34. The method of claim 1, wherein the electronically receiving user status information regarding a particular individual living being including at least living being identification associated with the particular individual living being comprises:
- electronically receiving the user status information via electronically enabled input including via electronic imaging of the particular individual living being.

35. The method of claim 1, wherein the electronically receiving user status information regarding a particular individual living being including at least living being identification associated with the particular individual living being comprises:
- electronically receiving the user status information via electronic audio recording of the particular individual living being.

36. The method of claim 1, wherein the electronically receiving user status information regarding a particular individual living being including at least living being identification associated with the particular individual living being comprises:
- electronically receiving the user status information via electronic input by the particular individual living being.

37. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via at least in part one or more directly connected electrical circuits.

38. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via thermal control of an enclosure containing ingredients to be used for preparation of the at least one selected ingestible product.

39. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via cooling control of an enclosure containing ingredients to be used for preparation of the at least one selected ingestible product.

40. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via controlling amount of ingredient mixing during preparation of the at least one selected ingestible product.

41. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via control of sound emitted within an enclosure containing ingredients to be used for preparation of the at least one selected ingestible product.

42. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via control of microwave radiation emitted within an enclosure containing ingredients to be used for preparation of the at least one selected ingestible product.

43. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via control of an outlet of an ingredient syringe holding an ingredient used for preparation of the at least one selected ingestible product.

44. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via control of blending of at least some of the ingredients used to prepare the at least one selected ingestible product after thermal treatment of the ingredients.

45. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:
  electronically directing control of the at least partial preparation of the at least one selected ingestible product via control of amount of time spent for a particular step in preparation of the at least one selected ingestible product.

46. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:

electronically directing control of the at least partial preparation of the at least one selected ingestible product via electronically including ingredients in the preparation of the ingestible product, the electronically including ingredients based at least in part on the received living being identification, including at least selecting at least some ingredients corresponding to at least one stored preference of the particular living being.

47. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:

electronically directing control of the at least partial preparation of the at least one selected ingestible product, the at least partial preparation of the at least one selected ingestible product within a vicinity of the electronically outputting of the electronically generated one or more selection menus, the vicinity including at least within an interior of an architectural building containing a dispensing machine.

48. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:

electronically directing control of the at least partial preparation of the at least one selected ingestible product, the at least partial preparation of the at least one selected ingestible product within a vicinity of the electronically outputting of the electronically generated one or more selection menus, the vicinity including at least within an interior of a restaurant.

49. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:

electronically directing control of the at least partial preparation of the at least one selected ingestible product, the at least partial preparation of the at least one selected ingestible product within a vicinity of the electronically outputting of the electronically generated one or more selection menus, the vicinity including at least within an interior of a ground vehicle.

50. A system, comprising:

means for receiving user status information regarding a particular individual living being including at least living being identification associated with the particular individual living being;

means for generating, based at least in part upon the user status information, one or more selection menus in ingestible sample form identifying at least in part one or more candidate ingestible products, the generated one or more selection menus including at least one or more ingestible samples that are at least one of a stored sample or a sample produced in real time;

means for outputting the generated one or more selection menus to provide, via means for inputting in response thereto, selection opportunity of the one or more candidate ingestible products subject to ingestion by the particular individual living being prior to selection of at least one candidate ingestible product as at least one selected ingestible product via the means for inputting in response to the outputted one or more selection menus; and means for directing control via at least one production machine of at least partial preparation of the at least one selected ingestible product subsequent to and based at least in part upon the selection of the at least one candidate ingestible product as the at least one selected ingestible product via the means for inputting in response to the outputted one or more selection menus and prior to dispensing of the at least one selected ingestible product subject to ingestion by the particular individual living being.

51. A system, comprising:

circuitry configured for receiving user status information regarding a particular living being;

circuitry configured for generating, based at least in part upon received user status information, one or more selection menus in ingestible sample form, the one or more selection menus including at least one or more ingestible samples that are at least one of a stored sample or a sample produced in real time, identifying at least in part one or more candidate ingestible products subject to ingestion by the particular living being;

circuitry configured for outputting at least one of the one or more selection menus;

circuitry configured for receiving a selection of at least one of the one or more candidate ingestible products; and circuitry configured for directing control of at least partial preparation via at least one production machine of the one or more selected ingestible products.

52. A method, comprising:

receiving user status information regarding a particular living being;

generating, based at least in part upon the user status information, one or more selection menus in ingestible sample form identifying at least in part one or more candidate ingestible products subject to ingestion by the particular living being;

outputting at least one of the one or more selection menus in ingestible sample form via at least one electronic food printer, the at least one electronic food printer configured to print at least one ingestible sample via at least one of deposition by layering or deposition at a pixel level;

receiving a selection of at least one of the one or more candidate ingestible products; and directing control of at least partial preparation via at least one production machine of the one or more selected ingestible products.

53. The method of claim 52, wherein outputting at least one of the one or more selection menus in ingestible sample form via at least one electronic food printer, the at least one electronic food printer configured to print at least one ingestible sample via at least one of deposition by layering or deposition at a pixel level and directing control of at least partial preparation via at least one production machine of the one or more selected ingestible products comprise:

outputting at least one of the one or more selection menus via at least one electronic food printer and directing control of at least partial preparation, via at least one production machine, of the one or more selected ingestible products, wherein the at least one electronic food printer and the at least one production machine are operably coupled via at least one network connection.

54. The method of claim 53, wherein outputting at least one of the one or more selection menus via at least one electronic food printer and directing control of at least partial preparation, via at least one production machine, of the one or more selected ingestible products, wherein the at least one electronic food printer and the at least one production machine are operably coupled via at least one network connection comprises:

outputting from a dispensing machine within an interior of a shopping mall, the dispensing machine including at least an electronic food printer, at least one of the one or more selection menus via the least one electronic food printer, and directing control of at least partial preparation, via at least one production machine within an interior of a factory, of the one or more selected ingestible products, wherein the at least one dispensing machine and the at least one production machine are operably coupled via at least one network connection.

55. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:

electronically receiving control signals from a distal location to control at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being.

56. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:

electronically providing control signals from a local location to control at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being.

57. The method of claim 1, wherein the electronically directing control via at least one production machine of at least partial preparation of the at least one selected ingestible product subsequent to and based at least in part upon the selection of the at least one candidate ingestible product as the at least one selected ingestible product via the electronically enabled input in response to the electronically outputted one or more selection menus and prior to dispensing of the at least one selected ingestible product subject to ingestion by the particular individual living being comprises:

electronically receiving control signals to control at least partial preparation of the at least one selected ingestible product from a distal location within a vicinity of the electronically outputting of the electronically generated one or more selection menus, the vicinity including at least within an international region.

58. The method of claim 57, wherein the electronically receiving control signals to control at least partial preparation of the at least one selected ingestible product from a distal location within a vicinity of the electronically outputting of the electronically generated one or more selection menus, the vicinity including at least within an international region comprises:

electronically receiving control signals from a foreign country to direct control of at least partial preparation of the at least one selected ingestible product.

59. The method of claim 52, wherein directing control of at least partial preparation via at least one production machine of the one or more selected ingestible products comprises:

receiving control signals from a distal location to control at least partial preparation of the one or more selected ingestible products.

60. The method of claim 52, wherein directing control of at least partial preparation via at least one production machine of the one or more selected ingestible products comprises:

providing control signals from a local location to control at least partial preparation of the one or more selected ingestible products.

\* \* \* \* \*

UNITED STATES PATENT AND TRADEMARK OFFICE
CERTIFICATE OF CORRECTION

PATENT NO. : 9,111,256 B2  
APPLICATION NO. : 13/317979  
DATED : August 18, 2015  
INVENTOR(S) : Paul Holman et al.

Page 1 of 1

It is certified that error appears in the above-identified patent and that said Letters Patent is hereby corrected as shown below:

On the Title Page, Lines 14-15, Abstract (57) please replace ". . . as at least one selected ingestible products" with -- . . as at least one selected ingestible product --

Claims

At Column 108, Line 20, Claim 20 please replace "selection menus electronically identifying at least in part" with -- selection menus identifying at least in part --

At Column 109, Line 23, Claim 25 please replace "selection menus electronically identifying at least in part" with -- selection menus identifying at least in part --

At Column 115, Line 23, Claim 54 please replace "more selection menus via the least one electronic food" with -- more selection menus via the at least one electronic food --

At Column 115, Line 23, Claim 54 please replace "more selection menus via the least one electronic food" with -- more selection menus via the at least one electronic food --

Signed and Sealed this  
Fifth Day of July, 2016

Michelle K. Lee  
*Director of the United States Patent and Trademark Office*